(12) United States Patent
Shimizu et al.

(10) Patent No.: US 10,654,190 B2
(45) Date of Patent: May 19, 2020

(54) STAPLER, POST-PROCESSING APPARATUS AND IMAGE FORMING SYSTEM

(71) Applicant: MAX CO., LTD., Chuo-ku, Tokyo (JP)

(72) Inventors: Toshio Shimizu, Tokyo (JP); Futoshi Kameda, Tokyo (JP); Yoshio Chigira, Tokyo (JP); Shinpei Sugihara, Tokyo (JP)

(73) Assignee: MAX CO., LTD., Tokyo (JP)

( * ) Notice: Subject to any disclaimer, the term of this patent is extended or adjusted under 35 U.S.C. 154(b) by 639 days.

(21) Appl. No.: 15/386,411

(22) Filed: Dec. 21, 2016

(65) Prior Publication Data

US 2017/0173817 A1 Jun. 22, 2017

(30) Foreign Application Priority Data

Dec. 22, 2015 (JP) ................................ 2015-249547
Oct. 31, 2016 (JP) ................................ 2016-213879

(51) Int. Cl.
*B27F 7/19* (2006.01)
*B27F 7/38* (2006.01)
(Continued)

(52) U.S. Cl.
CPC .............. *B27F 7/19* (2013.01); *B25C 5/0207* (2013.01); *B27F 7/006* (2013.01); *B27F 7/21* (2013.01);
(Continued)

(58) Field of Classification Search
CPC . G03G 2215/00827; B27F 7/19; B65H 37/04; B65H 2301/51611; B65H 2408/12; B65H 2408/124
See application file for complete search history.

(56) References Cited

U.S. PATENT DOCUMENTS 4,386,725 A 6/1983 Chambers
4,844,319 A 7/1989 Kurosawa
(Continued)

FOREIGN PATENT DOCUMENTS

EP A1-1683616 7/2006
JP S63-72001 U 5/1988
(Continued)

OTHER PUBLICATIONS

EP Communication under Rule 71(3) dated May 24, 2018 in corresponding European patent application 1600272.9 (297 pages).
(Continued)

*Primary Examiner* — Erika J Villaluna
(74) *Attorney, Agent, or Firm* — Rothwell, Figg, Ernst & Manbeck, P.C.

(57) ABSTRACT

A stapler includes a staple cartridge in which a staple is stored, a storage unit to which the staple cartridge is detachably attached, a staple ejecting unit which ejects the staple to penetrate a paper sheet, a cutting unit which cuts a staple leg of the staple penetrating the paper sheet, a binding unit which bends the staple leg of the staple penetrating the paper sheet to bind the paper sheet, a cut staple storage unit which stores a cut staple that is cut by the cutting unit, a cut staple quantity detection unit which detects a quantity of the cut staple stored in the cut staple storage unit, and a discharge unit through which the cutting unit and the cut staple storage unit communicate with each other to guide the cut staple to the cut staple storage unit. The cut staple storage unit is attachable to and detachable from the stapler.

16 Claims, 169 Drawing Sheets

MODIFIED EXAMPLE OF CUT STAPLE STORAGE UNIT FOR
PERFORMING CUT STAPLE FULL LOAD DETECTION

(51) Int. Cl.
*B27F 7/21* (2006.01)
*B27F 7/00* (2006.01)
*B25C 5/02* (2006.01)
*B42B 5/00* (2006.01)
*G01J 1/04* (2006.01)
*G01V 8/10* (2006.01)

(52) U.S. Cl.
CPC ............... *B27F 7/38* (2013.01); *B42B 5/00* (2013.01); *G01J 1/0425* (2013.01); *G01V 8/10* (2013.01)

(56) References Cited

U.S. PATENT DOCUMENTS

| | | | | |
|---|---|---|---|---|
| 7,240,817 B2 * | 7/2007 | Higuchi | ............... | B25C 5/1689 227/110 |
| 7,396,008 B2 * | 7/2008 | Sato | ............... | B27F 7/006 227/78 |
| 7,472,899 B2 * | 1/2009 | Moriyama | ............ | B65H 35/008 270/58.08 |
| 2007/0034665 A1 | 2/2007 | Shimizu et al. | | |
| 2008/0035699 A1 | 2/2008 | Shimizu et al. | | |
| 2008/0223899 A1 | 9/2008 | Kishi et al. | | |
| 2014/0001225 A1 | 1/2014 | Strååt | | |

FOREIGN PATENT DOCUMENTS

| | | |
|---|---|---|
| JP | 2006-026859 A | 2/2006 |
| JP | 2006-168185 A | 6/2006 |
| WO | WO-A1-2012-125098 | 9/2012 |

OTHER PUBLICATIONS

Extended European Search Report dated May 4, 2017 in corresponding European patent application 16002724.9 (8 pages).

* cited by examiner

CONFIGURATION EXAMPLE OF IMAGE FORMING SYSTEM OF PRESENT EMBODIMENT

CONFIGURATION EXAMPLE OF POST-PROCESSING APPARATUS

OF PRESENT EMBODIMENT

OPERATIONAL EXAMPLE OF BINDING SHEET WITH STAPLE

CONFIGURATION EXAMPLE OF STAPLER OF

FIRST EMBODIMENT

CONFIGURATION EXAMPLE OF STAPLER OF

FIRST EMBODIMENT

CONFIGURATION EXAMPLE OF STAPLER OF

FIRST EMBODIMENT

CONFIGURATION EXAMPLE OF STAPLER OF

SECOND EMBODIMENT

CONFIGURATION EXAMPLE OF STAPLER OF

SECOND EMBODIMENT

CONFIGURATION EXAMPLE OF STAPLER OF

SECOND EMBODIMENT

CONFIGURATION EXAMPLE OF STAPLER OF

THIRD EMBODIMENT

CONFIGURATION EXAMPLE OF STAPLER OF

THIRD EMBODIMENT

CONFIGURATION EXAMPLE OF STAPLER OF

FOURTH EMBODIMENT

CONFIGURATION EXAMPLE OF STAPLER OF

FOURTH EMBODIMENT

CONFIGURATION EXAMPLE OF STAPLER OF

FOURTH EMBODIMENT

CONFIGURATION EXAMPLE OF STAPLER OF

FIFTH EMBODIMENT

CONFIGURATION EXAMPLE OF STAPLER OF

SIXTH EMBODIMENT

CONFIGURATION EXAMPLE OF STAPLER OF

SIXTH EMBODIMENT

CONFIGURATION EXAMPLE OF STAPLER OF

SEVENTH EMBODIMENT

CONFIGURATION EXAMPLE OF STAPLER OF

SEVENTH EMBODIMENT

CONFIGURATION EXAMPLE OF STAPLER OF

EIGHTH EMBODIMENT

CONFIGURATION EXAMPLE OF STAPLE CARTRIDGE OF PRESENT EMBODIMENT

CONFIGURATION EXAMPLE OF REFILL OF

PRESENT EMBODIMENT

CONFIGURATION EXAMPLE OF REFILL OF

PRESENT EMBODIMENT

CONFIGURATION EXAMPLE OF REFILL OF

PRESENT EMBODIMENT

MODIFIED EXAMPLE OF REFILL OF PRESENT EMBODIMENT

MODIFIED EXAMPLE OF REFILL OF PRESENT EMBODIMENT

MODIFIED EXAMPLE OF REFILL OF PRESENT EMBODIMENT

MODIFIED EXAMPLE OF REFILL OF PRESENT EMBODIMENT

MODIFIED EXAMPLE OF REFILL OF PRESENT EMBODIMENT

MODIFIED EXAMPLE OF REFILL OF PRESENT EMBODIMENT

MODIFIED EXAMPLE OF REFILL OF PRESENT EMBODIMENT

MODIFIED EXAMPLE OF REFILL OF PRESENT EMBODIMENT

MODIFIED EXAMPLE OF REFILL OF PRESENT EMBODIMENT

CONFIGURATION EXAMPLE OF STAPLER OF

NINTH EMBODIMENT

CONFIGURATION EXAMPLE OF STAPLER OF

NINTH EMBODIMENT

CONFIGURATION EXAMPLE OF STAPLER OF

NINTH EMBODIMENT

CONFIGURATION EXAMPLE OF STAPLER OF

NINTH EMBODIMENT

CONFIGURATION EXAMPLE OF STAPLER OF

NINTH EMBODIMENT

MODIFIED EXAMPLE OF STAPLER OF NINTH EMBODIMENT

MODIFIED EXAMPLE OF STAPLER OF NINTH EMBODIMENT

MODIFIED EXAMPLE OF STAPLER OF NINTH EMBODIMENT

CONFIGURATION EXAMPLE OF STAPLER OF

TENTH EMBODIMENT

CONFIGURATION EXAMPLE OF STAPLER OF

TENTH EMBODIMENT

CONFIGURATION EXAMPLE OF STAPLER OF

TENTH EMBODIMENT

CONFIGURATION EXAMPLE OF STAPLER OF

TENTH EMBODIMENT

CONFIGURATION EXAMPLE OF STAPLER OF

TENTH EMBODIMENT

MODIFIED EXAMPLE OF STAPLER OF TENTH EMBODIMENT

MODIFIED EXAMPLE OF STAPLER OF TENTH EMBODIMENT

MODIFIED EXAMPLE OF STAPLER OF TENTH EMBODIMENT

CONFIGURATION EXAMPLE OF STAPLER OF

ELEVENTH EMBODIMENT

CONFIGURATION EXAMPLE OF STAPLER OF

ELEVENTH EMBODIMENT

CONFIGURATION EXAMPLE OF STAPLER OF

ELEVENTH EMBODIMENT

CONFIGURATION EXAMPLE OF STAPLER OF

TWELFTH EMBODIMENT

CONFIGURATION EXAMPLE OF STAPLER OF

TWELFTH EMBODIMENT

CONFIGURATION EXAMPLE OF CUT STAPLE STORAGE UNIT

MODIFIED EXAMPLE OF STAPLER OF TWELFTH EMBODIMENT

MODIFIED EXAMPLE OF STAPLER OF TWELFTH EMBODIMENT

MODIFIED EXAMPLE OF STAPLER OF TWELFTH EMBODIMENT

ANOTHER MODIFIED EXAMPLE OF STAPLER OF

TWELFTH EMBODIMENT

ANOTHER MODIFIED EXAMPLE OF STAPLER OF

TWELFTH EMBODIMENT

ANOTHER MODIFIED EXAMPLE OF STAPLER OF

TWELFTH EMBODIMENT

ANOTHER MODIFIED EXAMPLE OF STAPLER OF

TWELFTH EMBODIMENT

ANOTHER MODIFIED EXAMPLE OF STAPLER OF

TWELFTH EMBODIMENT

ANOTHER MODIFIED EXAMPLE OF STAPLER OF

TWELFTH EMBODIMENT

ANOTHER MODIFIED EXAMPLE OF STAPLER OF

TWELFTH EMBODIMENT

CONFIGURATION EXAMPLE OF STAPLER OF

THIRTEENTH EMBODIMENT

CONFIGURATION EXAMPLE OF STAPLER OF

THIRTEENTH EMBODIMENT

CONFIGURATION EXAMPLE OF MAIN PARTS OF STAPLER OF

THIRTEENTH EMBODIMENT

CONFIGURATION EXAMPLE OF MAIN PARTS OF STAPLER OF

THIRTEENTH EMBODIMENT

MODIFIED EXAMPLE OF STAPLER OF THIRTEENTH EMBODIMENT

MODIFIED EXAMPLE OF STAPLER OF THIRTEENTH EMBODIMENT

CONFIGURATION EXAMPLE OF STAPLER OF

FOURTEENTH EMBODIMENT

CONFIGURATION EXAMPLE OF STAPLER OF

FOURTEENTH EMBODIMENT

CONFIGURATION EXAMPLE OF STAPLER OF

FOURTEENTH EMBODIMENT

CONFIGURATION EXAMPLE OF STAPLER OF

FOURTEENTH EMBODIMENT

CONFIGURATION EXAMPLE OF STAPLER OF

FOURTEENTH EMBODIMENT

MODIFIED EXAMPLE OF STAPLER OF

FOURTEENTH EMBODIMENT

MODIFIED EXAMPLE OF STAPLER OF

FOURTEENTH EMBODIMENT

MODIFIED EXAMPLE OF STAPLER OF

FOURTEENTH EMBODIMENT

MODIFIED EXAMPLE OF CUT STAPLE STORAGE UNIT

ANOTHER MODIFIED EXAMPLE OF CUT STAPLE STORAGE

MODIFIED EXAMPLE OF CUT STAPLE STORAGE UNIT

ANOTHER MODIFIED EXAMPLE OF CUT STAPLE STORAGE UNIT

MODIFIED EXAMPLE OF CUT STAPLE STORAGE UNIT

ANOTHER MODIFIED EXAMPLE OF CUT STAPLE STORAGE UNIT

CONFIGURATION EXAMPLE OF POST-PROCESSING APPARATUS

OF PRESENT EMBODIMENT

MODIFIED EXAMPLE OF POST-PROCESSING APPARATUS OF PRESENT EMBODIMENT

ANOTHER MODIFIED EXAMPLE OF POST-PROCESSING APPARATUS OF PRESENT EMBODIMENT

ANOTHER MODIFIED EXAMPLE OF POST-PROCESSING APPARATUS OF PRESENT EMBODIMENT

ANOTHER MODIFIED EXAMPLE OF POST-PROCESSING

APPARATUS OF PRESENT EMBODIMENT

ANOTHER MODIFIED EXAMPLE OF CUT STAPLE STORAGE UNIT

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT
FOR PERFORMING CUT STAPLE FULL LOAD DETECTION

CONFIGURATION EXAMPLE OF STAPLER OF PRESENT EMBODIMENT FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT
FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT

FOR PERFORMING CUT STAPLE FULL LOAD DETECTION

CONFIGURATION EXAMPLE OF STAPLER OF PRESENT EMBODIMENT FOR PERFORMING CUT STAPLE FULL LOAD DETECTION

CONFIGURATION EXAMPLE OF STAPLER OF PRESENT EMBODIMENT
FOR PERFORMING CUT STAPLE FULL LOAD DETECTION

CONFIGURATION EXAMPLE OF STAPLER OF PRESENT EMBODIMENT
FOR PERFORMING CUT STAPLE FULL LOAD DETECTION
FIG.134A
FIG.134B
FIG.134C
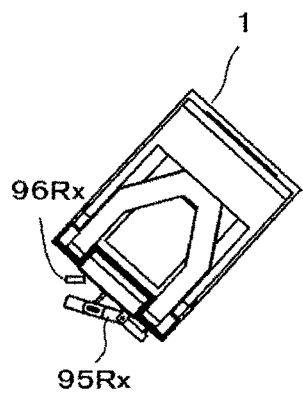
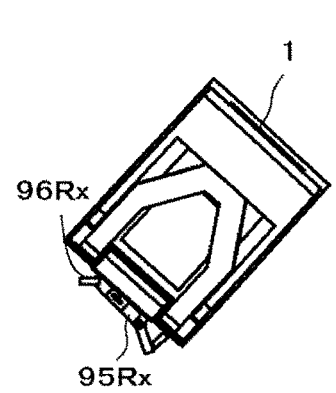
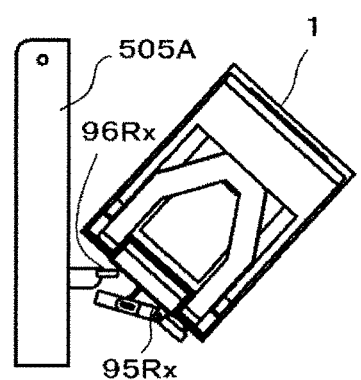

CONFIGURATION EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF CUT STAPLE STORAGE UNIT FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT
FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT FOR PERFORMING CUT STAPLE FULL LOAD DETECTION

MODIFIED EXAMPLE OF STAPLER OF PRESENT EMBODIMENT
FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT
FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT
FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF STAPLER OF PRESENT EMBODIMENT

FOR PERFORMING CUT STAPLE FULL LOAD DETECTION

MODIFIED EXAMPLE OF POST-PROCESSING APPARATUS OF PRESENT EMBODIMENT FOR PERFORMING CUT STAPLE FULL LOAD DETECTION

MODIFIED EXAMPLE OF POST-PROCESSING APPARATUS OF PRESENT EMBODIMENT FOR PERFORMING CUT STAPLE FULL LOAD DETECTION

MODIFIED EXAMPLE OF POST-PROCESSING APPARATUS OF PRESENT EMBODIMENT FOR PERFORMING CUT STAPLE FULL LOAD DETECTION

MODIFIED EXAMPLE OF POST-PROCESSING APPARATUS OF PRESENT EMBODIMENT FOR PERFORMING CUT STAPLE FULL LOAD DETECTION

MODIFIED EXAMPLE OF POST-PROCESSING APPARATUS OF PRESENT EMBODIMENT FOR PERFORMING CUT STAPLE FULL LOAD DETECTION

MODIFIED EXAMPLE OF POST-PROCESSING APPARATUS OF PRESENT EMBODIMENT FOR PERFORMING CUT STAPLE FULL LOAD DETECTION

STAPLER, POST-PROCESSING APPARATUS AND IMAGE FORMING SYSTEM

CROSS-REFERENCE TO RELATED APPLICATION

This application claims priorities from Japanese Patent Applications No. 2015-249547 filed on Dec. 22, 2015 and No. 2016-213879 filed on Oct. 31, 2016 the entire contents of which are incorporated herein by reference.

FIELD

The present disclosure relates to a stapler for binding a plurality of sheets with a staple, a post-processing apparatus on which a stapler is mounted, and an image forming system in which the post-processing apparatus is connected to an image forming apparatus.

BACKGROUND

In an electric stapler used in a post-processing apparatus, there is suggestion of a technique in which a staple having a staple foot of a length capable of binding the maximum number of sheets to be assumed is stored, and in a case where the number of sheets to be bound is small or the like, the staple foot is cut and bound.

In the related-art stapler mounted on the post-processing apparatus, the cut staple storage unit is provided on the post-processing apparatus side, the cut staple is temporarily stored in a discharge path of the cut staple provided in the stapler, the stapler is moved to the position of the cut staple storage unit, and the cut staple is discharged from the stapler to the cut staple storage unit (see, for example, Japanese Utility Model Application Publication No. 63-72001 and Japanese Unexamined Patent Application Publication No. 2006-26859).

Further, there is suggestion of a technique of providing a staple storage unit in a staple cartridge which stores a staple (see, for example, Japanese Unexamined Patent Application Publication No. 2006-168185).

In the related art, since it is necessary to move the stapler to a position of the cut staple storage unit provided on the side of the post-processing apparatus in order to recover the cut staple, the productivity of a booklet for binding the sheet with the staple decreases. When the number of cut staples temporarily stored in a discharge passage provided in the stapler is large, in a state in which the stapler is moved to the position of the cut staple storage unit, there was a possibility that the cut staple may leak into the post-processing apparatus from the discharge passage.

In a configuration in which the staple cartridge has a cut staple storage unit, the quantity of the cut staple that can be stored in the cut staple storage unit decreases, and it was necessary to recover the cut staple from the cut staple storage unit before the staple stored in the staple cartridge disappeared. In the related art, it was not possible to detect the quantity of the cut staple stored in the cut staple storage unit and to detect and report whether the quantity of the cut staple stored in the cut staple storage unit was full.

The present disclosure has been made to solve such a problem, and an object thereof is to provide a stapler capable of storing a predetermined quantity of cut staples and capable of detecting that the quantity of cut staples is fully loaded, a post-processing apparatus on which the stapler is mounted, and an image forming system in which the post-processing apparatus is connected to the image forming apparatus.

A stapler may comprise a staple cartridge in which a staple is stored, a storage unit to which the staple cartridge is detachably attached, a staple ejecting unit which ejects the staple to penetrate a paper sheet, a cutting unit which cuts a staple leg of the staple penetrating the paper sheet, a binding unit which bends the staple leg of the staple penetrating the paper sheet to bind the paper sheet, a cut staple storage unit which stores a cut staple that is cut by the cutting unit, a cut staple quantity detection unit which detects a quantity of the cut staple stored in the cut staple storage unit, and a discharge unit through which the cutting unit and the cut staple storage unit communicate with each other to guide the cut staple to the cut staple storage unit. The cut staple storage unit may be attachable to and detachable from the stapler.

A post-processing apparatus may comprise a stapler. The post-processing apparatus may perform post-processing on a paper sheet on which an image is formed. The stapler may include a staple cartridge in which a staple is stored, a storage unit to which the staple cartridge is detachably attached, a staple ejecting unit which ejects a staple to penetrate a paper sheet, a cutting unit which cuts a staple leg of the staple penetrating the paper sheet, a binding unit which bends the staple leg of the staple penetrating the paper sheet to bind the paper sheet, a cut staple storage unit which stores a cut staple that is cut by the cutting unit; and a discharge unit through which the cutting unit and the cut staple storage unit communicate with each other to guide a cut staple to a cut staple storage unit. The cut staple storage unit may be detachable to and detached from the stapler. The post-processing apparatus may further comprise a cut staple quantity detection unit which detects a quantity of the cut staple stored in the cut staple storage unit.

An image forming system may comprise an image forming apparatus which forms an image on a paper sheet and outputs the image, and the post-processing apparatus which is connected to the image forming apparatus and performs post-processing on the paper sheet.

In the present disclosure, the cut staple is stored in the cut staple storage unit provided in the stapler. The quantity of the cut staple stored in the cut staple storage unit is detected, and the quantity of the cut staple being fully loaded is detected. Recovery of the cut staple achieved by detecting that the quantity of the cut staple is full is performed by removing the cut staple storage unit from the stapler.

In the present disclosure, by providing the cut staple storage unit in the stapler, it is possible to store the cut staple in the cut staple storage unit regardless of the position of the stapler in the post-processing apparatus. Thus, in order to recover the cut staple, since there is no need to move the stapler to a specific position, the productivity of the booklet for binding the sheet with the staple is improved.

Since the cut staple storage unit is configured to be attachable to and detachable from the stapler, the recovery of the cut staple can be performed by removing the cut staple storage unit from the stapler. Thus, when the cut staple is recovered, it is possible to suppress an occurrence of failure such as the cut staple falling into the post-processing apparatus.

By detecting the quantity of the cut staple stored in the cut staple storage unit, it is possible to detect and notify that the cut staple is full.

BRIEF DESCRIPTION OF DRAWINGS

FIG. 120 is a configuration diagram illustrating an example of a stapler according to another embodiment that performs the cut staple full load detection;

FIG. 121 is a configuration diagram illustrating an example of a stapler according to another embodiment that performs the cut staple full load detection;

FIG. 122 is a configuration diagram illustrating a modified example of a stapler according to another embodiment that performs the cut staple full load detection;

FIGS. 123A and 123B are configuration diagrams illustrating a modified example of a stapler according to another embodiment that performs the cut staple full load detection;

FIGS. 124A and 124B are configuration diagrams illustrating a modified example of a stapler according to another embodiment that performs the cut staple full load detection;

FIGS. 125A and 125B are configuration diagrams illustrating a modified example of the stapler according to another embodiment that performs the cut staple full load detection;

FIGS. 126A and 126B are configuration diagrams illustrating a modified example of a stapler according to another embodiment that performs the cut staple full load detection;

FIGS. 127A and 127B are configuration diagrams illustrating a modified example of a stapler according to another embodiment that performs the cut staple full load detection;

FIG. 128 is a configuration diagram illustrating a modified example of a stapler according to another embodiment that performs the cut staple full load detection;

FIGS. 129A and 129B are configuration diagrams illustrating a modified example of the stapler according to another embodiment that performs the cut staple full load detection;

FIG. 130 is a configuration diagram illustrating a modified example of a stapler according to another embodiment that performs the cut staple full load detection;

FIG. 131 is a configuration diagram illustrating a modified example of a stapler according to another embodiment that performs the cut staple full load detection;

Figure 132A:
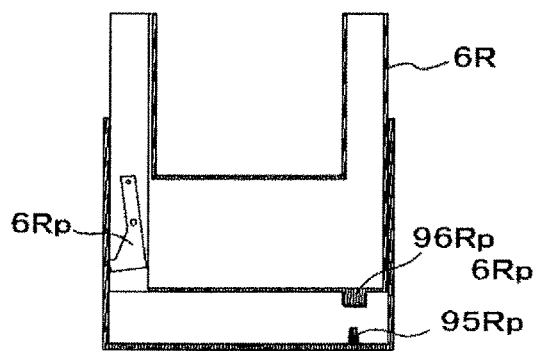
Figure 132B:
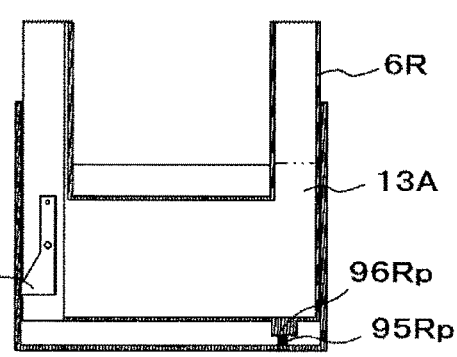
Figure 133A:
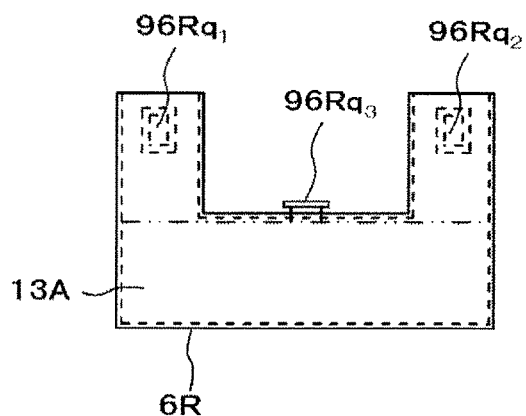
Figure 133B:
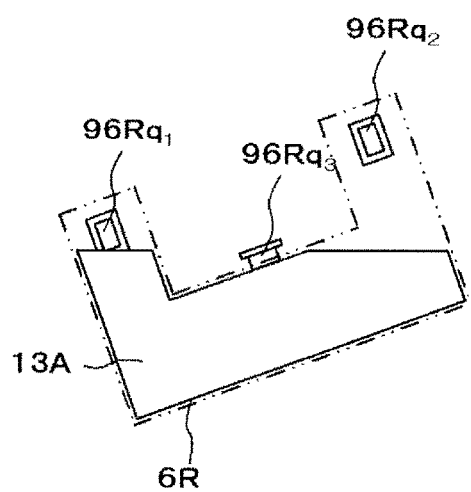
Figure 135:
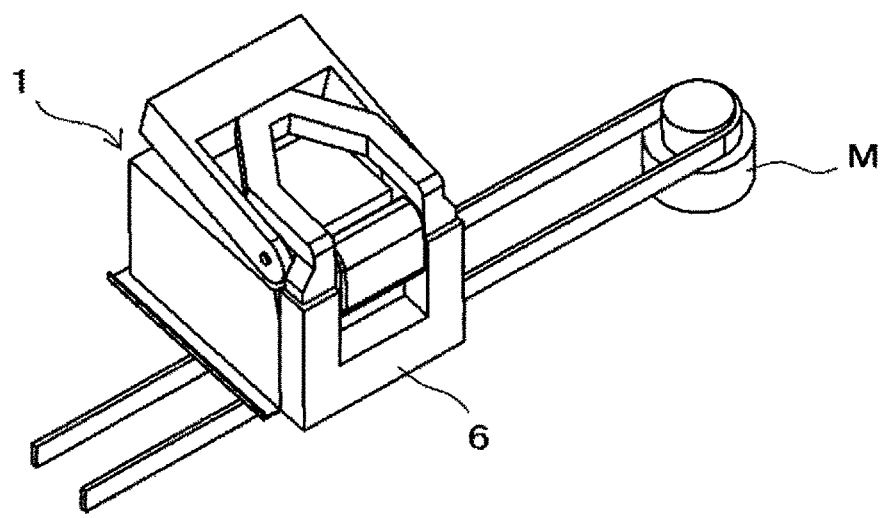
Figure 136:
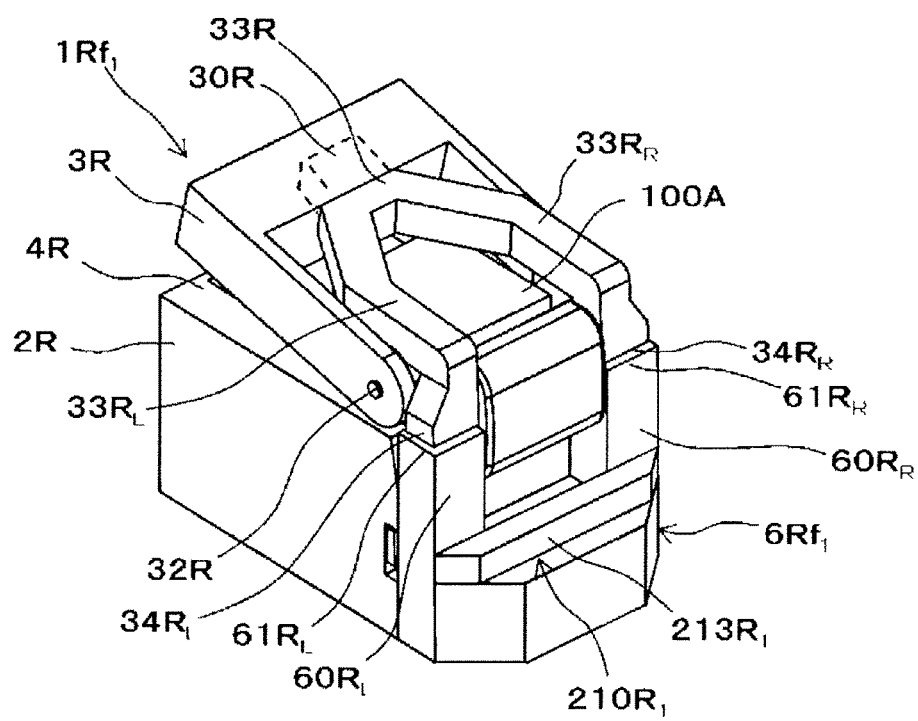
Figure 137:
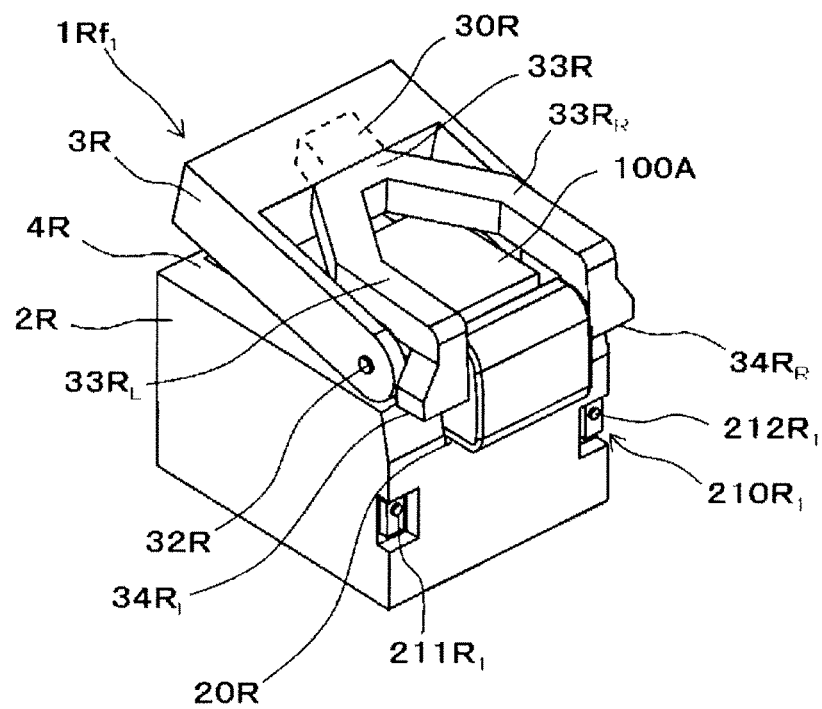
Figure 138:
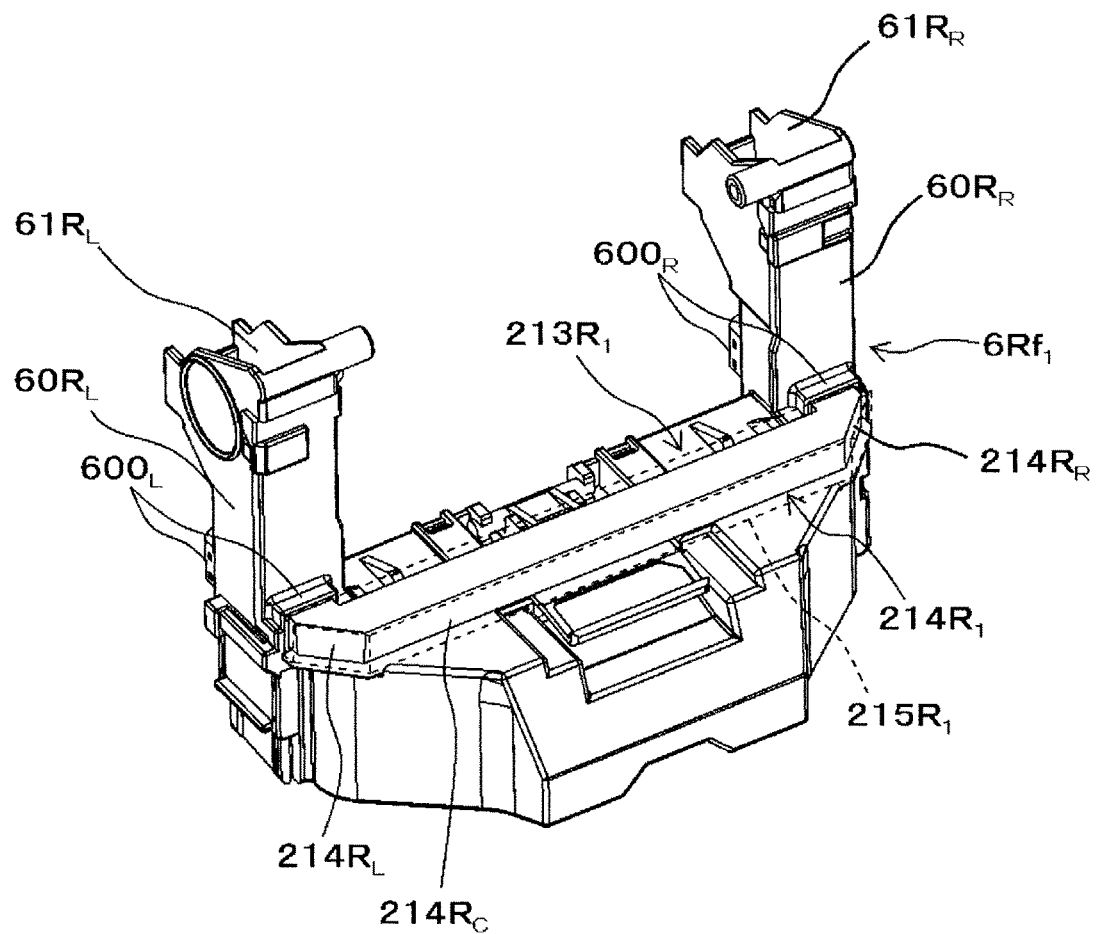
Figure 139:
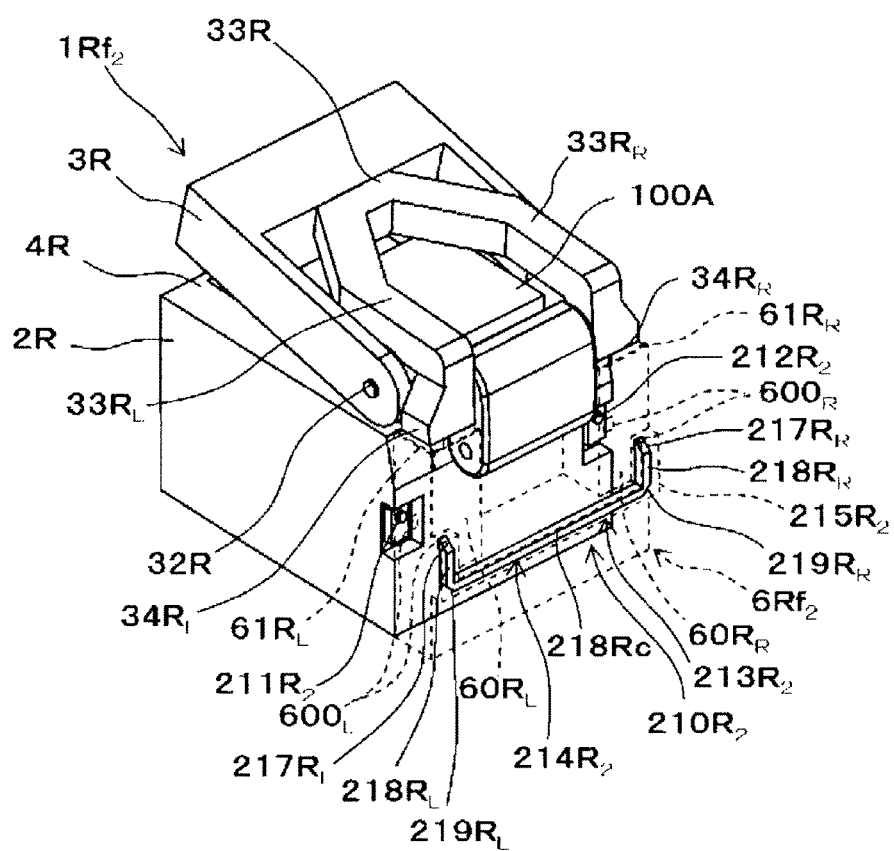
Figure 140:
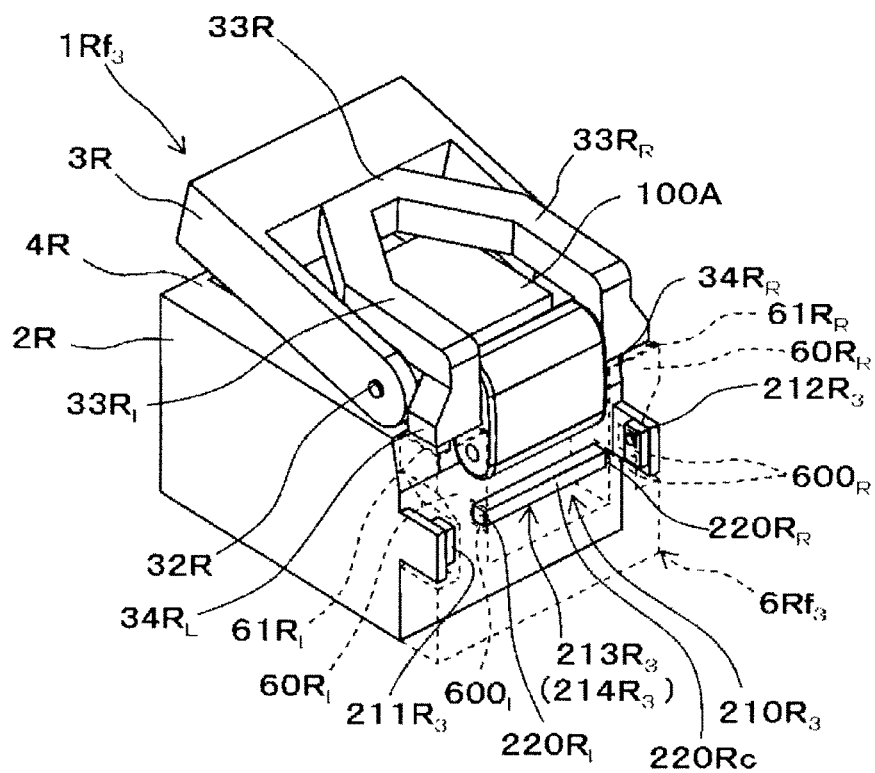
Figure 141:
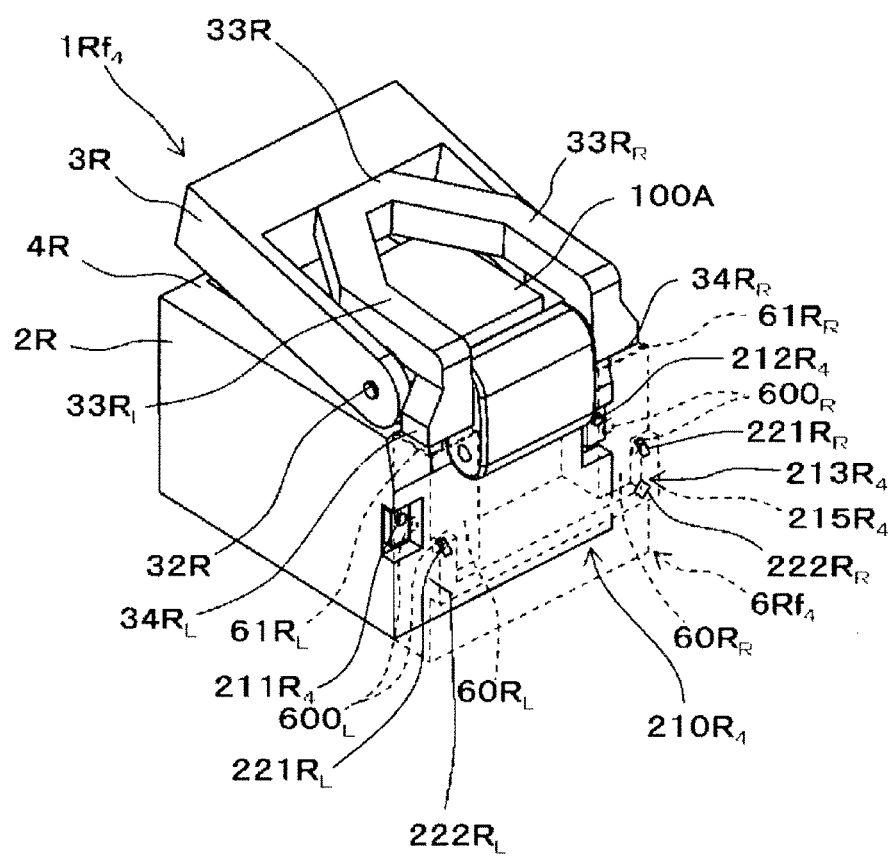
Figure 142:
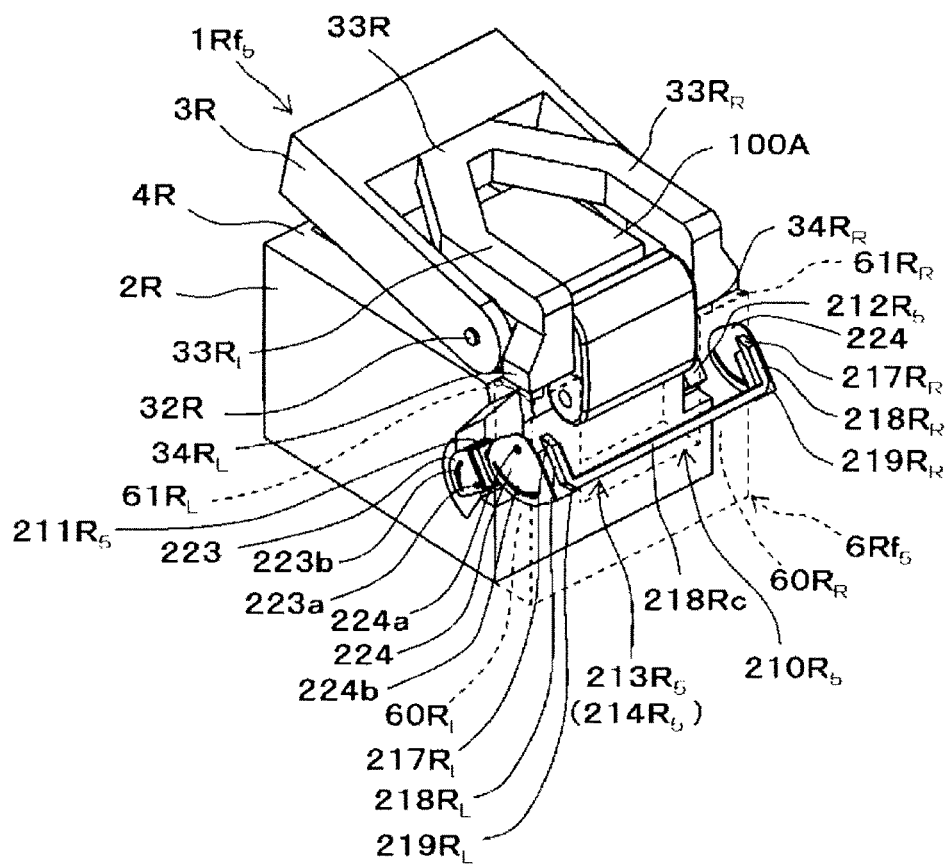
Figure 143:
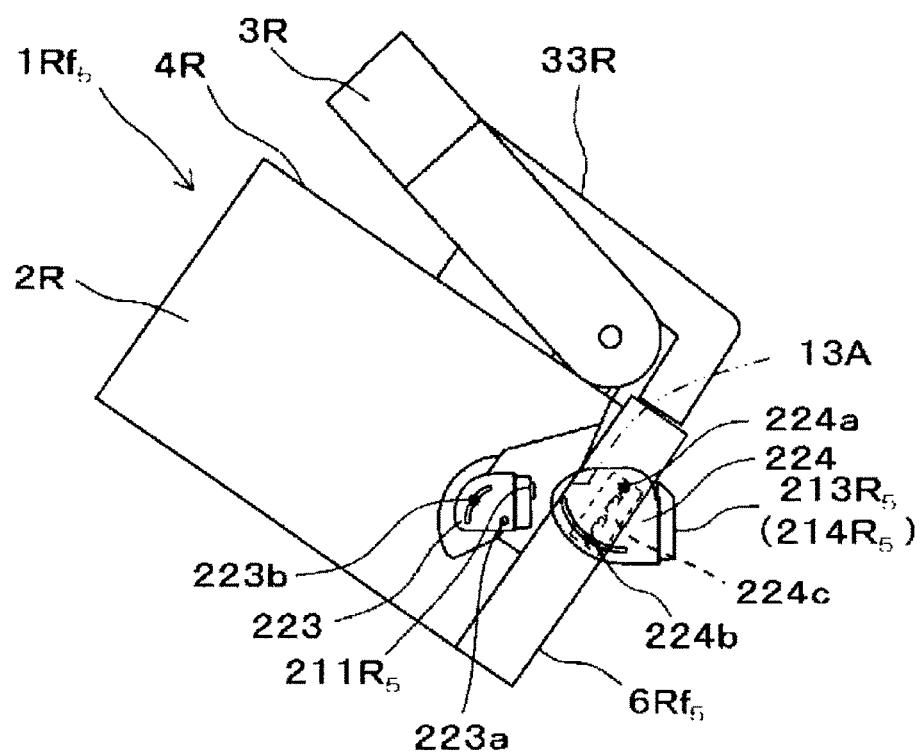
Figure 144:
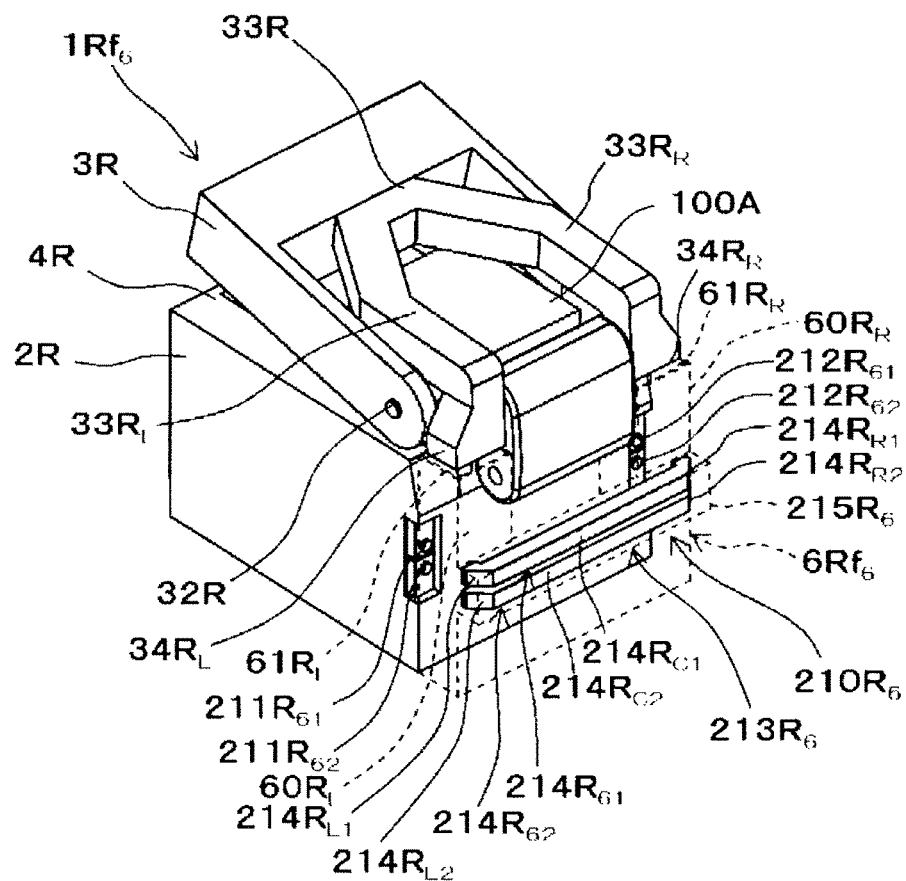
Figure 145A:
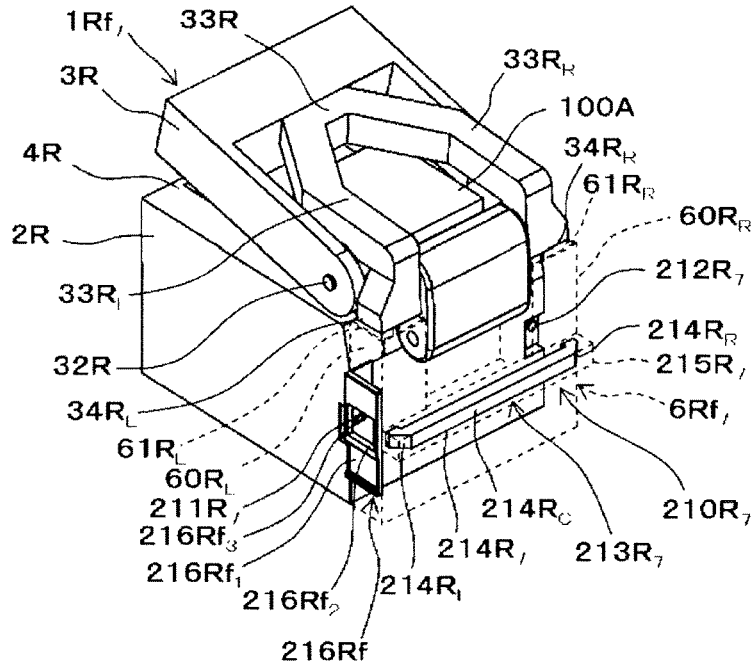
Figure 145A:
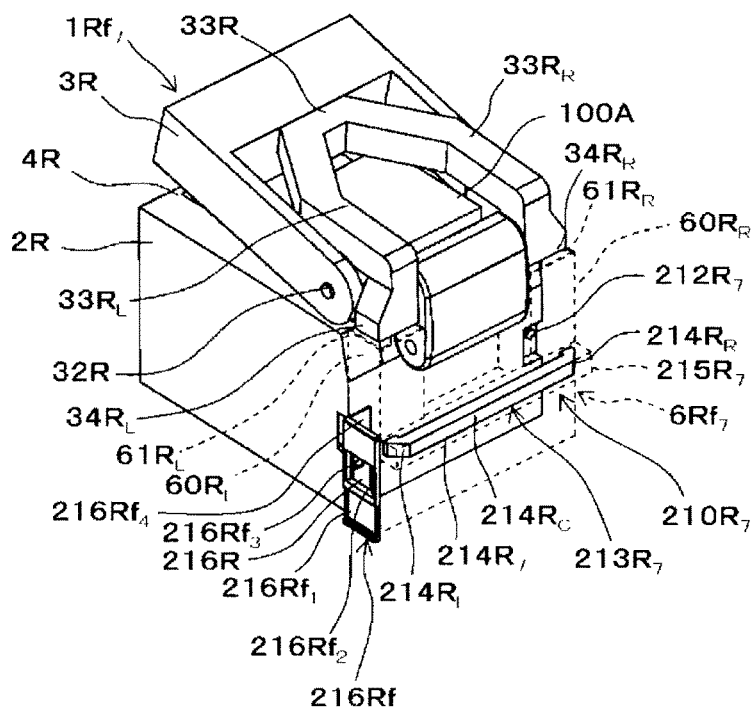
Figure 146:
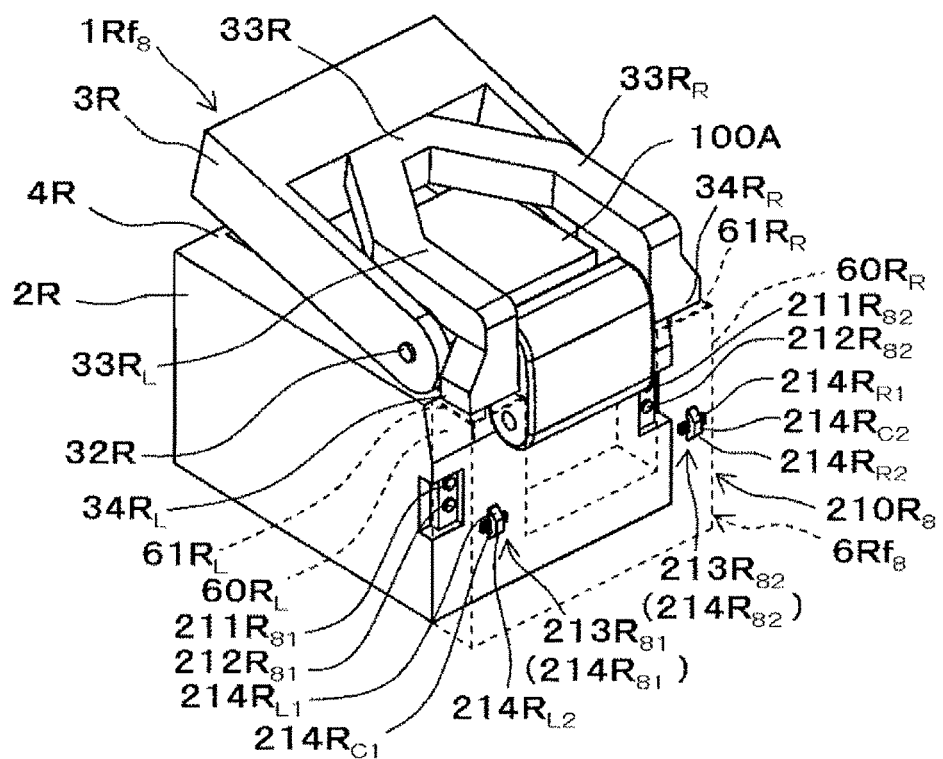
Figure 147:
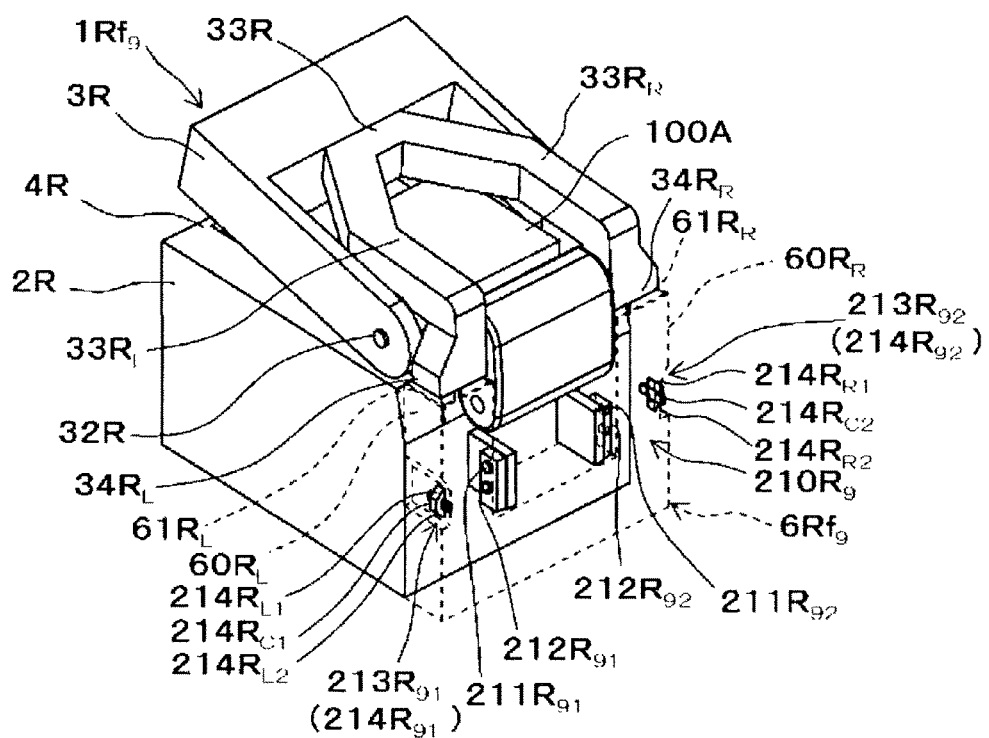
Figure 148:
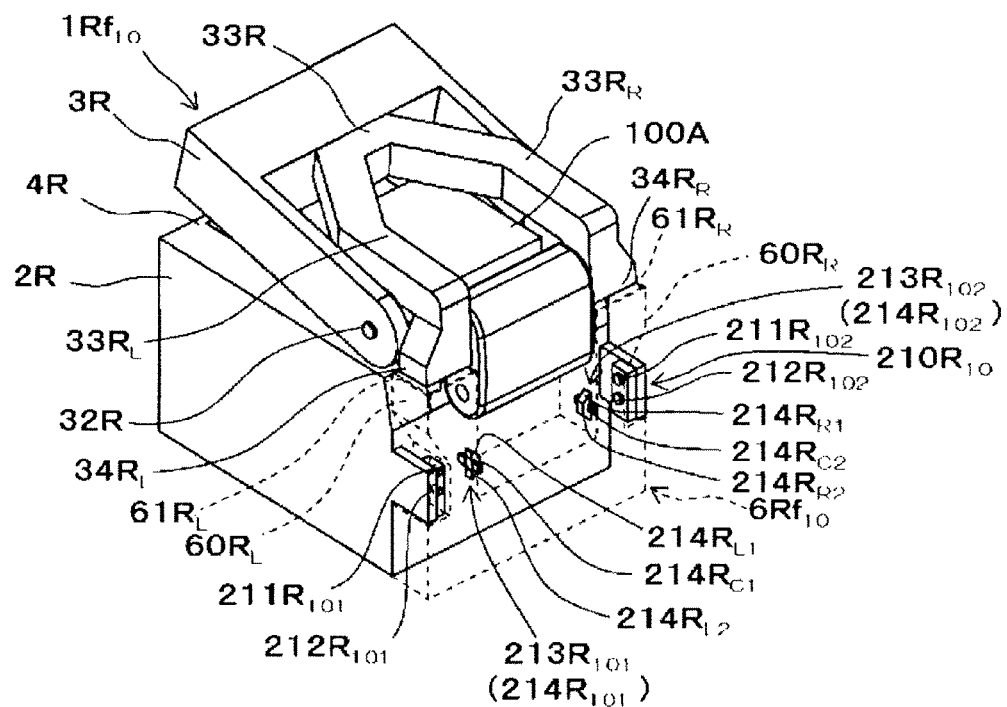
Figure 149:
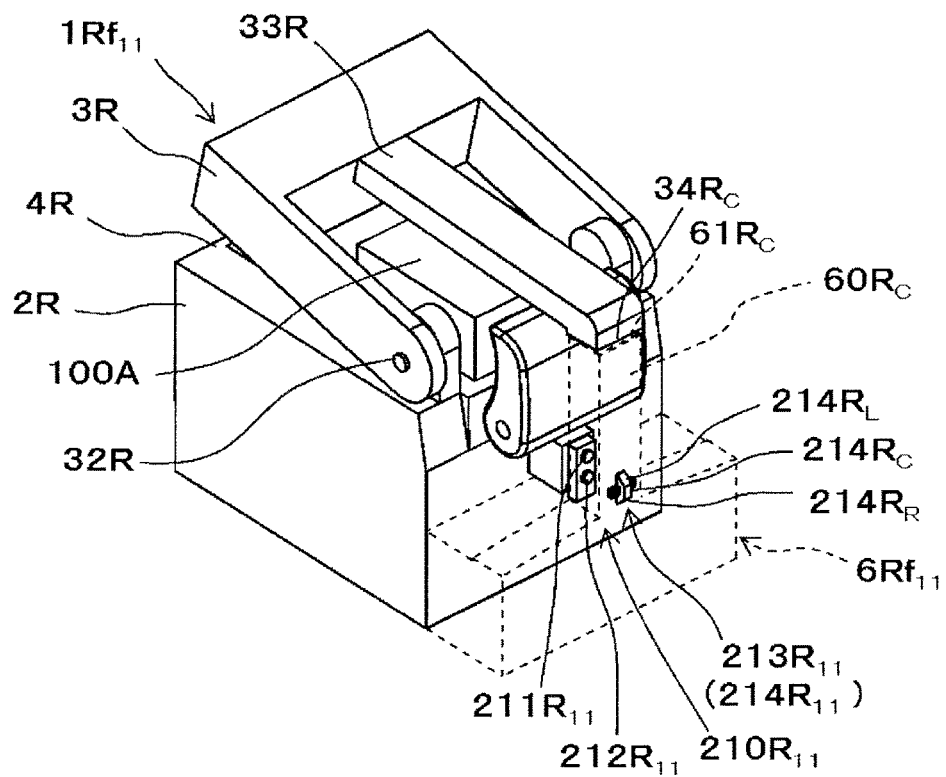
Figure 150A:
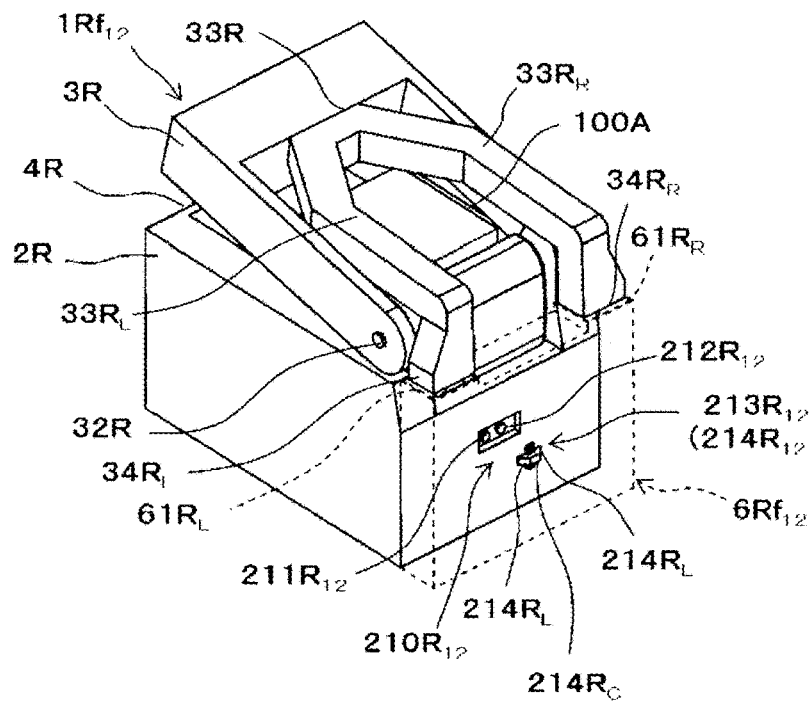
Figure 150B:
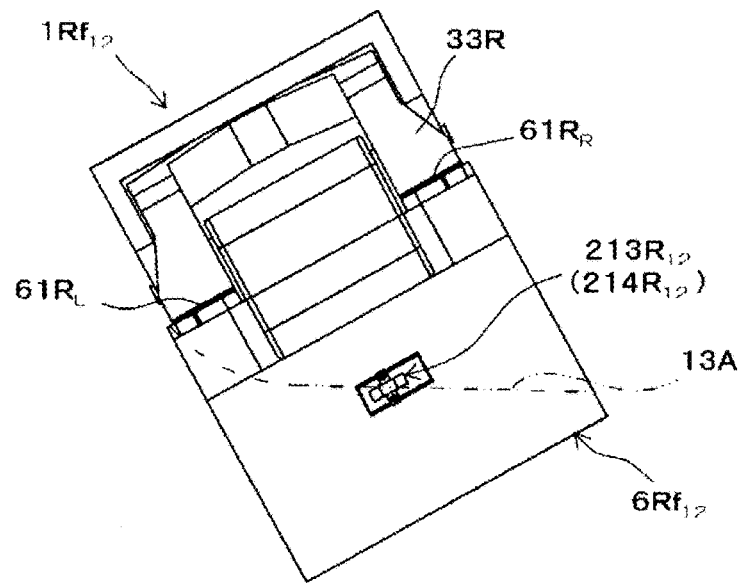
Figure 151:
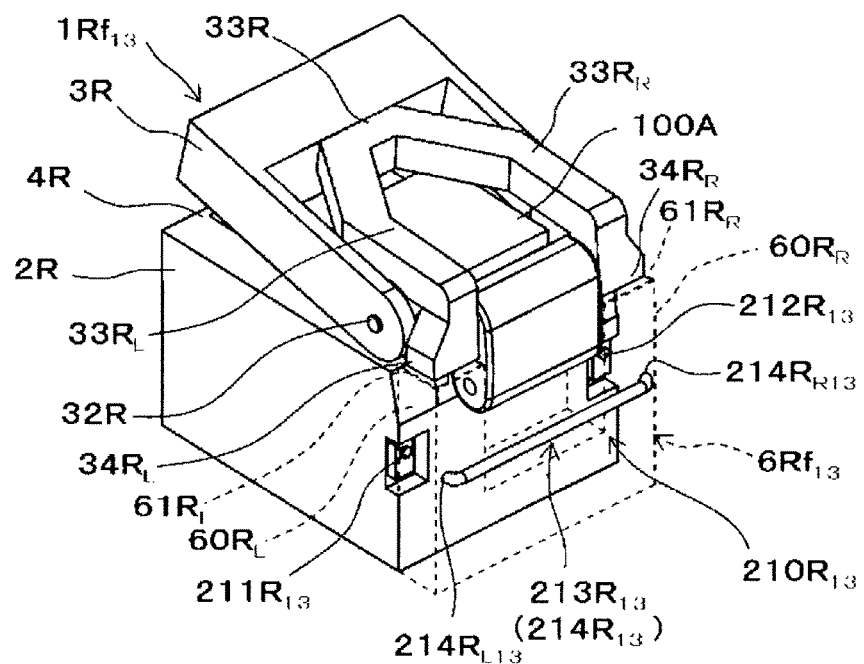
Figure 152:
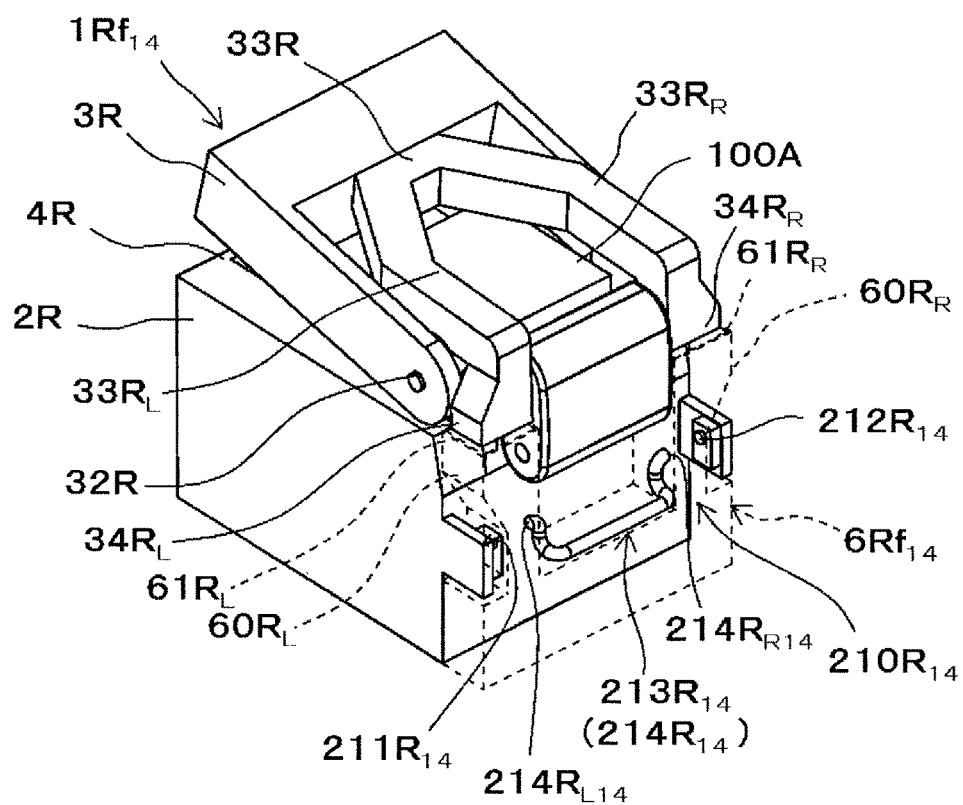
Figure 153:
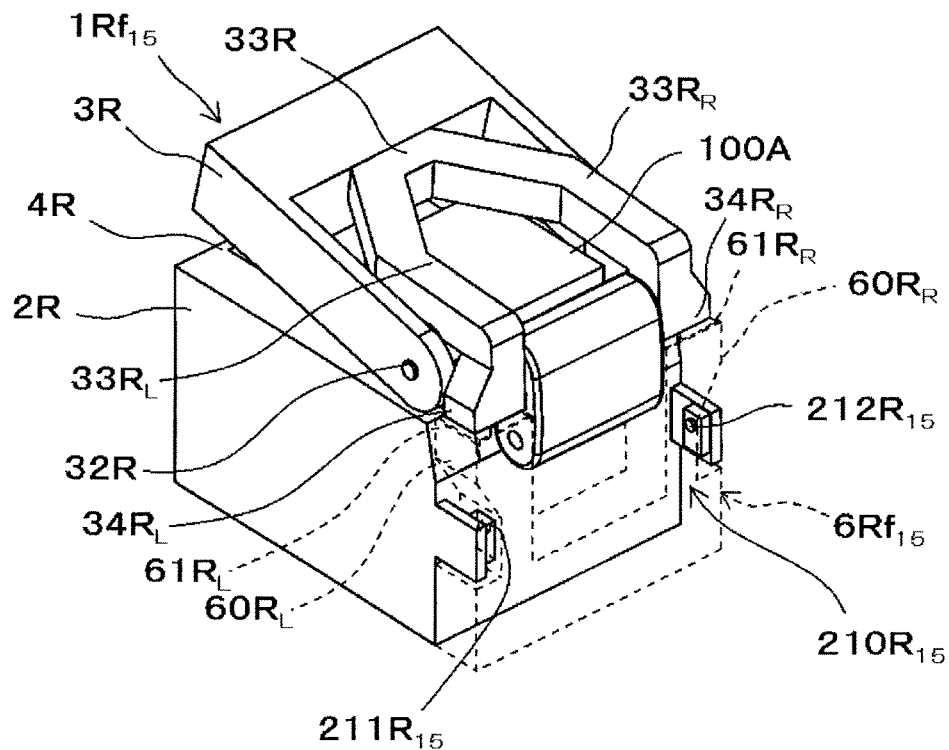
Figure 154A:
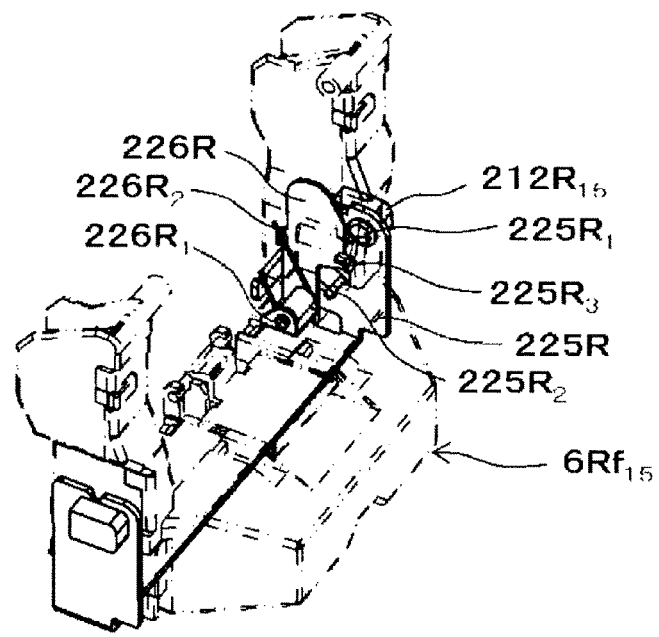
Figure 154B:
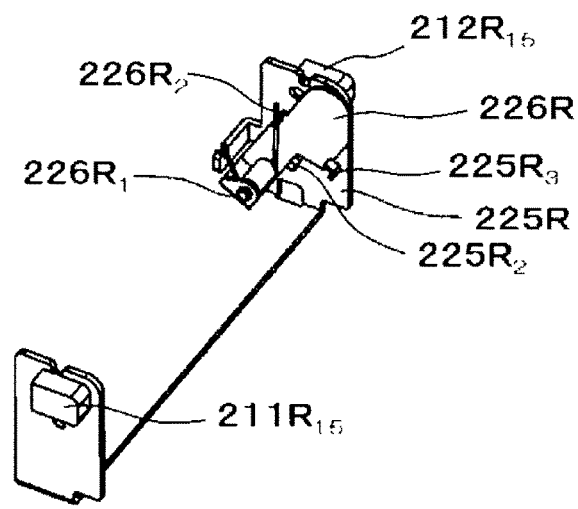
Figure 155:
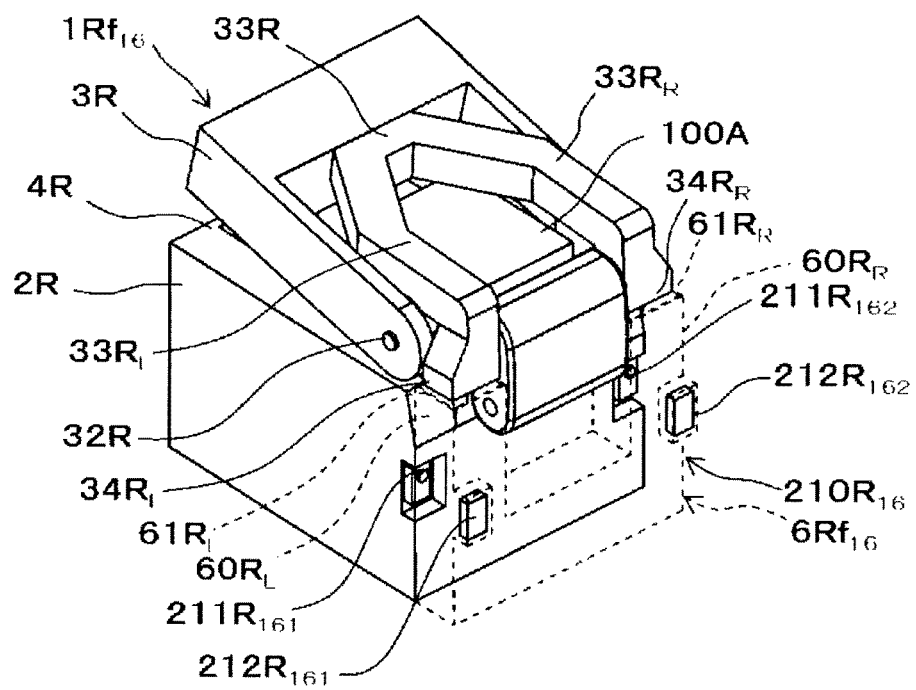
Figure 156:
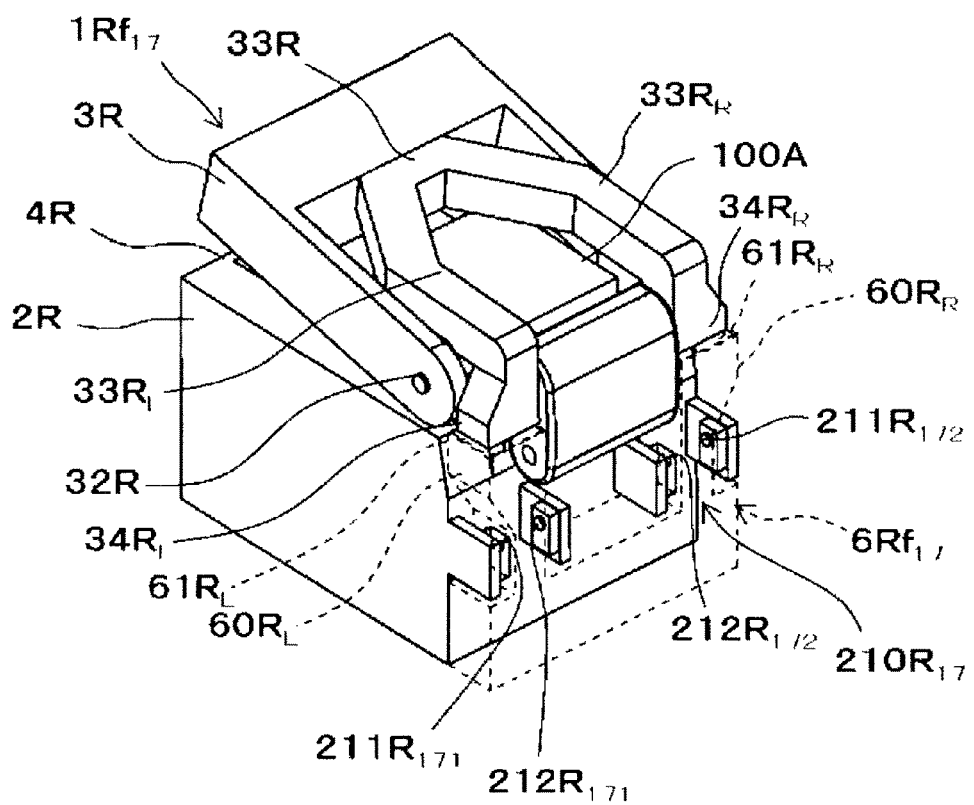
Figure 157:
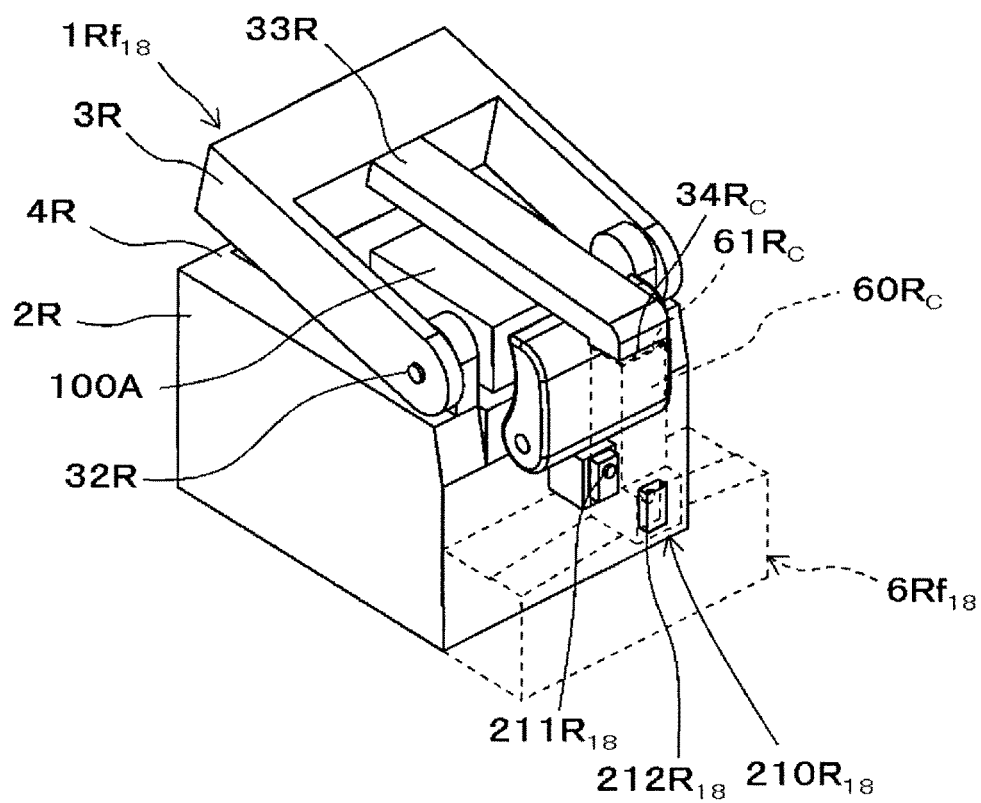
Figure 158:
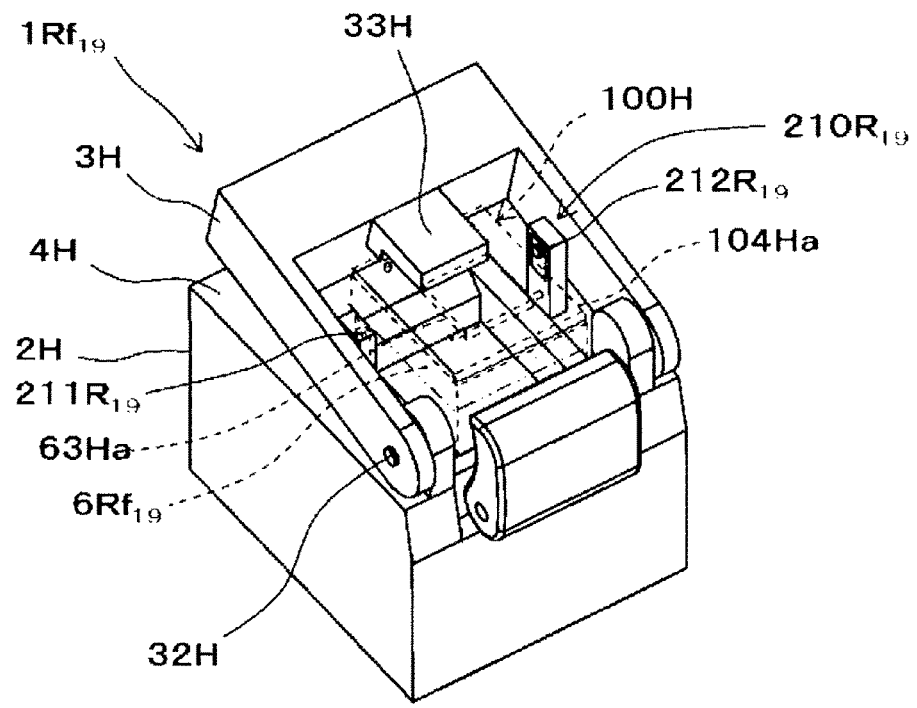
Figure 159:
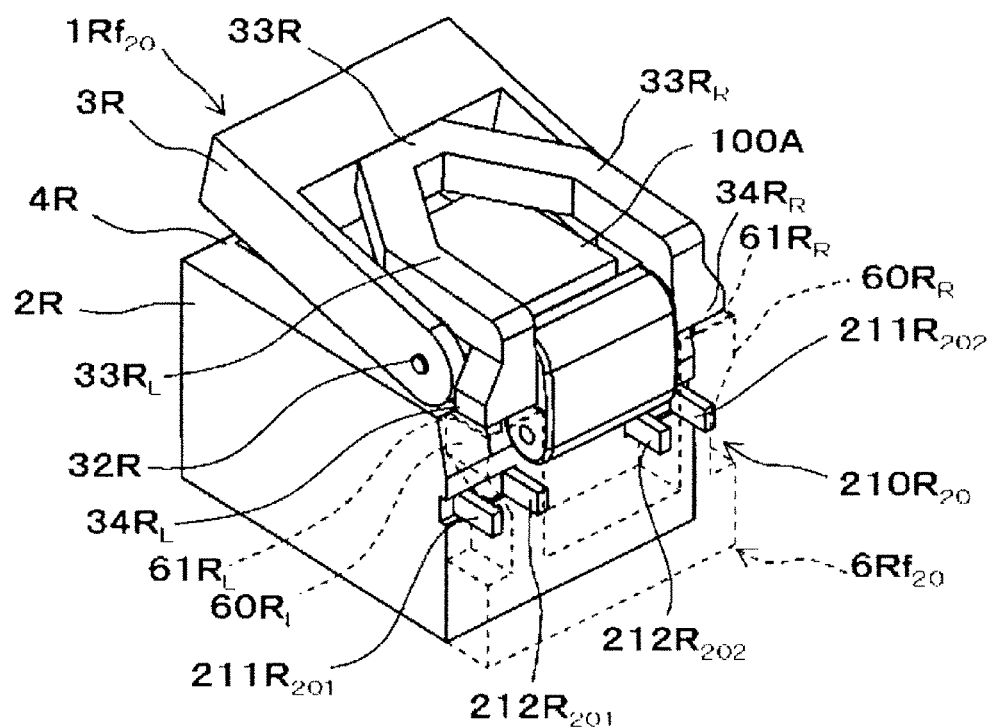
Figure 160:
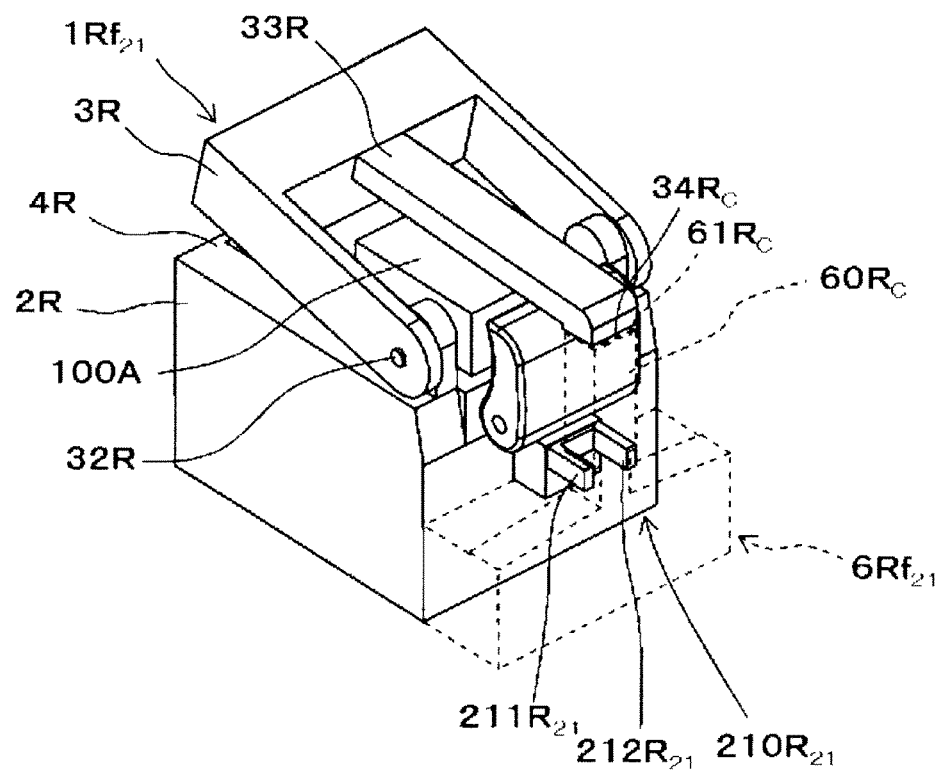
Figure 161:
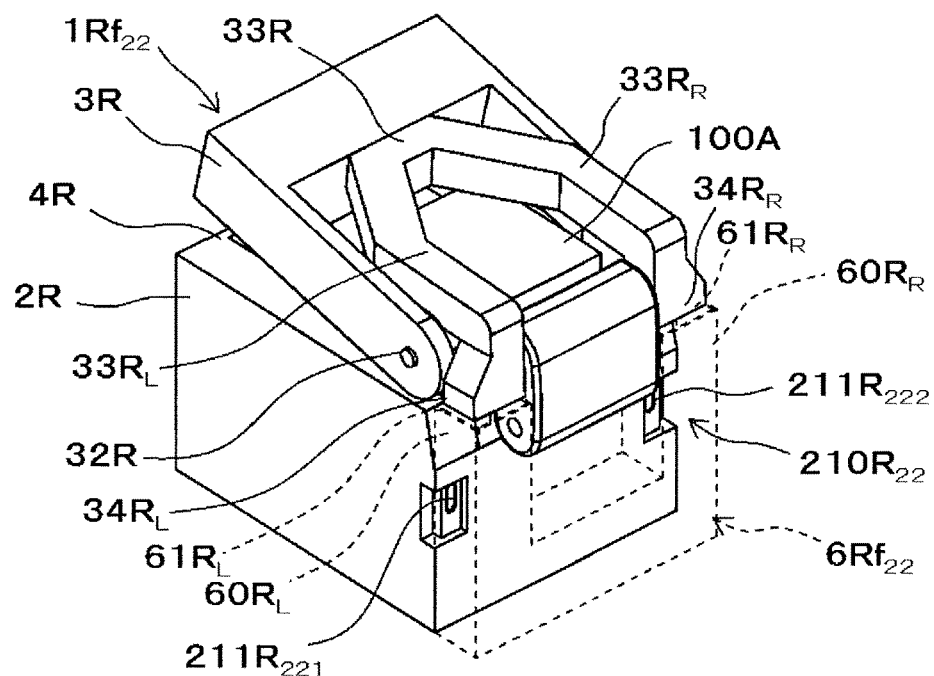
Figure 162:
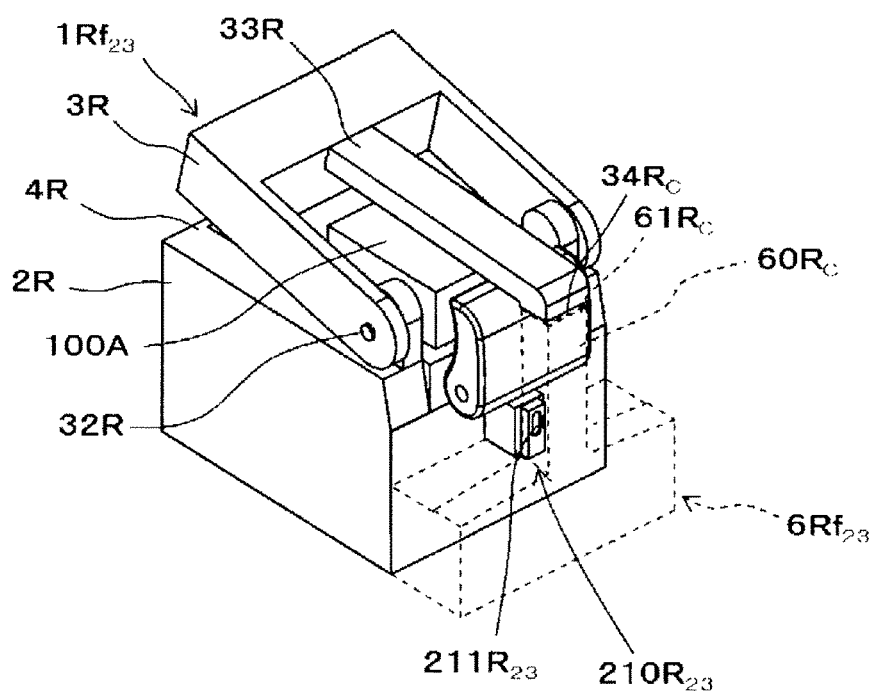
Figure 163:
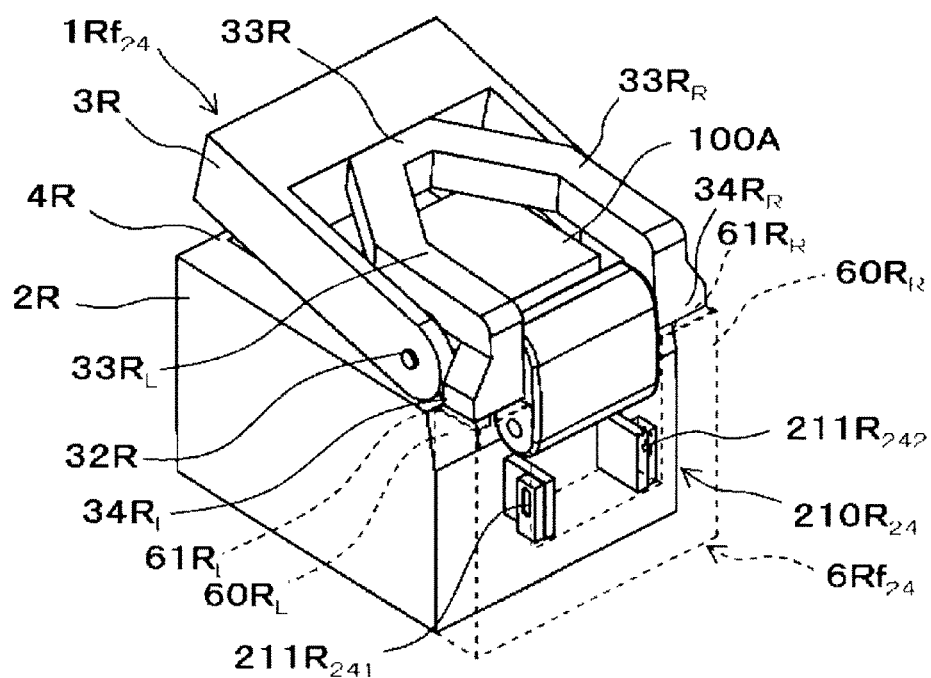
Figure 164:
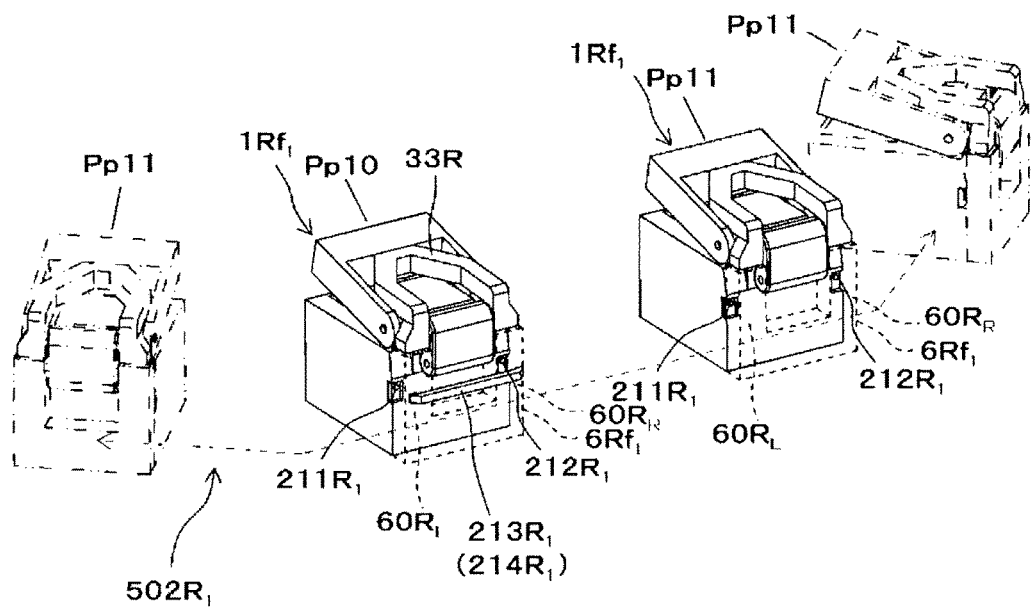
Figure 165:
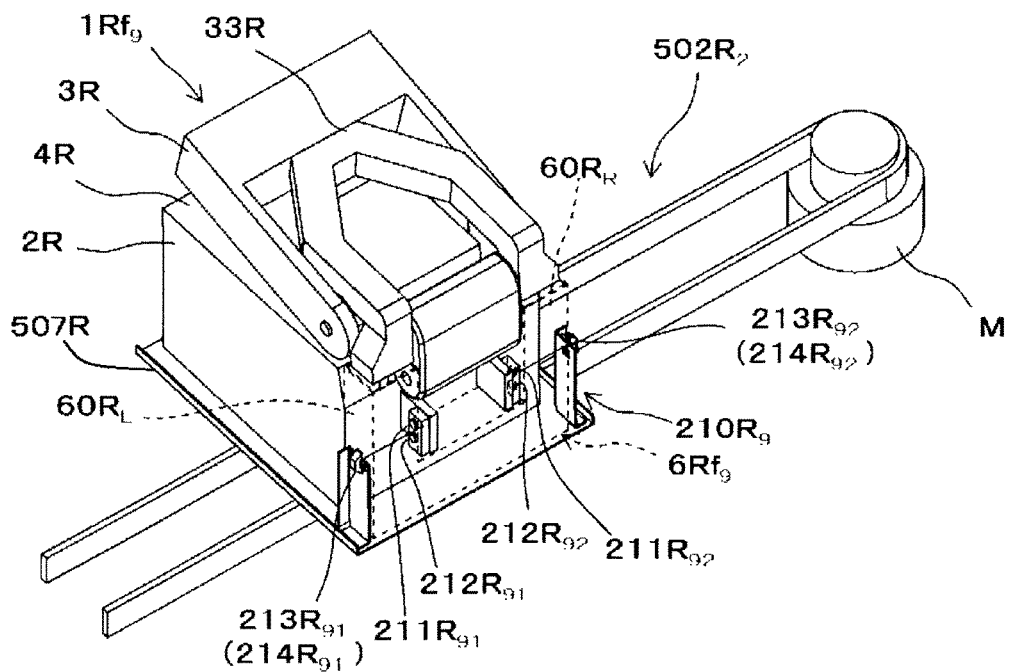
Figure 166:
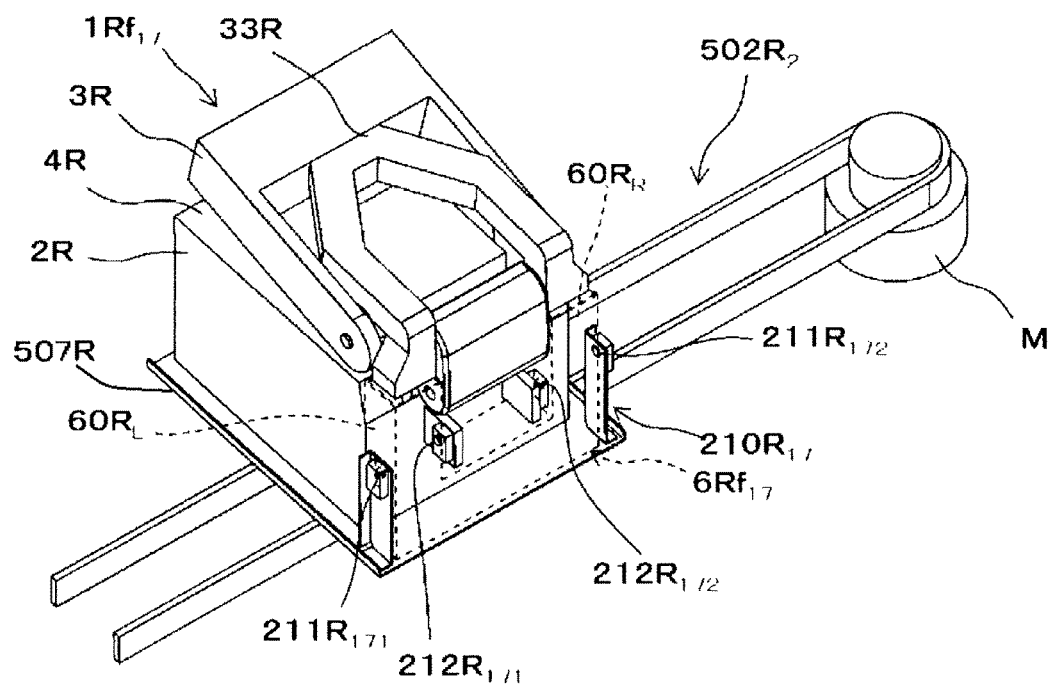
Figure 167:
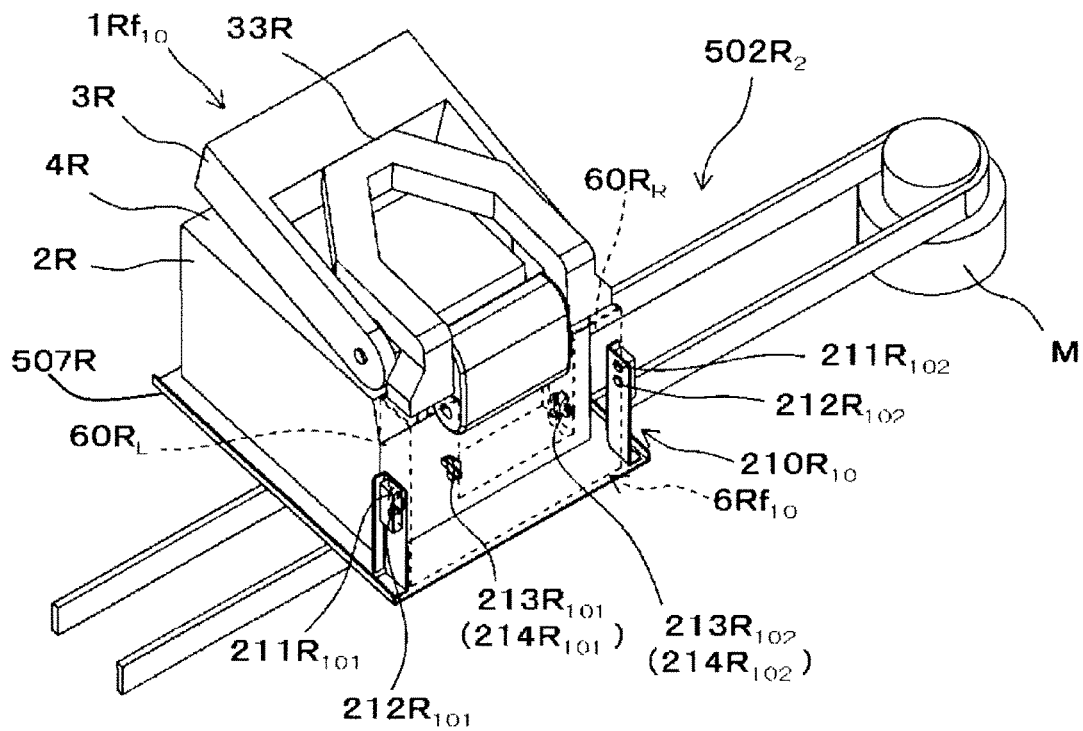
Figure 168:
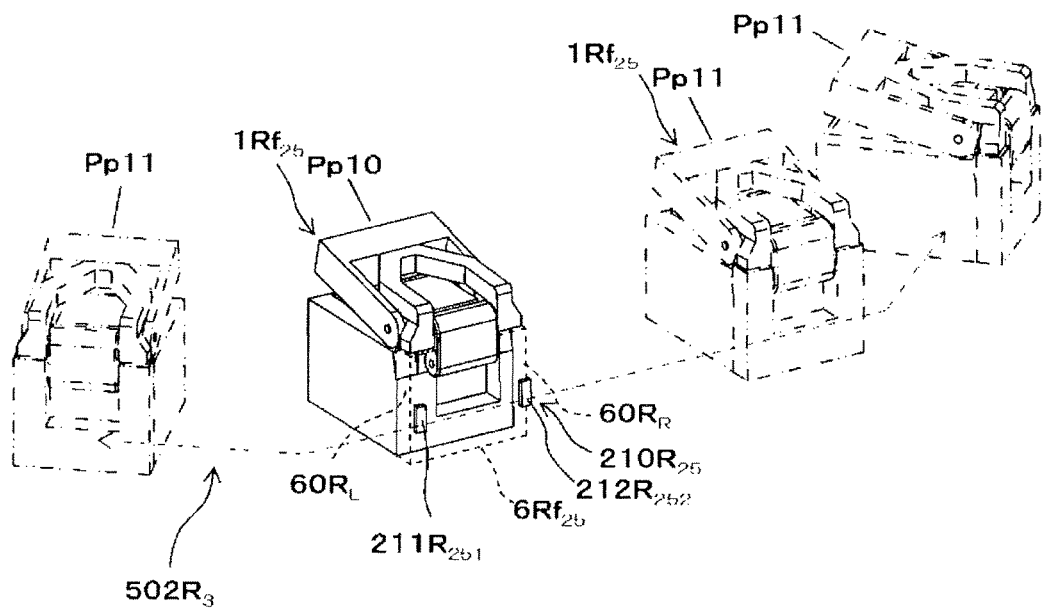
Figure 169:
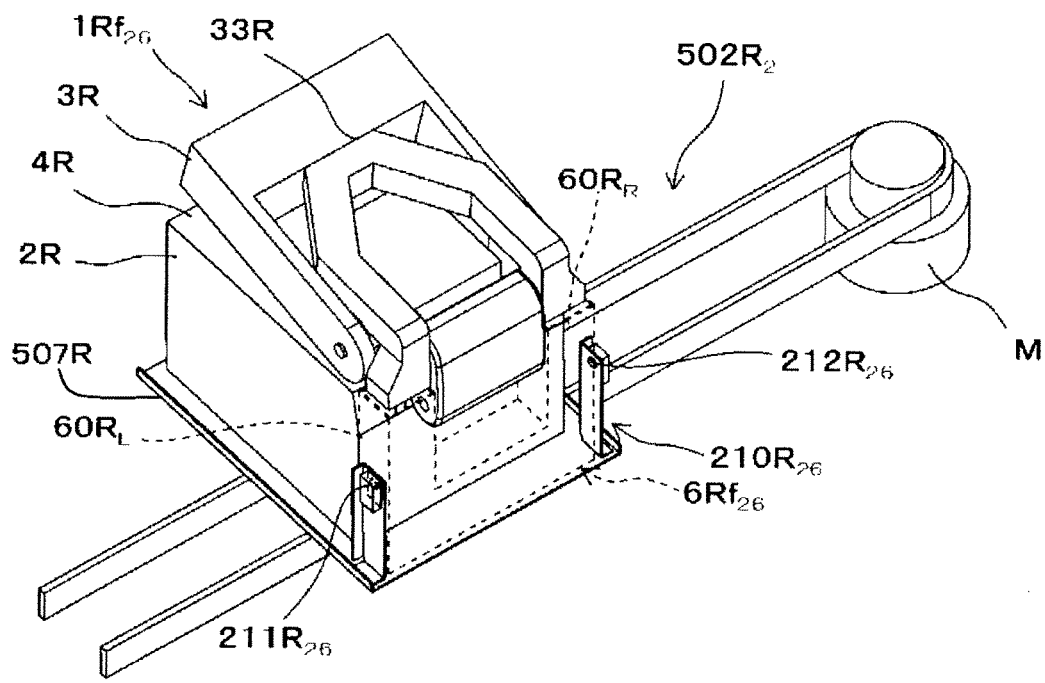

FIGS. 132A and 132B are configuration diagrams illustrating a modified example of a stapler according to another embodiment that performs the cut staple full load detection;

FIGS. 133A and 133B are configuration diagrams illustrating a modified example of a stapler according to another embodiment that performs the cut staple full load detection;

FIGS. 134A to 134C are configuration diagrams illustrating a modified example of a stapler according to another embodiment that performs the cut staple full load detection;

FIG. 135 is a configuration diagram illustrating a modified example of a stapler according to another embodiment that performs the cut staple full load detection;

FIG. 136 is a configuration diagram illustrating an example of a stapler according to an embodiment that performs full load detection of a cut staple with an optical sensor;

FIG. 137 is a configuration diagram illustrating an example of a stapler according to an embodiment that performs full load detection of a cut staple with an optical sensor;

FIG. 138 is a configuration diagram illustrating an example of a cut staple storage unit of the embodiment that performs full load detection of a cut staple with an optical sensor;

FIG. 139 is a configuration diagram illustrating a modified example of the stapler of the embodiment that performs full load detection of a cut staple with an optical sensor;

FIG. 140 is a configuration diagram illustrating another modified example of the stapler according to the embodiment that performs full load detection of a cut staple with an optical sensor;

FIG. 141 is a configuration diagram illustrating another modified example of the stapler of the embodiment that performs full load detection of a cut staple with an optical sensor;

FIG. 142 is a configuration diagram illustrating another modified example of the stapler of the embodiment that performs full load detection of a cut staple with an optical sensor;

FIG. 143 is a configuration diagram illustrating another modified example of the stapler of the embodiment that performs full load detection of a cut staple with an optical sensor;

FIG. 144 is a configuration diagram illustrating another modified example of the stapler of the embodiment that performs full load detection of a cut staple with an optical sensor;

FIGS. 145A and 145B are configuration diagrams illustrating another modified example of the stapler of the embodiment that performs full load detection of a cut staple with an optical sensor;

FIG. 146 is a configuration diagram illustrating another modified example of the stapler of the embodiment that performs full load detection of a cut staple with an optical sensor;

FIG. 147 is a configuration diagram illustrating another modified example of the stapler of the embodiment that performs full load detection of a cut staple with an optical sensor;

FIG. 148 is a configuration diagram illustrating another modified example of the stapler according to the embodiment that performs full load detection of a cut staple with an optical sensor;

FIG. 149 is a configuration diagram illustrating another modified example of the stapler of the embodiment that performs full load detection of a cut staple with an optical sensor;

FIGS. 150A and 150B are configuration diagrams illustrating another modified example of the stapler of the embodiment that performs full load detection of a cut staple with an optical sensor;

FIG. 151 is a configuration diagram illustrating another modified example of the stapler according to the embodiment that performs full load detection of a cut staple with an optical sensor;

FIG. 152 is a configuration diagram illustrating another modified example of the stapler according to the embodiment that performs full load detection of a cut staple with an optical sensor;

FIG. 153 is a configuration diagram illustrating another modified example of the stapler according to the embodiment that performs full load detection of a cut staple with an optical sensor;

FIGS. 154A and 154B are configuration diagrams illustrating another modified example of the stapler according to the embodiment that performs full load detection of a cut staple with an optical sensor;

FIG. 155 is a configuration diagram illustrating another modified example of the stapler according to the embodiment that performs full load detection of a cut staple with an optical sensor;

FIG. 156 is a configuration diagram illustrating another modified example of the stapler according to the embodiment that performs full load detection of a cut staple with an optical sensor;

FIG. 157 is a configuration diagram illustrating another modified example of the stapler of the embodiment that performs full load detection of a cut staple with an optical sensor;

FIG. 158 is a configuration diagram illustrating another modified example of the stapler of the embodiment that performs full load detection of a cut staple with an optical sensor;

FIG. 159 is a configuration diagram illustrating another modified example of the stapler according to the embodiment that performs full load detection of a cut staple with an optical sensor;

FIG. 160 is a configuration diagram illustrating another modified example of the stapler according to the embodiment that performs full load detection of a cut staple with an optical sensor;

FIG. 161 is a configuration diagram illustrating another modified example of the stapler according to the embodiment that performs full load detection of a cut staple with an optical sensor;

FIG. 162 is a configuration diagram illustrating another modified example of the stapler according to the embodiment that performs full load detection of a cut staple with an optical sensor;

FIG. 163 is a configuration diagram illustrating another modified example of the stapler according to the embodiment that performs full load detection of the cut staple with the optical sensor;

FIG. 164 is a configuration diagram illustrating a modified example of a post-processing apparatus of the present embodiment equipped with the stapler that performs full load detection of the cut staple with the optical sensor;

FIG. 165 is a configuration diagram illustrating a modified example of the post-processing apparatus of the present embodiment equipped with the stapler that performs full load detection of the cut staple with the optical sensor;

FIG. 166 is a configuration diagram illustrating a modified example of the post-processing apparatus of the present embodiment equipped with the stapler that performs full load detection of the cut staple with the optical sensor;

FIG. 167 is a configuration diagram illustrating a modified example of the post-processing apparatus of the present embodiment equipped with the stapler that performs full load detection of the cut staple with the optical sensor;

FIG. 168 is a configuration diagram illustrating a modified example of the post-processing apparatus of the present embodiment equipped with the stapler that performs full load detection of the cut staple with the optical sensor; and FIG. 169 is a configuration diagram illustrating a modified example of the post-processing apparatus of the present embodiment equipped with the stapler that performs full load detection of the cut staple with the optical sensor.

DETAILED DESCRIPTION

Embodiments of a stapler of the present disclosure, a post-processing apparatus on which a stapler is mounted, and an image forming system equipped with the post-processing apparatus will be described below with reference to the drawings.

<Configuration Example of Image Forming System and Post-Processing Apparatus>

Figure 1:
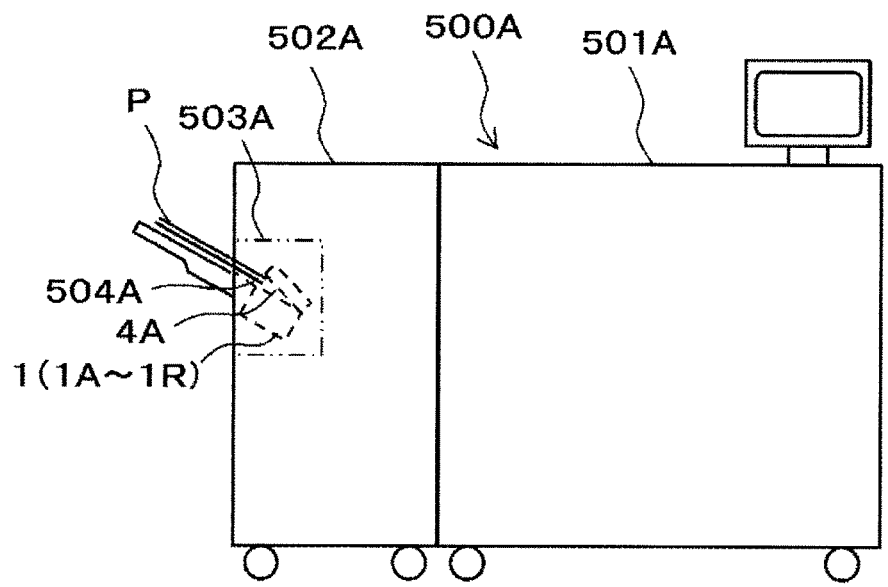
FIG. 1 is a configuration diagram illustrating an outline of an image forming system according to an embodiment.
Figure 2:
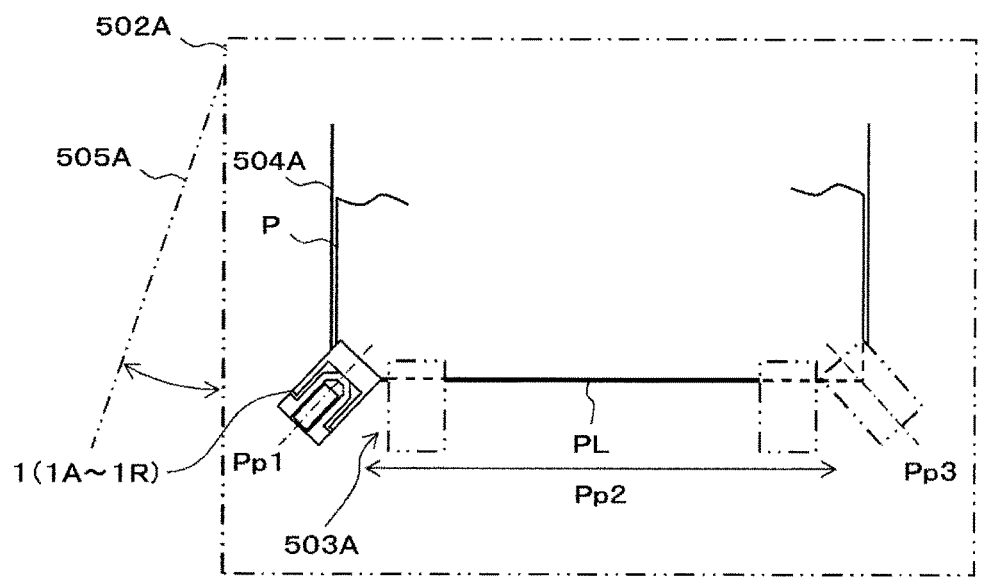
FIG. 2 is a configuration diagram illustrating an example of a post-processing apparatus according to the present embodiment.

FIG. 1 is a block diagram illustrating the outline of the image forming system of the present embodiment, and FIG. 2 is a block diagram illustrating an example of a post-processing apparatus of the present embodiment.

The image forming system 500A according to the present embodiment includes an image forming apparatus 501A, and a post-processing apparatus 502A which is connected to the image forming apparatus 501A and is capable performing of at least one type of processing. The image forming apparatus 501A forms and outputs an image on a sheet P that is fed from a sheet feeding unit (not illustrated) inside or outside the apparatus. In this example, the image forming apparatus 501A forms an image on the sheet P, by forming an electrostatic latent image by scanning exposure, by developing an electrostatic latent image with toner, and by transferring and fixing the toner to sheet and the like.

The post-processing apparatus 502A of the present embodiment includes any one of the stapler 1 of each embodiment to be described later in a binding unit 503A. The binding unit 503A includes a loading unit 504A that stacks the sheet P output from the image forming apparatus 501A.

FIG. 2 is a view of the binding unit 503A of the post-processing apparatus 502A as viewed from above. As illustrated in FIG. 2, the stapler 1 includes a first position Pp1 for binding one corner portion of the sheet P stacked on the loading unit 504A, a second position Pp2 for binding an arbitrary portion along a side PL of the sheet P, and a third position Pp3 for binding the other corner portion of the sheet P by a moving unit (not illustrated). In this example, the first position Pp1 also serves as a reference position that is a home position (HP).

<Operational Example of Binding Sheet with Staple>

Figure 3A:
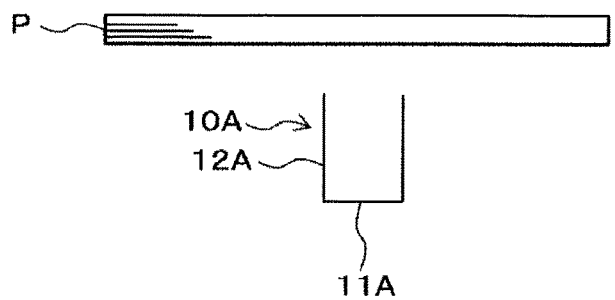
FIGS. 3A to 3D are explanatory views illustrating an example of an operation of binding a sheet with a staple.

FIGS. 3A to 3D are explanatory views illustrating an example of an operation of binding a sheet with a staple. As illustrated in FIG. 3A, both ends of the staple crown 11A are bent in one direction to form a staple leg 12A which is referred to as a staple.

Figure 3B:
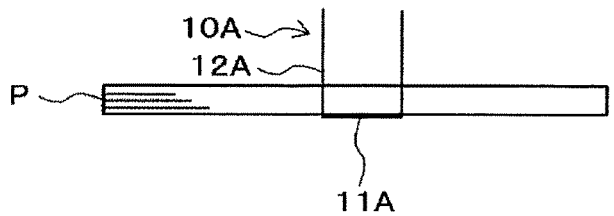
Figure 3C:
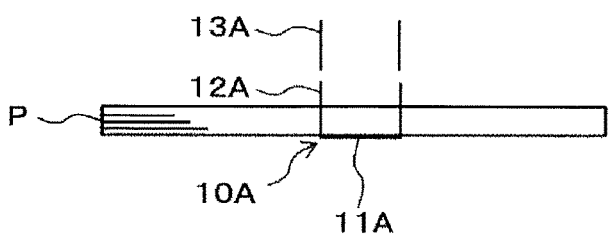

As the staple crown 11A is pressed, as illustrated in FIG. 3B, the staple leg 12A penetrates the sheet P and the staple crown 11A comes into contact with the sheet P. As illustrated in FIG. 3C, when the staple leg 12A is bent, the excess of the staple leg 12A overlapping each other is cut in the staple 10A in which the staple leg 12 penetrates through the sheet P. The structure which stores the cut staple 13A cut from the staple leg 12A will be described later.

Figure 3D:
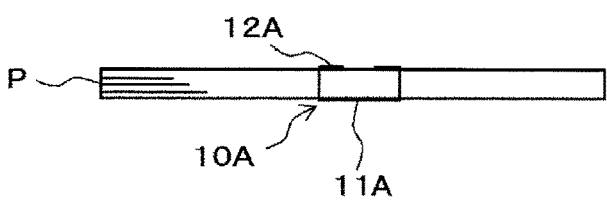

As illustrated in FIG. 3D, in the staple 10A in which the staple leg 12A is cut to the predetermined length, the staple leg 12A penetrating the sheet P is bent and the sheet P is bound with the staple 10A as illustrated in FIG. 3D.

<Configuration Example of Stapler of First Embodiment>

Figure 4:
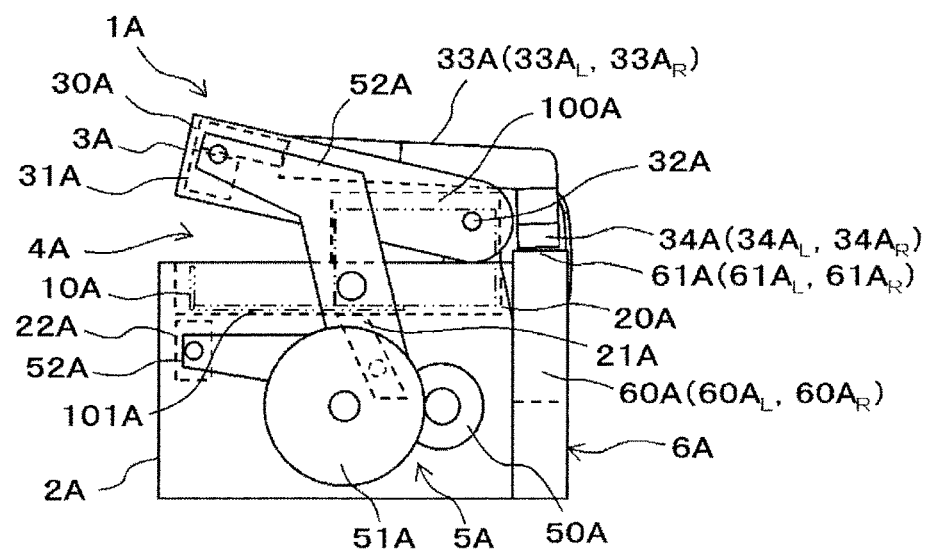
FIG. 4 is a side view illustrating an example of the stapler of the first embodiment.
Figure 5:
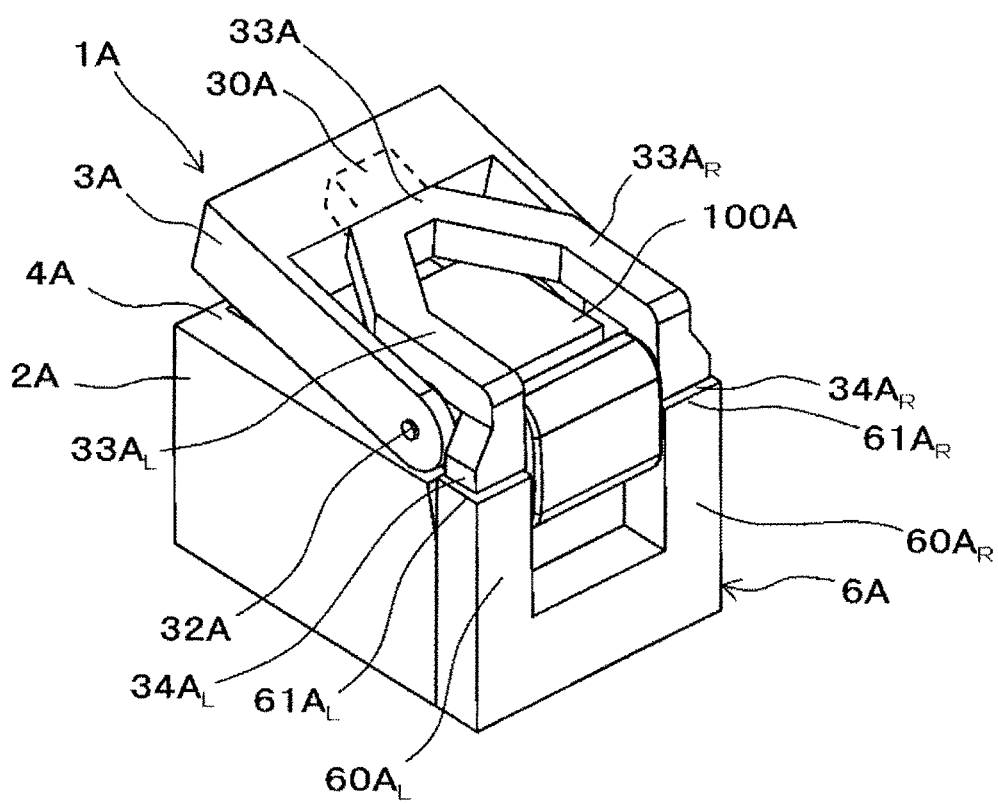
FIG. 5 is a perspective view illustrating an example of the stapler of the first embodiment.

FIG. 4 is a side view illustrating an example of the stapler of the first embodiment, and FIG. 5 is a perspective view illustrating an example of the stapler of the first embodiment.

The stapler 1A of the first embodiment is equipped with a staple ejecting unit 2A which supplies and ejects the staple 10A, and a binding unit 3A which cuts the staple leg 12A of the staple 10A illustrated in FIG. 3C and folds the staple leg 12A illustrated in FIG. 3D by cooperating with the staple ejecting unit 2A to bind the sheet P with the staple 10A.

The staple ejecting unit 2A is an example of a staple ejecting unit and includes a storage unit 20A to which a staple cartridge 100A as a staple storage unit in which the staple 10A is stored is detachably attached, a feeding unit 21A which feeds the staple 10A from the staple cartridge 100A, and a ejecting unit 22A which ejects the staple 10A into the sheet P.

In the present example, the staple 10A is provided as a staple sheet 101A in which a plurality of linear staples 10A are integrated by adhesion, and the plurality of staple sheets 101A are stacked and stored in the staple cartridge 100A. The ejecting unit 22A forms the second or third staple 10A in conjunction with the operation of ejecting the one staple 10A of the foremost end in the conveying direction of the staple sheet 101A. The staple cartridge 100A may be supplied in a form in which the staple sheet 101A is stored in a detachable refill.

The binding unit 3A is an example of a binding unit, and includes a cut unit 30A that cuts the staple leg 12A of the staple 10A penetrating the sheet P at a predetermined length, and a clinch unit 31A which folds the staple leg 12A of the staple 10A that passes through the sheet P and is cut to a predetermined length in the direction of the sheet P.

The stapler 1A is provided with a sheet pinching unit 4A which pinches the sheet P between the staple ejecting unit 2A and the binding unit 3A. The sheet pinching unit 4A is provided on one side of the stapler 1A provided with the ejecting unit 22A of the staple ejecting unit 2A and the clincher unit 31A of the binding unit 3A.

As illustrated in FIG. 1, in the post-processing apparatus 502A, since the sheets P are aligned and stacked by the loading unit 504A, in the stapler 1A, the opening side of the sheet pinching unit 4A where the sheet P is inserted is mounted to be inclined to the upper side or horizontally.

As illustrated in FIG. 2, the direction of the stapler 1A is not constant by moving inside the post-processing apparatus 502A by switching the binding position or the like. Therefore, a side on which the sheet pinching unit 4A is provided is a front side of the stapler 1A, and a side opposite to the side provided with the sheet pinching unit 4A is a back side. Further, a side on which the binding unit 3A is provided is an upper surface side of the stapler 1A, and a side on which the staple ejecting unit 2A is provided is a lower surface side of the stapler 1A.

In order to enable the binding position of the sheet P by the staple 10A to be positioned between the ejecting unit 22A and the clincher unit 31a, the sheet pinching unit 4A has a shape in which three directions of the front side of the stapler 1A and both side surfaces of the stapler 1A are open.

The stapler 1A includes a feeding unit 21A and an ejecting unit 22A of the staple ejecting unit 2A, a binding unit 3A, and a driving unit 5A that drives the cut unit 30A of the binding unit 3A, and the clincher unit 31A.

The ejecting unit 5A includes a cam 51A that is driven by a motor 50A provided in the staple ejecting unit 2A, and a link unit 52A that transmits the operation of the cam 51A to each unit.

When the operation of the cam 51A is transmitted to the binding unit 3A via the link unit 52A or the like, the stapler 1A relatively moves in a direction in which the staple ejecting unit 2A and the binding unit 3A come into contact with and separate from each other. In this example, the binding unit 3A moves in a direction in which the binding unit 3A moves in the direction of coming into contact with and separating from the staple ejecting unit 2A with a rotational operation about the shaft 32A as a fulcrum.

In the operation of the cam 51A rotating in one direction, the stapler 1A moves in a direction in which the binding unit 3A approaches the staple ejecting unit 2A, and pinches the sheet P with the sheet pinching unit 4A at a predetermined timing. In addition, in the operation in which the cam 51A further rotates in one direction, the stapler 1A moves in a direction in which the binding unit 3A moves away from the staple ejecting unit 2A at a predetermined timing, thereby releasing the pinching of the sheet P by the sheet pinching unit 4A.

In addition, in the operation in which the operation of the cam 51A is transmitted to the feeding unit 21A and the ejecting unit 22A via the link unit 52A and the like, and the cam 51A rotates in one direction, the stapler 1A feeds the staple 10A stored in the staple cartridge 100A by the feeding unit 21A, and drives the foremost tip of the fed staple 10A into the sheet P pinched by the sheet pinching unit 4A by the ejecting section 22A, so that the staple leg 12A of the staple 10A penetrates the sheet P. Also, the second or third staple 10A is molded.

Furthermore, in the operation in which the operation of the cam 51A is transmitted to the cut unit 30A and the clincher unit 31A via the link unit 52A and the like, and the cam 51A rotates in one direction, in the stapler 1A cuts the staple leg 12A of the staple 10A penetrating the sheet P by the cut unit 30A at a predetermined length, and folds the staple leg 12A of the staple 10A cut to a predetermined length with the clincher unit 31A.

The stapler 1A has a cut staple storage unit 6A which stores the cut staple 13A that is cut by the cut unit 30A. The cut staple storage unit 6A is detachably attached to the stapler 1A on the back side of the stapler 1A opposite to the side on which the sheet pinching unit 4A is provided.

The cut staple storage unit 6A includes two recovery passages $60A_L$ and $60A_R$. When attached to the stapler 1A, the two recovery passages $60A_L$ and $60A_R$ are disposed on both sides of the storage unit 20A to block the attachment and detachment path of the staple cartridge 100A to be attached to and detached from the storage unit 20A.

The cut staple storage unit 6A has a size capable of storing all of the cut staples 13A even when the staple leg 12A of the number of staples 10A capable of being stored in the staple cartridge 100A is cut with the maximum length.

Further, regardless of the position of the stapler 1A in the post-processing apparatus 502A, the cut staple storage unit 6A is configured so that the main body of the cut staple storage unit 6A is located below one or both of the recovery passage $60A_L$ or the recovery passage $60A_R$, regardless of the position of the stapler 1A in the post-processing apparatus 502A.

The stapler 1A includes a discharge passage 33A which guides the cut staple 13A cut by the cut unit 30A to the cut staple storage unit 6A in the binding unit 3A. In the present embodiment, one discharge passage 33A communicating with the cut unit 30A is divided into two discharge passages $33A_L$ and $33A_R$ and are disposed on both left and right sides of the storage unit 20A to block the attachment and detachment path of the stable cartridge 100A attached to and detached from the storage unit 20A.

In the stapler 1A, the discharge port $34A_L$ of one discharge passage $33A_L$ communicates with the recovery port $61A_L$ of one recovery passage $60A_L$ of the cut staple storage unit 6A, and the discharge port $34A_R$ of the other discharge passage $33A_R$ communicates with the recovery port $61A_R$ of the other recovery passage $60A_R$ of the cut staple storage unit 6A.

As a result, the cut staple 13A passing through one discharge passage $33A_L$ from the cut unit 30A is stored in the cut staple storage unit 6A from the recovery port $61A_L$ through the recovery passage $60A_L$. The cut stable 13A passing through the other discharge passage $33A_R$ from the cut unit 30A is stored in the cut staple storage unit 6A through the recovery passage $60A_R$ from the recovery port $61A_R$.

In the discharge passage 33A, at least one of the discharge passage $33A_L$ and the discharge passage $33A_R$ is configured such that the discharge ports $34A_L$ and $34A_R$ are lower than the cut unit 30A, regardless of the position of the stapler 1A in the post-processing apparatus 502A.

By providing the discharge passages 33A ($33A_L$, $33A_R$) in the binding unit 3A, the discharge passage 33A ($33A_L$, $33A_R$) moves by the rotational operation of the binding unit 3A with the shaft 32A as a fulcrum. In contrast, the cut staple storage unit 6A does not move with respect to the binding unit 3A when attached to the staple ejecting unit 2A.

Therefore, the discharge port $34A_L$ of one discharge passage $33A_L$ and the discharge port $34A_R$ of the other discharge passage $33A_R$ are disposed in the vicinity of the shaft 32A, thereby suppressing the quantity of movement of the discharge port $34A_L$ and $34A_R$ in the rotational operation of the binding unit 3A with the shaft 32A as a fulcrum to be small level.

Further, the discharge port $34A_L$ of one discharge passage $33A_L$ enters one recovery port $61A_L$ of the cut staple storage unit 6A, and the discharge port $34A_L$ can move within the range of opening of the recovery port $61A_L$. Similarly, the discharge port $34A_R$ of the other discharge passage $33A_R$ enters the other recovery port $61A_R$ of the cut staple storage unit 6A, and the discharge port $34A_R$ can move within the range of opening of the recovery port $61A_R$.

<Example of Operational Effect of Stapler of First Embodiment>

In the conventional stapler mounted on the post-processing apparatus, the cut staple storage unit is provided on the side of the post-processing apparatus, the cut staple is temporarily stored in the discharge passage of the cut staple provided in the stapler, and the stapler is moved to the position of the cut staple storage unit, and the cut staple is discharged from the stapler to the cut staple storage unit.

As described above, in the related art, in order to recover the cut staple, since it is necessary to move the stapler to the position of the cut staple storage unit provided on the side of the post-processing apparatus, the productivity of the booklet for binding the sheet with the staple decreases. When the number of cut staples temporarily stored in the discharge passage provided in the stapler is large, in a state in which the stapler is not moved to the position of the cut staple storage unit, there was a possibility that the cut staple from the discharge passage may leak into the post-processing apparatus.

In contrast, in the stapler 1A according to the first embodiment, by providing the cut staple storage unit 6A in the stapler 1A, it is possible to store the cut staple 13A in the storage unit 6A, regardless of the position of the stapler 1A in the post-processing apparatus 502A. Therefore, there is no need to move the stapler 1A to a specific position in order to recover the cut staple, and the productivity of the booklet for binding the sheet with the staple is improved.

Further, even when the staple leg 12A of the number of staples 10A that can be stored in the staple cartridge 100A is cut with the maximum length, the cut staple storage unit 6A is large enough to store all the cut staples 13A and has a sufficient capacity, and it is unnecessary to recover the staple 13A until the timing of replenishing the staple 10A. Therefore, it is possible to reduce the number of times of recovering the cut staple 13A from the stapler 1A, and it is possible to reduce the number of times of stopping the operation of the image forming system 500A for recovering the cut staple 13A, the productivity of the booklet for binding the sheet with the stable is improved.

Figure 6:
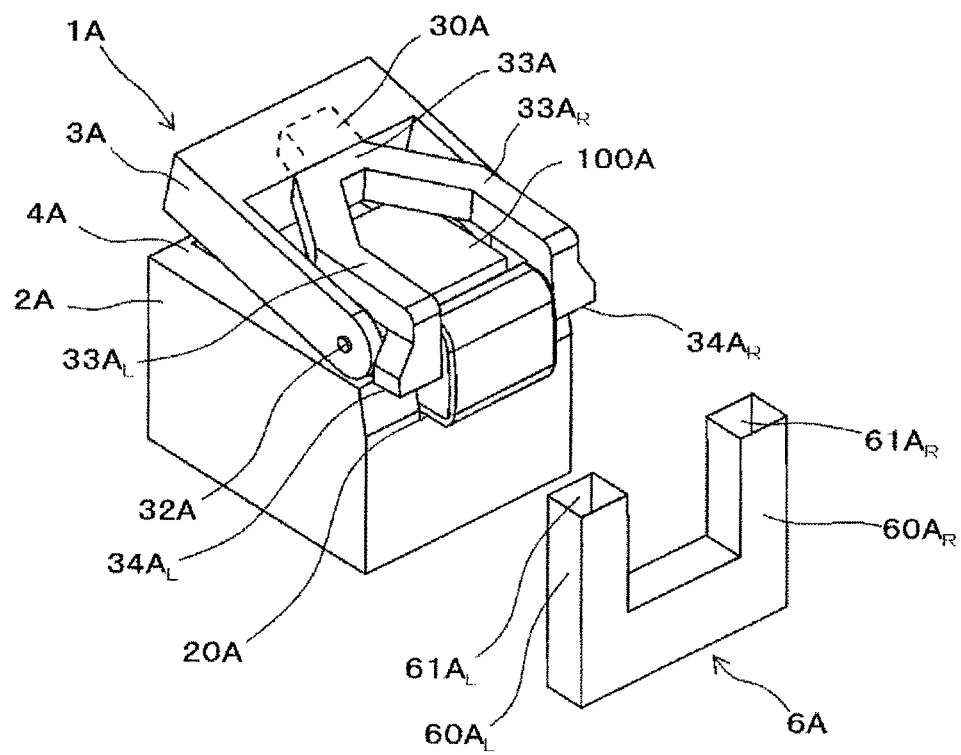
FIG. 6 is an explanatory view illustrating an attaching and detaching operation of a cut staple storage unit.

FIG. 6 is an explanatory view illustrating the attaching and detaching operation of the cut staple storage unit. Since the cut staple storage unit 6A is configured to be attachable to and detachable from the stapler 1A, the recovery of the cut staple 13A can be performed by removing the cut staple storage unit 6A from the stapler 1A, whereby when the cut staple 13A is recovered, it is possible to suppress the occurrence of troubles such as dropping of the cut staple 13A into the post-processing apparatus 502A.

In the present example, attachment and detachment of the cut staple storage unit 6A are performed by moving the stapler 1A to the first position Pp1 illustrated in FIG. 2 and by opening a lid 505A. Further, the recovery of the cut staple 13A is performed from the recovery ports $61A_L$ and $61A_R$ of the cut staple storage unit 6A or from a discharge port which can be opened and closed (not illustrated). Further, the cut staple storage unit 6A itself may be exchanged.

In the stapler 1A, the staple cartridge 100A can be attached and detached with the cut staple storage unit 6A attached. Thus, by moving the stapler 1A to the first position Pp1 illustrated in FIG. 2 and by opening the lid 505A, the staple cartridge 100A can be attached and detached without detaching the cut staple storage unit 6A, and the replenishment of the staple 10A or the like can be performed.

Further, since the cut staple storage unit 6A is attached to the back side of the stapler 1A, even if the capacity of the cut staple storage unit 6A increases, restriction on the size of the staple cartridge 100A is restrained, it is possible to maintain or increase the number of stored staples 10A, as compared with a configuration not provided with the cut staple storage unit 6A.

As illustrated in FIG. 2, in the operation of moving the stapler 1A to the predetermined binding position, the reciprocating movement of the stapler 1A applies force in the left-right direction to the cut staple 13A stored in the cut staple storage unit 6. As a result, it is possible to suppress the deviation of the cut staple 13A in the cut staple storage unit 6A and to store the cut staple 13A with a level equal to a substantially uniform height.

There is a possibility that erroneous detection may occur that the cut staple 13A is full if the bulk increases due to the inclination of the stored cut staple 13A. In the configuration in which the processing is stopped by full load of the cut staple 13A, even if there is still a remaining capacity in the cut staple storage unit 6A, the cut staple 13A cannot be stored and the cut staple storage unit 6A cannot be effectively used. In contrast, since it is possible to suppress the deviation of the cut staple 13A and store the cut staple 13A flattened to a substantially uniform height, erroneous detection or the like caused by offset of the stored cut staple 13A can be suppressed, which makes it possible to effectively use the cut staple storage unit 6A.

As illustrated in FIG. 1, the stapler 1A mounted on the post-processing apparatus 502A is inclined so that the sheet pinching unit 4A faces upward and moves in accordance with the binding position as illustrated in FIG. 2. Therefore, depending on the position of the stapler 1A, the inclination of the discharge passage $33A_L$ and the discharge passage $33A_R$, the height between the discharge passage $33A_L$ and the discharge passage $33A_R$, the inclination of the cut staple storage unit 6A, the height between the recovery passage $60A_L$ and the recovery passage $60A_R$ change.

Therefore, even if the stapler 1A moves to any one of the first position Pp1, the second position Pp2 or the third position Pp3 illustrated in FIG. 2, at least one of the discharge passage $33A_L$ and the discharge passage $33A_R$ is configured so that the discharge ports $34A_L$ and $34A_R$ become lower than the cut unit 30A. Further, the cut staple storage unit 6A is configured so that, regardless of the position of the stapler 1A in the post-processing apparatus 502A, the main body portion of the cut staple storage unit 6A is located below one or both of the recovery passage $60A_L$ and the recovery passage $60A_R$.

As a result, even if the stapler 1A moves to one of the first position Pp1, the second position Pp2 or the third position Pp3 in the binding operation, it is possible to suppress the cut staple 13A cut by the cut unit 30A from staying in the discharge passage $33A_L$ and the discharge passage $33A_R$. Further, it is possible to suppress the cut staples 13A discharged from the discharge passage $33A_L$ and the discharge passage $33A_R$ from staying in the recovery passage $60A_L$ and the recovery passage $60A_R$. Therefore, the cut staple 13A cut with the cut unit 30A can be stored in the cut staple storage unit 6A.

In the operation of binding the sheet P with the stapler 1A, the discharge unit $33A_L$ and the discharge unit $33A_R$ are moved when the binding unit 3A moves by the rotational operation about the shaft 32A as a fulcrum. When the movement quantity of the discharge port of the discharge passage increases, since the recovery port of the cut staple storage unit to which the discharge port is connected needs to be sized to match the movement range of the discharge port, the size of the stapler increase.

In contrast, by arranging the discharge port $34A_L$ of one discharge passage $33A_L$ and the discharge port $34A_R$ of the other discharge passage $33A_R$ in the vicinity of the shaft 32A, it is possible to suppress the movement quantity of the discharge port $34A_L$ and the discharge port $34A_R$, and it is possible to reduce the size of the stapler 1A.

In addition, the discharge port $34A_L$ of one discharge passage $33A_L$ enters one recovery port $61A_L$ of the cut staple storage unit 6A, and the discharge port $34A_L$ can move within the range of opening of the recovery port $61A_L$. Similarly, the discharge port $34A_R$ of the other discharge passage $33A_R$ enters the other recovery port $61A_R$ of the cut staple storage unit 6A, and the discharge port $34A_R$ can move within the range of the opening of the recovery port $61A_R$. As a result, it is possible to suppress leakage of the cut staple 13A to the outside at the connecting portion between the cut staple storage unit 6A and the discharge passage 33A.

<Configuration Example of Stapler According to Second Embodiment>

Figure 7:
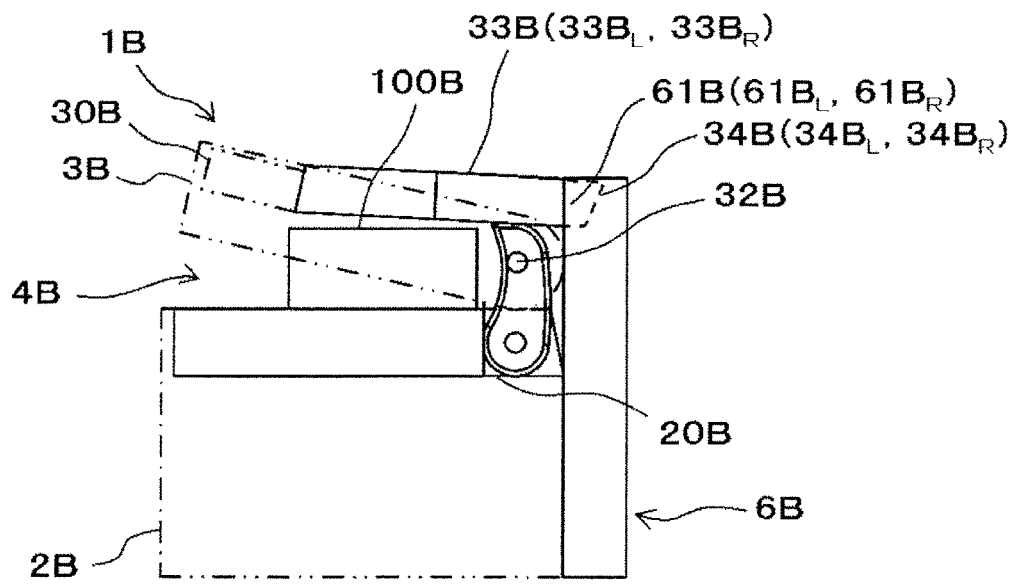
FIG. 7 is a side view illustrating an example of the stapler according to a second embodiment.
Figure 8:
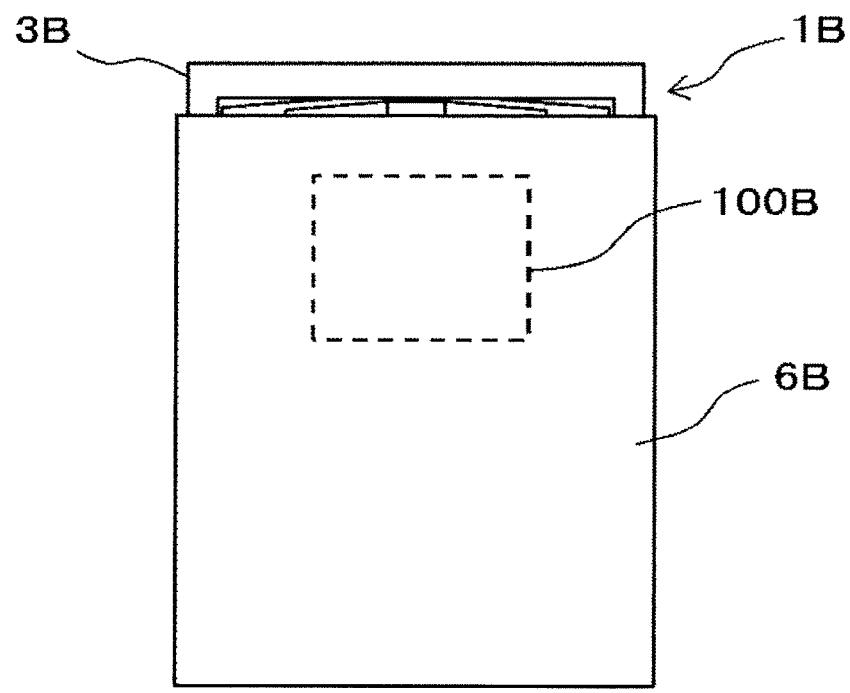
FIG. 8 is a rear view illustrating an example of a stapler according to the second embodiment.
Figure 9:
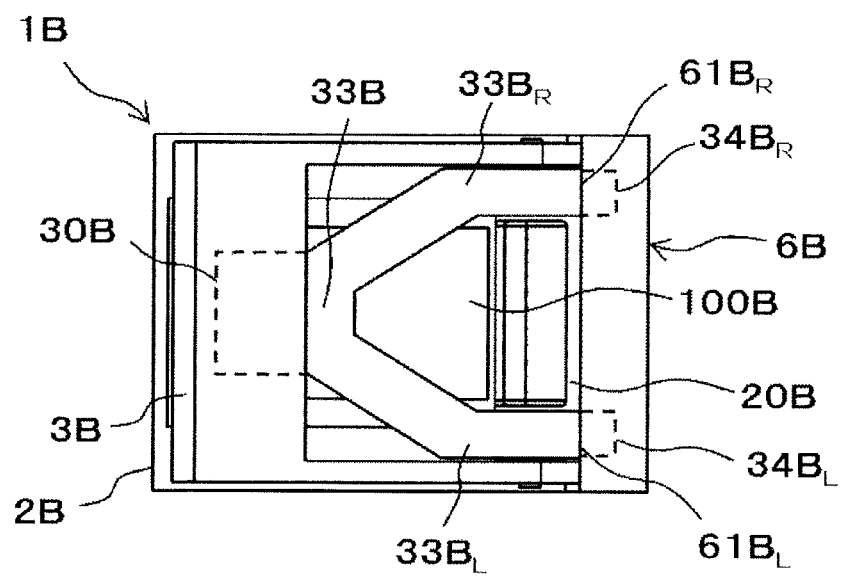
FIG. 9 is a top view illustrating an example of a stapler according to the second embodiment.

FIG. 7 is a side view illustrating an example of the stapler of a second embodiment, FIG. 8 is a rear view illustrating an example of the stapler of the second embodiment, and FIG. 9 is a top view illustrating an example of the stapler of the second embodiment.

As illustrated in FIGS. 3A and 3B, the stapler 1B according to the second embodiment includes a staple ejecting unit 2B which supplies and ejects the staple 10A, and a binding unit 3B that binds the sheet P with the staple 10A, by cutting the staple leg 12A of the staple 10A illustrated in FIG. 3C and by folding the staple leg 12A illustrated in FIG. 3D in cooperation with the staple ejecting unit 2B.

The stapler 1B includes a sheet pinching unit 4B that pinches the sheet P between the staple ejecting unit 2B and the binding unit 3B. The stapler 1B moves in a direction in which the binding unit 3B moves away from and comes into contact with the staple ejecting unit 2B in a rotational operation about the shaft 32B as a fulcrum, and pinches and releases the sheet P with the sheet pinching unit 4B.

The stapler 1B includes a cut unit 30B that cuts the staple leg 12A of the staple 10A penetrating the sheet P at a predetermined length, a cut staple storage unit 6B which stores the cut staple 13A cut with the cut unit 30B, and a discharge passage 33B which guides the cut staple 13A cut with the cut unit 30B to the cut staple storage unit 6B. In the stapler 1B according to the second embodiment, the feeding unit, the ejecting unit, the clincher unit, and the driving unit of the staple 10A are not illustrated, but the stapler 1B may have the same configuration as the stapler 1A of the first embodiment.

The cut staple storage unit 6B is detachably attached to the stapler 1B on the back side of the stapler 1B. When attached to the stapler 1B, the cut staple storage unit 6B has a shape that closes the attachment/detachment path of the staple cartridge 100 B attached to and detached from the storage unit 20B as illustrated in FIG. 8.

As illustrated in FIG. 9, the discharge passage 33B is provided in the binding unit 3B and communicates with the cut unit 30B. In the discharge passage 33B, one discharge passage 33B communicating with the cut unit 30B is divided into two discharge passages $33B_L$ and $33B_R$ and is disposed on both left and right sides of the storage unit 20B so as not to block the attachment and detachment paths of the staple cartridge 100B attached to and detached from the storage unit 20B.

In the stapler 1B, the discharge port $34B_L$ of one discharge passage $33B_L$ and one recovery port $61B_L$ of the cut staple storage unit 6B communicate with each other, and the discharge port $34B_R$ of the other discharge passage $33B_R$ and the other recovery port $61B_R$ of the cut staple storage unit 6B communicate with each other.

As a result, the cut staple 13A passing through the one discharge passage $33B_L$ from the cut unit 30B is stored in the cut staple storage unit 6B from the recovery port $61B_L$. Further, the cut staple 13A passing from the cut unit 30B through the other discharge passage $33B_R$ is stored in the cut staple storage unit 6B from the recovery port $61B_R$.

At least one of the discharge passage $33B_L$ and the discharge passage $33B_R$ of the discharge passage 33B is configured such that the discharge ports $34B_L$ and $34B_R$ are lower than the cut unit 30B, regardless of the position of the stapler 1B in the post-processing apparatus 502A. Therefore, the cut staple 13A cut with the cut unit 30B is suppressed from staying in the cut unit 30B, the discharge passage $33B_L$, and the discharge passage $33B_R$, and is configured to be stored in the cut staple storage unit 6B.

In the discharge passage 33B, the discharge port $34B_L$ of one discharge passage $33B_L$ and the discharge port $34B_R$ of the other discharge passage $33B_R$ are arranged in the vicinity of the shaft 32B. As a result, the quantity of movement of the discharge ports $34B_L$ and $34B_R$ in the rotational operation of the binding unit 3B with the shaft 32B as the fulcrum is suppressed, and it is possible to reduce the size of the plow 1B.

Further, the discharge port $34B_L$ of one discharge passage $33B_L$ enters one recovery port $61B_L$ of the cut staple storage unit 6B, and the discharge port $34B_L$ is disposed within the range of the opening of the recovery port $61B_L$. Similarly, the discharge port $34B_R$ of the other discharge passage $33B_R$ enters the other recovery port $61B_R$ of the cut staple storage unit 6B, and the discharge port $34B_R$ is movable within the range of the opening of the recovery port $61B_R$. As a result, it is possible to suppress the leakage of the cut staple 13A to the outside at the connecting portion between the cut staple storage unit 6B and the discharge passage 33B.

<Example of Operational Effect of Stapler of Second Embodiment>

In the stapler 1B according to the second embodiment, the attachment and detachment of the staple cartridge 100B is performed in a state in which the cut staple storage unit 6B is detached from the stapler 1B. Therefore, when replenishing the staple 10A, an operation of attaching and detaching the cut staple storage unit 6B is indispensable, and the recovery of the cut staple 13A can be performed reliably at the timing of replenishing the staple 10A when there is no staple 10A.

<Configuration Example of Stapler of Third Embodiment>

Figure 10:
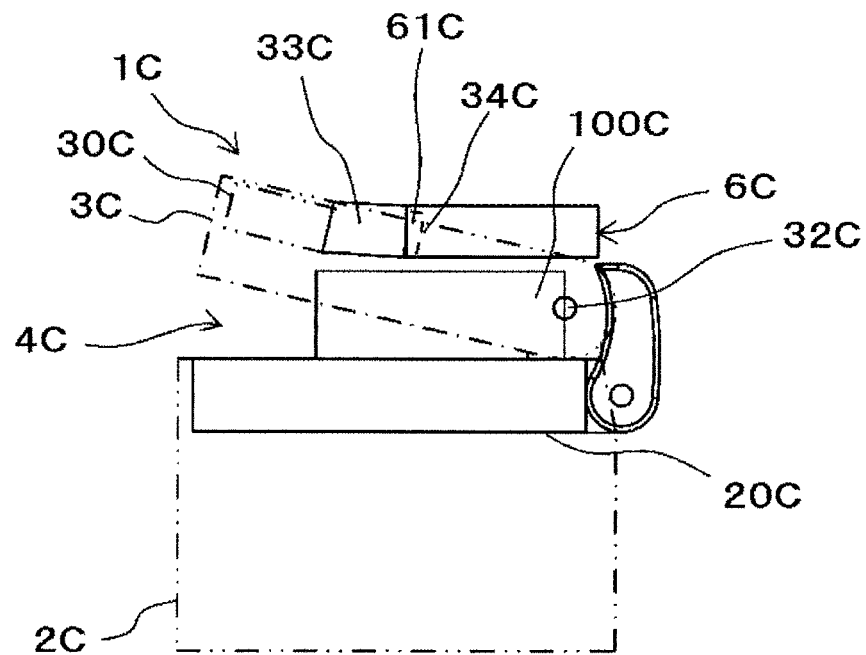
FIG. 10 is a side view illustrating an example of a stapler according to a third embodiment.
Figure 11:
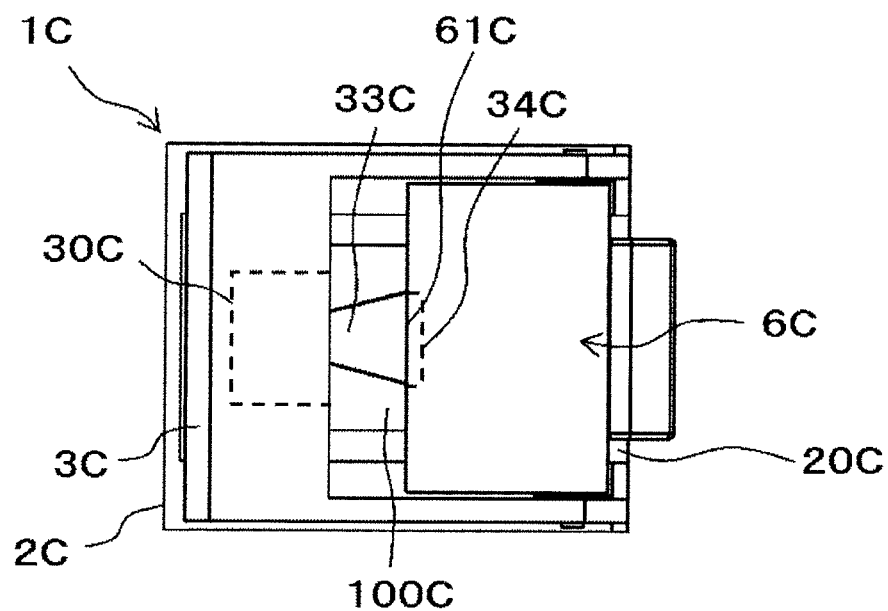
FIG. 11 is a top view illustrating an example of a stapler according to the third embodiment.

FIG. 10 is a side view illustrating an example of the stapler of a third embodiment, and FIG. 11 is a top view illustrating an example of the stapler of the third embodiment.

As illustrated in FIGS. 3A and 3B, the stapler 1C according to the third embodiment includes a staple ejecting unit 2C which supplies and ejects the staple 10A, and a binding unit 3C that binds the sheet P with the staple 10A, by cutting the staple leg 12A of the staple 10A illustrated in FIG. 3C and by folding the staple leg 12A illustrated in FIG. 3D, in cooperation with the staple ejecting unit 2C.

The stapler 1C includes a sheet pinching unit 4C which pinches the sheet P between the staple ejecting unit 2C and the binding unit 3C. The stapler 1C moves in a direction in which the binding unit 3C comes into contact with and separates from the staple ejecting unit 2C in a rotational operation about the shaft 32 C as a fulcrum, and pinches and releases the sheet P by the sheet pinching unit 4C.

The stapler 1C includes a cut unit 30C which cuts the staple leg 12A of the staple 10A penetrating the sheet P with a predetermined length, a cut staple storage unit 6C which stores the cut staple 13A cut by the cut unit 30C, and a discharge passage 33C which guides the cut staple 13A cut by the cut unit 30C to the cut staple storage unit 6C. In the stapler 1C according to the third embodiment, the feeding unit, the ejecting unit, the clincher unit, and the driving unit of the staple 10A are not illustrated, but the stapler 1C may have the same configuration as the stapler 1A of the first embodiment.

The cut staple storage unit 6C is detachably attached to the stapler 1C on the upper surface side of the stapler 1C. The cut staple storage unit 6C may be detachably attached to the binding unit 3C or may be detachably attached to the staple ejecting unit 2C. In addition, the cut staple storage unit 6C may be attached to the staple cartridge 100C, or may be configured to detach the cut staple storage unit 6C from the stapler 1C by attaching and detaching the staple cartridge 100C.

The discharge passage 33C is provided in the binding unit 3C and communicates with the cut unit 30C, and the recovery port 61C of the cut staple storage unit 6C communicates with the discharge port 34C. As a result, the cut staple 13A passing from the cut unit 30C through the discharge passage 33C is stored in the cut staple storage unit 6C from the recovery port 61C.

<Example of Operational Effect of Stapler of Third Embodiment>

As illustrated in FIG. 1, the stapler 1C is mounted on the post-processing apparatus 502A in an inclined state. Therefore, when the stapler 1A is moved to the first position Pp1 illustrated in FIG. 2 to open the lid 505A, the upper surface of the stapler 1C faces the opening side of the lid 505A, and the cut staple storage unit 6C provided on the upper surface of the stapler 1C is easily visually recognized. Therefore, it is possible to easily check the quantity of the stored cut staple 13A, by making the entire inside of the cut staple storage unit 6C or at least the upper surface transparent so that the interior can be visually recognized.

<Configuration Example of Stapler of Fourth Embodiment>

Figure 12:
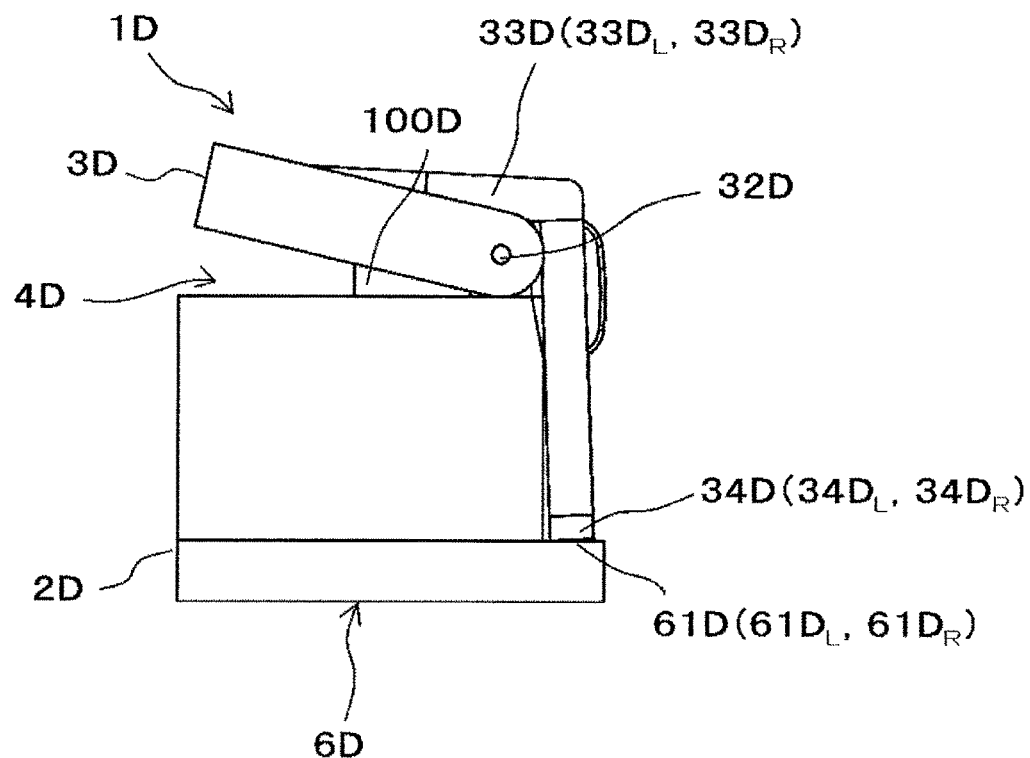
FIG. 12 is a side view illustrating an example of the stapler of a fourth embodiment.
Figure 13:
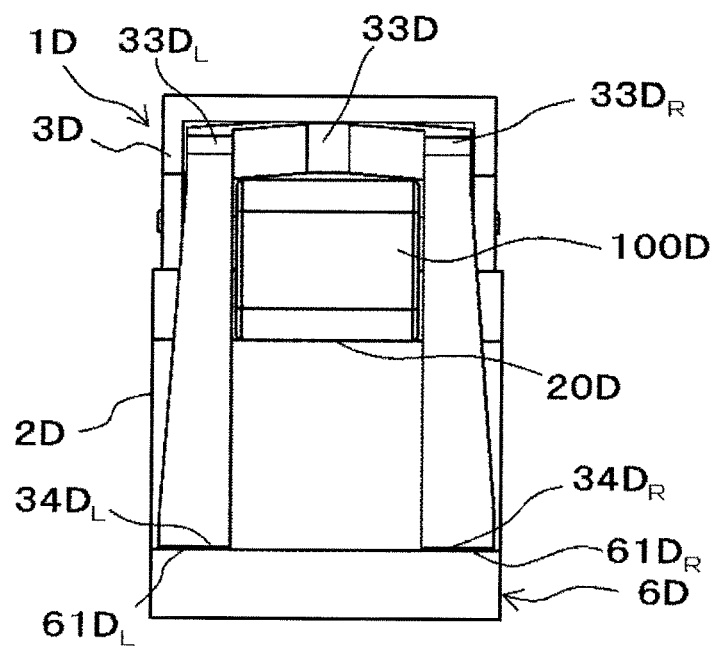
FIG. 13 is a rear view illustrating an example of the stapler of the fourth embodiment.
Figure 14:
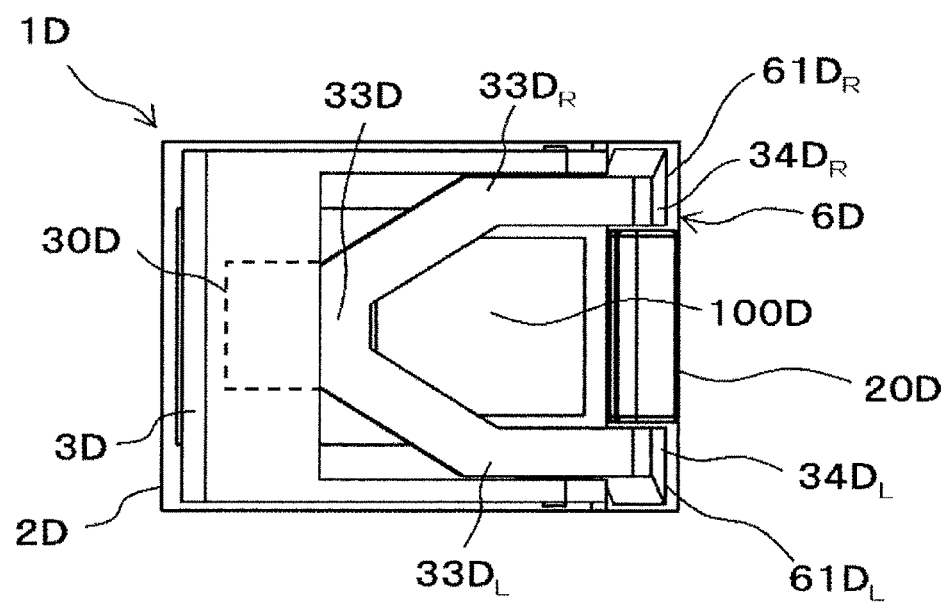
FIG. 14 is a top view illustrating an example of the stapler of the third embodiment.

FIG. 12 is a side view illustrating an example of the stapler of the fourth embodiment, FIG. 13 is a rear view illustrating an example of the stapler of the fourth embodiment, and FIG. 14 is a top view of the stapler of the third embodiment.

As illustrated in FIGS. 3A and 3B, the stapler 1D according to the fourth embodiment includes a staple ejecting unit 2D which supplies and ejects the staple 10A, and a binding unit 3D that binds the sheet P with the staple 10A, by cutting the staple leg 12A of the staple 10A illustrated in FIG. 3C and by folding the staple leg 12A illustrated in FIG. 3D in cooperation with the staple ejecting unit 2D.

The stapler 1D is provided with a sheet pinching unit 4D which pinches the sheet P between the staple ejecting unit 2D and the binding unit 3D. The stapler 1D moves in a direction in which the binding unit 3D comes into contact with and separates from the staple ejecting unit 2D in a rotational operation about the shaft 32D as a fulcrum, and pinches and releases the sheet P by the sheet pinching unit 4D.

The stapler 1D includes a cut unit 30D which cuts the staple leg 12A of the staple 10A penetrating the sheet P at a predetermined length, a cut staple storage unit 6D which stores the cut staple 13A cut with the cut unit 30D, and a discharge passage 33D which guides the cut staple 13A cut by the cut unit 30D to the cut staple storage unit 6D. In the stapler 1D of the fourth embodiment, the feeding unit, the ejecting unit, the clincher unit, and the driving unit of the staple 10A are not illustrated, but the stapler 1D may have the same configuration as the stapler 1A of the first embodiment.

The cut staple storage unit 6D is detachably attached to the stapler 1D on the lower surface side of the stapler 1D. In the present example, the cut staple storage unit 6D is attached to the staple ejecting unit 2D.

The discharge passage 33D is provided in the binding unit 3D and communicates with the cut unit 30D. In the discharge passage 33D, one discharge passage 33D communicating with the cut unit 30D is divided into two discharge passages $33D_L$ and $33D_R$ so as not to block the attachment and detachment paths of the staple cartridge 100D attached to and detached from the storage unit 20D, and is arranged on both the left and right sides of the storage unit 20D. In the discharge passage 33D, the two discharge passages $33D_L$ and $33D_R$ extend from the upper surface to the lower surface side through the back surface of the stapler 1D.

In the stapler 1D, the discharge port $34D_L$ of one discharge passage $33D_L$ and one recovery port $61D_L$ of the cut staple storage unit 6D communicate with each other, and the discharge port $34D_R$ of the other discharge passage $33D_R$ and the other recovery port $61D_R$ of the cut staple storage unit 6D communicate with each other.

As a result, the cut staple 13A passing through the one discharge passage $33D_L$ from the cut unit 30D is stored in the cut staple storage unit 6D from the recovery port $61D_L$. Further, the cut staple 13A passing from the cut unit 30D through the other discharge passage $33D_R$ is stored in the cut staple storage unit 6D from the recovery port $61D_R$.

<Example of Operational Effect of Stapler of Fourth Embodiment>

The lower surface side of the stapler 1D deviates from the attachment and detachment paths of the staple cartridge 100D, and no movable unit is also provided. As a result, the cut staple storage unit 6D can be configured to have a shape that covers the entire lower surface of the stapler 1D, so that it is easy to increase the capacity of the cut staple storage unit 6D.

<Configuration Example of Stapler of Fifth Embodiment>

Figure 15:
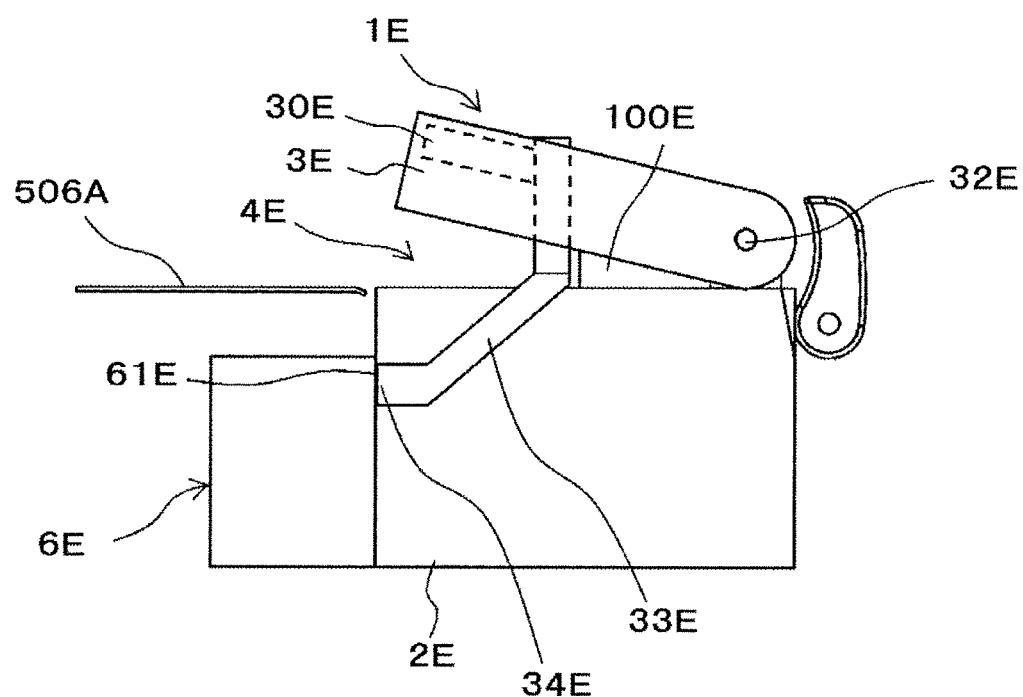
FIG. 15 is a side view illustrating an example of the stapler of a fifth embodiment.

FIG. 15 is a side view illustrating an example of the stapler of a fifth embodiment.

As illustrated in FIGS. 3A and 3B, the stapler 1E according to a fifth embodiment includes a staple ejecting unit 2E which supplies and ejects the staple 10A, and a binding unit 3E that binds the sheet P with the staple 10A, by cutting the staple leg 12A of the staple 10A illustrated in FIG. 3C and by folding the staple leg 12A illustrated in FIG. 3D in cooperation with the staple ejecting unit 2E.

The stapler 1E includes a sheet pinching unit 4E which pinches the sheet P between the staple ejecting unit 2E and the binding unit 3E. The stapler 1E moves in a direction in which the binding unit 3E comes into contact with and separates from the staple ejecting unit 2E in a rotational operation about the shaft 32 E as a fulcrum, and pinches and releases the sheet P with the sheet pinching unit 4E.

The stapler 1E includes a cut unit 30E which cuts the staple leg 12A of the staple 10A penetrating the sheet P with a predetermined length, a cut staple storage unit 6E which stores the cut staple 13A cut by the cut unit 30E, and a discharge passage 33E which guides the cut staple 13A cut by the cut unit 30E to the cut staple storage unit 6E. In the stapler 1E according to the fourth embodiment, the feeding unit, the ejecting unit, the clincher unit, and the driving unit of the staple 10A are not illustrated, but the stapler 1E may have the same configuration as the stapler 1A of the first embodiment.

The cut staple storage unit 6E is detachably attached to the stapler 1E on the front side of the stapler 1E. In the present example, the cut staple storage unit 6E is attached to the staple ejecting unit 2E.

The discharge passage 33E communicates with the cut unit 30E, and the discharge port 34E of the discharge passage 33E and the recovery port 61E of the cut staple storage unit 6E communicate with each other through the side surface of the stapler 1E. As a result, the cut staple 13A passing through the discharge passage 33E from the cut unit 30E is stored in the cut staple storage unit 6E from the recovery port 61E.

<Example of Operational Effect of Stapler of Fifth Embodiment>

A lower side of a sheet guide 506A constituting a loading unit 504A of a post-processing apparatus 502A illustrated in FIG. 1 is conventionally a space. Therefore, by providing the cut staple storage unit 6E on the front face of the stapler 1E, it is possible to provide the cut staple storage unit 6E in the stapler 1E by utilizing the space that is not used conventionally, and it is possible to suppress an increase in size of the apparatus for providing the cut staple storage unit 6E.

<Configuration Example of Stapler of Sixth Embodiment>

Figure 16:
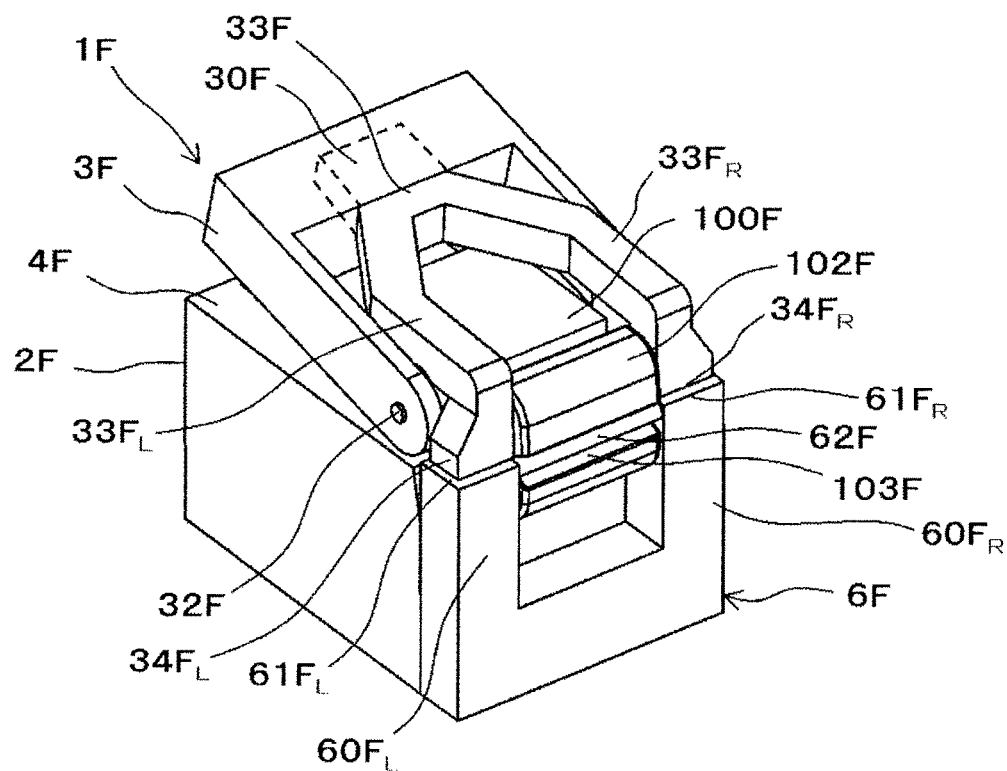
FIG. 16 is a perspective view illustrating an example of a stapler according to a sixth embodiment.
Figure 17:
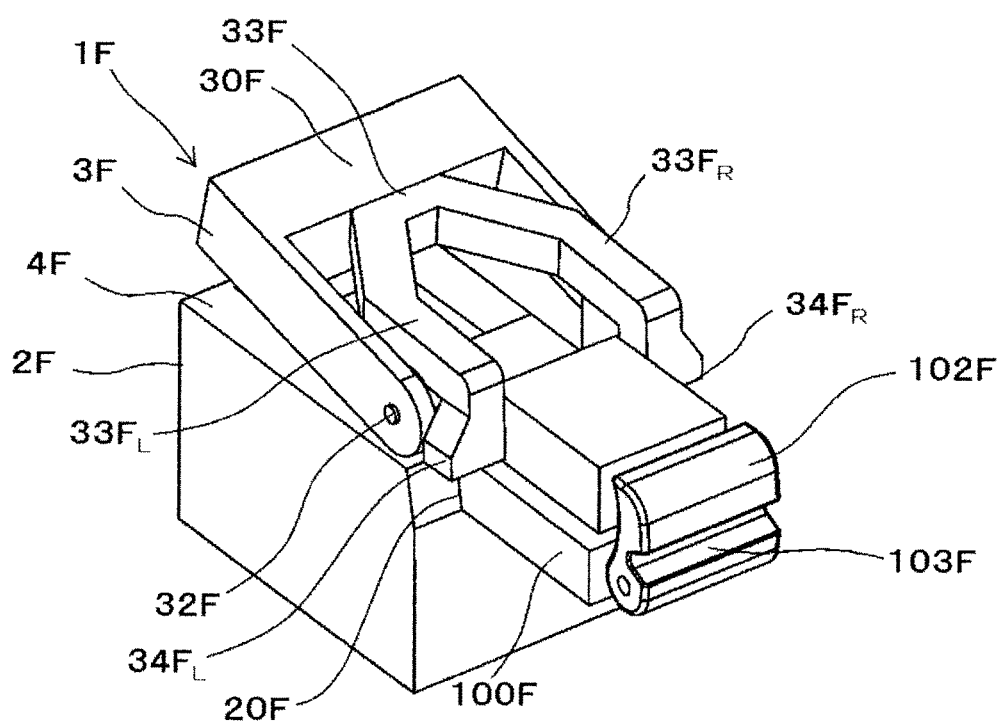
FIG. 17 is a perspective view illustrating an example of a stapler according to the sixth embodiment.

FIGS. 16 and 17 are perspective views illustrating an example of the stapler of a sixth embodiment.

As illustrated in FIGS. 3A and 3B, a stapler 1F of a sixth embodiment includes a staple ejecting unit 2F which supplies and ejects the staple 10A, and a binding unit 3F that binds the sheet P with the staple 10A, by cutting the staple leg 12A of the staple 10A illustrated in FIG. 3C and by folding the staple leg 12A illustrated in FIG. 3D in cooperation with the staple ejecting unit 2F.

The stapler 1F includes a sheet pinching unit 4F which pinches the sheet P between the staple ejecting unit 2F and the binding unit 3F. The stapler 1F moves in a direction in which the binding unit 3F comes into contact with and separates from the staple ejecting unit 2F, in a rotational operation about the shaft 32F as a fulcrum, and pinches and releases the sheet P with the sheet pinching unit 4F.

The stapler 1F includes a cut unit 30F which cuts the staple leg 12A of the staple 10A penetrating the sheet P with a predetermined length, a cut staple storage unit 6F which stores the cut staple 13A cut by the cut unit 30F, and a discharge passage 33F which guides the cut staple 13A cut by the cut unit 30F to the cut staple storage unit 6F. In the stapler 1F according to the sixth embodiment, the feeding unit, the ejecting unit, the clincher unit, and the driving unit of the staple 10A are not illustrated, but the stapler 1F may have the same configuration as the stapler 1A of the first embodiment.

The cut staple storage unit 6F is detachably attached to the stapler 1F on the back side of the stapler 1F. When the cut staple storage unit 6F is attached to the stapler 1F, the two recovery passages $60F_L$ and $60F_R$ are arranged on both sides of the storage unit 20F.

The discharge passage 33F is provided in the binding unit 3F and communicates with the cut unit 30F. In the discharge passage 33F, a single discharge passage 33F communicating with the cut unit 30F is divided into two discharge passages $33F_L$ and $33F_R$ and is arranged on both the left and right sides of the storage unit 20F so as not to block the attachment and detachment paths detachably attached to the staple cartridge 100F.

In the stapler 1F, the discharge port $34F_L$ of one discharge passage $33F_L$ and one recovery port $61F_L$ of the cut staple storage unit 6B communicate with each other, and the discharge port $34F_R$ of the other discharge passage $33F_R$ and the other recovery port $61F_R$ of the cut staple storage unit 6F communicate with each other.

Thus, the cut staple 13A passing through the one discharge passage $33F_L$ from the cut unit 30F is stored in the cut staple storage unit 6F from the recovery port $61F_L$. Further, the cut staple 13A passing from the cut unit 30F through the other discharge passage $33F_R$ is stored in the cut staple storage unit 6F from the recovery port $61F_R$.

The cut staple storage unit 6F includes a fitting portion 62F to be fitted with the staple cartridge 100F. The fitting portion 62F extends between one recovery passage $60F_L$ and the other recovery passage $60F_R$ and is provided at a position which blocks the attachment and detachment paths of the staple cartridge 100F to be attached to and detached from the storage unit 20F. In a state in which the staple cartridge 10F is attached to the storage unit 20F of the stapler 1F, when the cut staple storage unit 6F is attached, the fitting portion 62F is fitted to a fitted portion 103F provided on the handle unit 102F of the staple cartridge 100F.

<Example of Operational Effect of Stapler of Sixth Embodiment>

In the stapler 1F of the sixth embodiment, in the state in which the cut staple storage unit 6F is attached, when the fitting portion 62F is fitted to the fitted portion 103F provided in the handle unit 102F of the staple cartridge 100F, the detachment of the staple cartridge 100F is restricted. Therefore, as illustrated in FIG. 17, attachment and detachment of the staple cartridge 100F are performed in a state in which the cut staple storage unit 6F is detached from the stapler 1F. This makes it necessary to attach and detach the cut staple storage unit 6F when replenishing the staple 10A or the like, and to reliably perform recovery of the cut staple 13A at the timing of replenishing the staple 10A when the staple 10A disappears.

<Configuration Example of Stapler of Seventh Embodiment>

Figure 18:
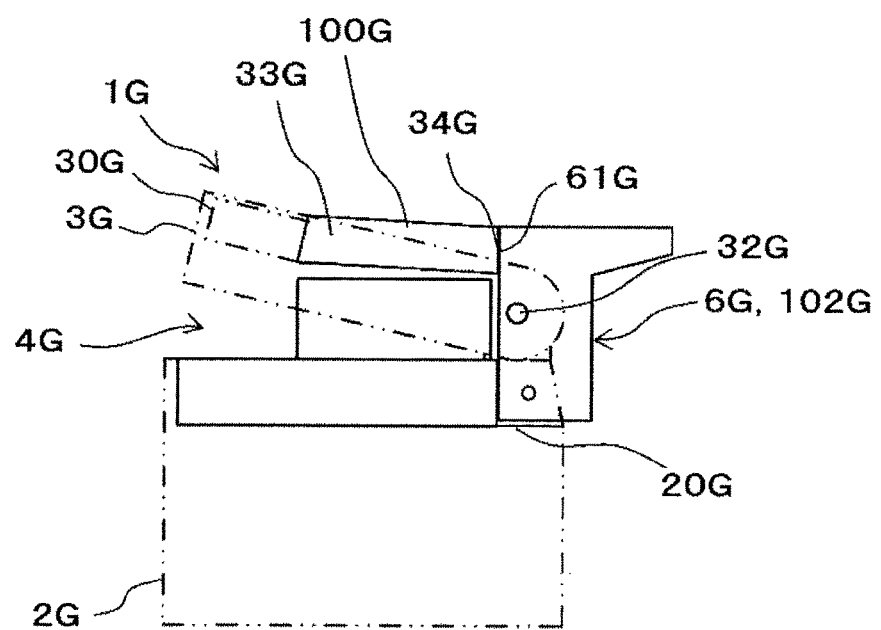
FIG. 18 is a side view illustrating an example of the stapler of a seventh embodiment.
Figure 19:
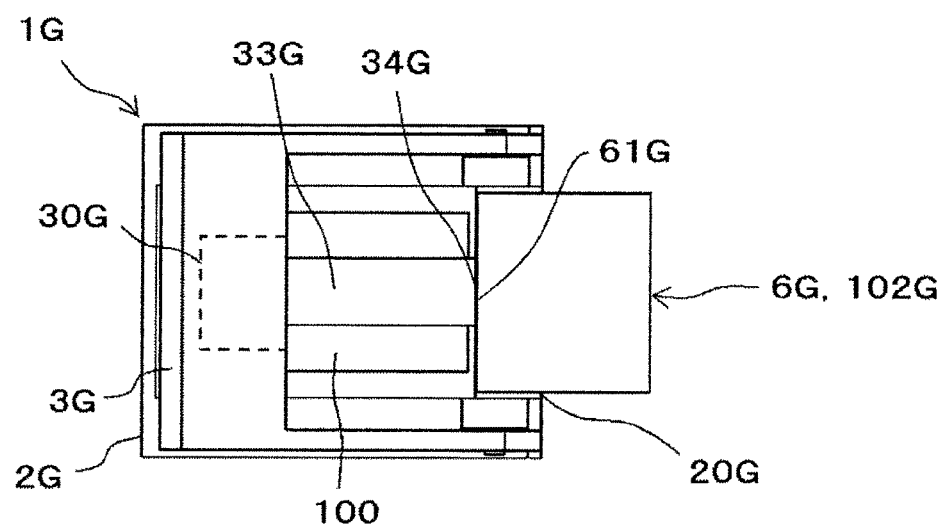
FIG. 19 is a top view illustrating an example of the stapler of the seventh embodiment.

FIG. 18 is a side view illustrating an example of the stapler of a seventh embodiment, and FIG. 19 is a top view illustrating an example of the stapler of the seventh embodiment.

As illustrated in FIGS. 3A and 3B, a stapler 1G according to the seventh embodiment includes a staple ejecting unit 2G which supplies and ejects the staple 10A, and a binding unit 3G that binds the sheet P with the staple 10A, by cutting the staple leg 12A of the staple 10A illustrated in FIG. 3C and by folding the staple leg 12A illustrated in FIG. 3D in cooperation with the staple ejecting unit 2G.

The stapler 1G includes a sheet pinching unit 4G that pinches the sheet P between the staple ejecting unit 2G and the binding unit 3G. The stapler 1G moves in a direction in which the binding unit 3G comes into contact with and separates from the staple ejecting unit 2G in a rotational operation about the shaft 32G as a fulcrum, and pinches and releases the sheet P with the sheet pinching unit 4G.

The stapler 1G includes a cut unit 30G which cuts the staple leg 12A of the staple 10A penetrating the sheet P with a predetermined length, a cut staple storage unit 6G which stores the cut staple 13A cut by the cut unit 30C and a discharge passage 33 G which guides the cut staple 13A cut by the cut unit 30G to the cut staple storage unit 6G. In the stapler 1G of the third embodiment, the feeding unit, the ejecting unit, the clincher unit, and the driving unit of the staple 10A are not illustrated, but the stapler 1G may have the same configuration as the stapler 1A of the first embodiment.

The cut staple storage unit 6G is provided in the staple cartridge 100G, and the cut staple storage unit 6G is detached from the stapler 1G by attachment and detachment of the staple cartridge 100G to the storage unit 20G. The cut staple storage unit 6G is provided in the handle unit 102G used when the staple cartridge 100G is attached and detached, and the cut staple storage unit 6G also serves as the handle unit 102G.

The discharge passage 33G is provided in the binding unit 3G to communicate with the cut unit 30G and the discharge port 34G communicates with the recovery port 61G of the cut staple storage unit 6G. Therefore, the cut staple 13A passing from the cut unit 30G through the discharge passage 33G is stored in the cut staple storage unit 6G from the recovery port 61G.

<Example of Operational Effect of Stapler of Seventh Embodiment>

In the stapler 1G according to the seventh embodiment, when replenishing the staple 10A or the like, the staple cartridge storage unit 6G is attached and detached together by the operation of attaching and detaching the staple cartridge 100G. This makes it possible to reliably perform the recovery of the cut staple 13A at the timing of replenishing the staple 10A when the staple 10A disappears. In addition, since the cut staple storage unit 6G also serves as the handle unit 102G a space for newly providing the cut staple storage unit 6G is unnecessary, and it is possible to suppress an increase in size of the stapler 1G. Further, the entire staple storage unit 6G or at least the upper surface thereof is made transparent so that the inside of the staple storage unit 6G can be visually confirmed, whereby the quantity of the cut staple 13A stored can be easily confirmed.

<Configuration Example of Stapler of Eighth Embodiment>

Figure 20:
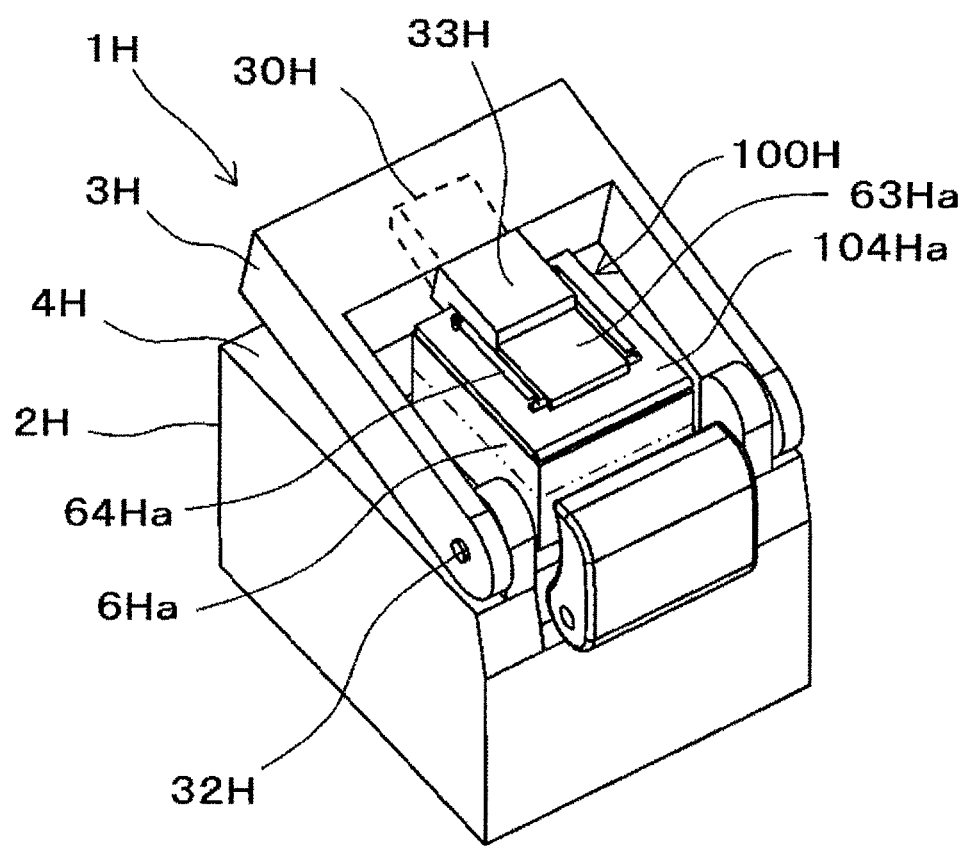
FIG. 20 is a perspective view illustrating an example of the stapler of an eighth embodiment.
Figure 21:
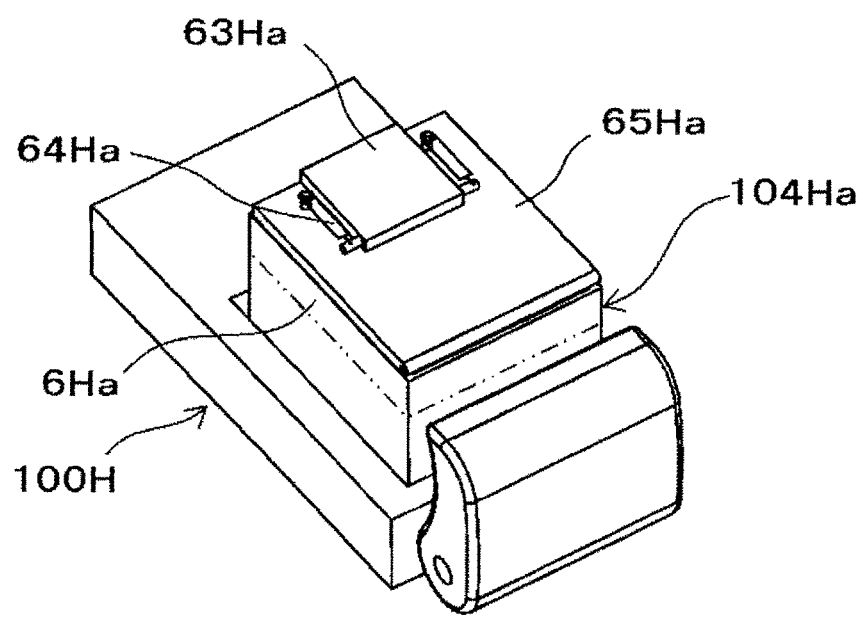
FIG. 21 is a perspective view illustrating an example of a staple cartridge according to the present embodiment.
Figure 22:
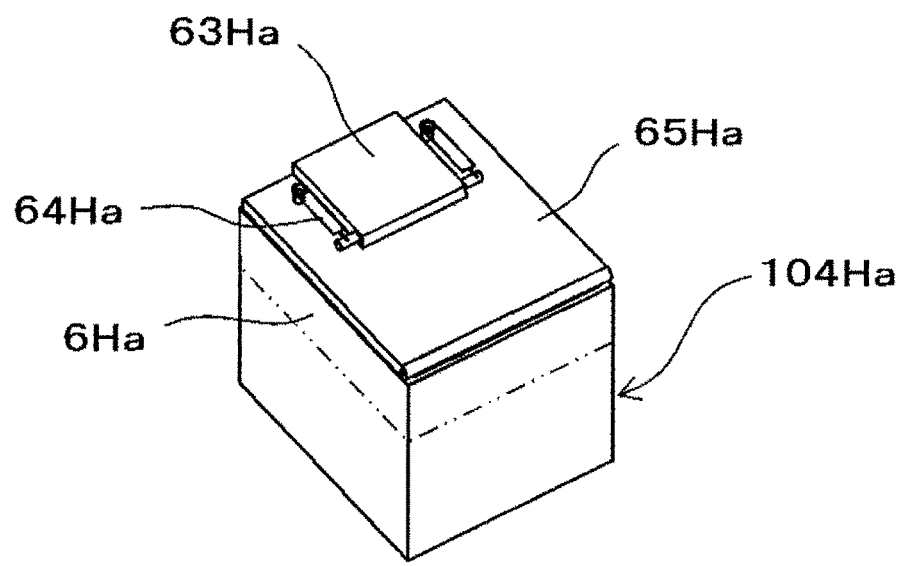
FIG. 22 is a perspective view illustrating an example of a refill according to the present embodiment.
Figure 23:
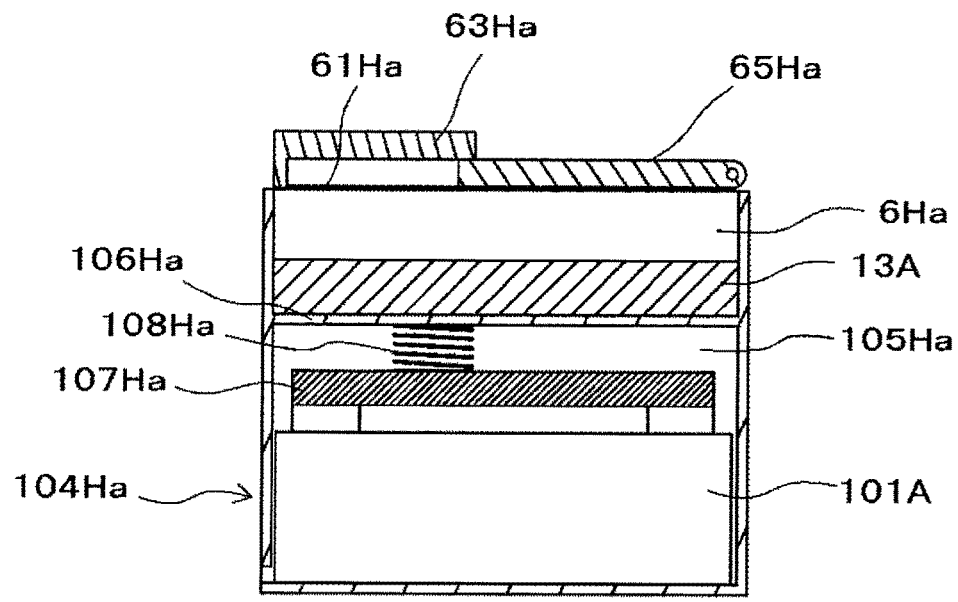
FIG. 23 is a side sectional view illustrating an example of a refill according to the present embodiment.
Figure 24:
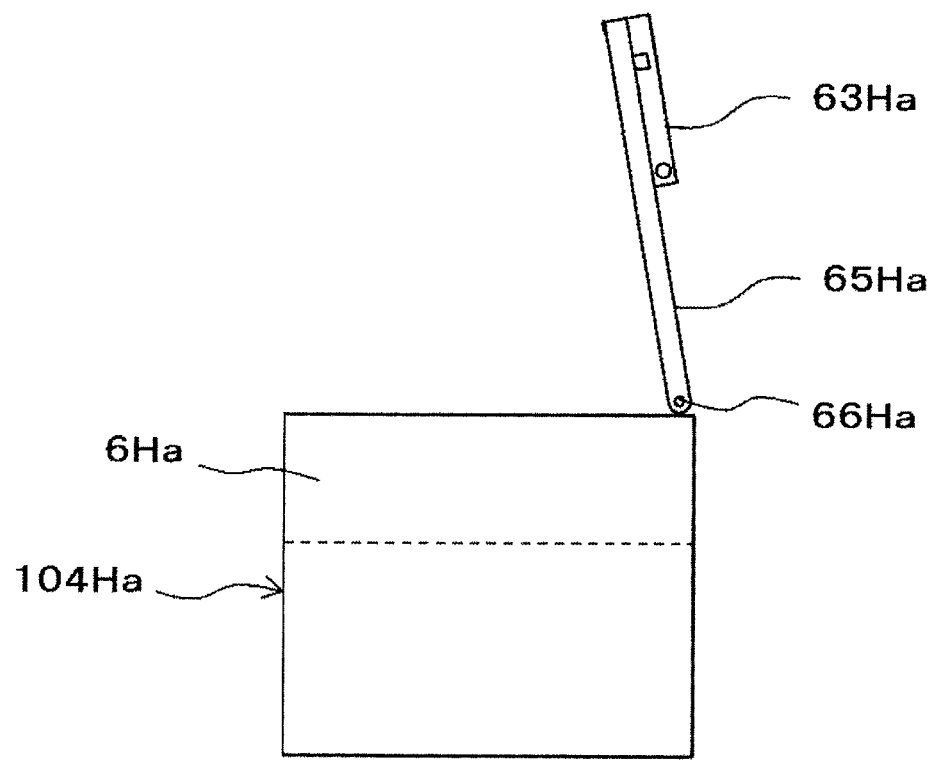
FIG. 24 is an operational explanatory view illustrating an operation example of the refill according to the present embodiment.

FIG. 20 is a perspective view illustrating an example of the stapler of an eighth embodiment, and FIG. 21 is a perspective view illustrating an example of the staple cartridge of the present embodiment attached to the stapler of the eighth embodiment. FIG. 22 is a perspective view illustrating an example of a refill attached to the staple cartridge of the present embodiment, and FIG. 23 is a side sectional view illustrating an example of the refill of the present embodiment. Further, FIG. 24 is an operational explanatory view illustrating an operation example of the refill of the present embodiment.

As illustrated in FIGS. 3A and 3B, a stapler 1H according to the eighth embodiment includes a staple ejecting unit 2H which supplies and ejects the staple 10A, and a binding unit 3H which binds the sheet P with the staple 10A, by cutting the staple leg 12A of the staple 10A illustrated in FIG. 3C and by folding the staple leg 12A illustrated in FIG. 3D in cooperation with the staple ejecting unit 2H.

The stapler 1H is provided with a sheet pinching unit 4H that pinches the sheet P between the staple ejecting unit 2H and the binding unit 3H. The stapler 1H moves in a direction in which the binding unit 3H moves away from the staple ejecting unit 2H in a rotational operation about the shaft 32 H as a fulcrum, and pinches and releases the sheet P with the sheet pinching unit 4H.

The stapler 1H includes a cut unit 30H which cuts the staple leg 12A of the staple 10A penetrating the sheet P with a predetermined length, a cut staple storage unit 6Ha which stores the cut staple 13A cut by the cut unit 30H, and a discharge passage 33H which guides the cut staple 13A cut by the cut unit 30H to the cut staple storage unit 6Ha. In the stapler 1H according to the eighth embodiment, the feeding unit, the ejecting unit, the clincher unit, and the driving unit of the staple 10A are not illustrated, but the stapler 1H may have the same configuration as the stapler 1A of the first embodiment.

The cut staple storage unit 6Ha is detachably attached to the stapler 1H on the upper surface side of the stapler 1H. In the present example, the cut staple storage unit 6Ha is attached to the staple cartridge 100H, and the cut staple storage unit 6Ha is attached to and detached from the stapler 1H by attaching and detaching the staple cartridge 100H.

The discharge passage 33H is provided in the binding unit 3H to communicate with the cut unit 30H, and communicates with the recovery port 61Ha of the cut staple storage unit 6Ha. As a result, the cut staple 13A passing from the cut unit 30H through the discharge passage 33H is stored in the cut staple storage unit 6Ha from the recovery port 61Ha.

The staple cartridge 100H is configured such that a refill 104Ha in which the staple sheet 101A is stored is detachable, and the cut staple storage unit 6Ha is provided in the refill 104Ha. The refill 104Ha includes a staple storage unit 105Ha in which the staple sheet 101A is stored so as to be fed, and is divided into the cut staple storage unit 105Ha and the partition 106Ha to form a cut staple storage unit 6Ha.

The staple storage unit 105Ha is provided with a staple sheet pressing part 107Ha and a spring 108Ha which press the staple sheet 101A along the stacking direction. The cut staple storage unit 6Ha is provided with a recovery port 61Ha on the upper surface of the refill 104Ha, and a lid 63Ha which opens and closes the recovery port 61Ha. The lid 63Ha is urged by the spring 64Ha in a direction which closes the recovery port 61Ha.

As a result, as illustrated in FIG. 21 and the like, in a state in which the staple cartridge 100H is not attached to the stapler 1H, the recovery port 61Ha is closed by the lid 63Ha. Therefore, in a state in which the staple cartridge 100H is detached from the stapler 1H, the stored cut staple 13A is prevented from being inadvertently discharged to the outside.

In contrast, as illustrated in FIG. 20, when the staple cartridge 100H is attached to the stapler 1H, the lid 63Ha is opened by being pushed against the discharge passage 33H, and the discharge passage 33H and the cut staple storage unit 6Ha communicate with each other. Therefore, with the operation of attaching the staple cartridge 100H to the stapler 1H, the lid 63Ha can be opened, and there is no need to perform another operation only to open the lid 63Ha. Therefore, it is possible to suppress the forgetting to open the lid 63Ha.

The cut staple storage unit 6Ha is provided with a recovery cover 65Ha that allows the entire upper surface of the refill 104Ha to be opened and closed. In this example, the recovery cover 65Ha opens and closes the cut staple storage unit 6Ha by rotational operation about the shaft 66Ha as a fulcrum. Therefore, by opening the recovery cover 65Ha in a state in which the staple cartridge 100H is detached from the stapler 1H, and in a state in which the refill 104Ha is detached from the staple cartridge 100H as necessary, the cut staple 13A stored in the cut staple storage unit 6Ha can be discharged. In the configuration in which the refill 104H is exchanged by replenishing the staple 10A, the recovery lid 65Ha may not be provided.

<Example of Operational Effect of Stapler of Eighth Embodiment>

In the stapler 1H of the eighth embodiment, when replenishing the staple 10A or the like, the cut staple storage unit 6Ha is attached and detached together by an operation of attaching and detaching the staple cartridge 100H. This makes it possible to reliably perform the recovery of the cut staple 13A at the timing of replenishing the staple 10A when the staple 10A disappears. Further, since the cut staple storage unit 6Ha is attached together by the operation of attaching the staple cartridge 100H to the stapler 1H, it is possible to suppress the forgetting to attach the cut staple storage unit 6Ha.

<Modified Example of Refill of Present Embodiment>

Figure 25:
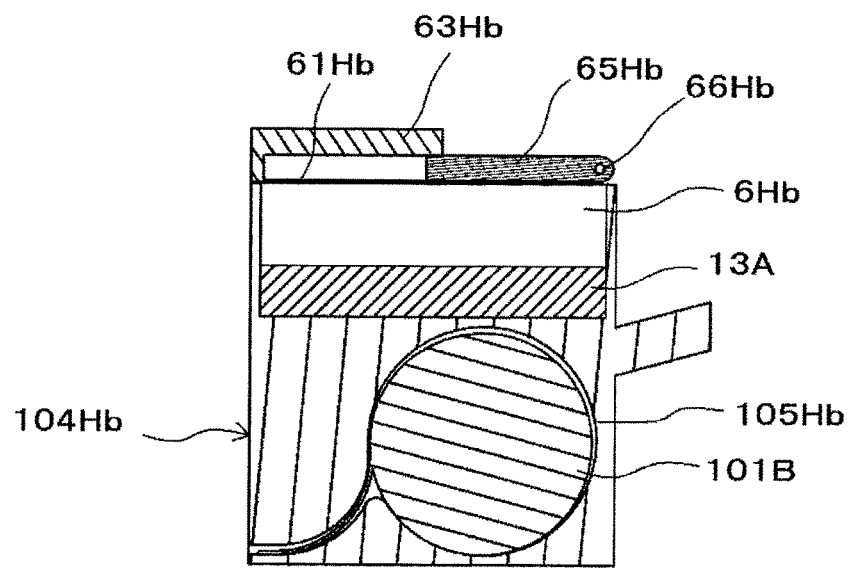
FIG. 25 is a side sectional view illustrating a modified example of the refill of the present embodiment.

FIG. 25 is a side sectional view illustrating a modified example of the refill of the present embodiment. In a refill 104Hb, a staple roll sheet 101B, on which a staple sheet integrally formed by bonding a plurality of linear staples 10A is wound, is stored in the staple storage unit 105Hb. In the refill 104Hb, a space capable of storing the cut staple 13A is provided above the staple storage unit 105Hb to form the cut staple storage unit 6Hb.

The cut staple storage unit 6Hb is provided with a recovery port 61Hb on the upper surface of the refill 104Hb and a lid 63Hb which opens and closes the recovery port 61Hb. The lid 63Hb is biased in a direction of closing the recovery port 61Hb by a spring (not illustrated).

The cut staple storage unit 6Hb is provided with a recovery cover 65Hb that allows the entire upper surface of the refill 104Hb to be opened and closed. In the present embodiment, the recovery lid 65Hb opens and closes the cut staple storage unit 6Hb by rotational operation about the shaft 66Hb as a fulcrum.

Figure 26:
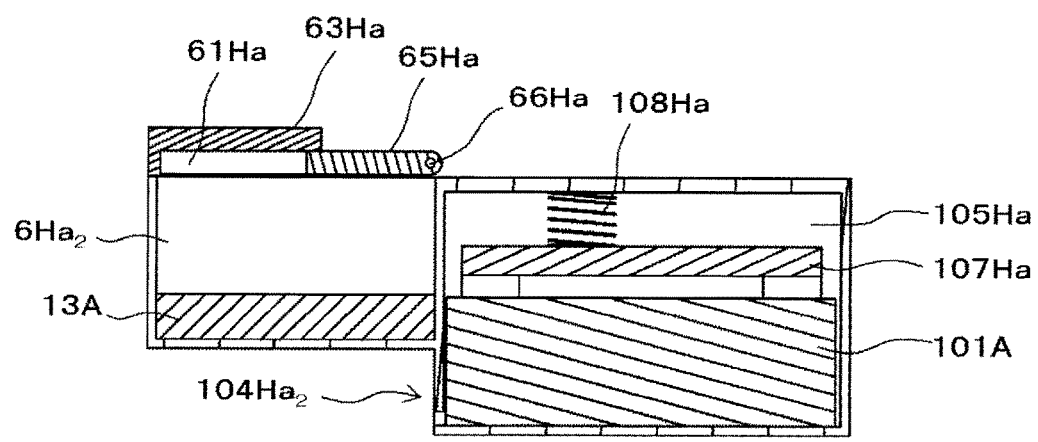
FIG. 26 is a side sectional view illustrating a modified example of the refill of the present embodiment.
Figure 27:
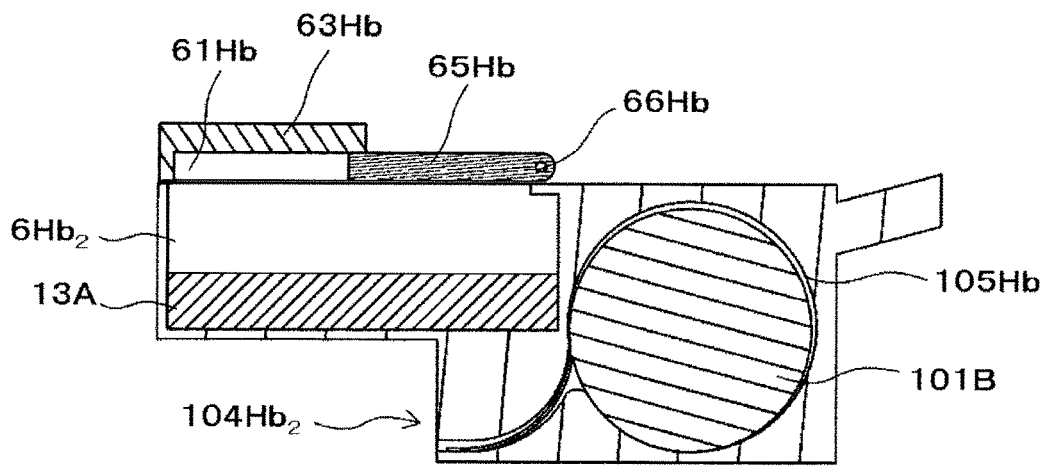
FIG. 27 is a side sectional view illustrating a modified example of the refill of the present embodiment.

FIGS. 26 and 27 are side sectional views illustrating modified examples of the refill according to the present embodiment, and in which the cut staple storage unit is provided on the front side of the refill. In the refill 6Ha$_2$ illustrated in FIG. 26, a cut staple storage unit 6Ha$_2$ is formed by providing a space in which the staple 13A can be stored on the front side of the cut staple storage unit 105Ha in which the staple sheet 101A is stored.

The refill 104Ha$_2$ is provided with a recovery port 61Ha on the upper surface of the cut staple storage unit 6Ha$_2$, and a lid 63Ha that opens and closes the recovery port 61Ha. The lid 63Ha is biased in a direction of closing the recovery port 61Ha by a spring (not illustrated).

The refill 104Ha$_2$ is provided with a recovery lid 65Ha that allows the entire upper surface of the cut staple storage unit 6Ha$_2$ to be opened and closed. In the present example, the recovery cover 65Ha opens and closes the cut staple storage unit 6Ha$_2$ by rotational operation about the shaft 66Ha as a fulcrum.

In the refill 6Hb$_2$ illustrated in FIG. 27, a cut staple storage unit 6Hb$_2$ is formed by providing a space in which the staple 13A can be stored on the front side of the cut staple storage unit 105Hb in which the staple sheet roll 101B is stored.

The refill 104Hb$_2$ is provided with a recovery port 61Hb on the upper surface of the cut staple storage unit 6Hb$_2$, and a lid 63Hb which opens and closes the recovery port 61Hb. The lid 63Hb is biased in a direction of closing the recovery port 61Hb by a spring (not illustrated).

The refill 104Hb$_2$ is provided with a recovery lid 65Hb that can open and close the entire upper surface of the cut staple storage unit 6Hb$_2$. In the present embodiment, the recovery lid 65Hb opens and closes the cut staple storage unit 6Hb$_2$ by rotational operation about the shaft 66Hb as a fulcrum.

Figure 28:
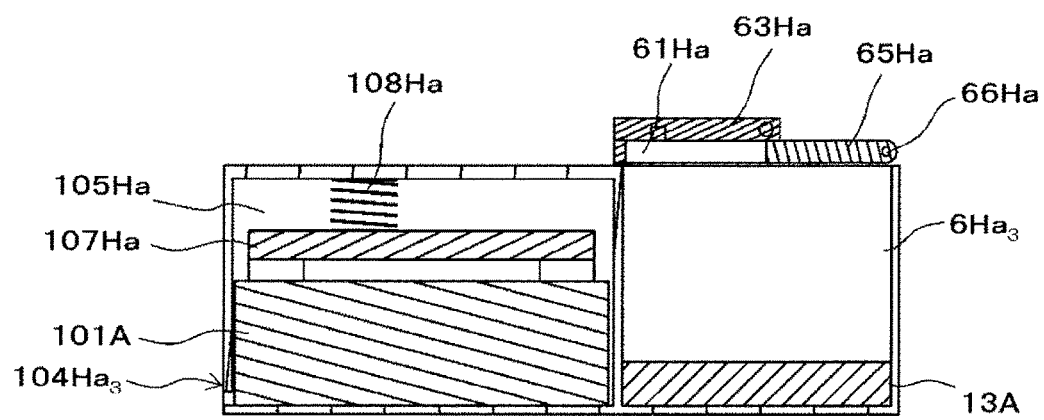
FIG. 28 is a side sectional view illustrating a modified example of the refill of the present embodiment.
Figure 29:
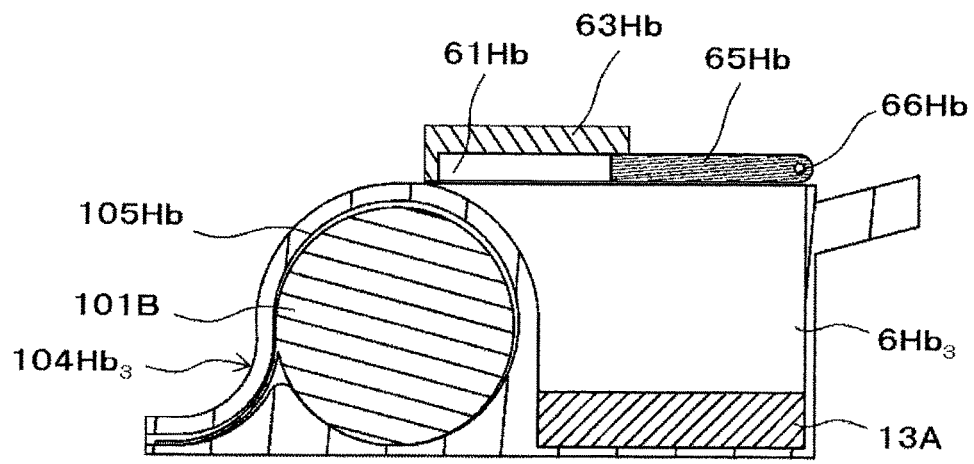
FIG. 29 is a side sectional view illustrating a modified example of the refill according to the present embodiment.

FIGS. 28 and 29 are side sectional views illustrating modified examples of the refill according to the present embodiment, in which the cut staple storage unit is provided on the back side of the refill. In a refill 6Ha$_3$ illustrated in FIG. 28, a cut staple storage unit 6Ha$_3$ is formed by providing a space in which the cut staple 13A can be stored on the back side of the cut staple storage unit 105Ha in which the staple sheet 101A is stored.

The refill 104Ha$_3$ is provided with a recovery port 61Ha on the upper surface of the cut staple storage unit 6Ha$_3$, and a lid 63Ha that opens and closes the recovery port 61Ha. The lid 63Ha is biased in a direction of closing the recovery port 61Ha by a spring (not illustrated).

The refill 104Ha$_3$ is provided with a recovery lid 65Ha that can open and close the entire upper surface of the cut staple storage unit 6Ha$_3$. In the present embodiment, the recovery lid 65Ha opens and closes the cut staple storage unit 6Ha$_3$ by rotational operation about the shaft 66Ha as a fulcrum.

In the refill $6Hb_3$ illustrated in FIG. 29, a cut staple storage unit $6Hb_3$ is formed by providing a space in which the staple 13A can be stored on the back side of the cut staple storage unit 105Hb in which the staple sheet roll 101B is stored.

The refill $104Hb_3$ is provided with a recovery port 61Hb on the upper surface of the cut staple storage unit $6Hb_3$, and a lid 63Hb which opens and closes the recovery port 61Hb. The lid 63Hb is biased in a direction of closing the recovery port 61Hb by a spring (not illustrated).

The refill $104Hb_3$ is provided with a recovery lid 65Hb that allows the entire upper surface of the cut staple storage unit $6Hb_3$ to be opened and closed. In the present example, the recovery cover 65Hb opens and closes the cut staple storage unit $6Hb_3$ by rotational operation about the shaft 66Hb as a fulcrum.

Figure 30:
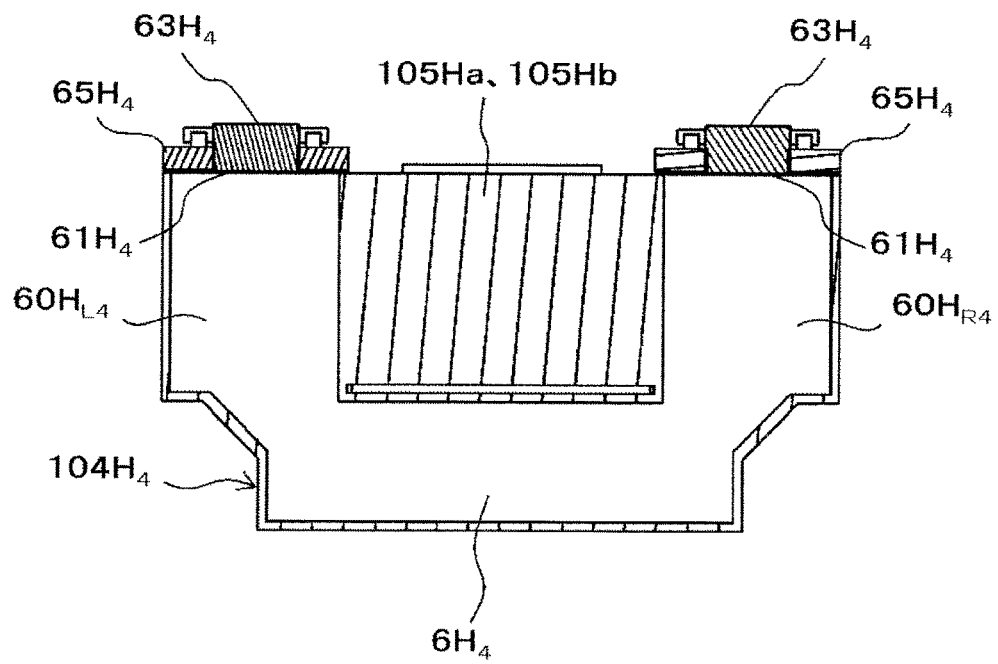
FIG. 30 is a front cross-sectional view illustrating a modified example of the refill of the present embodiment.
Figure 31:
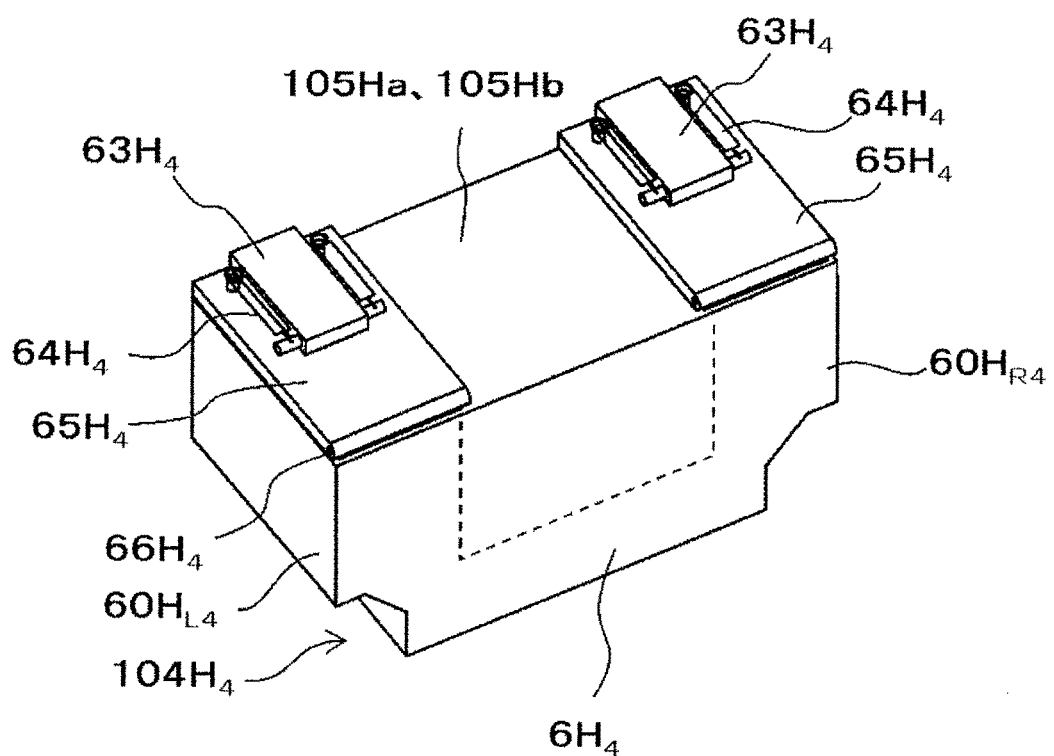
FIG. 31 is a perspective view illustrating a modified example of the refill of the present embodiment.

FIG. 30 is a front cross-sectional view illustrating a modified example of the refill according to the present embodiment, and FIG. 31 is a perspective view illustrating a modified example of the refill of the present embodiment, in which the cut staple storage unit is provided on the lower surface side of the refill. In the refill $6H_4$, on the lower surface side of a staple storage unit 105Ha in which the staple sheet 101A is stored or a staple storage unit 105Hb in which the staple sheet roll 101B is stored, by providing a space in which the cut staple 13A can be stored, a cut staple storage unit $6H_4$ is formed. Further, on both sides of the cut staple storage unit 105Ha or the cut staple storage unit 105Hb, recovery passage $60HL_4$ and $60HR_4$ communicating with the cut staple storage unit $6H_4$ are provided.

The refill $104H_4$ is provided with a recovery port $61H_4$ provided on the upper surfaces of one recovery passage $60H_M$ and the other recovery passage $60HR_4$, and a lid $63H_4$ which opens and closes the recovery port $61H_4$. The lid $63H_4$ is urged in a direction of closing the recovery port $61H_4$ by the spring $64H_4$.

The refill $104H_4$ is formed with a recovery lid $65H_4$ that allows the entire upper surfaces of one recovery passage $60HL_4$ and the other recovery passage $60H_{R4}$ to be opened and closed is provided. In the present embodiment, the recovery lid $65H_4$ opens and closes the cut staple storage unit $6H_4$ by rotational operation about the shaft $66H4$ as a fulcrum.

Figure 32:
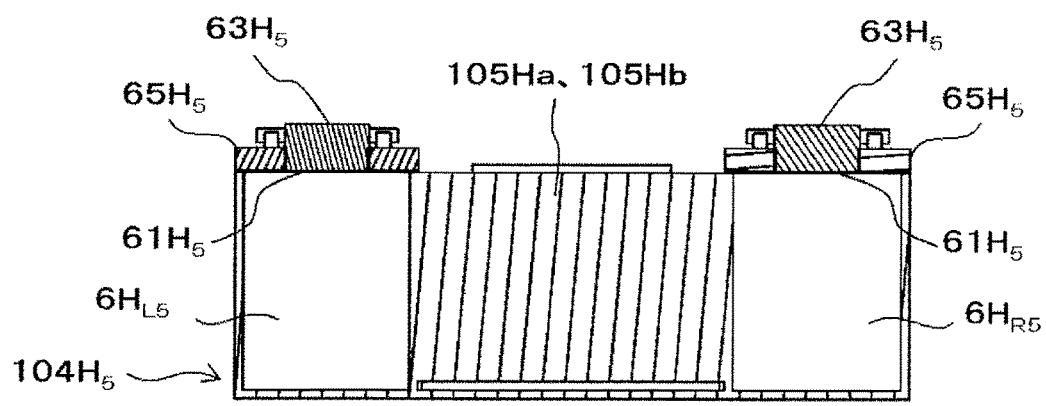
FIG. 32 is a front cross-sectional view illustrating a modified example of the refill of the present embodiment.
Figure 33:
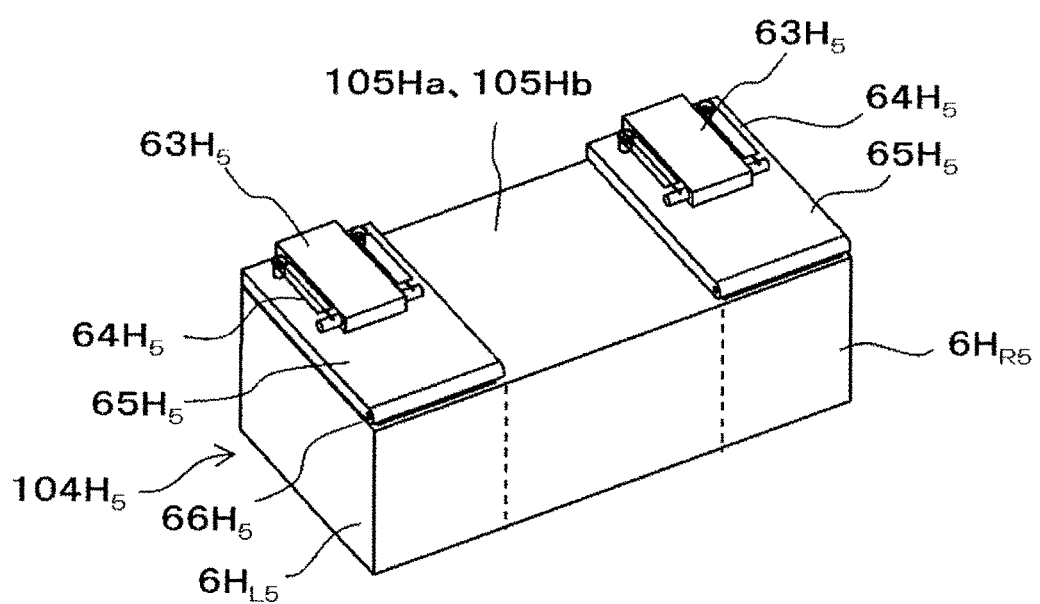
FIG. 33 is a perspective view illustrating a modified example of the refill of the present embodiment.

FIG. 32 is a front cross-sectional view illustrating a modified example of the refill according to the present embodiment, and FIG. 33 is a perspective view illustrating a modified example of the refill according to the present embodiment, in which the cut staple storage unit is provided on the side surface of the refill. In the refill $6H_5$, on both side surfaces of a staple storage unit 105Ha in which the staple sheet 101A is stored or a staple storage unit 105Hb in which the staple sheet roll 101B is stored, by providing a space in which the cut staple 13A can be stored, cut staple storage units $6HL_5$ and $6HR_5$ are formed.

The refill $104H_5$ is provided with a recovery port 61H on the upper surfaces of one cut staple storage unit $6HL_5$ and the other cut staple storage unit $6HR_5$, and a lid $63H_5$ Which opens and closes the recovery port $61H_5$. The lid $63H_5$ is biased in the direction of closing the recovery port 61H by the spring $64H_5$.

The refill 104H is provided with a recovery lid $65H_5$ which is capable of opening and closing the entire upper surfaces of one cut staple storage unit $6HL_5$ and the other cut staple storage unit $6HR_5$. In the present embodiment, the recovery lid $65H_5$ opens and closes the cut staple storage units $6HL_5$, $6HR_5$ by the rotational operation about the shaft $66H_5$ as a fulcrum.

<Configuration Example of Stapler of Ninth Embodiment>

Figure 34:
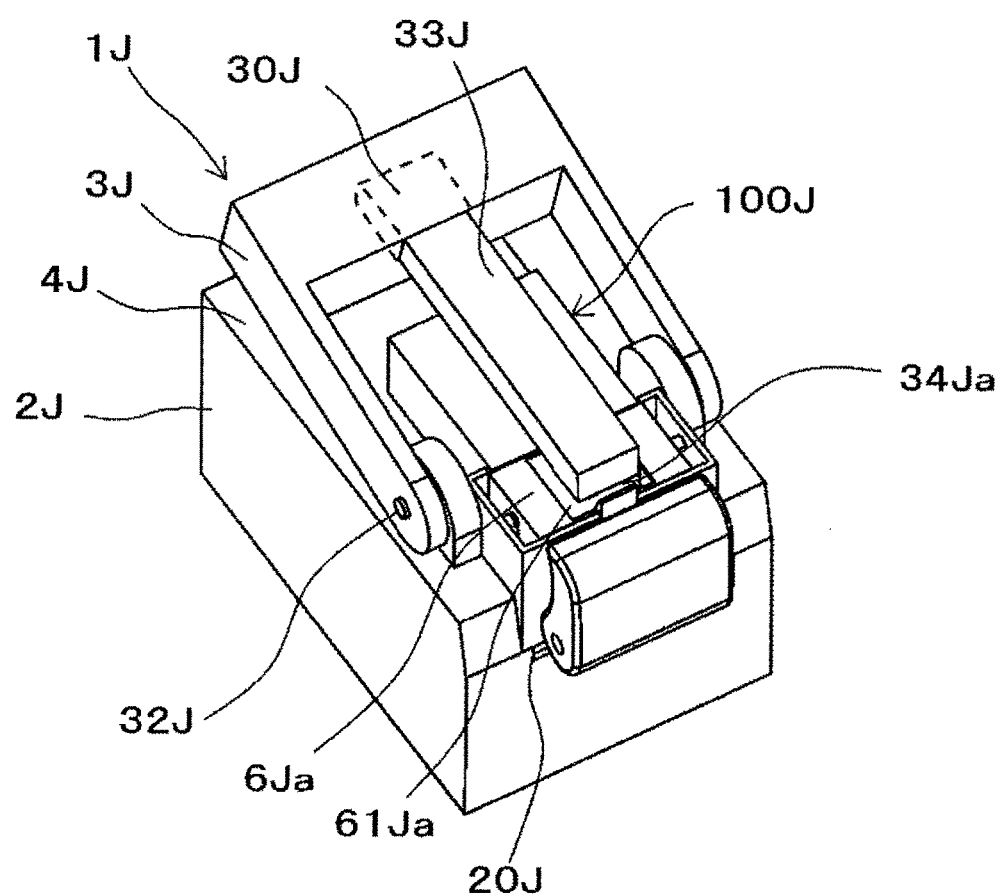
FIG. 34 is a perspective view illustrating an example of the stapler of a ninth embodiment.

FIG. 34 is a perspective view illustrating an example of the stapler of a ninth embodiment, and FIGS. 35 to 38 are side sectional views illustrating an example of the stapler of the ninth embodiment.

As illustrated in FIGS. 3A and 3B, a stapler 1J according to the ninth embodiment includes a staple ejecting unit 2J which supplies and ejects the staple 10A, and a binding unit 3J that binds the sheet P with the staple 10A, by cutting the staple leg 12A of the staple 10A illustrated in FIG. 3C and by folding the staple leg 12A illustrated in FIG. 3D in cooperation with the staple ejecting unit 2J.

The stapler 1J is provided with a sheet pinching unit 4J that pinches the sheet P between the staple ejecting unit 2J and the binding unit 3J. The stapler 1J moves in a direction in which the binding unit 3J moves away from the staple ejecting unit 2J in a rotational operation about the shaft 32J as a fulcrum, and pinches and releases the sheet P with the sheet pinching unit 4J.

The stapler 1J has a cut unit 30J which cuts the staple leg 12A of the staple 10A penetrating the sheet P with a predetermined length, a cut staple storage unit 6Ja which stores the cut staple 13A cut by the cut unit 30J, and a discharge passage 33J which guides the cut staple 13A cut by the cut unit 30J to the cut staple storage unit 6Ja. In the stapler 1J according to the ninth embodiment, the feeding unit, the ejecting unit, the clincher unit, and the driving unit of the staple 10A are not illustrated, but the stapler 1J have the same configuration as the stapler 1A of the fast embodiment.

The cut staple storage unit 6Ja is detachably attached to the stapler 1J. In the present example, the cut staple storage unit 6Ja is attached to the staple cartridge 100J, and the cut staple storage unit 6Ja is detached from the stapler 1J by attaching and detaching the staple cartridge 100J.

The discharge passage 33J is provided in the binding unit 3J and communicates with the cut unit 30J, and the discharge port 34Ja communicates with the recovery port 61Ja of the cut staple storage unit 6Ja. As a result, the cut staple 13A passing from the cut unit 30J through the discharge passage 33J is stored in the cut staple storage unit 6Ja from the recovery port 61Ja.

In the staple cartridge 100J, the cut staple storage unit 6Ja is attached so as to be vertically movable. The cut staple storage unit 6Ja is suspended from the staple cartridge 100J by the spring 67Ja and is moved up and down by a change in weight due to a change in the quantity of the stored cut staple 13A.

The cut staple storage unit 6Ja has a fitting portion 68J at a lower portion thereof. The fitting portion 68Ja is configured so that a surface that is located on the front side in the movement direction in the operation of moving the staple cartridge 100J in the direction of attaching to the storage unit 20J of the stapler 1J is substantially perpendicular to the movement direction. Further, the fitting portion 68Ja is configured so that the surface located on the front side in the movement direction in the movement of moving the staple cartridge 100J away from the storage unit 20J of the stapler 1J is inclined with respect to the movement direction.

When the staple cartridge 100J is attached to the storage unit 20J, the stapler 1J has a fitted portion 109Ja at a position facing the fitting portion 68Ja. The fitted portion 109Ja has a shape that matches the fitting portion 68Ja. When the quantity of the cut staple stored in the cut staple storage unit 6Ja increases and the cut staple storage unit 6Ja is lowered, the fitting portion 68Ja is engaged.

<Example of Operational Effect of Stapler of Ninth Embodiment>

Figure 35:
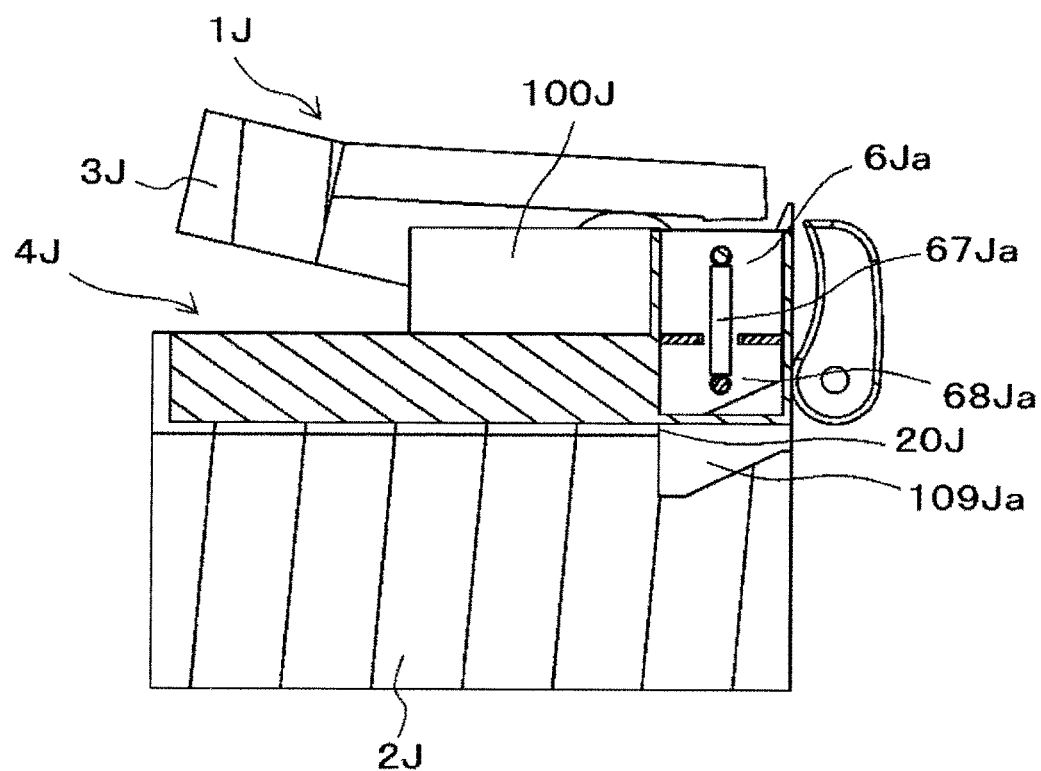
FIG. 35 is a side sectional view illustrating an example of the stapler of the ninth embodiment.

In the stapler 1J according to the ninth embodiment, when the cut staple 13A is not stored in the cut staple storage unit 6Ja, as illustrated in FIG. 35, the cut staple storage unit 6Ja is raised to the initial position by the spring 67Ja. As a result, the fitting portion 68Ja enters the staple cartridge 100J, and the staple cartridge 100J can be freely attached and detach to and from the storage unit 20J.

Figure 36:
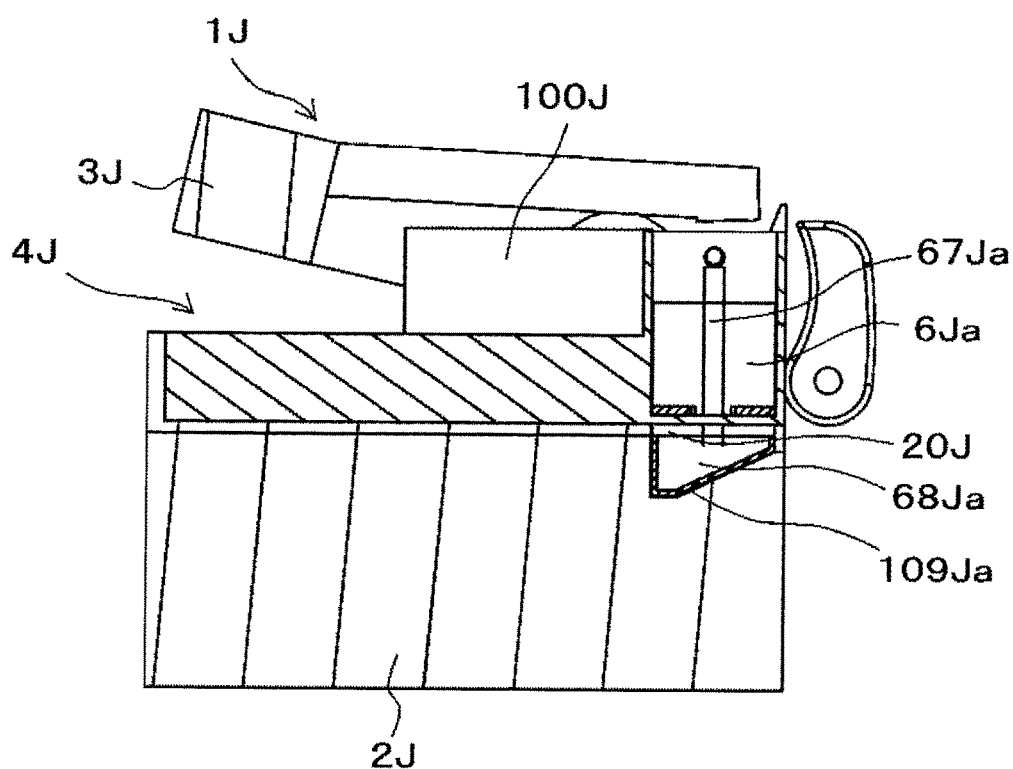
FIG. 36 is a side sectional view illustrating an example of the stapler of the ninth embodiment.

In a state in which a predetermined quantity of the cut staple 13A is stored in the cut staple storage unit 6Ja, as illustrated in FIG. 36, while the spring 67Ja is stretched by the weight of the cut staple 13A, the cut staple storage unit 6Ja descends to the fitting position, and the fitting portion 68Ja is fitted to the fitted portion 109Ja.

Figure 37:
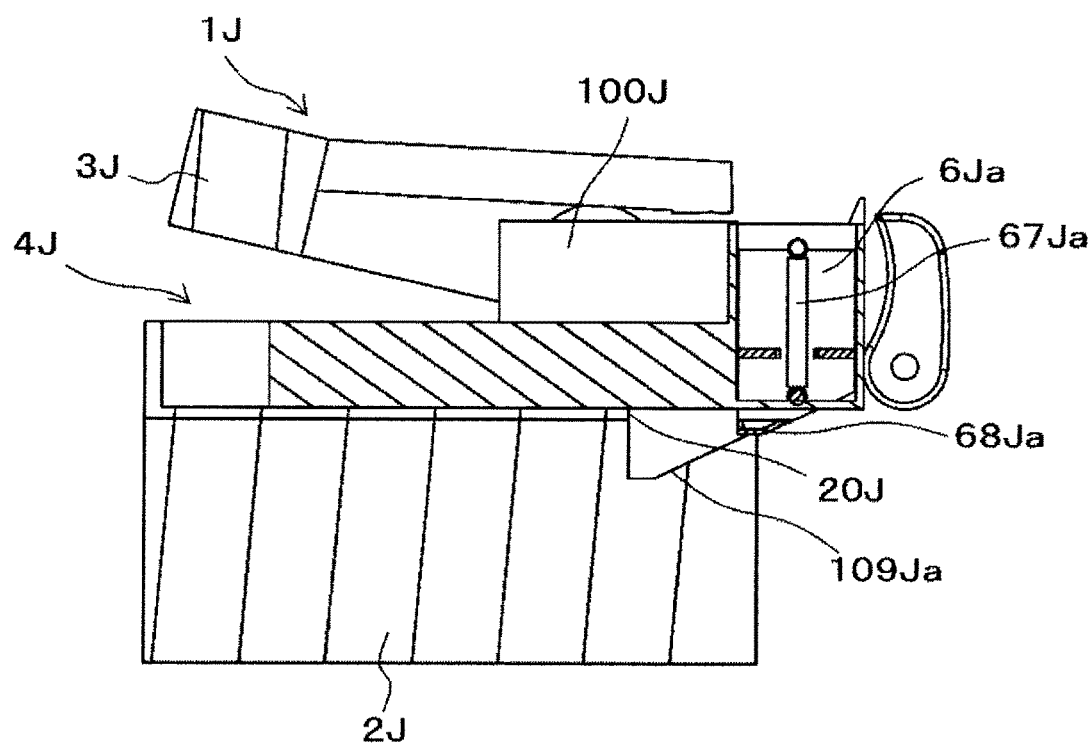
FIG. 37 is a side sectional view illustrating an example of the stapler of the ninth embodiment.

In the operation of detaching the staple 13A or removing the staple cartridge 100J by replenishing the staple 10A, in order to detach the staple cartridge 100J from the stapler 1J, as illustrated in FIG. 37, the staple cartridge 100J is moved in the direction of pulling out the staple cartridge 100J from the storage unit 20J.

When the staple cartridge 100J is moved in the direction of pulling out from the storage unit 20J, depending on the shape of the inclined surface of the fitting portion 68Ja and the shape of the inclined surface of the fitted portion 109Ja, while the fitting portion 68Ja runs over the fitted portion 109Ja, the cut staple storage unit 6Ja is raised and the fitting portion 68Ja escapes from the fitted portion 109Ja. Therefore, the staple cartridge 100J can be detached from the stapler 1J.

Figure 38:
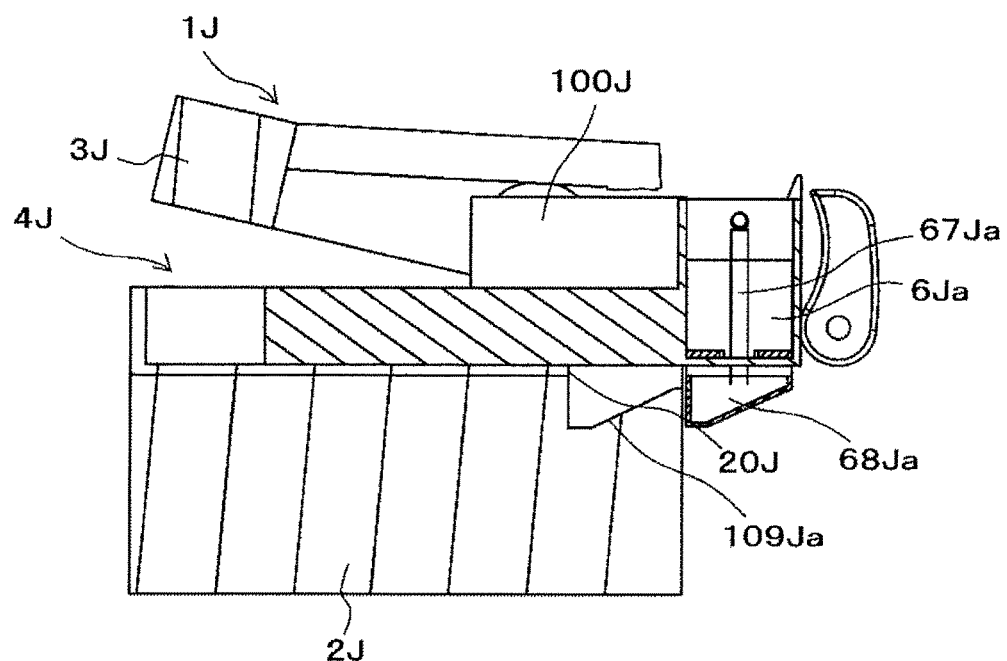
FIG. 38 is a side sectional view illustrating an example of the stapler of the ninth embodiment.

When the staple cartridge 100J is detached from the stapler 1J, unless the cut staple 13a is discharged from the cut staple storage unit 6Ja, the cut staple storage unit 6Ja descends to the fitting position by the weight of the cut staple 13A. Therefore, when trying to attach the staple cartridge 100J to the stapler 1J again without discharging the cut staple 13a from the cut staple storage unit 6Ja, the fitting portion 68Ja abuts against the fitted portion 109Ja as illustrated in FIG. 38.

In the operation of moving the staple cartridge 100J in the direction of attaching the staple cartridge 100J to the stapler 1J, the cut staple storage unit 6Ja cannot be raised due to the shape of the fitting section 68Ja. Accordingly, the staple cartridge 100J cannot be attached to the stapler 1J unless the cut staple 13A is discharged from the cut staple storage unit 6Ja. Therefore, it is possible to reliably discharge the cut staple 13A from the cut staple storage unit 6Ja and to recover the cut staple 13A.

<Modified Example of Stapler of Ninth Embodiment>

Figure 39:
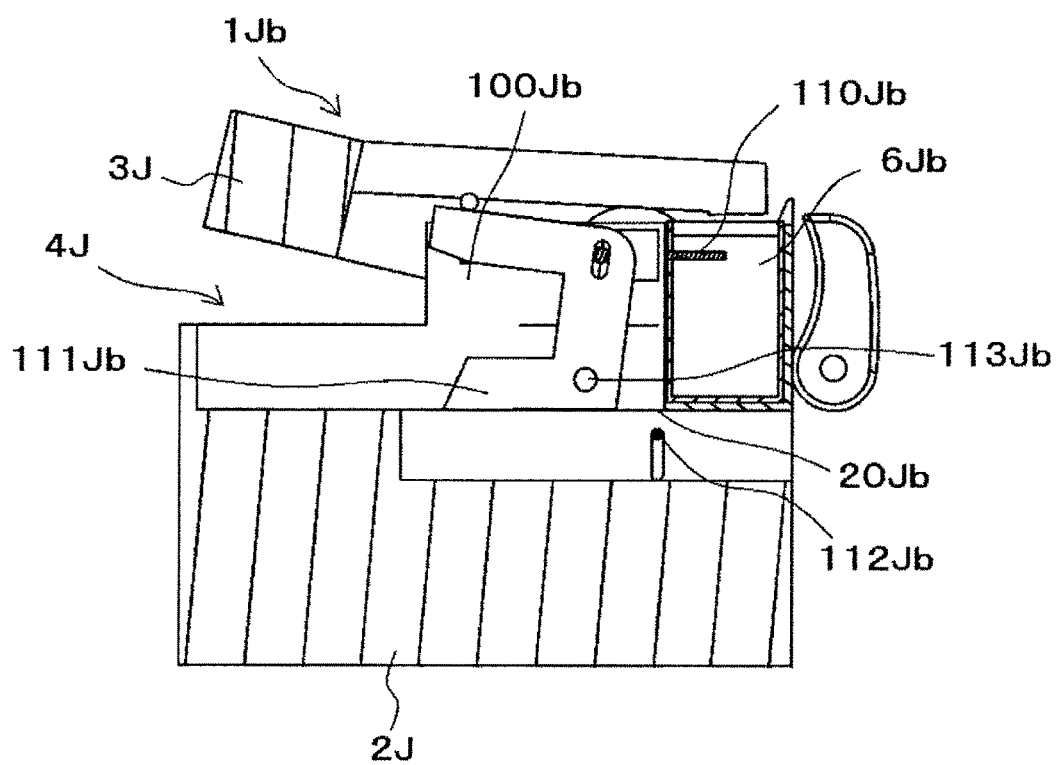
FIG. 39 is a side sectional view illustrating a modified example of the stapler of the ninth embodiment.
Figure 40:
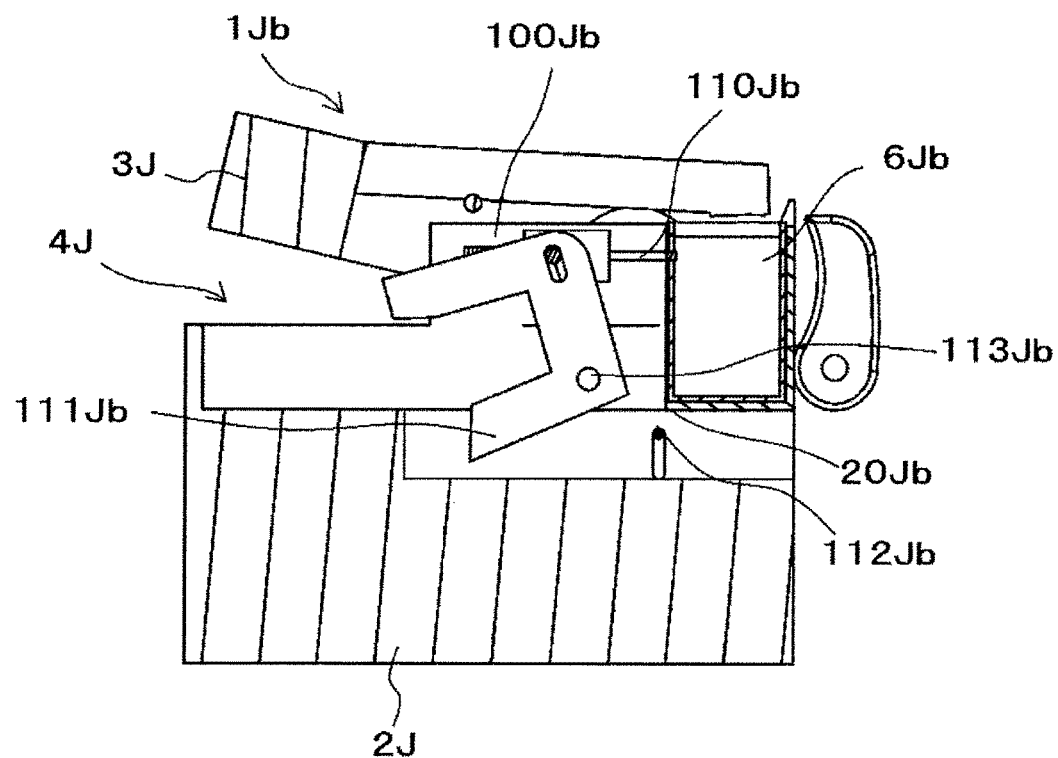
FIG. 40 is a side sectional view illustrating a modified example of the stapler of the ninth embodiment.
Figure 41:
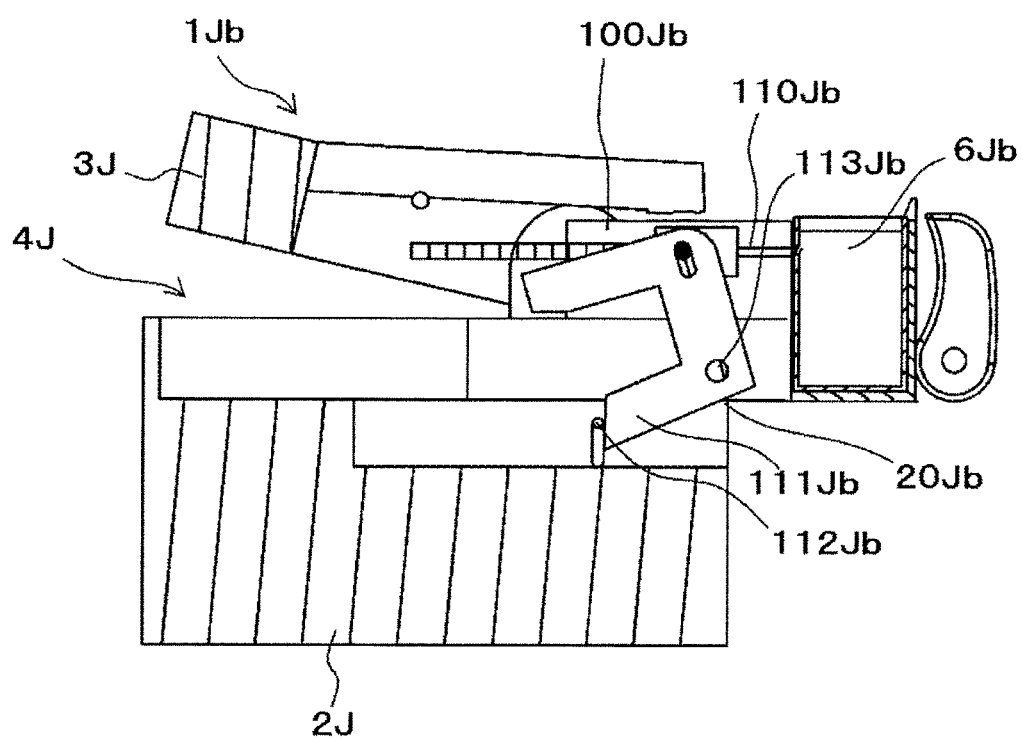
FIG. 41 is a side sectional view illustrating a modified example of the stapler of the ninth embodiment.

FIGS. 39 to 41 are side sectional views illustrating modified examples of the stapler of the ninth embodiment.

Like the stapler 1J according to the ninth embodiment, a stapler 1Jb according to the modified example of the ninth embodiment is provided with the staple ejecting unit 2J and the binding unit 3J, and a sheet pinching unit 4J which pinches the sheet P between the staple ejecting unit 2J and the binding unit 3J.

The stapler 1Jb includes a cut staple storage unit 6Jb which stores the cut staple 13A cut by the cut unit 30J. The cut staple storage unit 6Jb is detachably attached to the stapler 1Jb. The cut staple storage unit 6Jb is attached to the staple cartridge 100Jb, and the cut staple storage unit 6Jb is detached from the stapler 1Jb by attaching and detaching the staple cartridge 100Jb.

The staple cartridge 100Jb includes a cut staple full load detection actuator 110Jb and a locking unit 111Jb interlocked with the cut staple full load detection actuator 110Jb.

Further, the stapler 1Jb is provided with a locked portion 112Jb with which the locking unit 111Jb abuts. The cut staple full load detection actuator 110Jb moves in a direction in which the cut staple full load detection actuator 110Jb protrudes into the cut staple storage unit 6Jb and in a retreating direction. The cut staple full load detection actuator 110Jb may be configured to be retracted from the inside of the cut staple storage unit 6Jb by being pushed against the cut staple 13A when the cut staple 13A is stored in the cut staple storage unit 6Jb, and cut staple full load detection actuator 110Jb may be configured to move in the direction of protruding and retracting into the inside of the cut staple storage unit 6Jb at a predetermined timing.

In the present embodiment, the locking unit 111Jb is interlocked with the cut staple full load detection actuator 110Jb, and in this example, moves by rotating operation between the initial position where the locking unit 111Jb retreats from the lower surface of the staple cartridge 1Jb into the inside and the locked position projecting from the lower surface of the staple cartridge 1Jb. The shaft 113Jb of the rotational operation of the locking unit 111Jb is located on the front side in the movement direction in the operation of moving the staple cartridge 100Jb in the direction of detaching the staple cartridge 100Jb from the storage unit 20Jb of the stapler 1Jb.

The locked portion 112Jb protrudes from the lower surface of the storage unit 20Jb into the movement path of the locking unit 111Jb that has moved to the locking position.

<Example of Operational Effect of Stapler of Modified Example of Ninth Embodiment>

In the stapler 1Jb according to the modified example of the ninth embodiment, as illustrated in FIG. 39, in a state in which the cut staple 13A is not stored in the cut staple storage unit 6Jb, when the cut staple full load detection actuator 110Jb is inserted into the cut staple storage unit 6Jb, the locking unit 111Jb is moved to the initial position where it retreats from the lower surface of the staple cartridge 1Jb to the inside thereof. Thus, the staple cartridge 100Jb can be freely attached to and detached from the storage unit 20Jb.

In the state in which a predetermined quantity of the cut staple 13A is stored in the cut staple storage unit 6Jb, as illustrated in FIG. 40, the cut staple full load detection actuator 110Jb is pushed against the cut staple 13A and cannot protrude inside the cut staple storage unit 6Jb. Thus, the cut staple full load detection actuator 110Jb is in state of retreating from the inside of the cut staple storage unit 6Jb. As a result, the locking unit 111Jb moves to the locking position where it protrudes from the lower surface of the staple cartridge 1Jb.

In the operation of detaching the staple 13A or detaching the staple cartridge 100Jb by replenishing the staple 10A, in order to remove the staple cartridge 100Jb from the stapler 1Jb, the staple cartridge 100Jb is moved in the direction of pulling the staple cartridge 100Jb out of the storage unit 20Jb.

When the staple cartridge 100Jb is moved in the direction of pulled out of the storage unit 20Jb, the locking unit 111Jb rides over the locked portion 112Jb. Therefore, the staple cartridge 100Jb can be detached from the stapler 1Jb.

When the staple cartridge 100Jb is attempted to be attached to the stapler 1Jb again without discharging the cut staple 13A from the cut staple storage unit 6Jb, the locking unit 111Jb abuts against the locked portion 112Jb, as illustrated in FIG. 41.

In the operation of moving the staple cartridge 100Jb in the direction of attaching the staple cartridge 100Jb to the stapler 1Jb, the locking unit 111Jb cannot ride over the locked portion 112Jb due to the shape of the locking unit 111Jb. As a result, the staple cartridge 100Jb cannot be attached to the stapler 1Jb unless the cut staple 13A is discharged from the cut staple storage unit 6Jb. Therefore, it is possible to reliably discharge the cut staple 13A from the cut staple storage unit 6Jb and to recover the cut staple 13A.

<Configuration Example of Stapler of Tenth Embodiment>

Figure 42:
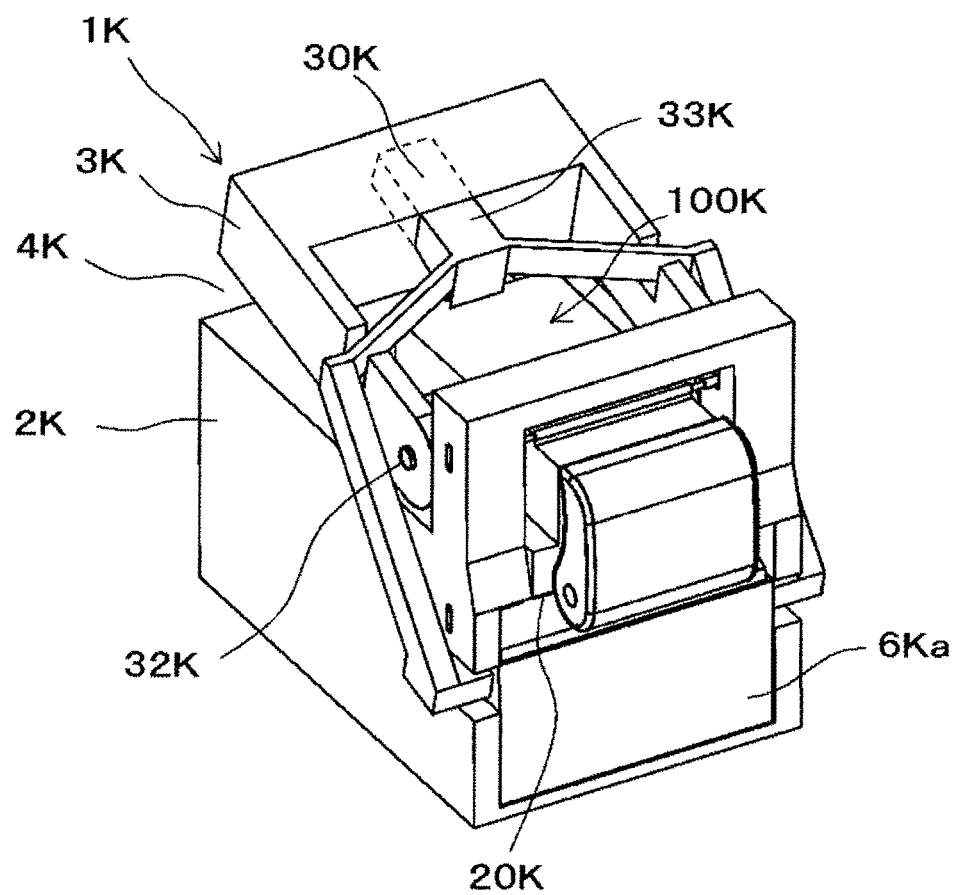
FIG. 42 is a perspective view illustrating an example of the stapler of a tenth embodiment.

FIG. 42 is a perspective view illustrating an example of the stapler of the tenth embodiment, and FIGS. 43 to 46 are side sectional views illustrating an example of the stapler of the tenth embodiment.

As illustrated in FIGS. 3A and 3B, a stapler 1K according to the tenth embodiment includes a staple ejecting unit 2K which supplies and ejects the staple 10A, and a binding unit 3K that binds the sheet P with the staple 10A, by cutting the staple leg 12A of the staple 10A illustrated in FIG. 3C and by folding the staple leg 12A illustrated in FIG. 3D, in cooperation with the staple ejecting unit 2.

The stapler 1K includes a sheet pinching unit 4K that pinches the sheet P between the staple ejecting unit 2K and the binding unit 3K. The stapler 1K moves in a direction in which the binding unit 3K comes into contact with and separates from the staple ejecting unit 2K in a rotational operation about the shaft 32K as a fulcrum, and pinches and releases the sheet P with the sheet pinching unit 4K.

The stapler 1K includes a cut unit 30K which cuts the staple leg 12A of the staple 10A penetrating the sheet P at a predetermined length, a cut staple storage unit 6Ka which stores the cut staple 13A cut by the cut unit 30K, and a discharge passage 33K which guides the cut staple 13A cut by the cut unit 30K to the cut staple storage unit 6Ka. In the stapler 1K according to the tenth embodiment, the feeding unit, the ejecting unit, the clincher unit, and the driving unit of the staple 10A are not illustrated, but the stapler 1K may have the same configuration as the stapler 1A of the first embodiment.

The cut staple storage unit 6Ka is detachably attached to the stapler 1K. In this example, the cut staple storage unit 6Ka is detachably attached to the staple ejecting unit 2K. The discharge passage 33K is provided in the binding unit 3K and communicates with the cut unit 30K, and communicates with the cut staple storage unit 6Ka. As a result, the cut staple 13A passing from the cut unit 30K through the discharge passage 33K is stored in the cut staple storage unit 6Ka.

The cut staple storage unit 6Ka includes an engagement portion 68Ka. The engagement portion 68Ka moves up and down by the change in the quantity of the cut staple 13A stored in the cut staple storage unit 6Ka. The engagement portion 68Ka is configured so that the surface facing the staple cartridge 100L in the operation of moving the staple cartridge 100K in the direction of attaching to the storage unit 20K of the stapler 1K is substantially perpendicular. Further, the fitting portion 68Ka is configured so that the surface facing the staple cartridge 100K in the operation of moving the staple cartridge 100K in the direction of detaching the staple cartridge 100K from the storage unit 20K of the stapler 1K is inclined with respect to the movement direction.

The stapler 1K includes a locking pin 115K locked to a locking protrusion 114K provided on the staple cartridge 100K, and a spring 116K which urges the locking pin 115K in the direction of the locking protrusion 114K.

<Example of Operational Effect of Stapler of Tenth Embodiment>

Figure 43:
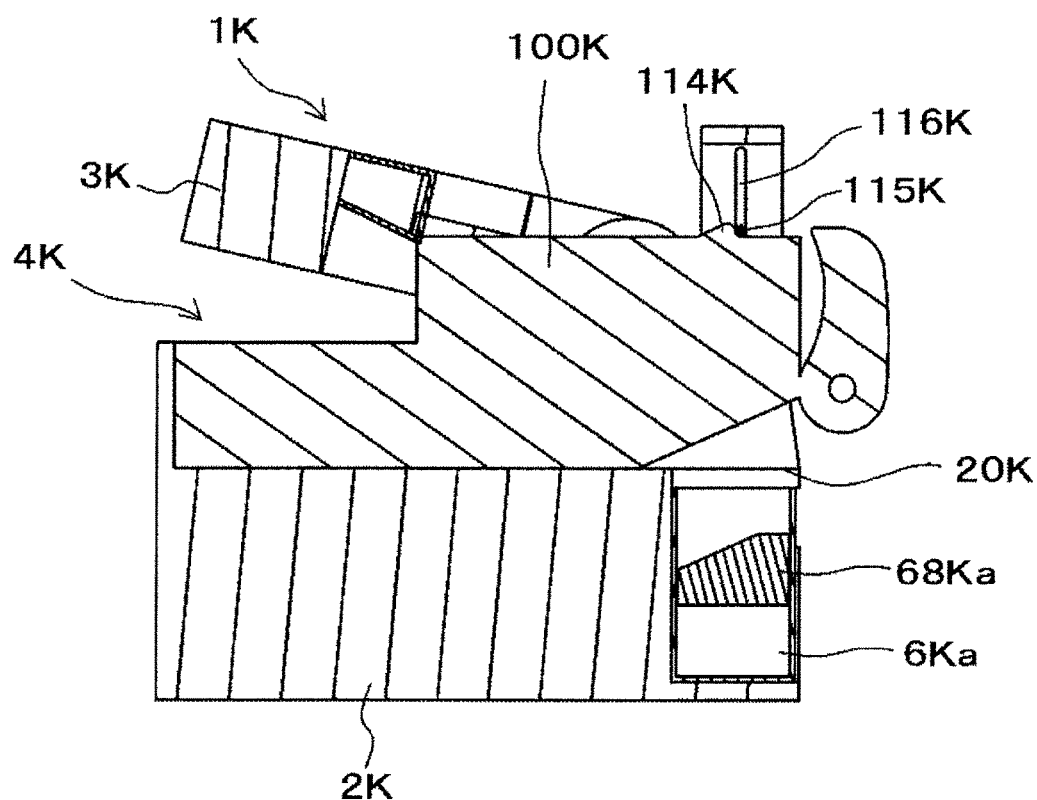
FIG. 43 is a side sectional view illustrating an example of the stapler of the tenth embodiment.

In the stapler 1K of the tenth embodiment, as illustrated in FIG. 43, the engagement portion 68Ka is lowered to the initial position in a state in which the cut staple 13A is not stored in the cut staple storage unit 6Ka. Thus, the engagement portion 68Ka does not protrude into the storage unit 20K, and the staple cartridge 100K can be freely attached to and detached from the storage unit 20K.

Figure 44:
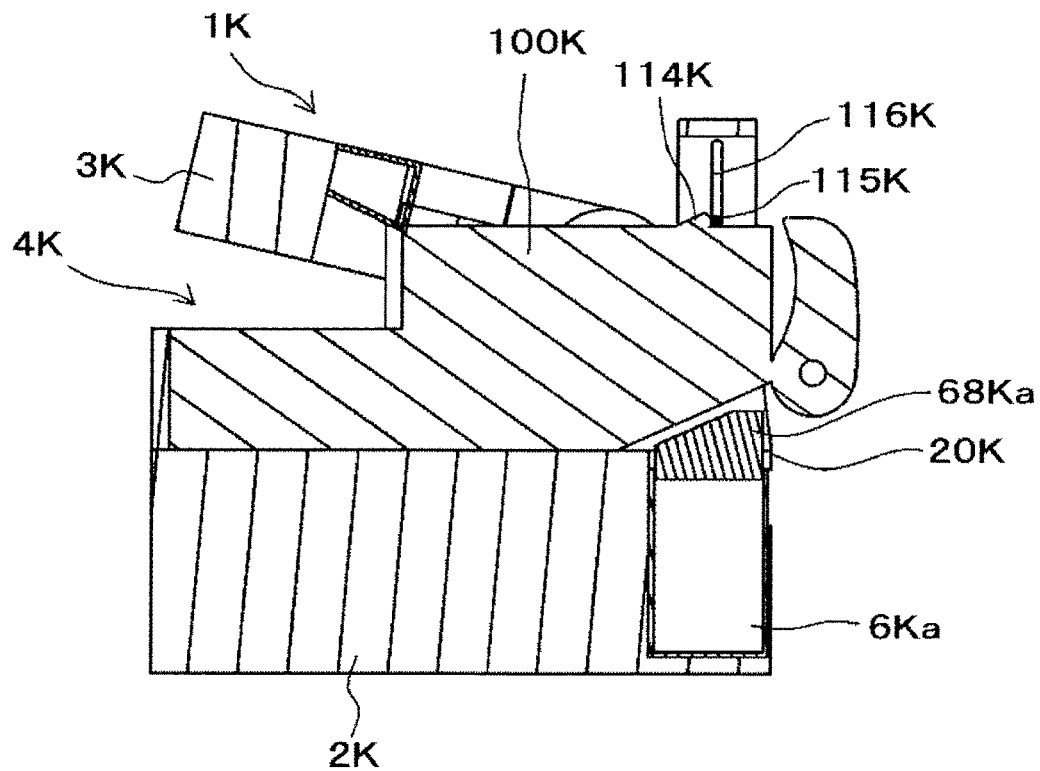
FIG. 44 is a side sectional view illustrating an example of the stapler of the tenth embodiment.

In a state in which a predetermined quantity of the cut staple 13A is stored in the cut staple storage unit 6Ka, as illustrated in FIG. 44, the engagement portion 68Ka rises to the engagement position.

Figure 45:
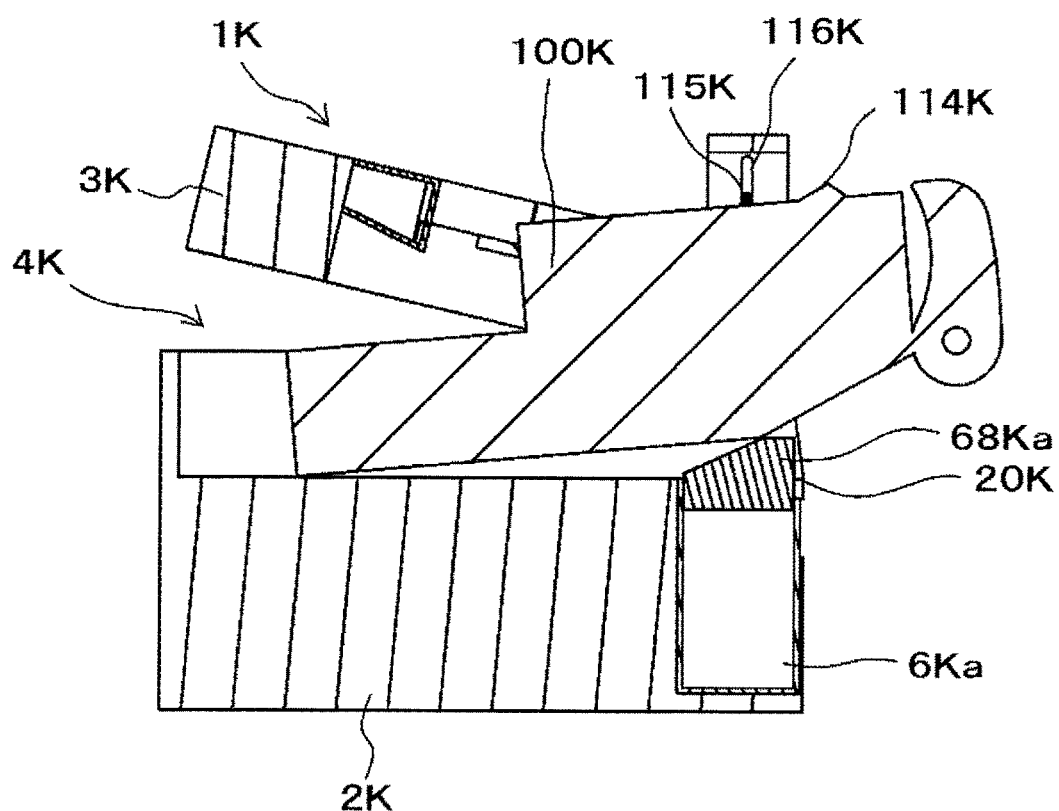
FIG. 45 is a side sectional view illustrating an example of the stapler of the tenth embodiment.

In the operation of recovering the staple 13A or detaching the staple cartridge 100K by replenishing the staple 10A, in order to remove the staple cartridge 100K from the stapler 1K, as illustrated in FIG. 45, the staple cartridge 100K is moved in the direction of pulling out the staple cartridge 100K from the storage unit 20K.

When the staple cartridge 100K is moved in the direction of pulled out of the storage unit 20K, the staple cartridge 100K rides over the engagement portion 68Ka, while compressing the spring 116K and pushing up the engagement pin 115K, by the shape of the inclined surface of the engagement portion 68Ka. Therefore, the staple cartridge 100K can be detached from the stapler 1K.

Figure 46:
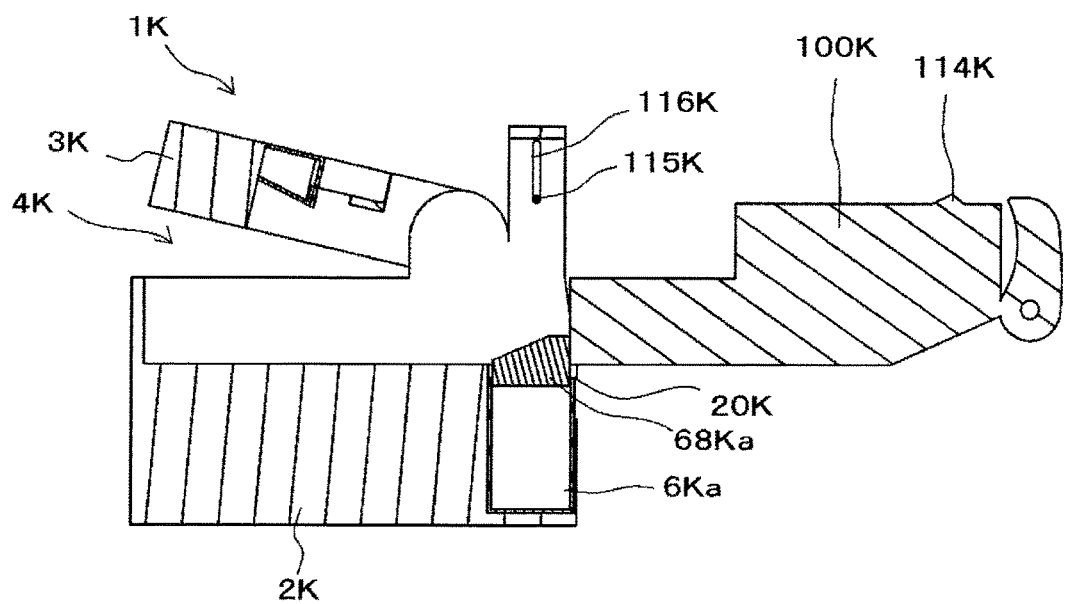
FIG. 46 is a side sectional view illustrating an example of the stapler of the tenth embodiment.

When the staple cartridge 100K is attempted to be attached to the stapler 1K again without discharging the cut staple 13A from the cut staple storage unit 6Ka, the staple cartridge 100K abuts against the engagement portion 68Ka as illustrated in FIG. 46.

In the operation of moving the staple cartridge 100K in the direction of attaching the staple cartridge 100K to the stapler 1K, the staple cartridge 100K cannot ride over the engagement portion 68Ka due to the shape of the engagement portion 68Ka. As a result, the staple cartridge 100K cannot be attached to the stapler 1K unless the cut staple 13A is discharged from the cut staple storage unit 6Ka. Therefore, it is possible to reliably discharge the cut staple 13A from the cut staple storage unit 6Ka and to recover the cut staple 13A.

<Modified Example of Stapler of Tenth Embodiment>

Figure 47:
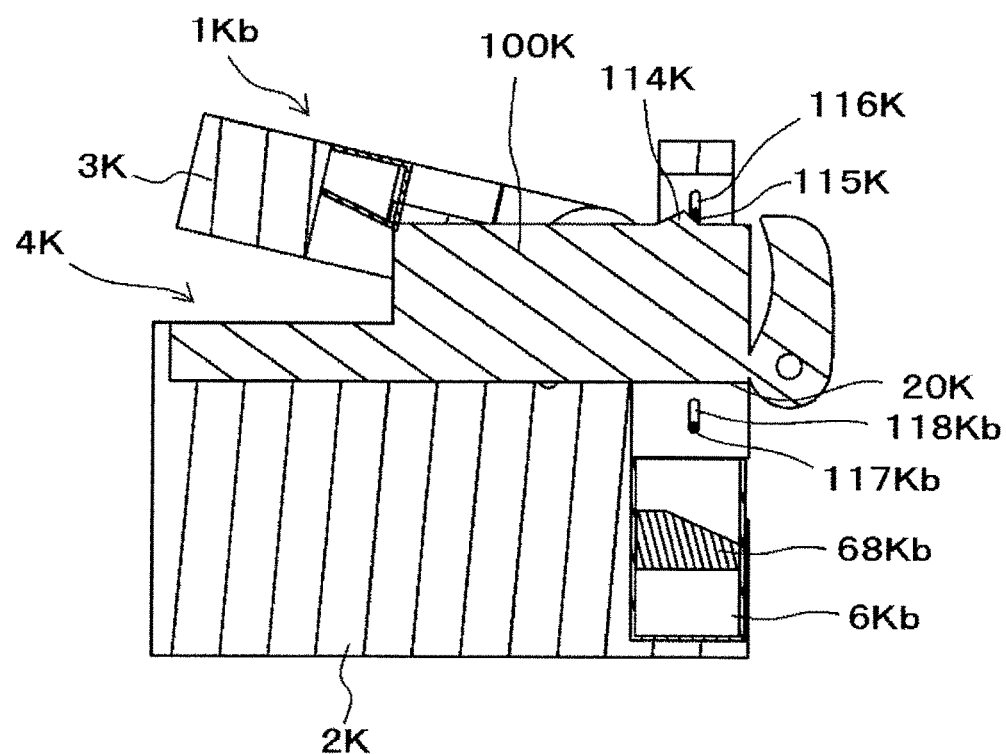
FIG. 47 is a side sectional view illustrating a modified example of the stapler of the tenth embodiment.
Figure 48:
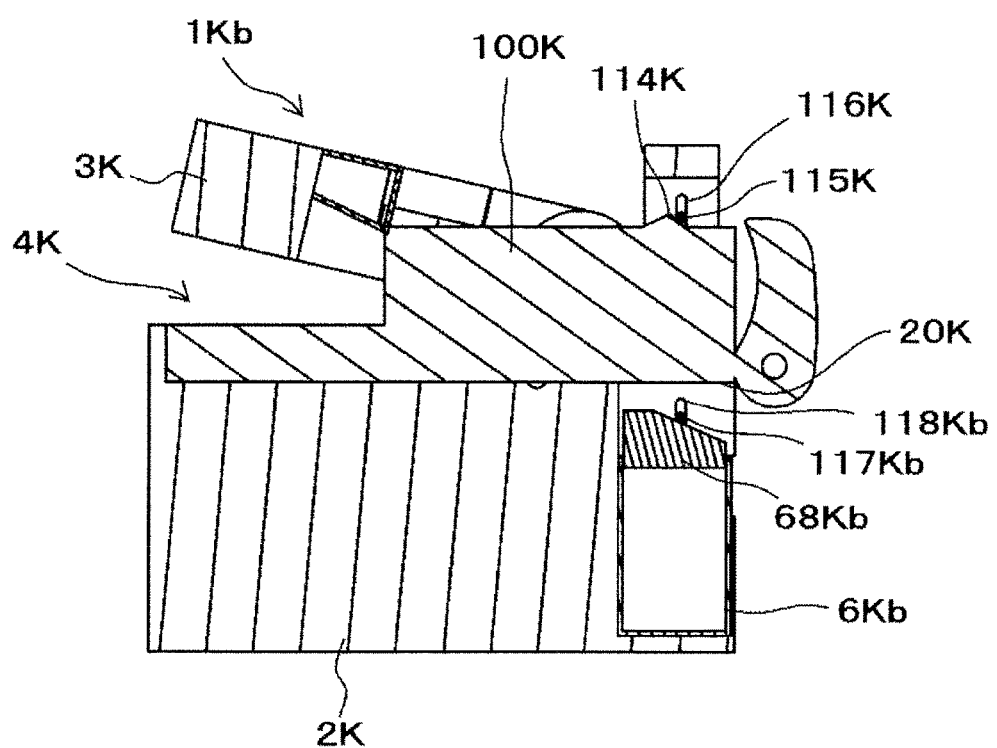
FIG. 48 is a side sectional view illustrating a modified example of the stapler of the tenth embodiment.
Figure 49:
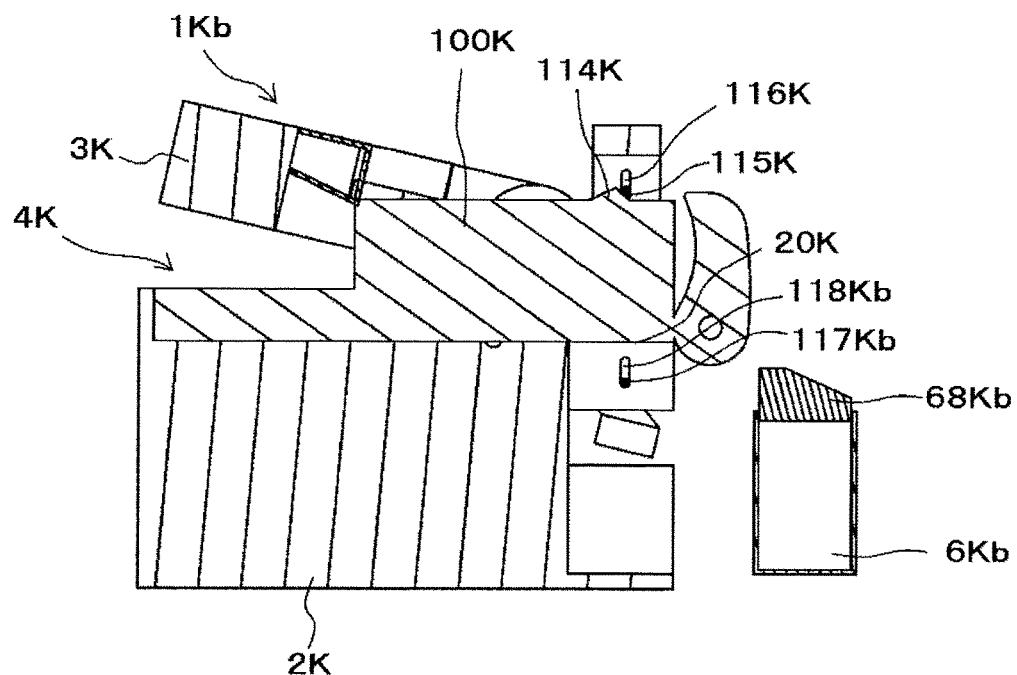
FIG. 49 is a side sectional view illustrating a modified example of the stapler of the tenth embodiment.

FIGS. 47 to 49 are side sectional views illustrating modified examples of the stapler of the tenth embodiment.

Like the stapler 1K of the tenth embodiment, a stapler 1Kb of the modified example of the tenth embodiment includes the staple ejecting unit 2K and the binding unit 3K, and a sheet pinching unit 4K which pinches the sheet P between the staple ejecting unit 2K and the binding unit 3K.

The stapler 1Kb is provided with a cut staple storage unit 6Kb which stores the cut staple 13A cut by the cut unit 30K. The cut staple storage unit 6Kb is detachably attached to the staple ejecting unit 2K.

The cut staple storage unit 6Kb is provided with an engagement portion 68Kb. The engagement portion 68Kb moves up and down by the change in the quantity of the cut staple 13A stored in the cut staple storage unit 6Kb. The engagement portion 68Kb is configured so that the surface facing the locking pin 117Kb in the operation of moving the cut staple storage unit 6Kb in the direction of attached to the stapler 1Kb is substantially perpendicular. Further, the fitting portion 68Ka is configured so that the surface facing the engaging pin 117Kb in the operation of moving the cut staple storage unit 6Kb in the direction of detached from the stapler 1K is inclined with respect to the movement direction.

The stapler 1Kb is provided with a locking pin 115K locked to the locking protrusion 114K provided on the staple cartridge 100K, and a spring 116K which urges the locking pin 115K in the direction of the locking protrusion 114K. The stapler 1Kb is provided with a locking pin 117Kb to which the engagement portion 68Kb is locked, and a spring 118Kb which urges the locking pin 117Kb in the direction of the engagement portion 68Kb.

<Example of Operational Effect of Stapler of Modified Example of Tenth Embodiment>

In the stapler 1Kb of the modified example of the tenth embodiment, as illustrated in FIG. 47, the engagement portion 68Kb is lowered to the initial position in a state in which the cut staple 13A is not stored in the cut staple storage unit 6Kb. Therefore, the engagement portion 68Kb does not protrude, and the cut staple storage unit 6Kb can be freely attached and detached.

In the state in which a predetermined quantity of the cut staple 13A is stored in the cut staple storage unit 6Kb, as illustrated in FIG. 48, the engagement portion 68Kb moves up to the engagement position. In the operation of detaching the cut staple storage unit 6Kb by the recovery of the cut staple 13A, the cut staple storage unit 6Kb is moved in the direction of pulled out of the stapler 1Kb.

When the cut staple storage unit 6Kb is moved in the direction of pulled out of the stapler 1Kb, the engagement portion 68Kb rides over the locking pin 117Kb, while compressing the spring 118Kb and pushing up the locking pin 117Kb by the shape of the slope of the engagement portion 68K. Therefore, the cut staple storage unit 6Kb can be detached from the stapler 1Kb.

When trying to attach the cut staple storage unit 6Kb to the stapler 1Kb again without discharging the cut staple 13A from the cut staple storage unit 6Kb, as illustrated in FIG. 49, the engagement portion 68Kb abuts against the locking pin 117Kb.

In the operation of moving the cut staple storage unit 6Kb in the direction of attached to the stapler 1Kb, the engagement portion 68Kb cannot ride over the locking pin 117Kb due to the shape of the engagement portion 68Kb. Accordingly, unless the cut staple 13A is discharged from the cut staple storage unit 6Kb, the cut staple storage unit 6Kb cannot be attached to the stapler 1Kb. Therefore, it is possible to reliably discharge the cut staple 13A from the cut staple storage unit 6Kb and to recover the cut staple 13A.

<Configuration Example of Stapler of Eleventh Embodiment>

Figure 50:
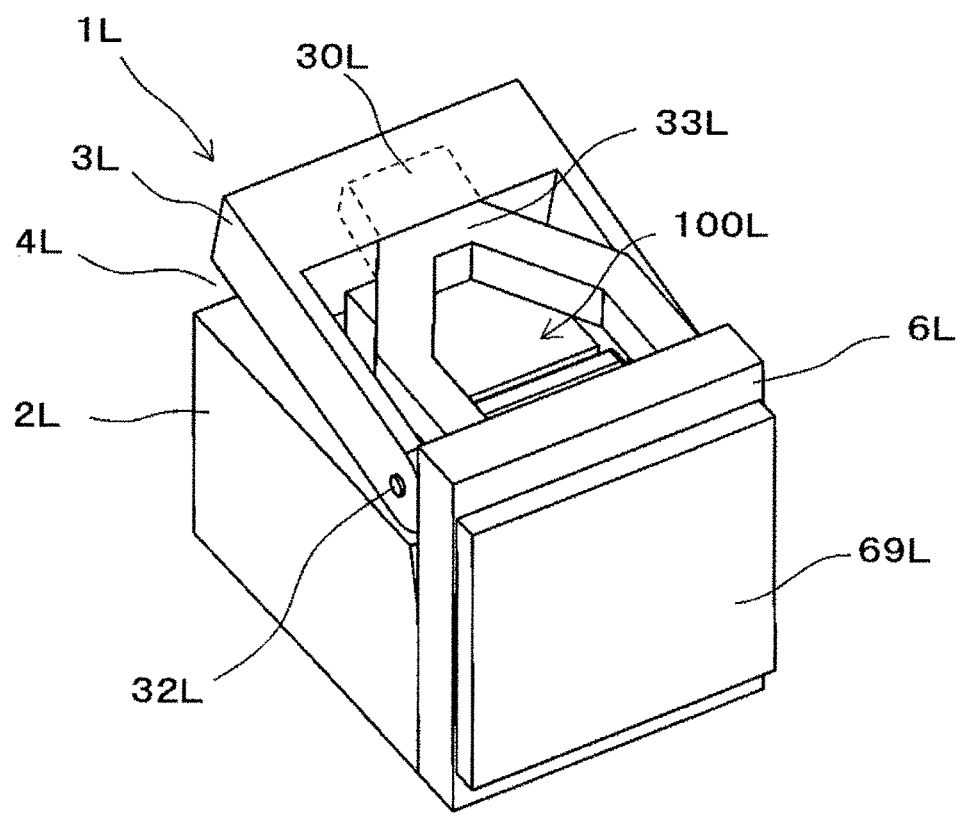
FIG. 50 is a perspective view illustrating an example of the stapler of an eleventh embodiment.
Figure 51:
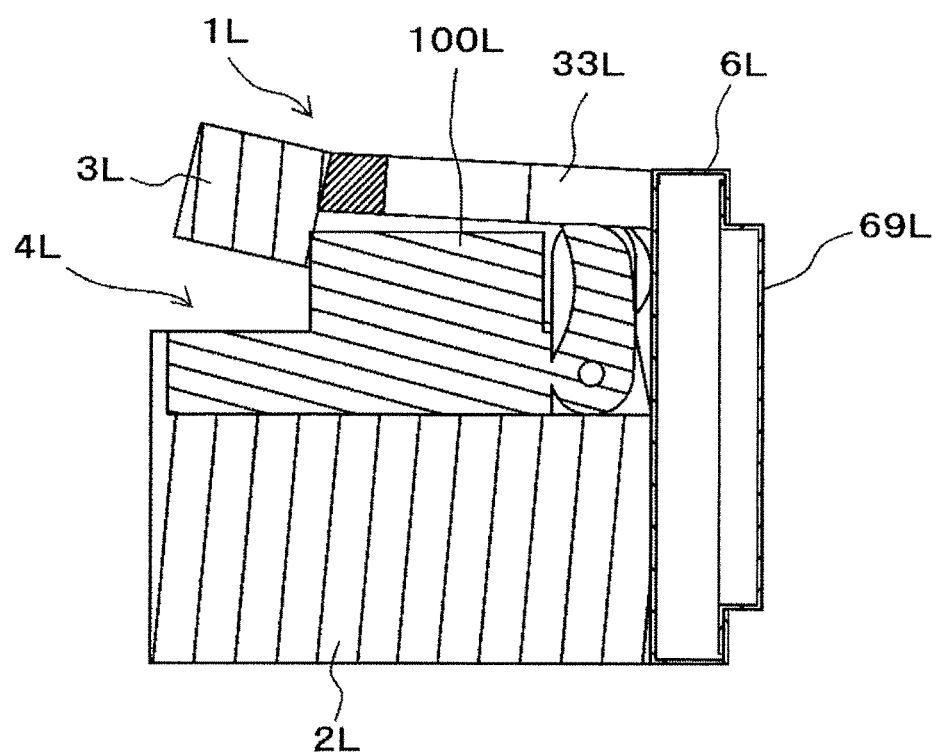
FIG. 51 is a side sectional view illustrating an example of the stapler of the eleventh embodiment.
Figure 52:
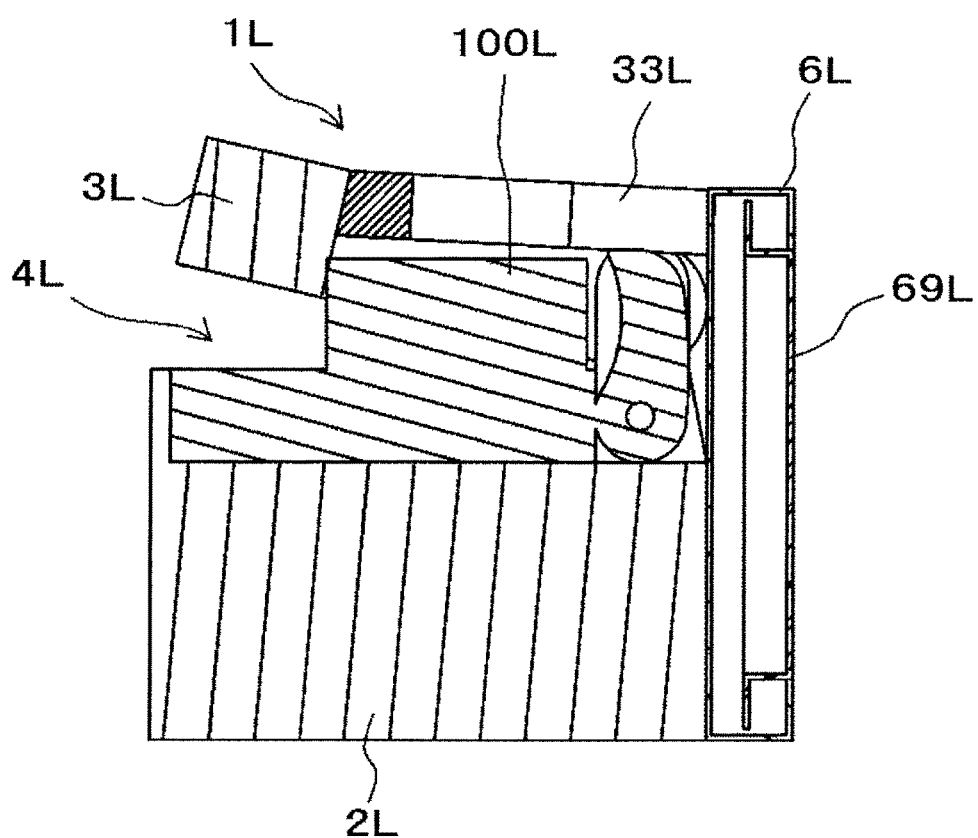
FIG. 52 is a side sectional view illustrating an example of the stapler of the eleventh embodiment.

FIG. 50 is a perspective view illustrating an example of the stapler of the eleventh embodiment, and FIGS. 51 and 52 are side sectional views illustrating an example of the stapler of the eleventh embodiment.

As illustrated in FIGS. 3A and 3B, a stapler 1L of the eleventh embodiment includes the staple ejecting unit 2L which supplies and ejects the staple 10A, and a binding unit 3L that binds the sheet P with the staple 10A, by cutting the staple leg 12A of the staple 10A illustrated in FIG. 3C and by folding the staple leg 12A illustrated in FIG. 3D in cooperation with the staple ejecting unit 2.

The stapler 1L is provided with a sheet pinching unit 4L which pinches the sheet P between the staple ejecting unit 2L and the binding unit 3L. The stapler 1L moves in a direction in which the binding unit 3L comes into contact with and separates from the staple ejecting unit 2L in a rotational operation about the shaft 32L as a fulcrum, and pinches and releases the sheet P with the sheet pinching unit 4L.

The stapler 1L includes a cut unit 30L which cuts the staple leg 12A of the staple 10A penetrating the sheet P with a predetermined length, a cut staple storage unit 6L which stores the cut staple 13A cut by the cut unit 30L, and a discharge passage 33L which guides the cut staple 13A cut by the cut unit 30L to the cut staple storage unit 6L. In the stapler 1L according to the eleventh embodiment, the feeding unit, the ejecting unit, the clincher unit, and the driving unit of the staple 10A are not illustrated, but the stapler 1L may have the same configuration as the stapler 1A of the first embodiment.

The cut staple storage unit 6L is detachably attached to the stapler 1L. In the present example, the cut staple storage unit 6L is detachably attached to the back surface of the staple ejecting unit 2L. The staple cartridge 100L is configured to be attachable to and detachable from the stapler 1L by attaching and detaching the cut staple storage unit 6L. The discharge passage 33L is provided in the binding unit 3L, communicates with the cut unit 30L, and communicates with the cut staple storage unit 6L. As a result, the cut staple 13A passing from the cut unit 30L through the discharge passage 33L is stored in the cut staple storage unit 6L.

The cut staple storage unit 6L includes an expansion unit 69L. The expansion unit 69L is movable in a direction of being drawn out and stored in the cut staple storage unit 6L, and is provided so that the volume of the cut staple storage unit 6L can be adjusted.

<Example of Operational Effect of Stapler of Eleventh Embodiment>

In the stapler 1L according to the eleventh embodiment, as illustrated in FIG. 51, by pulling out the expansion unit 69L from the cut staple storage unit 6L, the volume of the cut staple storage unit 6L can be enlarged. Further, as illustrated in FIG. 52, by storing the expansion unit 69L in the cut staple storage unit 6L, it is possible to reduce the volume of the cut staple storage unit 6L. Accordingly, the storage quantity of the cut staple 13A can be adjusted as necessary.

<Configuration Example of Stapler of Twelfth Embodiment>

Figure 53:
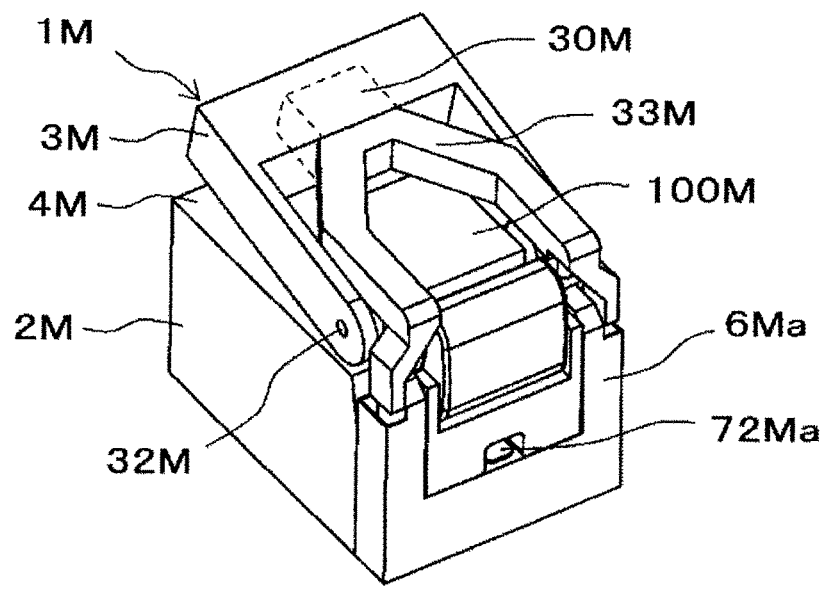
FIG. 53 is a perspective view illustrating an example of a stapler of a twelfth embodiment.
Figure 54:
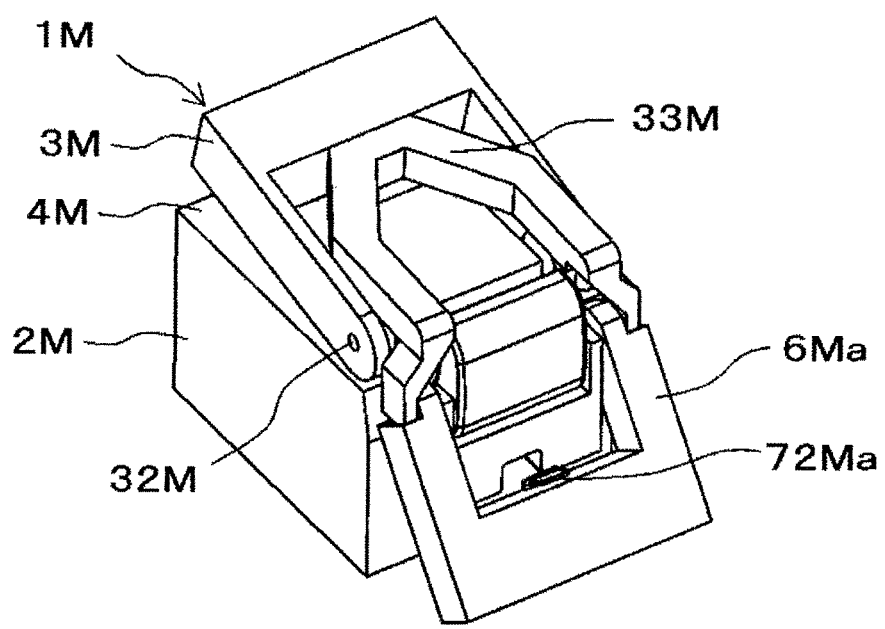
FIG. 54 is a perspective view illustrating an example of the stapler of the twelfth embodiment.
Figure 55:
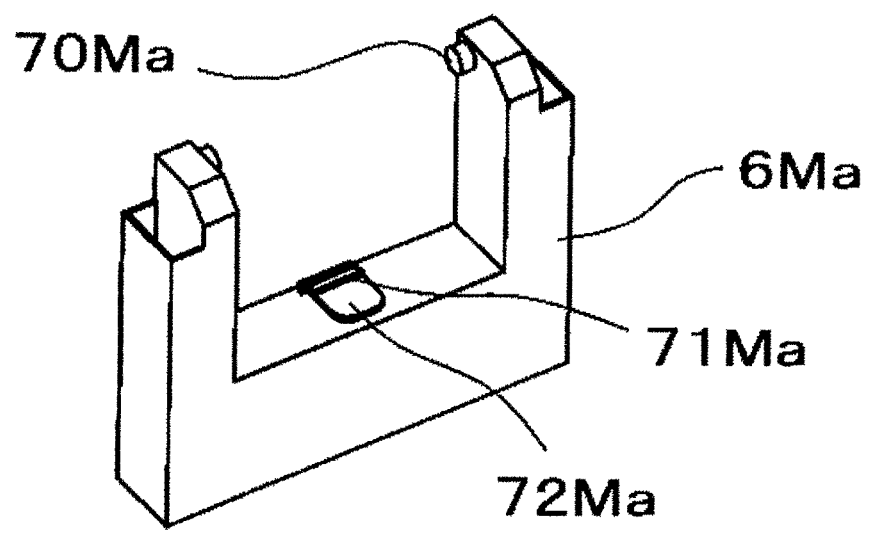
FIG. 55 is a perspective view illustrating an example of a cut staple storage unit.

FIGS. 53 and 54 are perspective views illustrating an example of the stapler of the twelfth embodiment, and FIG. 55 is a perspective view illustrating an example of the cut staple storage unit.

As illustrated in FIGS. 3A and 3B, the stapler 1M according to the twelfth embodiment includes a staple ejecting unit 2M which supplies and ejects the staple 10A, and a binding unit 3M that binds the sheet P with the staple 10A, by cutting the staple leg 12A of the staple 10A illustrated in FIG. 3C and by folding the staple leg 12A illustrated in FIG. 3D in cooperation with the stapler ejecting unit 2M.

The stapler 1M includes a sheet pinching unit 4M which pinches the sheet P between the staple ejecting unit 2M and the binding unit 3M. The stapler 1M moves in a direction in which the binding unit 3M comes into contact with and separates from the staple ejecting unit 2M in a rotational operation about the shaft 32M as a fulcrum, and pinches and releases the sheet P with the sheet pinching unit 4M.

The stapler 1M includes a cut unit 30M that cuts the staple leg 12A of the staple 10A penetrating the sheet P with a predetermined length, a cut staple storage unit 6Ma that stores the cut staple 13A cut by the cut unit 30M, and a discharge passage 33M which guides the cut staple 13A cut by the cut unit 30M to the cut staple storage unit 6Ma. In the stapler 1M of the twelfth embodiment, the feeding unit, the ejecting unit, the clincher unit, and the driving unit of the staple 10A are not illustrated, but the stapler 1M have the same configuration as the stapler 1A of the first embodiment.

The cut staple storage unit 6Ma is detachably attached to the stapler 1M. The cut staple storage unit 6Ma is detachably attached to the back surface of the staple ejecting unit 2M. The shaft protrusion 70Ma is inserted into a receiving unit (not illustrated) of the stapler 1M, and in the operation of attaching and detaching the cut staple storage unit 6Ma to and from the stapler 1M is performed by the rotational operation around the shaft protrusion 70Ma as the shaft. The cut staple storage unit 6Ma is detached from the stapler 1M by removing the shaft projection portion 70Ma from the stapler 1M. The cut staple storage unit 6Ma includes an locking claw 71Ma locked with the stapler 1M, and an manipulation unit 72Ma provided on the locking claw 71Ma to release the locking of the locking claw 71Ma.

The staple cartridge 100M is configured to be attachable to and detachable from the stapler 1M in a state in which the cut staple storage unit 6Ma is attached to the stapler 1M. The discharge passage 33M is provided in the binding unit 3M, communicates with the cut unit 30M, and communicates with the cut staple storage unit 6Ma. As a result, the cut staple 13A passing from the cut unit 30L through the discharge passage 33L is stored in the cut staple storage unit 6Ma.

<Example of Operational Effect of Stapler of Twelfth Embodiment>

In the stapler 1M according to the twelfth embodiment, when attaching the cut staple storage unit 6Ma, by inserting the shaft protrusion 70Ma into a storage unit (not illustrated) of the stapler 1M and by pushing the cut staple storage unit 6Ma toward the stapler 1M, as illustrated in FIG. 54, the locking claw 71Ma is locked with the stapler 1M in a rotational operation around the shaft protrusion 70Ma as a shaft, and as illustrated in FIG. 53, the cut staple storage unit 6Ma is attached to the stapler 1M. As a result, as illustrated in FIG. 2, the stapler 1M can prevent the cut staple storage unit 6Ma from being unintentionally disengaged, even if vibration or the like is applied when moving in the post-processing apparatus 502A.

When detaching the cut staple storage unit 6Ma, by manipulating the manipulation unit 72Ma, the locking of the locking claw 71Ma is released and the cut staple storage unit 6Ma is moved in a direction of separating from the staple 1M. Thus, the shaft protrusion 70Ma is disengaged from the stapler 1M by the rotational operation about the shaft protrusion 70Ma as a shaft, and the cut staple receiving unit 6Ma is detached from the stapler 1M.

<Modified Example of Stapler of Twelfth Embodiment>

Figure 56:
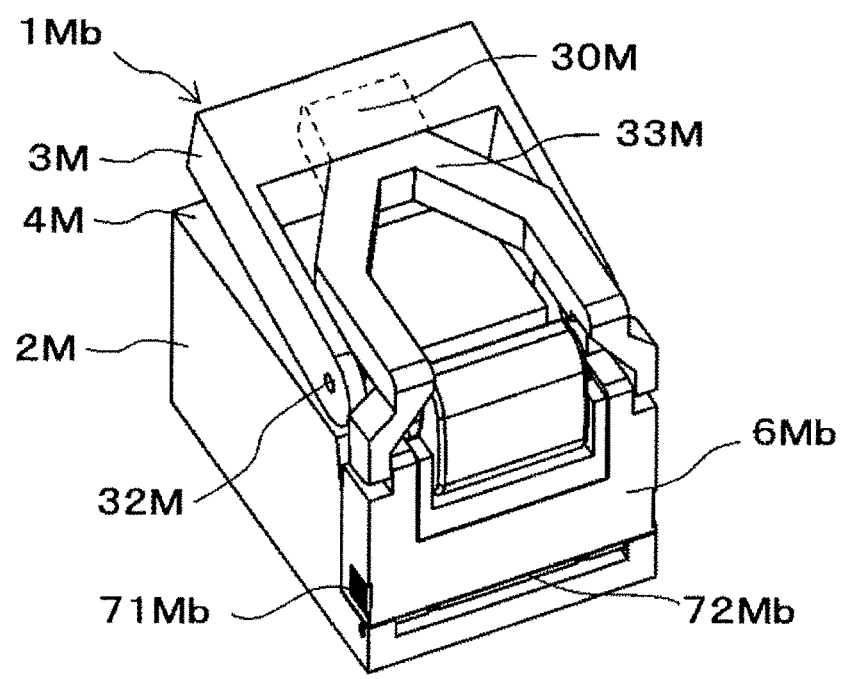
FIG. 56 is a perspective view illustrating a modified example of the stapler of the twelfth embodiment.
Figure 57:
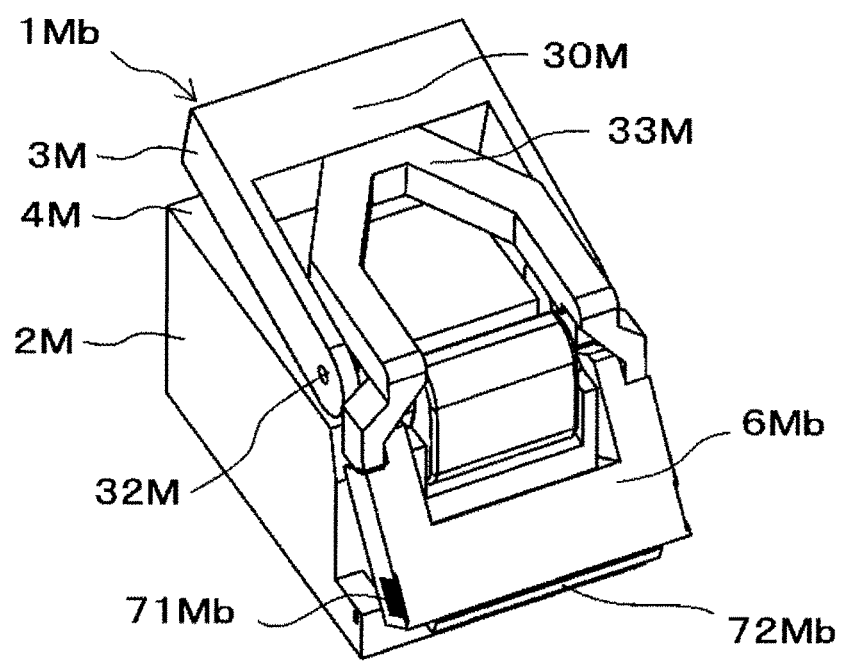
FIG. 57 is a perspective view illustrating a modified example of the stapler of the twelfth embodiment.

FIGS. 56 and 57 are perspective views illustrating a modified example of the stapler of the twelfth embodiment. Like the stapler 1M of the twelfth embodiment, a stapler 1Mb of the modified example of the twelfth embodiment includes the staple ejecting unit 2M and the binding unit 3M, and a sheet pinching unit 4M which pinches the sheet P between the staple ejecting unit 2M and the binding unit 3M.

The stapler 1Mb includes a cut staple storage unit 6Mb which stores the cut staple 13A cut by the cut unit 30M, and a discharge passage 33M which guides the cut staple 13A cut by the cut unit 30M to the cut staple storage unit 6Mb. The staple cartridge 100M is configured to be attachable to and detachable from the stapler 1M in a state in which the cut staple storage unit 6Mb is attached to the stapler 1M.

The cut staple storage unit 6Mb is detachably attached to the back surface of the staple ejecting unit 2M. The cut staple storage unit 6Mb is attached to and detached from the stapler 1M in a rotational operation about the shaft protrusion (not illustrated) as a fulcrum.

The cut staple storage unit 6Mb is provided with a locking claw 71Mb locked with the stapler 1Mb, and a manipulation unit 72Mb which releases the locking of the locking claw 71Mb. The manipulation unit 72Mb is provided on one or both side surfaces of the cut staple storage unit 6Mb, and moves the locking claw 71Mb provided on the lower surface of the cut staple storage unit 6Mb.

<Example of Operational Effect of Stapler of Modified Example of Twelfth Embodiment>

In the stapler 1Mb according to the modified example of the twelfth embodiment, when the cut staple storage unit 6Mb is attached, by pushing the cut staple storage unit 6Mb in the direction of the stapler 1Mb, as illustrated in FIG. 57, in the rotational operation of the cut staple storage unit 6Mb, the locking claw 71Ma is locked to the stapler 1M, and as illustrated in FIG. 56, the cut staple storage unit 6Mb is attached to the stapler 1Mb.

In the case of detaching the cut staple storage unit 6Mb, by manipulating the manipulation unit 72Mb, the locking claw 71Mb is retracted to release the locking, and the cut staple storage unit 6Mb is moved in a direction of separating from the stapler 1Mb. Thus, as illustrated in FIG. 57, the cut staple storage unit 6Mb is detached from the stapler 1Mb by the rotational operation.

<Another Modified Example of Stapler of Twelfth Embodiment>

Figure 58:
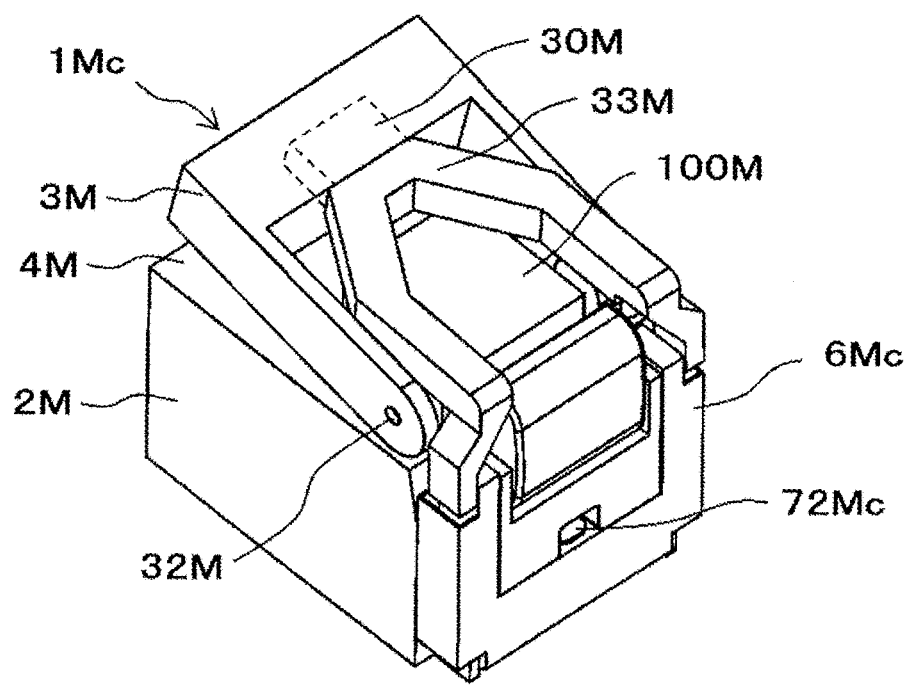
FIG. 58 is a perspective view illustrating another modified example of the stapler of the twelfth embodiment.
Figure 59:
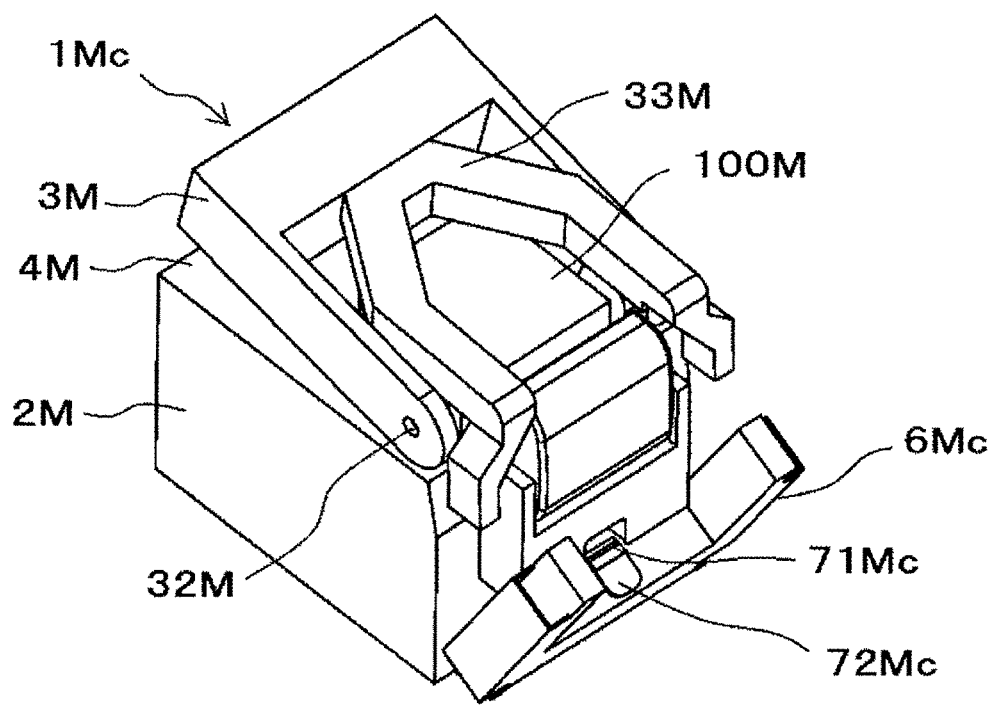
FIG. 59 is a perspective view illustrating another modified example of the stapler of the twelfth embodiment.
Figure 60:
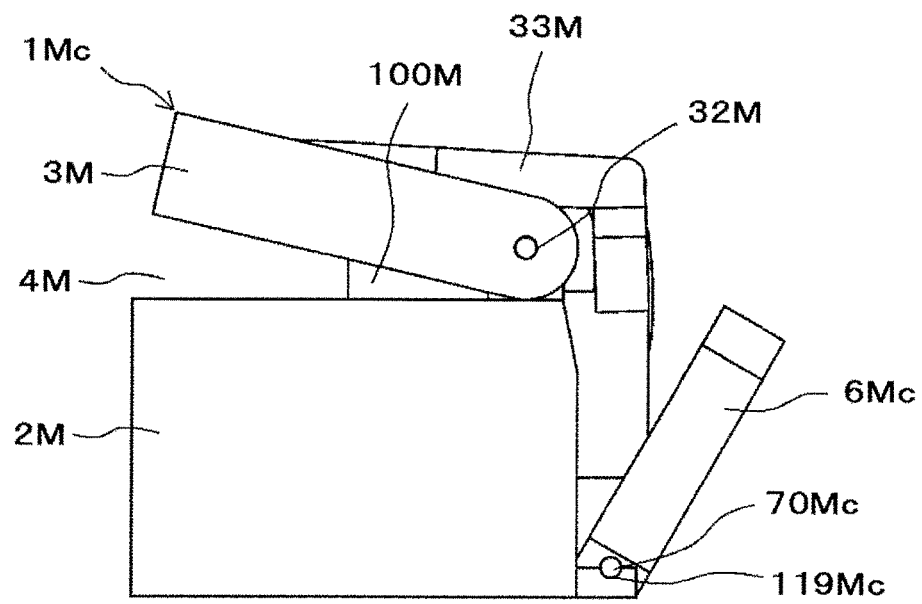
FIG. 60 is a side view illustrating another modified example of the stapler of the twelfth embodiment.

FIGS. 58 and 59 are perspective views illustrating another modified example of the stapler of the twelfth embodiment, and FIG. 60 is a side view illustrating another modified example of the stapler of the twelfth embodiment.

As with the stapler 1M of the twelfth embodiment, the stapler 1Mc of the other modified example of the twelfth embodiment is provided with the staple ejecting unit 2M and the binding unit 3M, and a sheet pinching unit 4M which pinches the sheet P between the staple ejecting unit 2M and the binding unit 3M.

The stapler 1Mc includes a cut staple storage unit 6Mc which stores the cut staple 13A cut by the cut unit 30M, and a discharge passage 33M which guides the cut staple 13A cut by the cut unit 30M to the cut staple storage unit 6Mc. The staple cartridge 100M is configured to be attachable to and detachable from the stapler 1M in a state in which the cut staple storage unit 6Mc is attached to the stapler 1M.

The cut staple storage unit 6Mc is detachably attached to the back surface of the staple ejecting unit 2M. The shaft protrusion 70Mc enters a receiving unit 119Mc provided in the lower portion of the stapler 1Mc, and the operation of attaching and detaching the cut staple storage unit 6Mc to and from the stapler 1Mc is performed by the rotational operation around the shaft protrusion 70Mc as a shaft.

The cut staple storage unit 6Mc is detached from the stapler 1Mc by removing the shaft protrusion 70Mc from the receiving unit 119Mc. The cut staple storage unit 6Mc includes a locking claw 71Mc locked to the stapler 1Mc, and a manipulation unit 72Mc provided on the locking claw 71Mc to release locking of the locking claw 71Mc.

In the stapler 1Mc according to another modified example of the twelfth embodiment, when attaching the cut staple storage unit 6Mc, the shaft protrusion 70Mc is inserted into the receiving unit 119Mc of the stapler 1Mc and the cut staple storage unit 6Mc is moved in the direction of the stapler 1Mc.

Then, as illustrated in FIGS. 59 and 60, the locking claw 71Mc is locked with the stapler 1Mc by the rotational operation about the shaft protrusion 70Mc as the shaft, and as illustrated in FIG. 58, the cut staple storage unit 6Mc is attached to the stapler 1Mc.

When detaching the cut staple storage unit 6Mc, by manipulating the manipulation unit 72Mc, the locking of the locking claw 71Mc is released, and by moving the cut staple storage unit 6Mc in the direction separating from the stapler 1Mc, the shaft protrusion 70Mc is disengaged from the stapler 1Mc by the rotational operation around the shaft protrusion 70Mc as illustrated in FIGS. 59 and 60, and the cut staple receiving unit 6Mc is detached from the stapler 1Mc.

Figure 61:
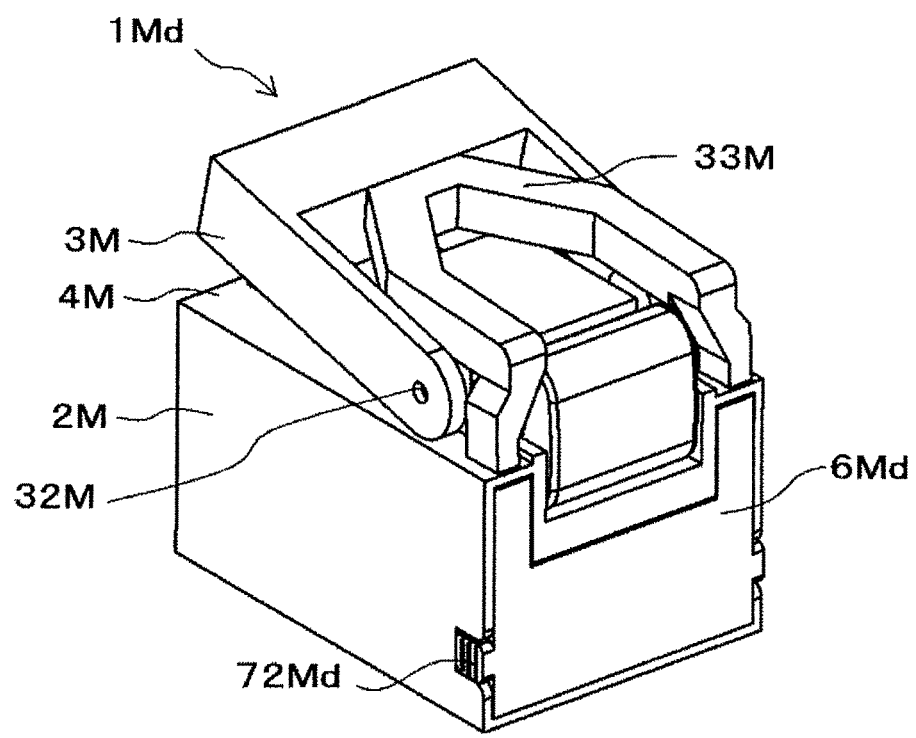
FIG. 61 is a perspective view illustrating another modified example of the stapler of the twelfth embodiment.
Figure 62:
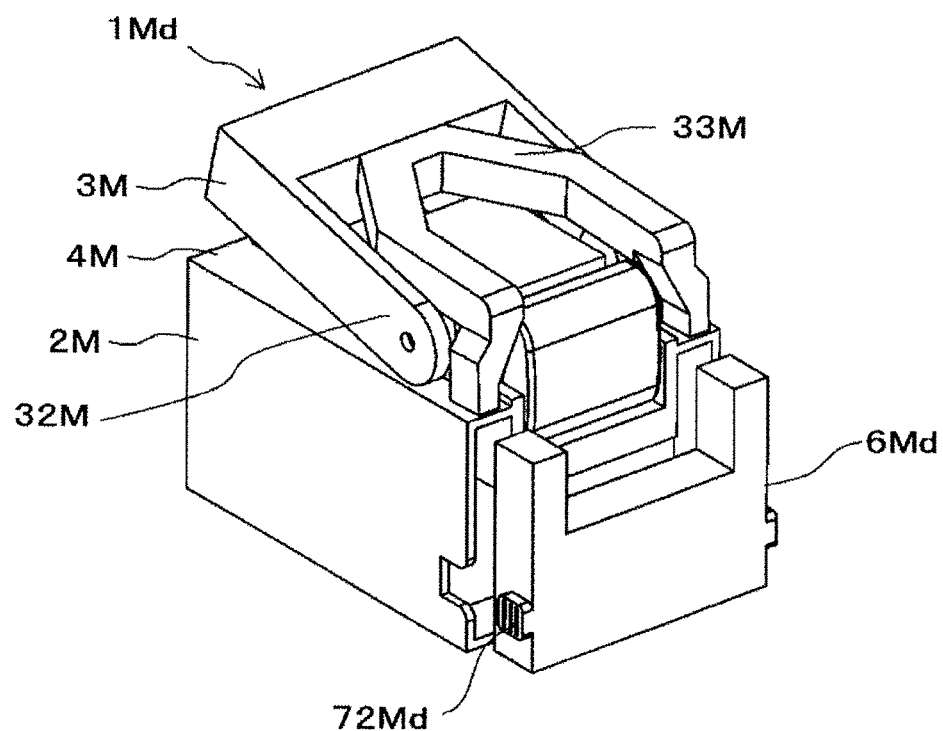
FIG. 62 is a perspective view illustrating another modified example of the stapler of the twelfth embodiment.

FIGS. 61 and 62 are perspective views illustrating another modified example of the stapler of the twelfth embodiment. Like the stapler 1M of the twelfth embodiment, the stapler 1Md of the other modified example of the twelfth embodiment is provided with the staple ejecting unit 2M and the binding unit 3M, and a sheet pinching unit 4M which pinches the sheet P between the staple ejecting unit 2M and the binding unit 3M.

The stapler 1Md includes a cut staple storage unit 6Md which stores the cut staple 13A cut by the cut unit 30M, and a discharge passage 33M which guides the cut staple 13A cut by the cut unit 30M to the cut staple storage unit 6Md. The staple cartridge 100M is configured to be attachable to and detachable from the stapler 1M in a state in which the cut staple storage unit 6Md is attached to the stapler 1M.

The cut staple storage unit 6Md is detachably attached to the back surface of the staple ejecting unit 2M. The cut staple storage unit 6Md is moved in the direction of pulled out to the back side of the stapler 1Md, and the operation of being attached to and detached from the stapler 1Md is performed.

The cut staple storage unit 6Md has a manipulation unit 72Md which releases the locking of a locking claw (not illustrated) locked with the stapler 1Md on both left and right side surfaces.

In the stapler 1Md according to another modified example of the twelfth embodiment, when the cut staple storage unit 6Md is attached, by pushing the cut staple storage unit 6Md from the back side into the attachment part on the back side of the stapler 1Md, the cut staple storage unit 6Md is attached to the stapler 1Md as illustrated in FIG. 61.

In the case of detaching the cut staple storage unit 6Md, the locking of the locking claw (not illustrated) is released by manipulating the manipulation unit 72Md, and by moving the cut staple storage unit 6Md in the direction of separating from the stapler 1Md, as illustrated in FIG. 62, the cut staple storage unit 6Md is detached from the back side of the stapler 1Md.

Figure 63:
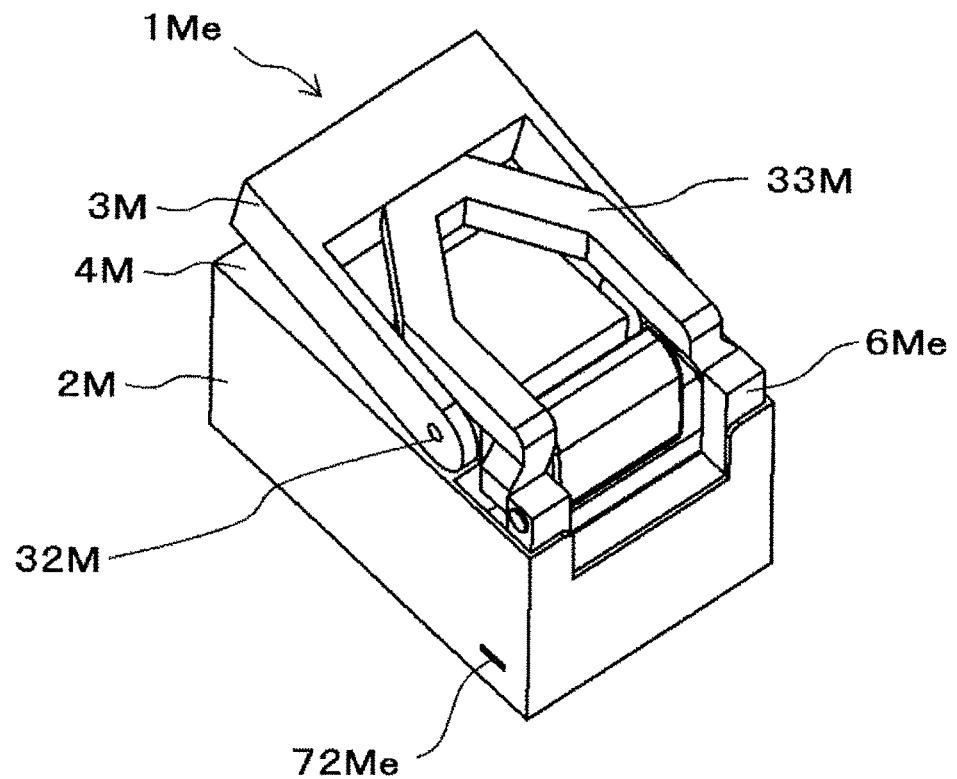
FIG. 63 is a perspective view illustrating another modified example of the stapler of the twelfth embodiment.
Figure 64:
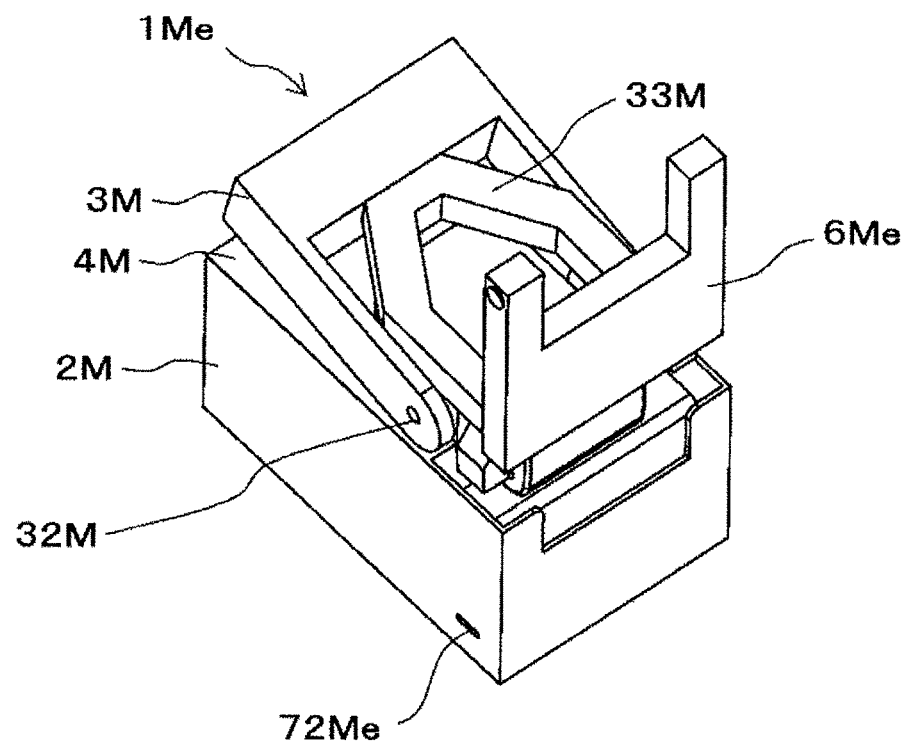
FIG. 64 is a perspective view illustrating another modified example of the stapler of the twelfth embodiment.
Figure 65:
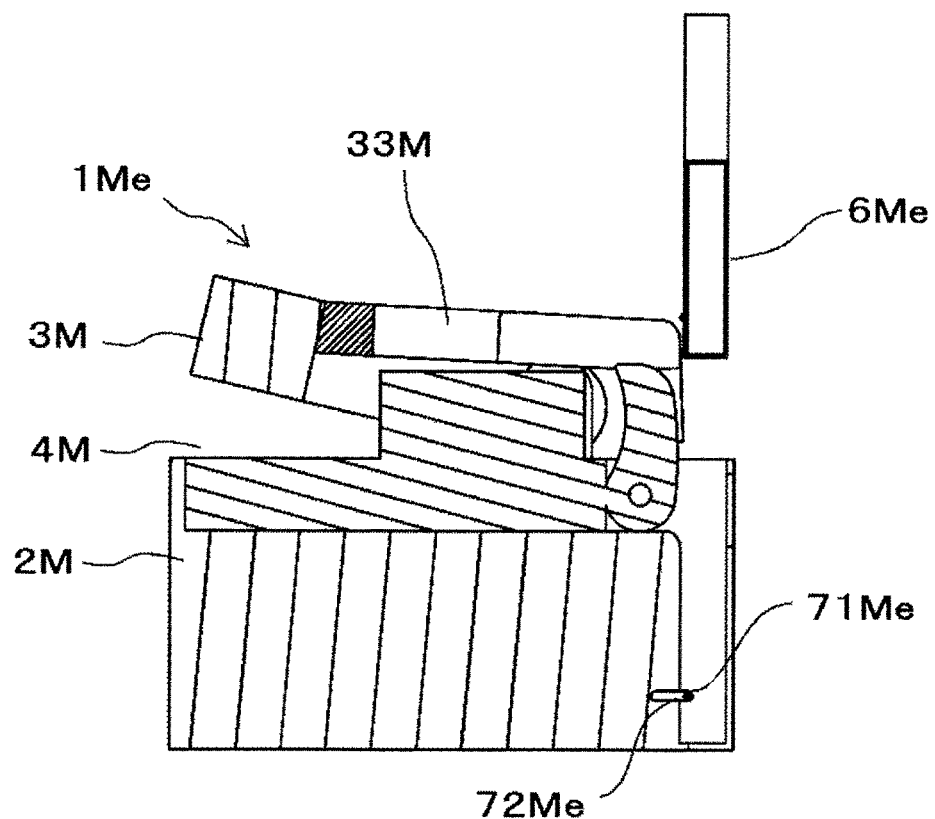
FIG. 65 is a side sectional view illustrating another modified example of the stapler of the twelfth embodiment.

FIGS. 63 and 64 are perspective views illustrating another modified example of the stapler of the twelfth embodiment, and FIG. 65 is a side sectional view illustrating another modified example of the stapler of the twelfth embodiment. As with the stapler 1M of the twelfth embodiment, a stapler 1Me of another modified example of the twelfth embodiment is provided with the staple ejecting unit 2M and the binding unit 3M, and a sheet pinching unit 4M which pinches the sheet P between the staple ejecting unit 2M and the binding unit 3M.

The stapler 1Me includes a cut staple storage unit 6Me which stores the cut staple 13A cut by the cut unit 30M, and a discharge passage 33M which guides the cut staple 13A cut by the cut unit 30M to the cut staple storage unit 6Md. The staple cartridge 100M is configured to be attachable to and detachable from the stapler 1M in a state in which the cut staple storage unit 6Md is attached to the stapler 1M.

The cut staple storage unit 6Me is detachably attached to the back surface of the staple ejecting unit 2M. The operation of attaching and detaching the cut staple storage unit 6Me with respect to the stapler 1Me by the movement in the vertical direction is performed.

The stapler 1Me has manipulation units 72Me which releases the locking of the locking claw 71Me locked with the cut staple storage unit 6Me on both of the left and right side surfaces.

In the stapler 1Me according to another modified example of the twelfth embodiment, when the cut staple storage unit 6Me is attached, by moving the cut staple storage unit 6Me downward from the upper side to the attachment site on the back side of the stapler 1Me, as illustrated in FIG. 63, the cut staple storage unit 6Me is attached to the stapler 1Me.

When detaching the cut staple storage unit 6Me, by manipulating the manipulation unit 72Me, the locking of the locking claw 71Me is released and the cut staple storage unit 6Me is moved upward away from the stapler 1Me. Thus, as illustrated in FIG. 65, the cut staple storage unit 6Me is detached from the stapler 1Me.

<Configuration Example of Stapler of Thirteenth Embodiment>

Figure 66:
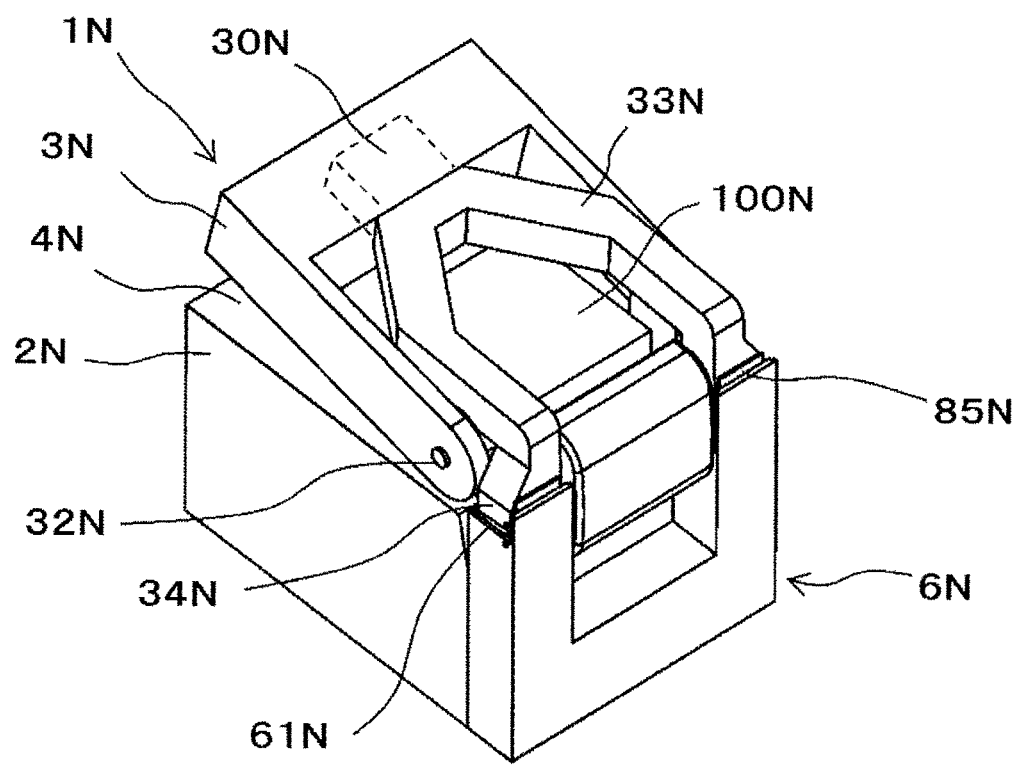
FIG. 66 is a perspective view illustrating an example of a stapler of a thirteenth embodiment.
Figure 67:
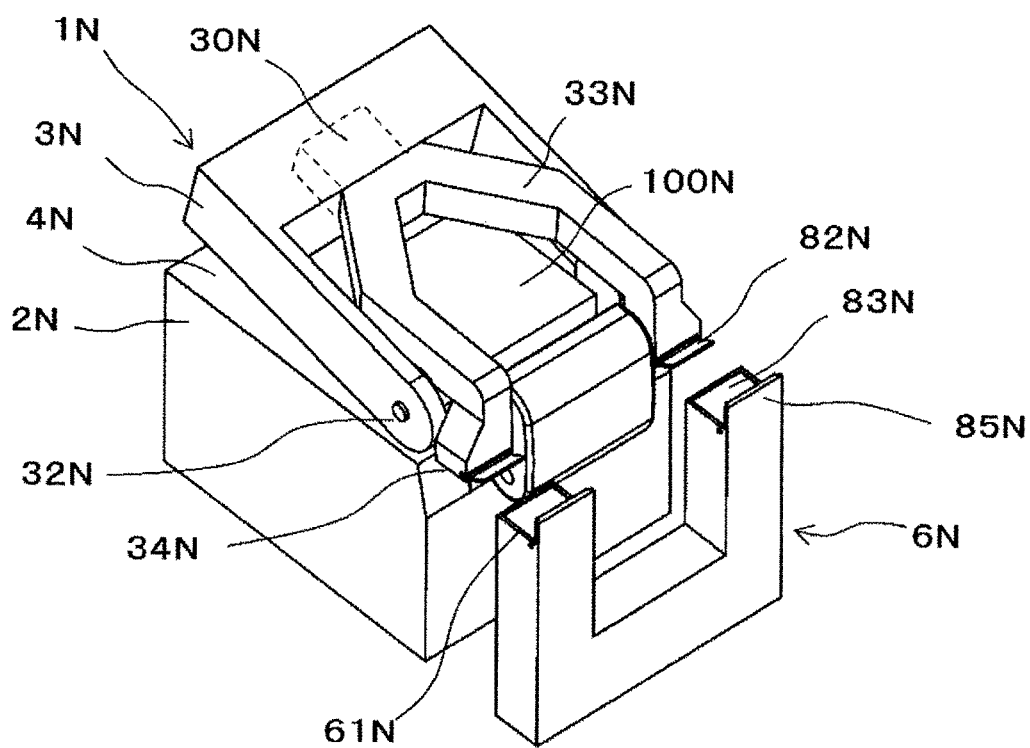
FIG. 67 is a perspective view illustrating an example of the stapler of the thirteenth embodiment.
Figure 68:
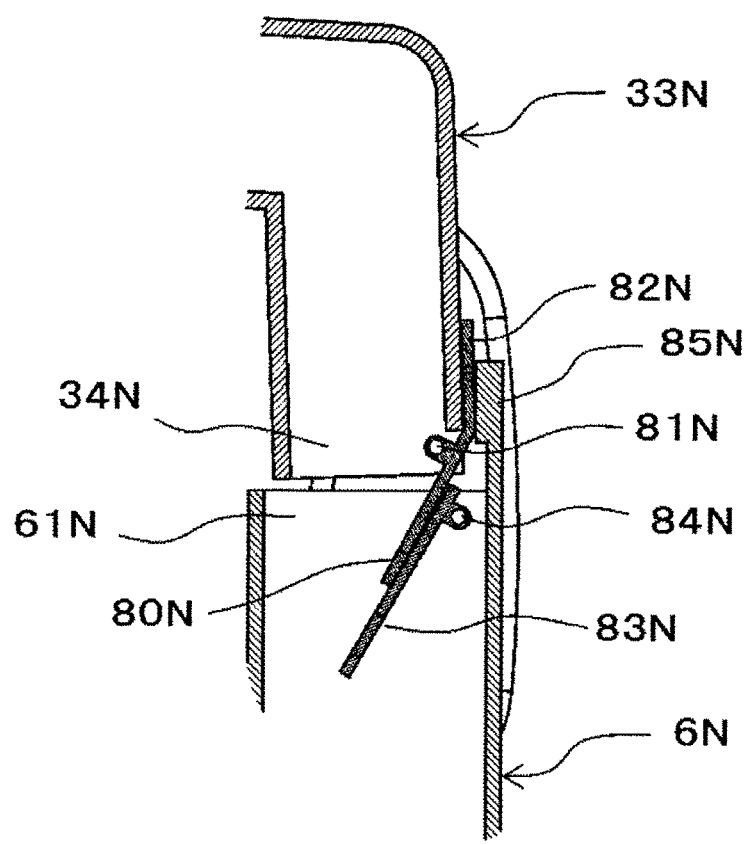
FIG. 68 is a cross-sectional side view of a main part illustrating an example of the stapler of the thirteenth embodiment.
Figure 69:
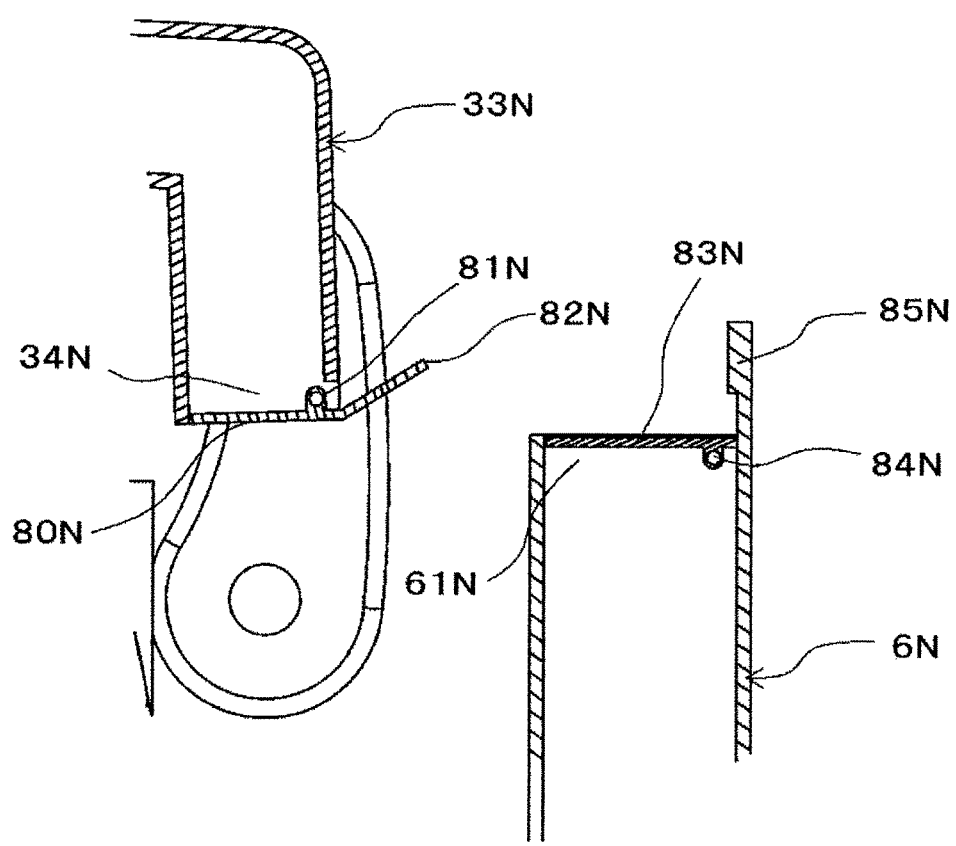
FIG. 69 is a side sectional view of a main part illustrating an example of the stapler of the thirteenth embodiment.

FIGS. 66 and 67 are perspective views illustrating an example of the stapler of the thirteenth embodiment, and FIGS. 68 and 69 are sectional views of main parts illustrating an example of the stapler of the thirteenth embodiment.

As illustrated in FIGS. 3A and 3B, a stapler 1N according to the thirteenth embodiment is provided with a staple ejecting unit 2N which supplies and ejects the staple 10A, and a binding unit 3N that binds the sheet P with the staple 10A, by cutting the staple leg 12A of the staple 10A illustrated in FIG. 3C and by folding the staple leg 12A illustrated in FIG. 3D in cooperation with the staple ejecting unit 2.

The stapler 1N is provided with a sheet pinching unit 4N which pinches the sheet P between the staple ejecting unit 2N and the binding unit 3N. The stapler 1N moves in a direction in which the binding unit 3N separates from the staple ejecting unit 2N in a rotational operation about the shaft 32N as a fulcrum, and pinches and releases the sheet P with the sheet pinching unit 4N.

The stapler 1N includes a cut unit 30N which cuts the staple leg 12A of the staple 10A penetrating the sheet P with a predetermined length, a cut staple storage unit 6N which stores the cut staple 13A cut by the cut unit 30N, and a discharge passage 33N which guides the cut staple 13A cut by the cut unit 30N to the cut staple storage unit 6N. In the stapler 1N according to the thirteenth embodiment, the feeding unit, the ejecting unit, the clincher unit, and the driving unit of the staple 10A are not illustrated, but the stapler 1N may have the same configuration as the stapler 1A of the first embodiment.

The cut staple storage unit 6N is detachably attached to the stapler 1N. The cut staple storage unit 6N is detachably attached to the back surface of the staple ejecting unit 2N. The staple cartridge 100N is configured to be attachable to and detachable from the stapler 1N in a state in which the cut staple storage unit 6N is attached to the stapler 1N.

The discharge passage 33N is provided in the binding unit 3N, communicates with the cut unit 30N and the discharge port 34N, and communicates with the recovery port 61N of the cut staple storage unit 6N. As a result, the cut staple 13A passing from the cut unit 30N through the discharge passage 33N is stored in the cut staple storage unit 6N from the recovery port 61N.

The stapler 1N is provided with a lid 80N in the discharge port 34N of the discharge passage 33N. The lid 80N is biased in a direction of closing the discharge port 34N with a spring (not illustrated) by opening and closing the discharge port 34N in a rotational operation about the shaft 81N as a fulcrum. The lid 80N is provided with a pressed section 82N that is pressed by the cut staple storage unit 6N on the opposite side across the shaft 81N.

The cut staple storage unit 6N includes a lid 83N in the recovery port 61N. The lid 83N is biased in a direction of closing the recovery port 61N with a spring (not illustrated) by opening and closing the recovery port 61N with a rotational operation about the shaft 84N as a fulcrum.

The cut staple storage unit 6N includes a pressing section 85N that presses the pressed section 82N of the lid 80N. The pressing section 85N is provided at a position of pressing the pressed section 82N of the lid 80N when the cut staple storage unit 6N is attached to the stapler 1N.

<Example of Operational Effect of Stapler of Thirteenth Embodiment>

In the stapler 1N according to the thirteenth embodiment, as illustrated in FIG. 66, when the cut staple storage unit 6N is attached to the stapler 1N, the pressing section 85N presses the pressed section 82N of the lid 80N. The lid 80N opens the discharge port 34N when the pressed section 82N is pressed. When the lid 80N opens downward, the lid 83N is pressed against the lid 80N, thereby opening the recovery port 61N as illustrated in FIG. 69.

Therefore, the lid 80N of the discharge port 34N and the lid 83N of the recovery port 61N are opened by the operation of attaching the cut staple storage unit 6N to the stapler 1N, and the discharge passage 33N and the cut staple storage unit 6N communicate with each other.

As illustrated in FIG. 67, when the cut staple storage unit 6N is detached from the stapler 1N, as the pressing section 85N separates from the pressed section 82N, as illustrated in FIG. 68, the lid 80N is closed by the force of a spring (not illustrated), and the lid 83N pressed by the lid 80N is closed by force of a spring (not illustrated).

As a result, the lid 80N of the discharge port 34N and the lid 83N of the recovery port 61N are closed by the operation of detaching the cut staple storage unit 6N from the stapler 1N, and even if the cut staple remains in the discharge passage 33N, it is possible to prevent the staple from being discharged to the outside of the stapler 1N.

<Modified Example of Stapler of Thirteenth Embodiment>

Figure 70:
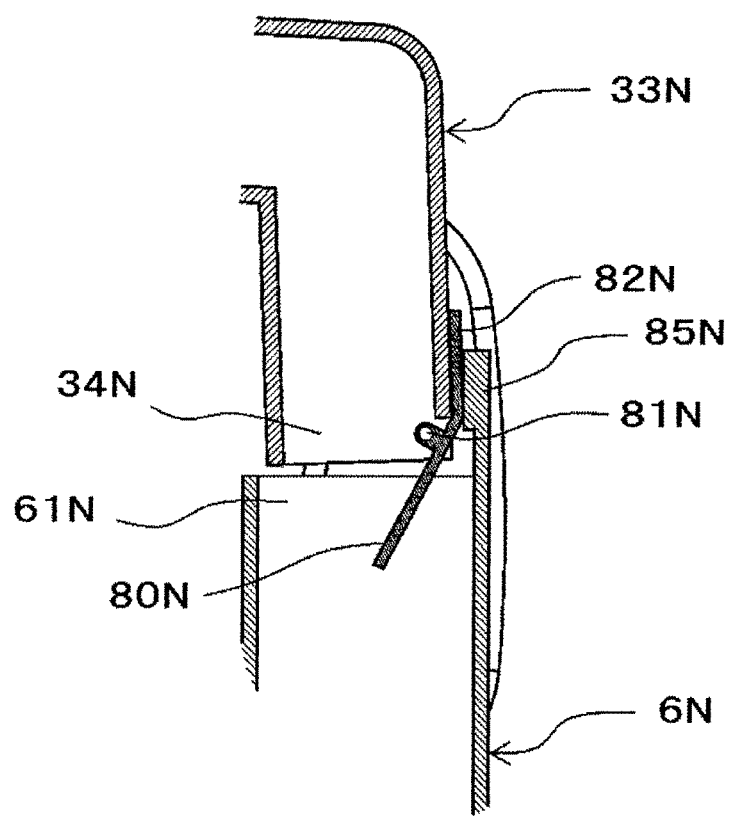
FIG. 70 is a cross-sectional side view of a main part illustrating a modified example of the stapler of the thirteenth embodiment.
Figure 71:
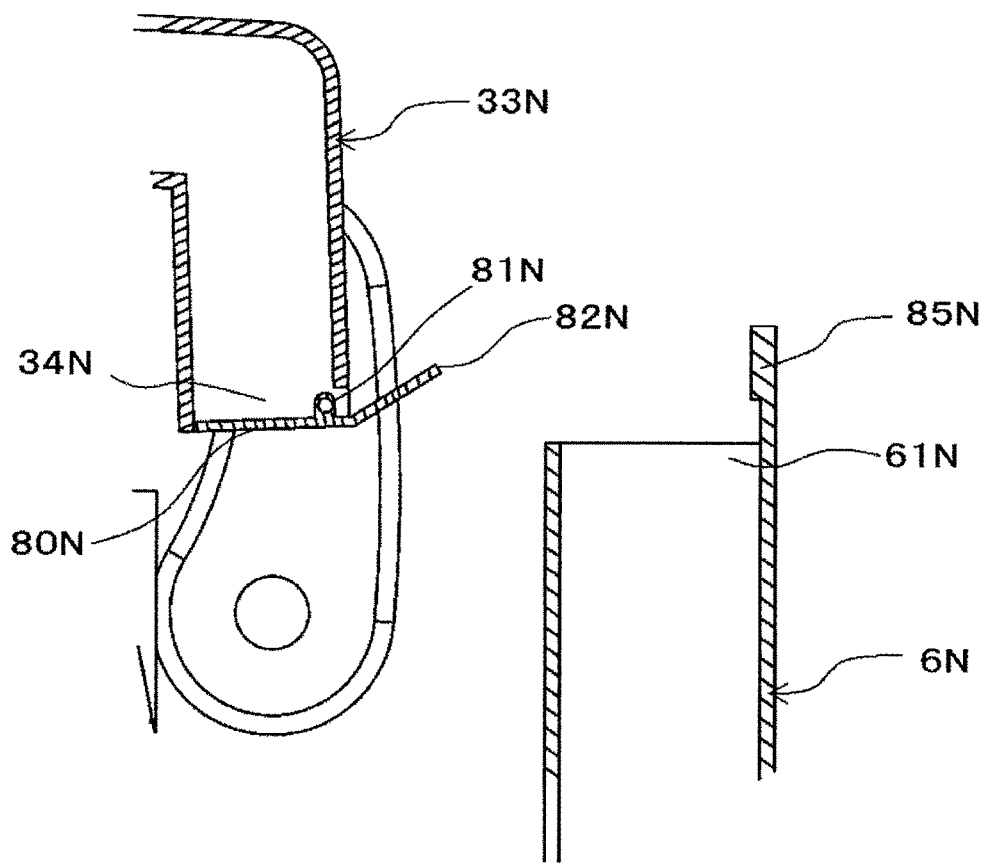
FIG. 71 is a cross-sectional side view of a main part illustrating a modified example of the stapler of the thirteenth embodiment.

FIGS. 70 and 71 are side sectional views illustrating main parts of a modified example of the stapler of the thirteenth embodiment.

The stapler 1N is provided with a lid 80N in the discharge port 34N of the discharge passage 33N. The lid 80N is biased in a direction of closing the discharge port 34N with a spring (not illustrated) by opening and closing the discharge port 34N in a rotational operation about the shaft 81N as a fulcrum. The lid 80N is provided with a pressed section 82N that is pressed against the cut staple storage unit 6N on the opposite side across the shaft 81N.

The cut staple storage unit 6N includes a pressing section 85N that presses the pressed section 82N of the lid 80N. The pressing section 85N is provided at a position of pressing the pressed section 82N of the lid 80N when the cut staple storage unit 6N is attached to the stapler 1N.

<Example of Operational Effect of Stapler of Modified Example of Thirteenth Embodiment>

In the stapler 1N of the modified example of the thirteenth embodiment, when the cut staple storage unit 6N is attached to the stapler 1N, the pressing section 85N presses the pressed section 82N of the lid 80N. As the pressed section 82N is pressed, the lid 80N opens the discharge port 34N as illustrated in FIG. 70. Therefore, the lid 80N of the discharge port 34N is opened by the operation of attaching the cut staple storage unit 6N to the stapler 1N, and the discharge passage 33N and the cut staple storage unit 6N communicate with each other.

When the cut staple storage unit 6N is detached from the stapler 1N, the pressing section 85N is separated from the pressed section 82N, and thus, the lid 80N is closed by the force of a spring (not illustrated) as illustrated in FIG. 71.

Therefore, the lid 80N of the discharge port 34N is closed by the operation of detaching the cut staple storage unit 6N from the stapler 1N, and even if the cut staple remains in the discharge passage 33N, it is possible to suppress the cut staple from being discharged to the outside of the stapler 1N. Since the lid is not provided in the recovery port 61N of the cut staple storage unit 6N, the stored staple can be discharged from the recovery port 61N.

<Configuration Example of Stapler of Fourteenth Embodiment>

Figure 72:
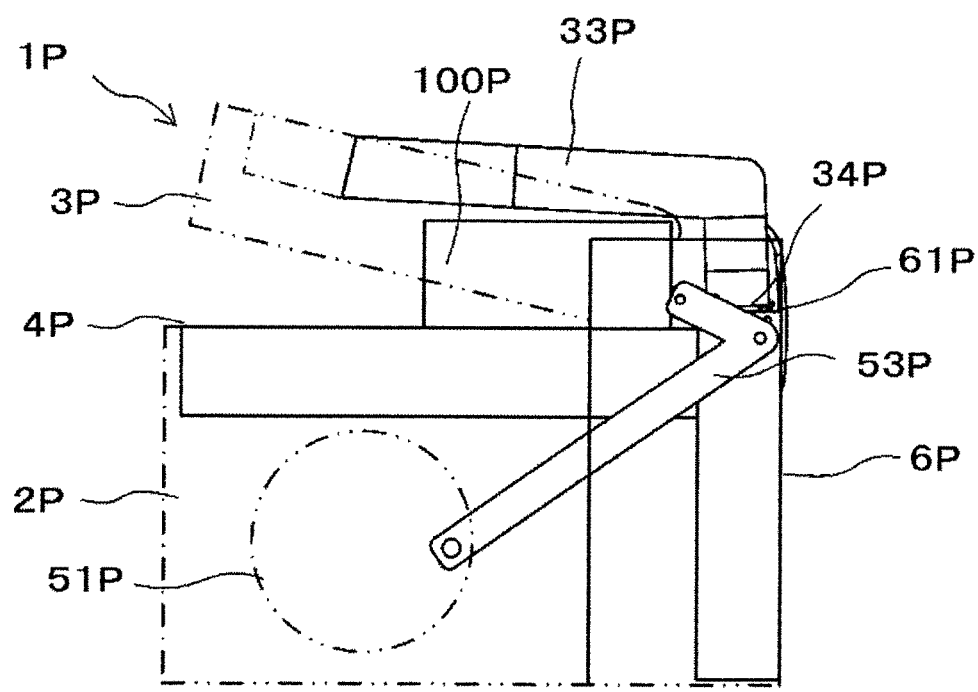
FIG. 72 is a side view illustrating an example of the stapler of a fourteenth embodiment.
Figure 73:
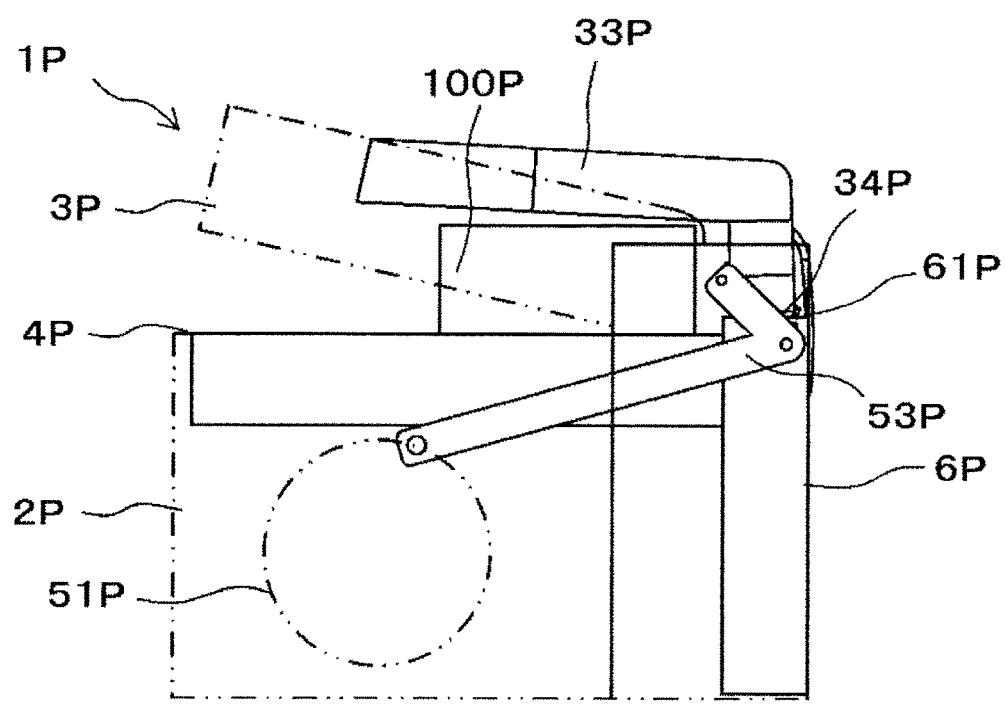
FIG. 73 is a side view illustrating an example of the stapler of the fourteenth embodiment.
Figure 74:
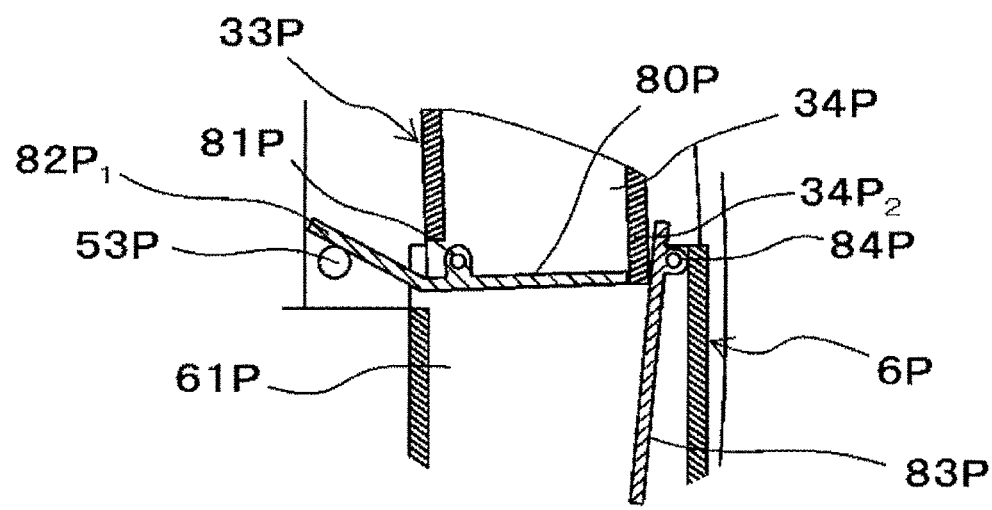
FIG. 74 is a cross-sectional side view of a main part illustrating an example of the stapler of the fourteenth embodiment.
Figure 75:
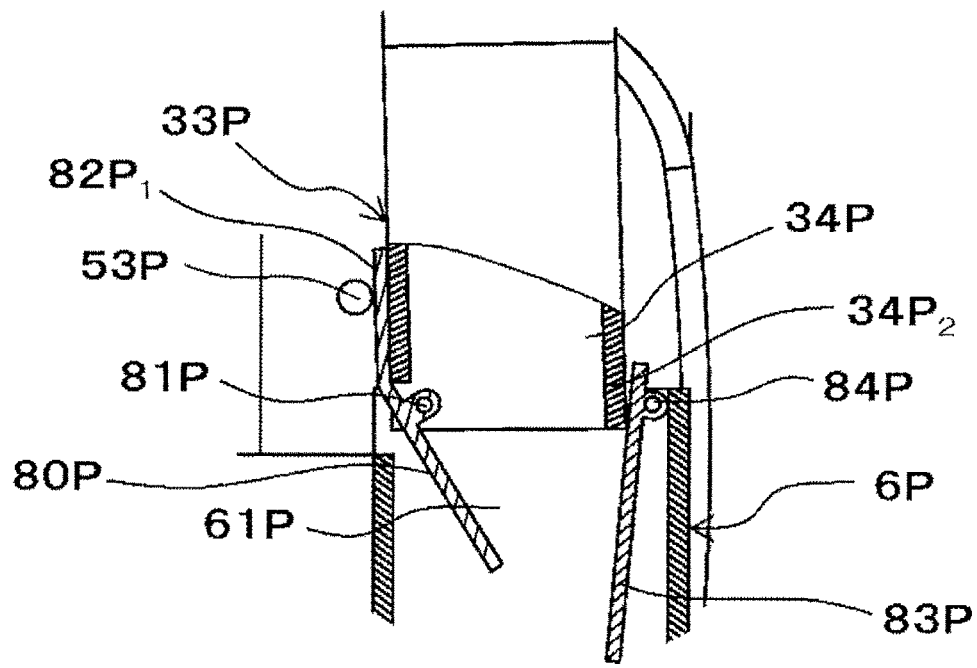
FIG. 75 is a cross-sectional side view of a main part illustrating an example of the stapler of the fourteenth embodiment.
Figure 76:
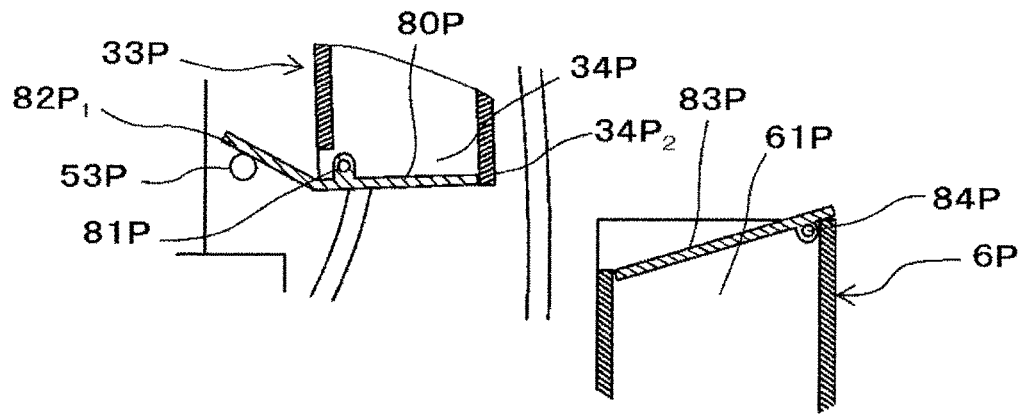
FIG. 76 is a cross-sectional side view of a main part illustrating an example of the stapler of the fourteenth embodiment.

FIGS. 72 and 73 are side views illustrating an example of the stapler of the fourteenth embodiment, and FIGS. 74 to 76 are side sectional views illustrating an example of the stapler of the fourteenth embodiment.

As illustrated in FIGS. 3A and 3B, a stapler 1P of the fourteenth embodiment includes a staple ejecting unit 2P which supplies and ejects the staple 10A, and a binding unit 3P that binds the sheet P with the staple 10A, by cutting the staple leg 12A of the staple 10A illustrated in FIG. 3C and by folding the staple leg 12A illustrated in FIG. 3D in cooperation with the staple ejecting unit 2P.

The stapler 1P is provided with a sheet pinching unit 4P which pinches the sheet P between the staple ejecting unit 2P and the binding unit 3P. In the stapler 1P, the binding unit 3P moves in a direction in which the binding unit 3P moves toward or away from the staple ejecting unit 2P by the rotational operation, and pinches and releases the sheet P with the sheet pinching unit 4P.

The stapler 1P includes a cut unit 30P that cuts the staple leg 12A of the staple 10A penetrating the sheet P at a predetermined length, a cut staple storage unit 6P that stores the cut staple 13A cut by the cut unit 30P, and a discharge passage 33P which guides the cut staple 13A cut by the cut unit 30P to the cut staple storage unit 6P. In the stapler 1P of the fourteenth embodiment, the feeding unit, the ejecting unit, the clincher unit, and the driving unit of the staple 10A are not illustrated, but the stapler 1P may have the same configuration as the stapler 1A of the first embodiment.

The cut staple storage unit 6P is detachably attached to the stapler 1P. The cut staple storage unit 6P is detachably attached to the back surface of the staple ejecting unit 2P. The staple cartridge 100P is configured to be attachable to and detachable from the stapler 1P in a state in which the cut staple storage unit 6P is attached to the stapler 1P.

The discharge passage 33P is provided in the binding unit 3P, communicates with the cut unit 30P, and the discharge port 34P communicates with the recovery port 61P of the cut staple storage unit 6P. As a result, the cut staple 13A passing from the cut unit 30P through the discharge passage 33P is stored in the cut staple storage unit 6P from the recovery port 61P.

The stapler 1P includes a lid 80P in the discharge port 34P of the discharge passage 33P. The lid 80P opens and closes the discharge port 34P by rotational operation about the shaft 81P as a fulcrum. The lid 80P includes a pressed section $82P_1$ on the other side across the shaft 81P. The operation of a cam 51P constituting a driving unit for performing pinching of the sheet, ejecting the staple and clinching is transmitted to the pressed section 82P₁ via the link unit 53P, and the lid 80P is opened and closed by the operation of the cam 51P.

The cut staple storage unit 6P includes a lid 83P in the recovery port 61P. The lid 83P is biased in a direction of closing the recovery port 61P with a spring (not illustrated) by opening and closing the recovery port 61P by the rotational operation about the shaft 84P as a fulcrum. The stapler 1P includes a pressing section 34P₂ which opens the lid 83P of the cut staple storage unit 6P at the opening end of the discharge port 34P of the discharge passage 33P. When the cut staple storage unit 6P is attached to the stapler 1P, the discharge port 34P of the discharge passage 33P enters the recovery port 61P of the cut staple storage unit 6P, and the pressing section 34P₂ projects downward from the shaft 84P of the lid 83P of the cut staple storage unit 6P. As a result, the lid 83P is pressed by the pressing section 34P₂ by the operation of attaching the cut staple storage unit 6P to the stapler 1P, the recovery port 61P of the cut staple storage unit 6P is opened, and the lid 83P is held in the open state.

<Example of Operational Effect of Stapler of Fourteenth Embodiment>

In the stapler 1P according to the fourteenth embodiment, as illustrated in FIG. 72, when the cut staple storage unit 6P is attached to the stapler 1P, the pressing section 34P₂ presses the lid 83P. As the lid 83P is pressed by the pressing section 34P₂, when the lid 83P is opened downward, the recovery port 61P opens as illustrated in FIG. 74.

As illustrated in FIG. 73, when the cam 51P rotates by the operation of binding the sheet with the staple, the pressed section 82P₁ of the lid 80P is pressed by the operation of the link unit 53P, and as illustrated in FIG. 75, the discharge port 34P is opened.

Therefore, the lid 83P of the recovery port 61P is opened by the operation of attaching the cut staple storage unit 6P to the stapler 1P, the lid 80P of the discharge port 34P is opened by the operation of binding the sheet with the staple, and the discharge passage 33P and the cut staple storage unit 6P communicate with each other.

When the operation of binding the sheet with the staple is completed and the cam 51P rotates as illustrated in FIG. 72, the lid 80P closes the discharge port 34P by the operation of the link unit 53P as illustrated in FIG. 74. When the cut staple storage unit 6P is detached from the stapler 1P, the pressing section 34P₂ is separated from the lid 83P, whereby the lid 83P is closed by the force of a spring (not illustrated) as illustrated in FIG. 76.

As a result, the lid 80P of the discharge port 34P and the lid 83P of the recovery port 61P are closed, and even if the cut staple remains in the discharge passage 33P, it is possible to suppress the staple from being discharged to the outside of the stapler 1P.

<Modified Example of Stapler of Fourteenth Embodiment>

Figure 77:
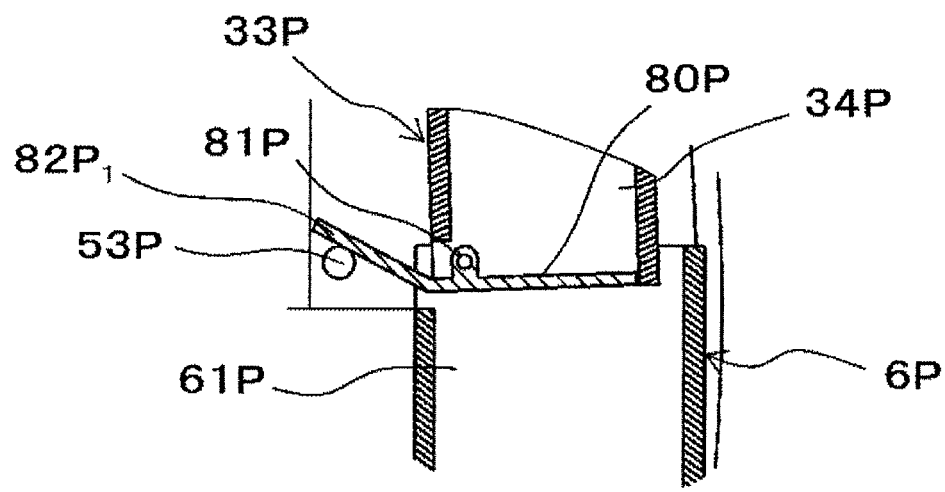
FIG. 77 is a cross-sectional side view of a main part illustrating a modified example of the stapler of the fourteenth embodiment.
Figure 78:
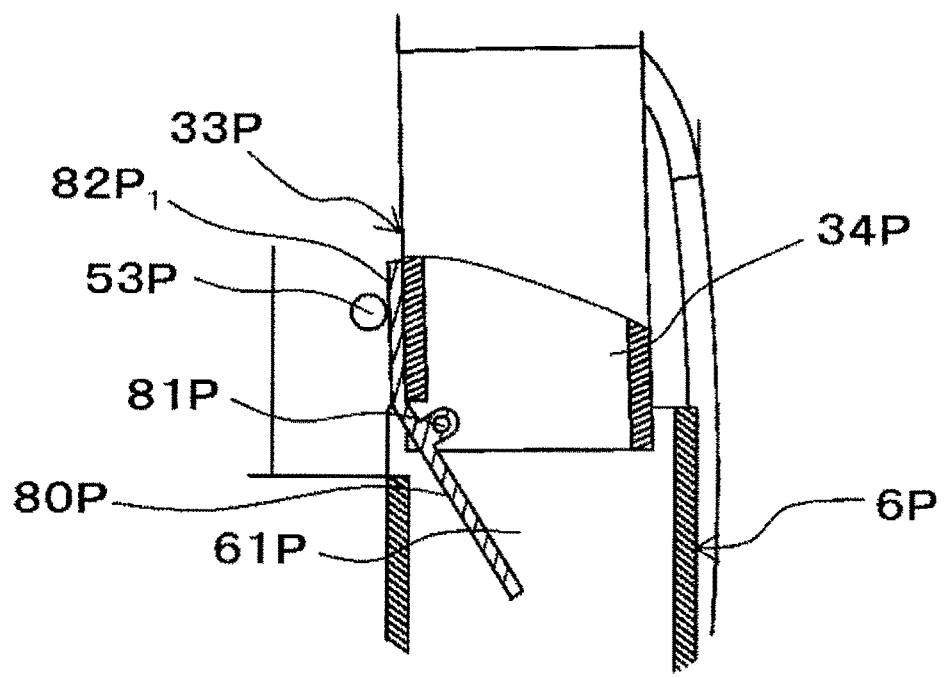
FIG. 78 is a cross-sectional side view of a main part illustrating a modified example of the stapler of the fourteenth embodiment.
Figure 79:
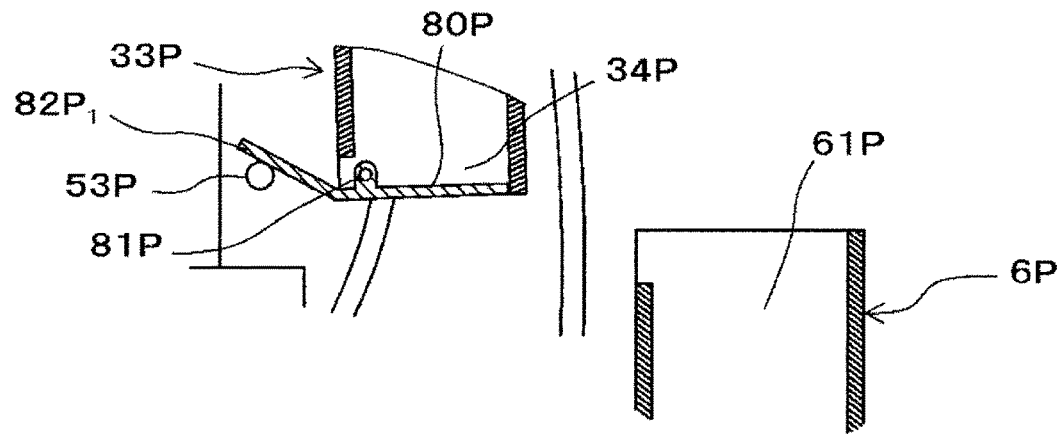
FIG. 79 is a sectional side view of a main part illustrating a modified example of the stapler of the fourteenth embodiment.

FIGS. 77 to 79 are side sectional views illustrating main parts of a modified example of the stapler of the fourteenth embodiment.

The stapler 1P includes a lid 80P in the discharge port 34P of the discharge passage 33P. The lid 80P opens and closes the discharge port 34P by rotational operation about the shaft 81P as a fulcrum. The lid 80P includes a pressed section 82P₁ on the other side of the shaft 81P. The operation of the cam 51P illustrated in FIGS. 72 and 73 is transmitted to the pressed section 82P₁ via the link unit 53P, and lid 80P is opened and closed by the operation of the cam 51P.

<Example of Operational Effect of Stapler of Modified Example of Fourteenth Embodiment>

In the stapler 1P according to the modified example of the fourteenth embodiment, the cut staple storage unit 6P is attached to the stapler 1P, and when the cam 51P rotates, as illustrated in FIG. 73, in the operation of binding the sheet with the staple, the pressed section 82P1 of the lid 80P is pressed by the operation of the link unit 53P to open the discharge port 34P as illustrated in FIG. 78.

Therefore, the lid 80P of the discharge port 34P is opened by the operation of binding the sheet with the staple, and the discharge passage 33P and the cut staple storage unit 6P communicate with each other.

When the operation of binding the sheet with the staple is completed and the cam 51P rotates as illustrated in FIG. 72, the lid 80P closes the discharge port 34P by the operation of the link unit 53P. As a result, in a state in which the cut staple storage unit 6P is detached from the stapler 1P, as illustrated in FIG. 79, the lid 80P of the discharge port 34P is closed, and even if the cut staple remains in the discharge passage 33P. It is possible to prevent the cut staple from being discharged to the outside of the stapler 1P. Further, since the lid is not provided in the recovery port 61P of the cut staple storage unit 6P, the stored cut staple can be discharged from the recovery port 61P.

In the stapler 1P of the fourteenth embodiment, the lid 80P of the discharge port 34P can be brought into the closed state at the stage in which the cut staple storage unit 6P is attached to the stapler 1P. Thus, in a state in which the stapler 1P is moved to a home position illustrated in FIG. 2, the lid 80P of the discharge port 34P can be closed.

As a result, since the lid 80P of the discharge port 34P is closed at the stage of detaching the cut staple storage unit 6P from the stapler 1P moved to the home position, an occurrence of event of pinching the cut staple remaining in the discharge passage 33 by the lid 80P is suppressed. As a result, a gap is generated between the discharge port 34P and the lid 80P, so that it is possible to prevent the cut staple from unintentionally being discharged to the outside of the stapler 1P.

Even in the configuration in which the recovery port 61P is provided with the lid 83P, and even the configuration in which the lid is not provided, it is preferable that the lid 80P of the discharge port 34P be closed except at the time of the binding operation. This is to prevent the cut staple from being unintentionally discharged from the discharge port 34P in a state in which the cut staple storage unit 6P is not attached to the stapler 1P.

<Modified Example of Cut Staple Storage Unit>

Figure 80:
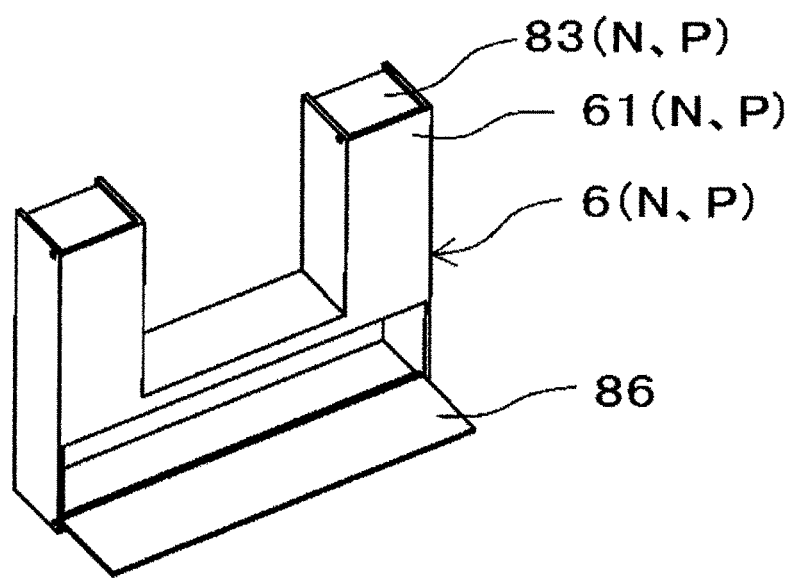
FIG. 80 is a perspective view illustrating a modified example of the cut staple storage unit.

FIG. 80 is a perspective view illustrating a modified example of the cut staple storage unit. The cut staple storage unit 6N including the lid 83N and the cut staple storage unit 6P including the lid 83P may be provided with an openable and closable lid 86 for discharging the cut staple. As a result, it is possible to discharge the cut staple by opening the lid 86.

Figure 81A:
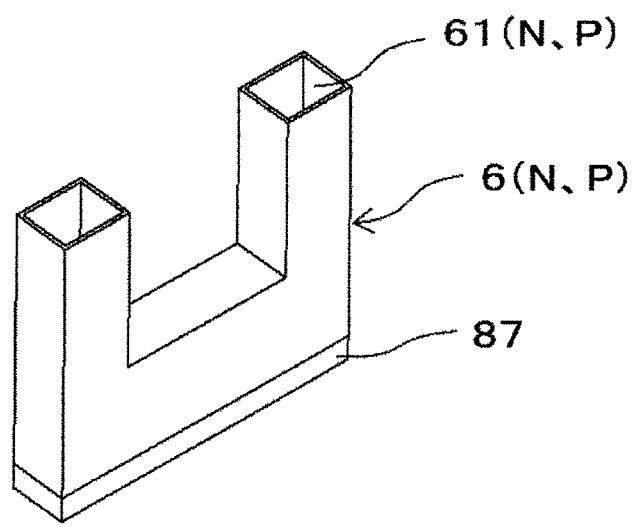
FIGS. 81A and 81B are perspective views illustrating another modified example of the cut staple storage unit.
Figure 81B:
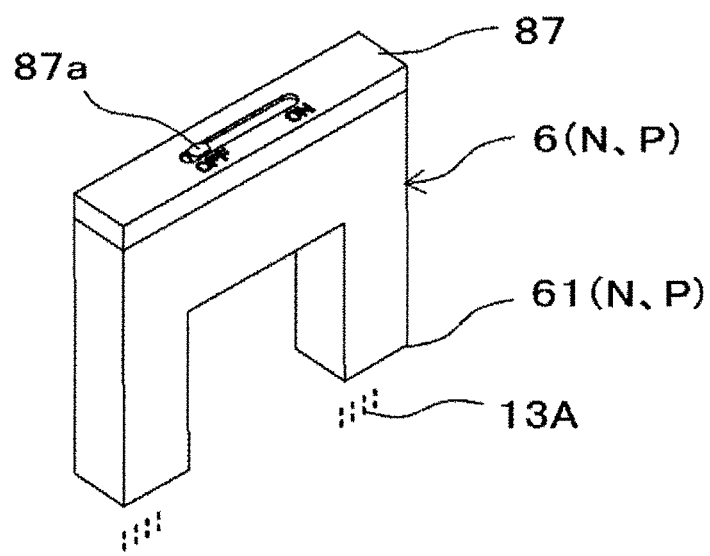

FIGS. 81A and 81B are perspective views illustrating another modified example of the cut staple storage unit. In the cut staple storage units 6N and 6P which are not provided with the above-described lid, a magnet 87 is provided on the bottom surface to absorb the metallic cut staple 13A and prevent scattering. As illustrated in FIG. 81B, in order to discharge the cut staple 13A, by including a switch 87a for releasing the magnetic force, the magnetic force of the magnet 87 is released, and it is possible to discharge the cut staple 13A from the recovery ports 61N and 61P.

Figure 82A:
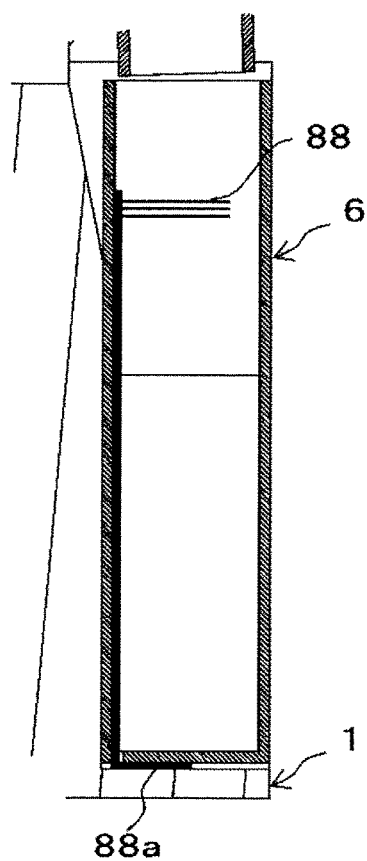
FIGS. 82A and 82B are side sectional views illustrating another modified example of the cut staple storage unit.
Figure 82B:
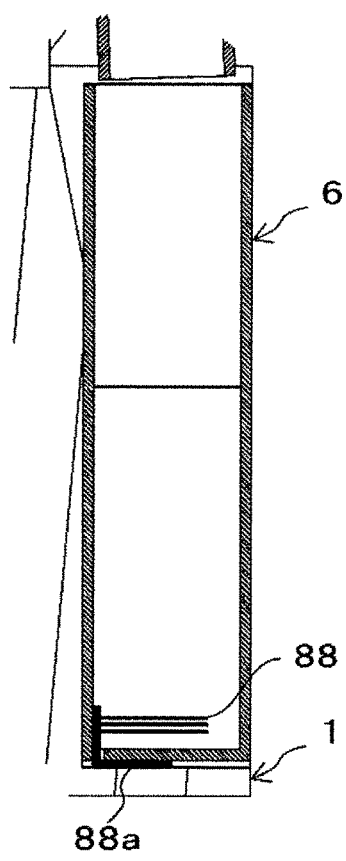

FIGS. 82A and 82B are side sectional views illustrating another modified example of the cut staple storage unit. If the metallic cut 13A is charged and adsorbed, there is a possibility of difficulty in discharge and an increase in bulk.

Therefore, a charging brush 88 is provided in each of the aforementioned cut staple storage units 6 (A to P). In the charging brush 88, a ground section 88a is in contact with the staplers 1 (A to P) and is grounded via the staplers 1 (A to N). In FIG. 82A, the discharging brush 88 is provided on the recovery port 61 side, and in FIG. 82B, the discharging brush 88 is provided on the bottom side of the cut staple storage unit 6. By discharging the stored cut staple 13A, discharge is facilitated. Further, an increase in bulk can be suppressed.

Figure 83:
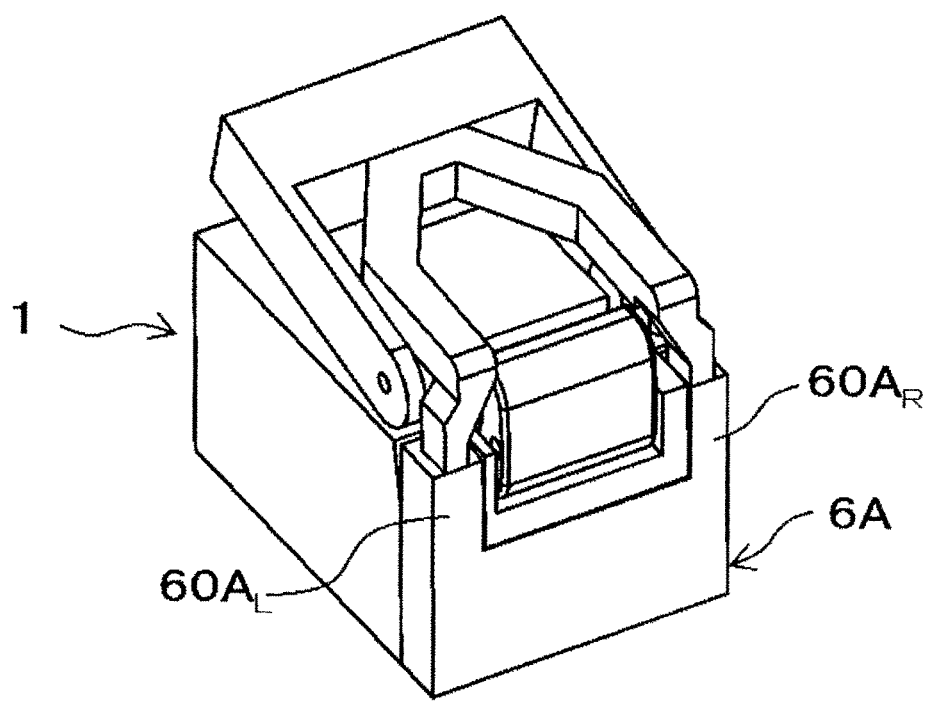
FIG. 83 is a perspective view illustrating another modified example of the cut staple storage unit.
Figure 84:
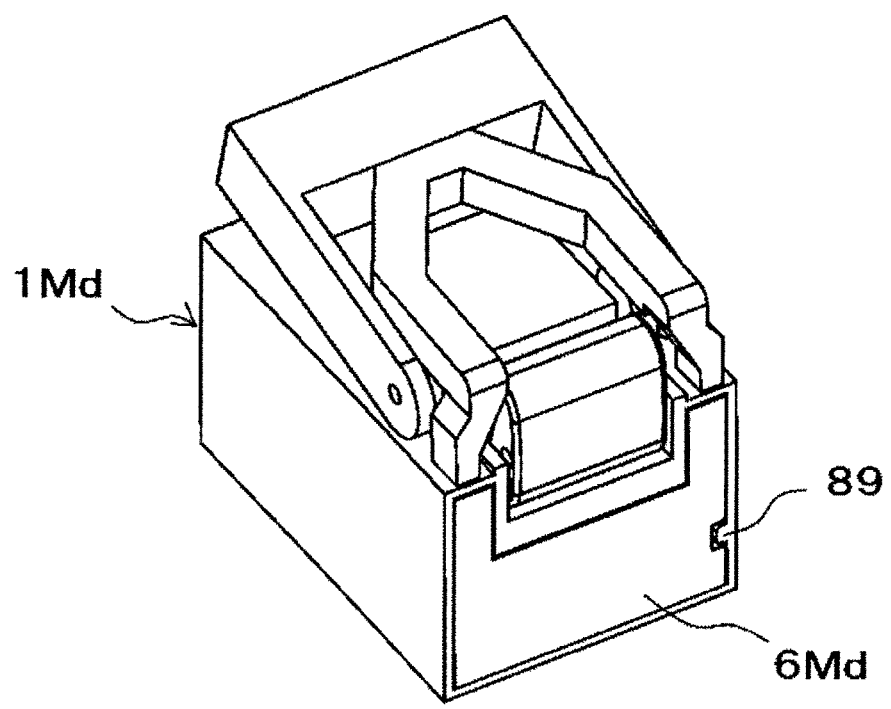
FIG. 84 is a perspective view illustrating another modified example of the cut staple storage unit.
Figure 85:
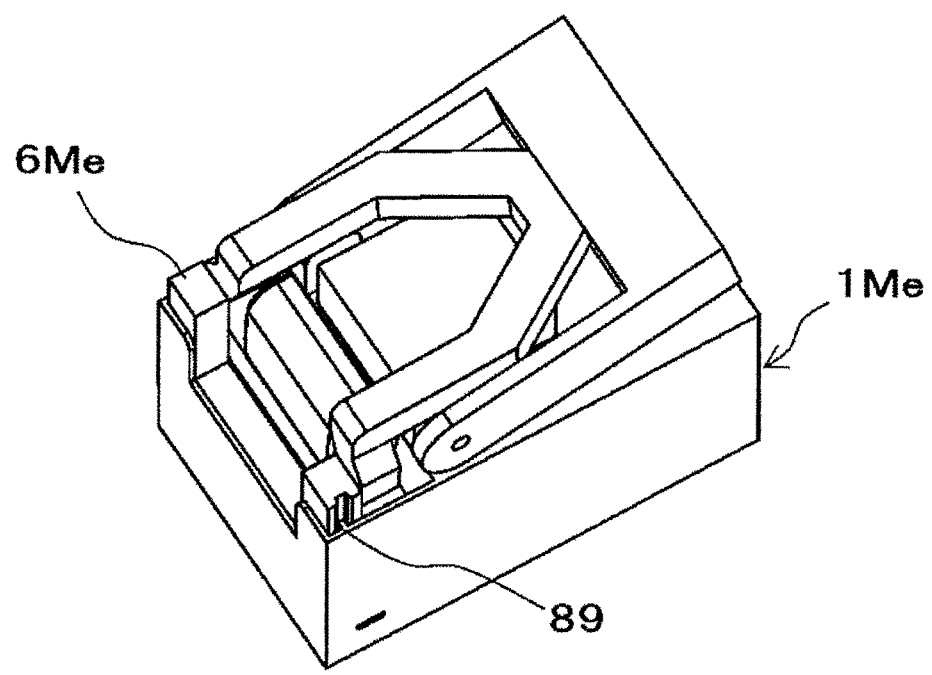
FIG. 85 is a perspective view illustrating another modified example of the cut staple storage unit.

FIGS. 83 to 85 are perspective views illustrating another modified example of the cut staple storage unit. The cut staple housing section 6 is formed asymmetrically in the lateral direction, and erroneous attachment to the stapler 1 is suppressed. In FIG. 83, the thicknesses of the recovery route 60$A_L$ and the recovery route 60$A_R$ are changed. In FIGS. 84 and 85, a fitting groove 89 including a combination of a recess and a protrusion extending in accordance with the attaching and detaching direction with respect to the stapler 1 (Md, Me) is provided, and if it is not aligned with the fitting groove 89, attachment and detachment cannot be performed. As a result, it is possible to prevent the mounting direction of the cut staple storage unit 6 from being mistaken, so that the attachment and detachment work can be easily performed.

<Configuration Example of Post-Processing Apparatus of Present Embodiment>

Figure 86:
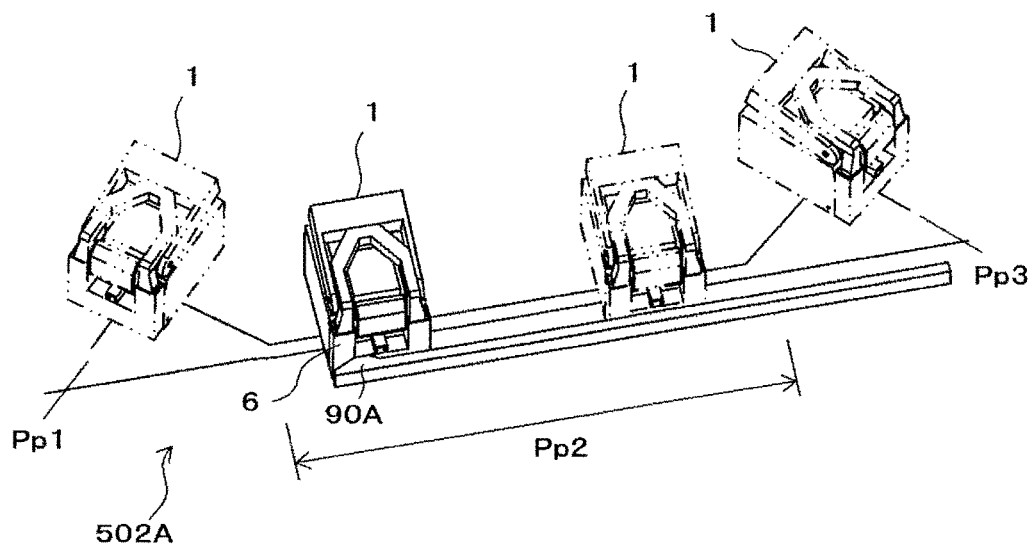
FIG. 86 is a configuration diagram illustrating an example of a post-processing apparatus according to the present embodiment.

FIG. 86 is a configuration diagram illustrating an example of a post-processing apparatus according to the present embodiment. In a configuration in which the cut staple storage unit 6M is detachable as in the stapler 1M described with reference to FIG. 53, there is a possibility that erroneous operation of operating the apparatus may be performed in a stage (referred to as a half set) during attachment and detachment of the cut staple storage unit 6M as illustrated in FIG. 54.

Therefore, as illustrated in FIG. 2, by moving the stapler 1, the cut staple storage unit 6 is attached at a regular position. In the post-processing apparatus 502A illustrated in FIG. 86, a pressing guide 90A is provided which is an example of an attachment assisting section that presses the cut staple storage unit 6 against the stapler 1 moving from the first position Pp1 to the second position Pp2.

As an example, when the first position Pp1 is set to the home position, the cut staple storage unit 6 is attached to and detached from the stapler 1 at the first position Pp1. In this case, the first position Pp1 also serves as an operation position for performing an operation of attaching/detaching the cut staple storage unit 6 to/from the stapler 1. As another example, when a position different from the first position Pp1 is set as a home position, attachment and detachment of the cut staple storage unit 6 to and from the stapler 1 is performed at the first position Pp1 as the operation position. Further, as another example, even if the first staple storage unit 6 may be attached to and detached from the stapler 1 with the first position Pp1 as the home position and with another position different from the first position Pp1 as the operation position. In this example, the home position is a position at which the stapler 1 stands by in preparation for the next job. The home position may be the same as and may be different from the manipulation position at which the attachment and detachment of the staple cartridge, and the attachment and detachment of the cut staple storage unit 6 are performed.

Before the operation of binding the sheet with the stapler 1 is started, for example, when performing the operation of closing the lid 505 illustrated in FIG. 2, the operation of moving the stapler 1 to the second position Pp2 is performed as the initial operation.

As a result, even when the attachment of the cut staple storage unit 6 is insufficient, when the stapler 1 moves to the second position Pp2 in the initial operation, the cut staple storage unit 6 is pressed in the direction of the stapler 1 by the pressing guide 90A, and it is attached at the regular position. Therefore, even when there is an erroneous operation in which the cut staple storage unit 6 is not attached to the regular position, the cut staple storage unit 6 can be attached to the regular position in the initial operation before performing the binding operation. Therefore, it is possible to reliably store the cut staple in the cut staple storage unit 6.

Figure 87A:
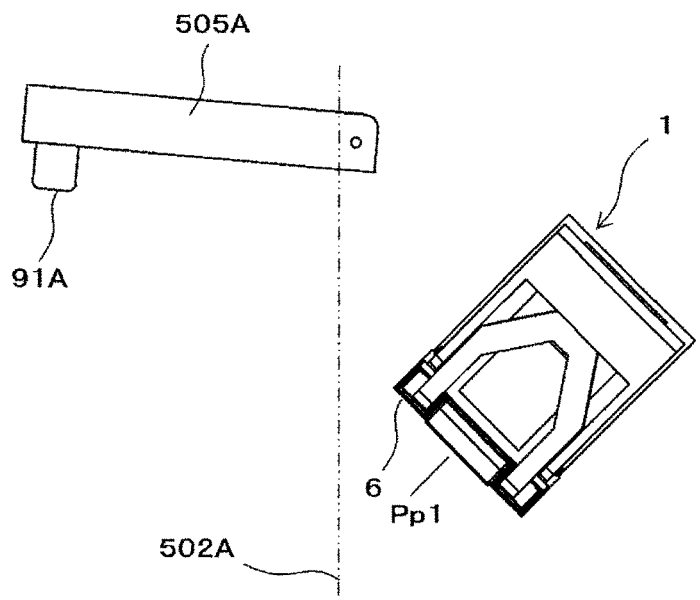
FIGS. 87A and 87B are configuration diagrams illustrating a modified example of the post-processing apparatus of the present embodiment.
Figure 87B:
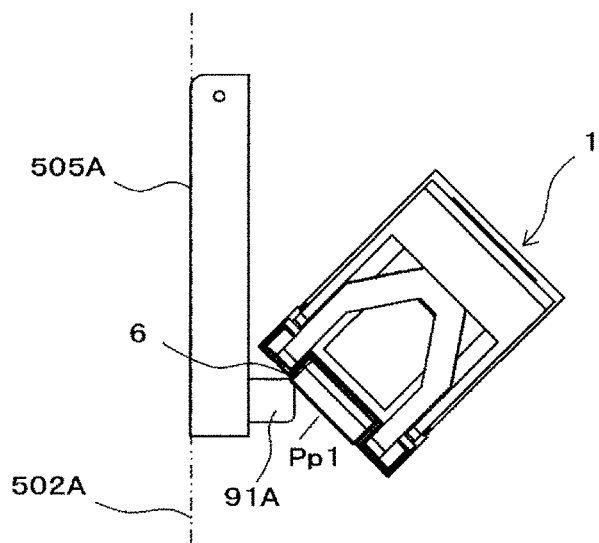

FIGS. 87A and 87B are configuration diagrams illustrating modified examples of the post-processing apparatus of the present embodiment. In the post-processing apparatus 502A illustrated in FIGS. 87A and 87, when the first position Pp1 is set to the home position, a pressing section 91A as an example of a mounting assistance unit for pressing the cut staple storage unit 6 against to the stapler 1 stopped at the first position Pp1 is provided on the lid 505A.

As illustrated in FIG. 87A, in a state in which the stapler 1 is stopped at the first position Pp1, the post-processing apparatus 502A opens the lid 505A to attach and detach the cut staple storage unit 6. Even when the attachment of the cut staple storage unit 6 is insufficient, as illustrated in FIG. 87B, by closing the lid 505A, the cut staple storage unit 6 is pressed in the direction of the stapler 1 by the pressing section 91A, and is attached at the regular position. Therefore, even when there is an erroneous operation in which the cut staple storage unit 6 is not attached to the regular position, the cut staple storage unit 6 can be attached to the regular position by the operation of closing the lid 505A. Therefore, it is possible to reliably store the cut staple in the cut staple storage unit 6.

Figure 88A:
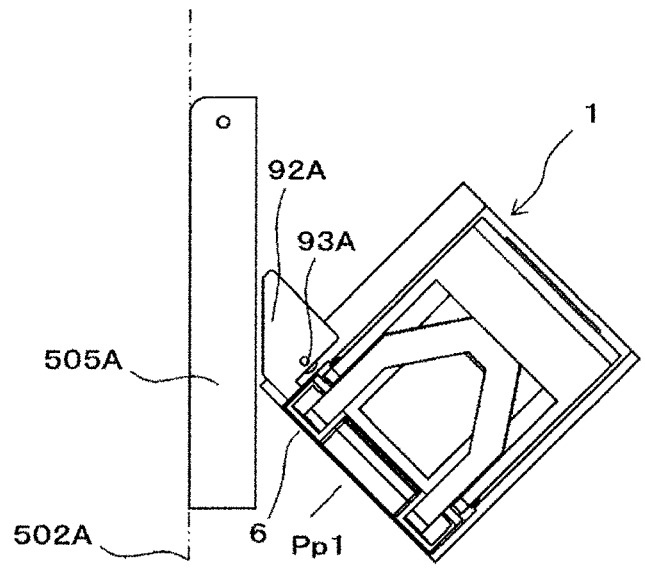
FIGS. 88A and 88B are configuration diagrams illustrating another modified example of the post-processing apparatus of the present embodiment.
Figure 88B:
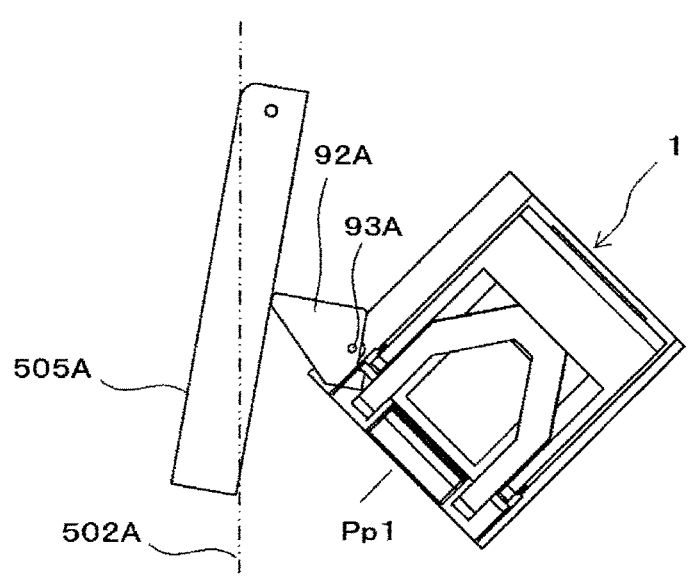

FIGS. 88A and 88B are configuration diagrams illustrating another modified example of the post-processing apparatus of the present embodiment. The post-processing apparatus 502A illustrated in FIGS. 88A and 88B is provided with a regulating unit 92A which regulates the closing of the lid 505A when the cut staple storage unit 6 is insufficiently mounted or is not attached.

The regulating unit 92A is displaced by the rotational operation about the shaft 93A as a fulcrum. When the first position Pp1 is set to the home position of the stapler 1, if the cut staple storage unit 6 is attached to the regular position, as illustrated in FIG. 88A, the regulating unit 92A is pressed against the cut staple storage unit 6, and is retracted from the path of opening and closing the lid 505A. As a result, the lid 505A can be closed.

As illustrated in FIG. 88B, when the attachment of the cut staple storage unit 6 is insufficient or is not attached, the regulating unit 92A enters the attaching position of the cut staple storage unit 6 in the stapler 1, and the lid 505A protrudes into the opening and closing path. As a result, the lid 505A cannot be closed.

Therefore, if the attachment of the cut staple storage unit 6 is insufficient or is not attached, when the lid 505A cannot be closed and there is an erroneous operation in which the cut staple storage unit 6 is not attached to the regular position, it is possible to prevent erroneous operation of the post-processing apparatus 502A.

Figure 89A:
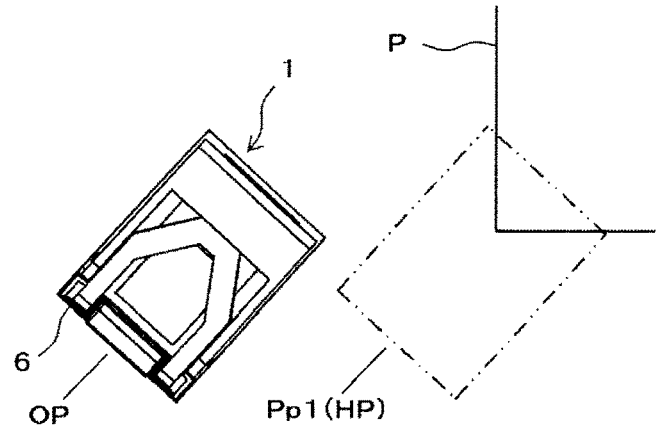
FIGS. 89A to 89C are configuration diagrams illustrating another modified example of the post-processing apparatus of the present embodiment.
Figure 89B:
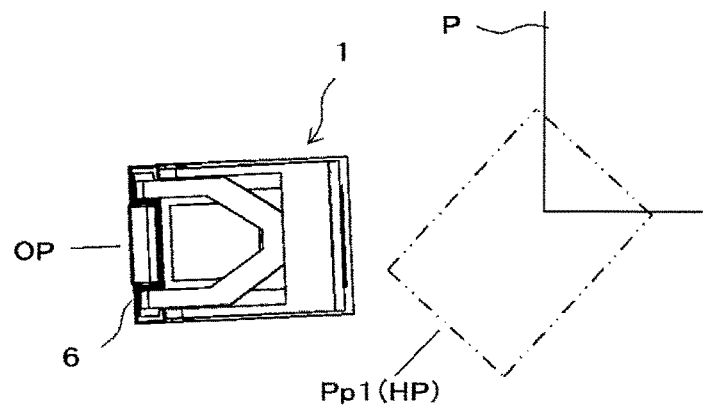
Figure 89C:
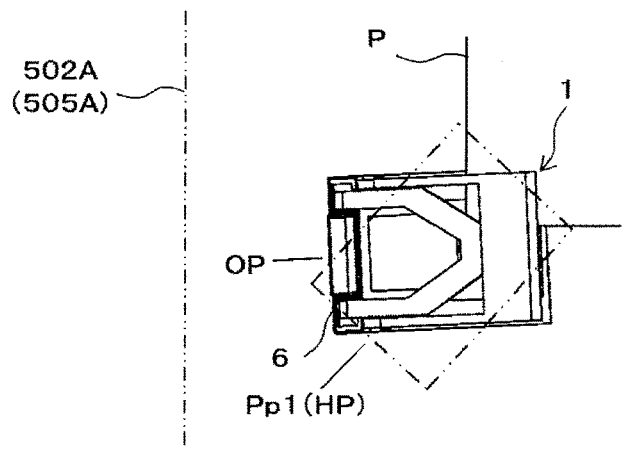

FIGS. 89A to 89C are configuration diagrams illustrating another modified example of the post-processing apparatus of the present embodiment. In the post-processing apparatus 502A illustrated in FIGS. 89A and 89B, an operation position OP of the stapler 1 is provided outside the first position Pp1. For example, when replenishing or exchanging the staples and recovering the cut staples, the stapler 1 is moved from the first position Pp1 to the operating position OP. In FIG. 89B, as the operation position OP, the direction of the stapler 1 is rotated at a position outside the first position Pp1 so that the cut staple storage unit 6 faces the lid 505A side. In FIG. 89C, as the operation position OP, the direction of the stapler 1 is rotated at the first position Pp1 so that the cut staple storage unit 6 faces the lid 505A side. Thus, in any case of FIGS. 89A to 89C, the operations of replenishing and replacing the staple, and recovering the cut staple after attaching and detaching the staple storage unit 6 are easily performed. Further, the first position Pp1 may also serve as the home position HP.

Figure 90:
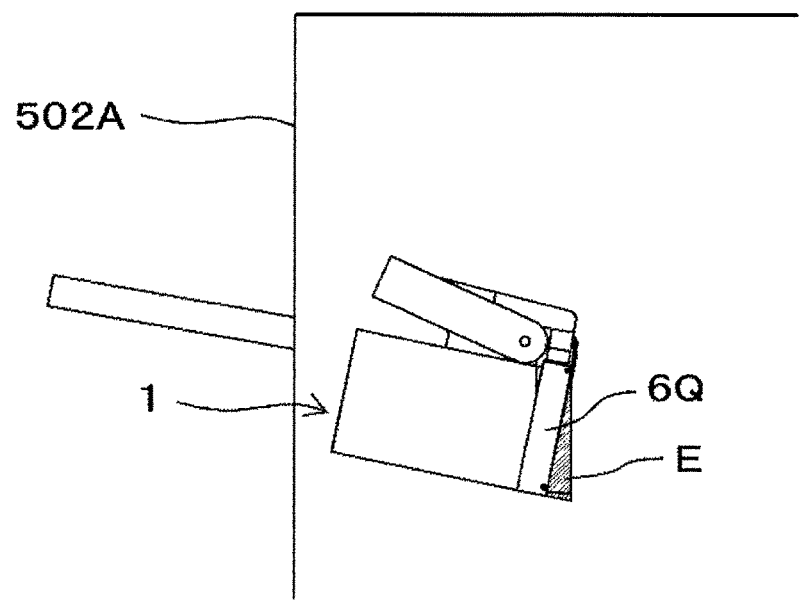
FIG. 90 is a configuration diagram illustrating another modified example of the post-processing apparatus of the present embodiment.
Figure 91:
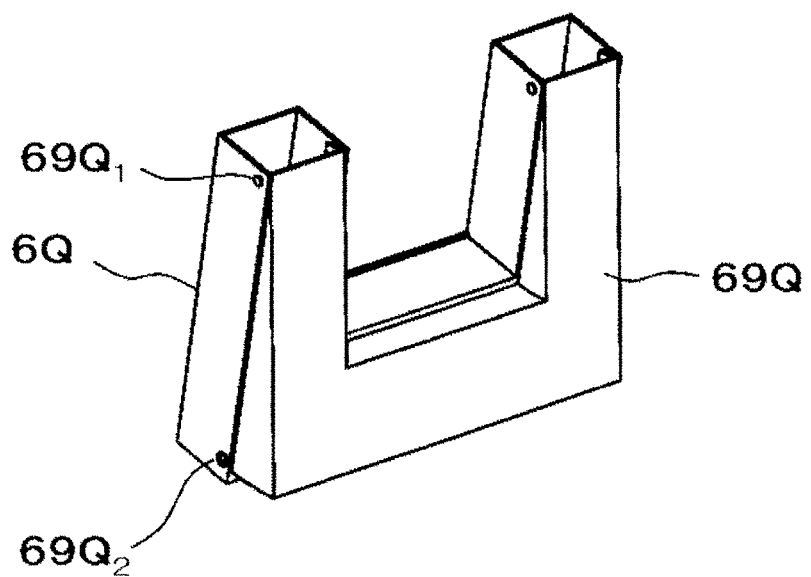
FIG. 91 is a perspective view illustrating a modified example of the cut staple storage unit of the present embodiment.

FIG. 90 is a block diagram illustrating another modified example of the post-processing apparatus of the present embodiment, and FIG. 91 is a perspective view illustrating a modified example of the cut staple storage unit of the present embodiment. In the post-processing apparatus 502A, as described above, since the stapler 1 is obliquely attached, a space E corresponding to the inclination of the stapler 1 is opened on the back side of the stapler 1.

Thus, as illustrated in FIG. 91, in the cut staple storage unit 6Q, the expansion unit 69Q is provided so that it can be opened and closed by the rotational operation about the shaft $69Q_1$ as a fulcrum. For example, the expansion unit 69Q is opened so that the expansion unit 69Q is substantially vertical in accordance with the inclination of the stapler 1, and the expansion unit 69Q is fixed by the position fixing member $69Q_2$ made up of a screw or the like. Thus, is possible to enlarge the volume of the cut staple storage unit 6Q in accordance with the configuration of the post-processing apparatus 502A.

<Configuration Example of Stapler of First Embodiment for Detecting Cut Staple Full Load>

Figure 92:
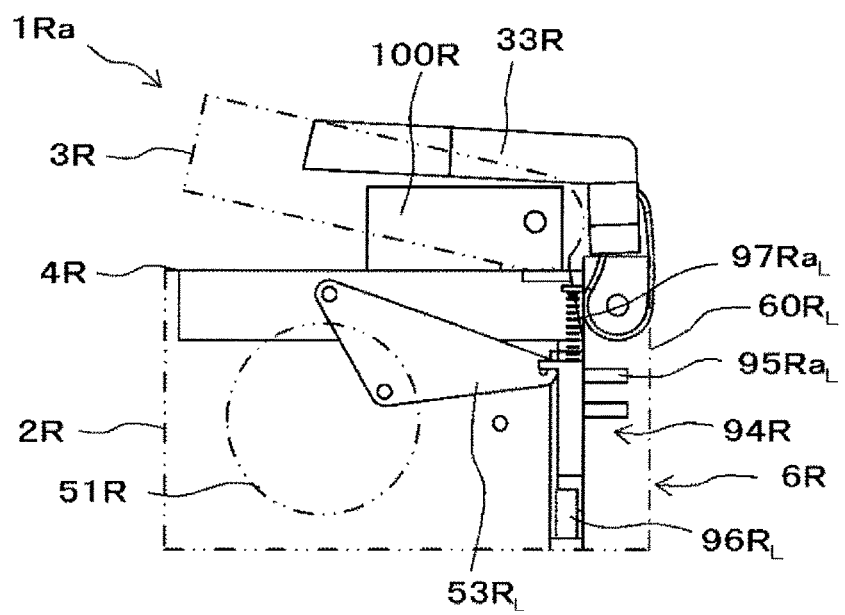
FIG. 92 is a side view illustrating an example of a stapler according to the first embodiment that performs the staple full load detection.
Figure 93:
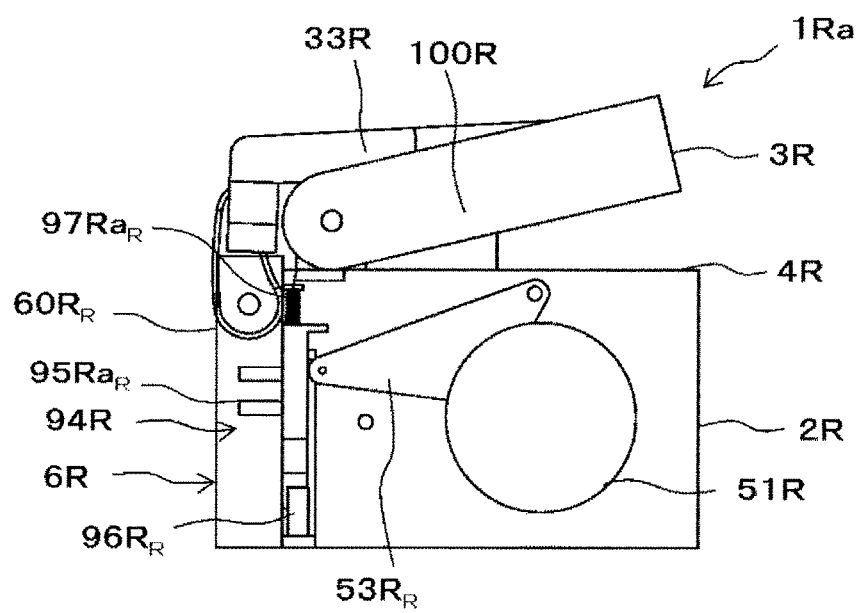
FIG. 93 is a side view illustrating an example of a stapler according to the first embodiment that performs the staple full load detection.
Figure 94:
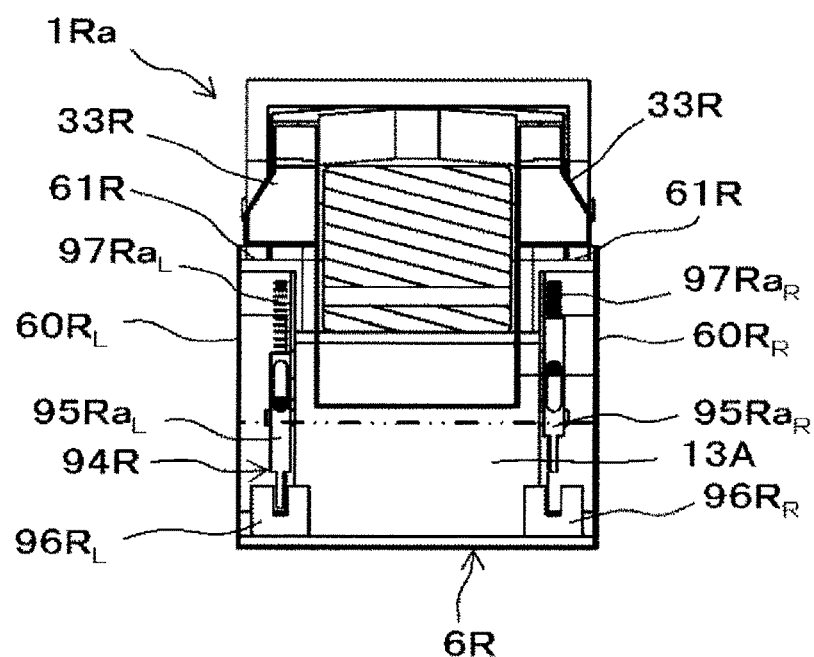
FIG. 94 is a rear view illustrating an example of the stapler of the first embodiment that performs the staple full load detection.
Figure 95:
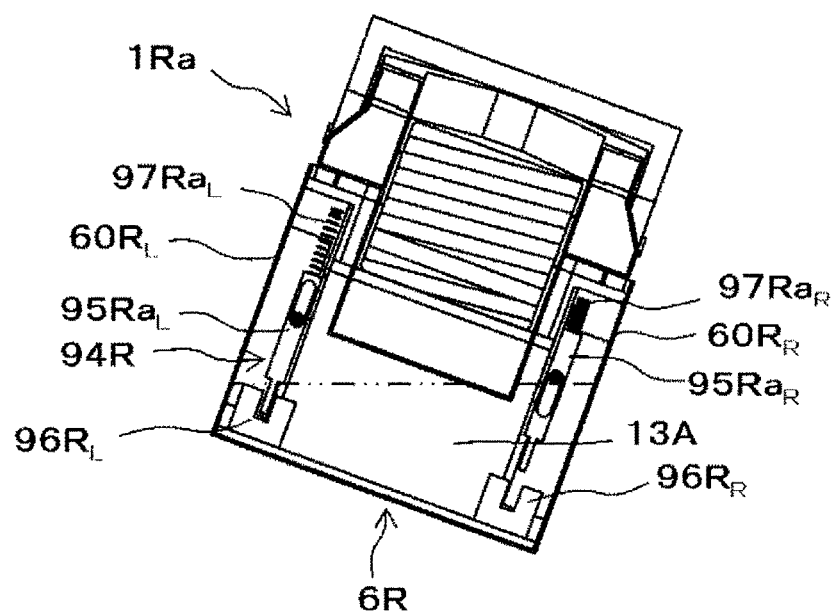
FIG. 95 is a configuration diagram illustrating an operation example of the stapler of the first embodiment that performs the cut staple full load detection.

FIGS. 92 and 93 are side views illustrating an example of the stapler of the first embodiment that performs the cut staple full load detection, FIG. 94 illustrates an example of the stapler of the first embodiment that performs the staple full load detection, and FIG. 95 is a configuration diagram illustrating an operation example of the stapler of the first embodiment that performs the cut staple full load detection.

As illustrated in FIGS. 3A and 3B, the stapler 1Ra is provided with a staple ejecting unit 2R which supplies and ejects the staple 10A, and a binding unit 3R that binds the sheet P with the staple 10A, by cutting the staple leg 12A of the staple 10A and by folding the staple leg 12A illustrated in FIG. 3D in cooperation with the staple ejecting unit 2R.

The stapler 1Ra is provided with a sheet pinching unit 4R which pinches the sheet P between the staple ejecting unit 2R and the binding unit 3R. In the stapler 1Ra, the binding unit 3R moves in a direction in which the binding unit 3R comes into contact with and separates from the staple ejecting unit 2R by the rotational operation, and pinches and releases the sheet P by the sheet pinching unit 4R.

The stapler 1Ra includes a cut unit 30R which cuts the staple leg 12A of the staple 10A penetrating the sheet P with a predetermined length, a cut staple storage unit 6R which stores the cut staple 13A cut by the cut unit 30R, and a discharge passage 33R (a discharge unit) which guides the cut staple 13A cut by the cut unit 30R to the cut staple storage unit 6R. In the stapler 1Ra, the feeding unit, the ejecting unit, the clincher unit, and the driving unit of the staple 10A are not illustrated, but the stapler 1Ra may have the same configuration as the stapler 1A of the first embodiment.

The cut staple storage unit 6R is detachably attached to the stapler 1Ra. The cut staple storage unit 6R is detachably attached to the back surface of the staple ejecting unit 2R. The staple cartridge 100R is configured to be attachable to and detachable from the stapler 1Ra in a state in which the cut staple storage unit 6R is attached to the stapler 1Ra.

The discharge passage 33R is provided in the binding unit 3R, communicates with the cut unit 30R, and communicates with the recovery port 61R of the cut staple storage unit 6R. As a result, the cut staple 13A passing from the cut unit 30R through the discharge passage 33R is stored in the cut staple storage unit 6R.

The stapler 1Ra and the post-processing apparatus 502A include a cut staple quantity detection unit 94R. The cut staple quantity detection unit 94R is an example of the cut staple full load detection unit, and includes contact movable units $95Ra_L$ and $95Ra_R$, sensors $96R_L$ and $96R_R$ for detecting the contact movable units $95Ra_L$ and $95Ra_R$, and springs $97Ra_L$ and $97Ra_R$ for urging the contact movable units $95Ra_L$ and $95Ra_R$.

The contact movable unit $95Ra_L$ protrudes to one recovery passage $60R_L$ of the cut staple storage unit 6R from the side, and is provided so as to be movable in the vertical direction along the stacking direction of the cut staple 13A. The contact movable unit $95Ra_L$ is pressed downward by the spring $97Ra_L$. The sensor $96R_L$ detects whether or not the quantity of the cut staple 13A is full, by detecting the presence or absence of the contact movable unit $95Ra_L$. In this example, the sensor $96R_L$ is located at a position of detecting the contact movable unit $95Ra_L$ moved to the non-full load position.

The contact movable unit $95Ra_R$ projects laterally from the other recovery passage $60R_R$ of the cut staple storage unit 6R, and is provided so as to be movable in the vertical direction along the stacking direction of the cut staple 13A. The contact movable unit $95Ra_R$ is pressed downward by the spring $97Ra_R$. The sensor 96R detects whether or not the quantity of the cut staple 13A is full, by detecting the presence or absence of the contact movable unit $95Ra_R$. In this example, the sensor 96R is provided at a position of detecting the contact movable unit $95Ra_R$ moved to the non-full load position.

The operation of the cam 51R forming the driving unit for pinching the sheet, driving the staple, and clinching is transmitted via the link unit $53R_L$, and the contact movable unit $95Ra_L$ is raised by the operation of the cam 51R. The operation of the cam 51R forming the driving unit for pinching the sheet, driving the staple, and clinching is transmitted via the link unit $53R_R$, and the contact movable unit $95Ra_R$ is raised by the operation of the cam 51R.

<Example of Operational Effect of Stapler of First Embodiment Performing Detection of Cut Staple Full Load Detection>

In the stapler 1Ra, when the cam 51R is rotated by the operation of binding the sheet with the staple, the contact movable unit $95Ra_L$ moves up and down by the operation of the link unit $53R_L$, and the contact movable unit $95Ra_R$ moves up and down by the operation of the link unit $53R_R$.

When the quantity of the cut staple 13A stored in the cut staple storage unit 6R is small, the contact movable unit $95Ra_L$ is pressed downward by the spring $97Ra_L$, is moved to the non-full load detection position, and is detected by the sensor $96R_L$. The contact movable unit $95Ra_R$ is pressed downward by a spring $97Ra_R$, is moved to the non-full load detection position, and is detected by the sensor 96R. Therefore, it is possible to detect that the quantity of the cut staple 13A is not full.

When the quantity of the cut staple 13A stored in the cut staple storage unit 6R is full, the contact movable unit $95Ra_L$ cannot descend to the non-full load detection position, stops at the raised position, and is not detected by the sensor $96R_L$. In addition, the contact movable unit $95Ra_R$ cannot descend to the non-full load detection position, stops at the raised position and is not detected by the sensor 96R. Therefore, it is possible to detect that the quantity of the cut staple 13A is full. Upon detecting that the quantity of the cut staple 13A is full, the stapler 1Ra reports this situation to the post-processing apparatus 502A illustrated in FIG. 2 or the like, or notifies this situation to a user or the like, by an operation display unit (not illustrated) from the image forming apparatus 501A which receives the notification from the post-processing apparatus 502A. Further, when it is detected that the quantity of the cut staple 13A is full or when it is detected that the quantity of the cut staple is a predetermined quantity smaller than the full load as in other modified examples described later, the remaining quantity of the staple sheet 101A stored in the post-processing apparatus 502A is considered to be small, this situation is notified to the post-processing apparatus 502A, and notification of promoting the preparation or replenishment of the preparatory staple sheet 101A to a user by an operation display unit (not illustrated) from the post-processing apparatus 502A or the image forming apparatus 501A.

In the post-processing apparatus 502A described with reference to FIG. 2 and the like, the stapler 1Ra is in a tilted state as illustrated in FIG. 95, depending on the position of the stapler 1Ra. In such a case, in this example, the loading height of the cut staple 13A is lowered on the one recovery passage $60R_L$ side of the cut staple storage unit 6R. Therefore, the contact movable unit $95Ra_L$ descends to the non-full load detection position and is detected by the sensor $96R_L$. On the other hand, on the other recovery passage $60R_R$ side of the cut staple storage unit 6R, the loading height of the cut staple 13A rises. Therefore, the contact movable unit $95Ra_R$ cannot descend to the non-full load detection position, stops at the raised position, and is not detected by the sensor 96R. Therefore, even when the stapler 1Ra is inclined, it is possible to accurately detect whether or not the quantity of the cut staple 13A is full. That is, along with the inclination of the stapler 1Ra, the direction of the cut staple storage unit 6R also changes, and the loading height of the cut staple 13A changes in accordance with the change in the direction of the cut staple storage unit 6R. The Contact movable unit $95Ra_L$ and the contact movable unit $95Ra_R$ detect the quantity of the cut staple 13A in accordance with the loading height of the changing cut staple 13A.

By providing the sensors $96R_L$ and $96R_R$ in the post-processing apparatus 502A, unless the cut staple storage unit 6R is attached to the stapler 1Ra, the contact movable units $95Ra_L$ and $95Ra_R$ are not detected. This makes it possible to perform the full load detection of the cut staple, the presence or absence of the cut staple storage unit 6R, that is, the detection of attachment and detachment of the cut staple storage unit 6R by the same detection unit.

<Modified Example of Stapler of First Embodiment for Detecting Cut Staple Full Load>

Figure 96:
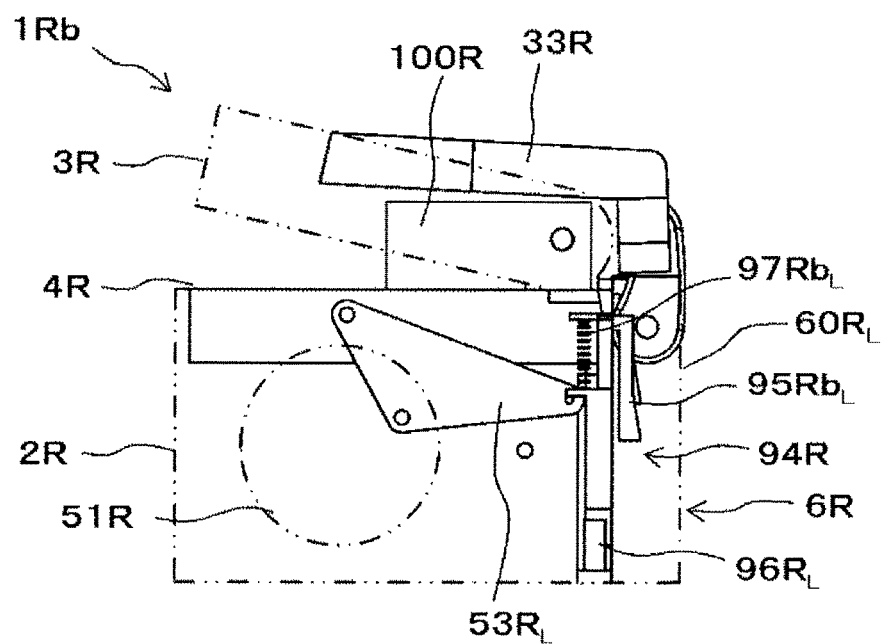
FIG. 96 is a side view illustrating a modified example of the stapler of the first embodiment that performs the cut staple full load detection.
Figure 97:
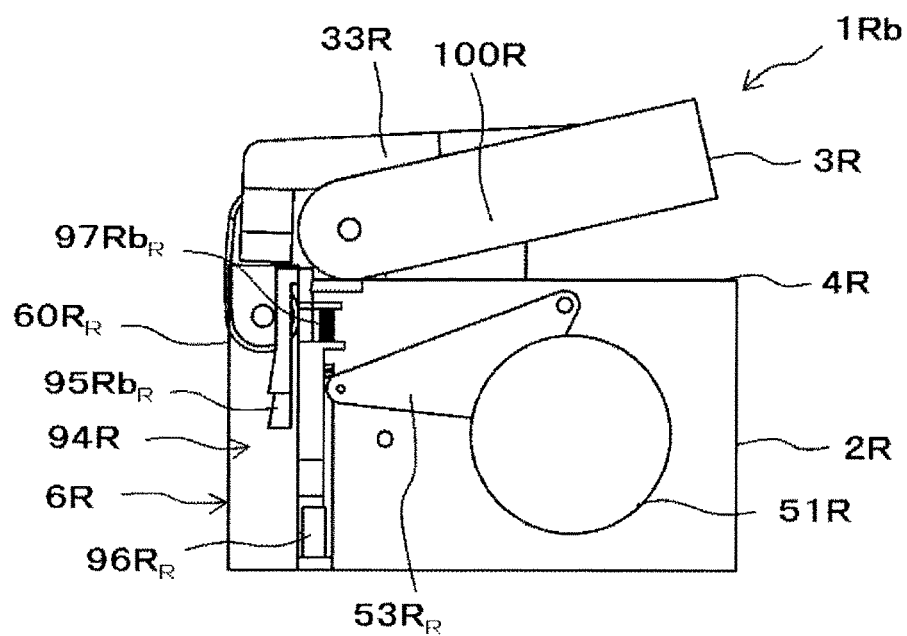
FIG. 97 is a side view illustrating a modified example of the stapler of the first embodiment that performs the staple full load detection.
Figure 98:
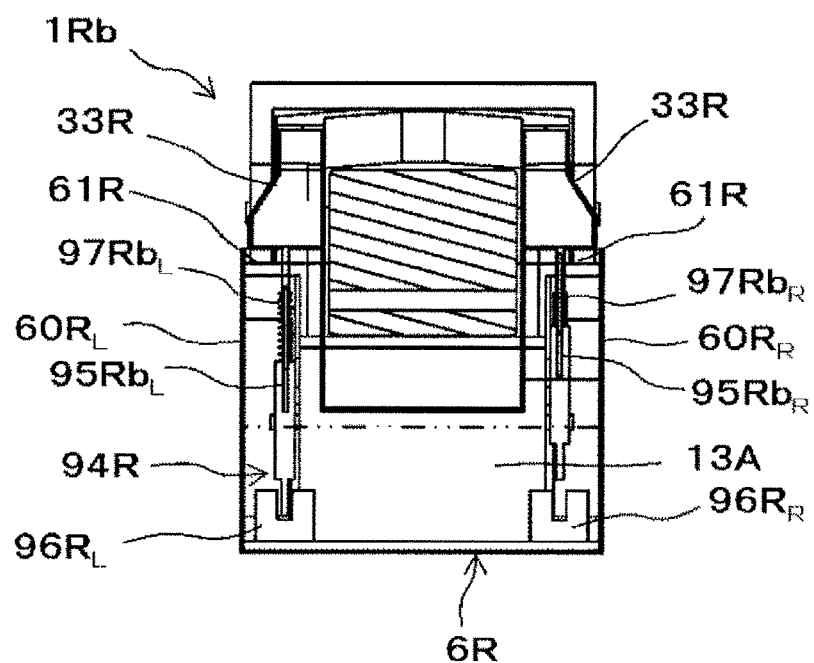
FIG. 98 is a rear view illustrating a modified example of the stapler of the first embodiment that performs the staple full load detection.
Figure 99:
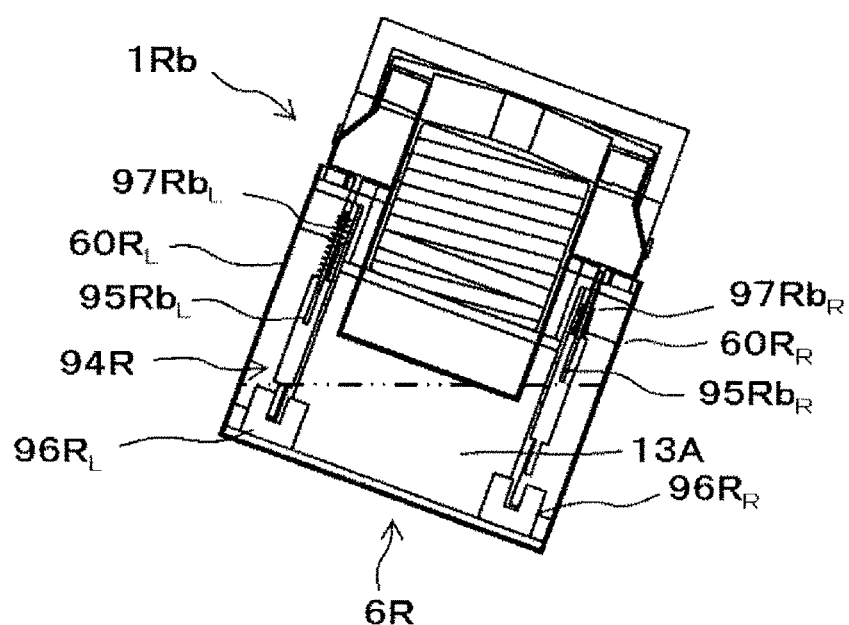
FIG. 99 is a configuration diagram illustrating an operation example of a stapler according to a modified example of the first embodiment that performs the cut staple full load detection.

FIGS. 96 and 97 are side views illustrating modified examples of the stapler of the first embodiment that performs the cut staple full load detection, FIG. 98 is a modified example of the stapler of the first embodiment that performs the cut staple full load detection, and FIG. 99 is a configuration diagram illustrating an operation example of the stapler of the modified example of the first embodiment that performs the cut staple full load detection.

Similarly to the stapler 1Ra, the stapler 1Rb of the modified example includes the staple ejecting unit 2R and the binding unit 3R, and has a sheet pinching unit 4R that pinches the sheet P between the staple ejecting unit 2R and the binding unit 3R.

The stapler 1Rb includes a cut staple quantity detection unit 94R. The cut staple quantity detection unit 94R is an example of a cut staple full load detection unit, and includes contact movable units $95Rb_L$ and $95Rb_R$, sensors $96R_L$ and $96R_R$ for detecting the contact movable units $95Rb_L$ and $95Rb_R$, and springs $97Rb_L$ and $97Rb_R$ for urging the contact movable units $95Rb_L$ and $95Rb_R$.

The contact movable unit $95Rb_L$ enters from the one recovery passages $60R_L$ of the cut staple storage unit 6R from the recovery port 61R and protrudes from above, and is movable in the vertical direction along the stacking direction of the cut staple 13A. The contact movable unit $95Rb_L$ is pressed downward by the spring $97Rb_L$. The sensor $96R_L$ detects whether or not the quantity of the cut staple 13A is full by detecting the presence or absence of the contact movable unit $95Rb_L$. In this example, the sensor $96R_L$ is provided at a position for detecting the contact movable unit $95Rb_L$ that has moved to the non-full load position.

The contact movable unit $95Rb_R$ enters the other recovery passage $60R_R$ of the cut staple storage unit 6R from the recovery port 61R, protrudes from the upper side, and is movable in the vertical direction along the stacking direction of the cut staple 13A. The contact movable unit $95Rb_R$ is pressed downward by the spring $97Rb_R$. The sensor 96R detects whether or not the quantity of the cut staple 13A is full by detecting the presence or absence of the contact movable unit $95Rb_R$. In this example, the sensor 96R is provided at a position for detecting the contact movable unit $95Rb_R$ that has moved to the non-full load position.

The operation of the cam 51R constituting the driving unit for pinching the sheet, driving the staple, and clinching is transmitted to the contact movable unit $95Rb_L$ via the link unit $53R_L$, and the contact movable unit $95Rb_L$ is moved up and down by the operation of the cam 51R. The operation of the cam 51R constituting the driving unit for pinching the sheet, driving the staple, and clinching is transmitted to the contact movable unit $95Rb_R$ via the link unit $53R_R$, and the contact movable unit $95Rb_R$ is moved up and down by the operation of the cam 51R.

<Example of Operational Effect of Stapler of Modified Example of First Embodiment for Detecting Cut Staple Full Load>

In the stapler 1Rb, when the cam 51R is rotated by the operation of binding the sheet with the staple, the contact movable unit $95Rb_L$ moves up and down by the operation of the link unit $53R_L$ and the contact movable unit $95Rb_R$ moves up and down by the operation of the link unit $53R_R$.

When the quantity of the cut staple 13A stored in the cut staple storage unit 6R is small, the contact movable unit $95Rb_L$ is pressed downward by the spring $97Rb_L$, is and moved to the non-full load detection position, and is detected by the sensor $96R_L$. Further, the contact movable unit $95Rb_R$ is formed by a spring $97Rb_R$, is moved to the non-full load detection position, and is detected by the sensor 96R. Therefore, it is possible to detect that the quantity of the cut staple 13A is not full.

When the quantity of the cut staple 13A stored in the cut staple storage unit 6R is full, the contact movable unit $95Rb_L$ cannot descend to the non-full load detection position, stops at the raised position, and is not detected by the sensor $96R_L$. Further, the contact movable unit $95Rb_R$ cannot descend to the non-full load detection position, stops at the raised position, and is not detected by the sensor 96R. Therefore, it is possible to detect that the quantity of the cut staple 13A is full.

In the post-processing apparatus 502A described with reference to FIG. 2 and the like, depending on the position of the stapler 1Rb, the stapler 1Rb is inclined as illustrated in FIG. 99. In such a case, in this example, the loading height of the cut staple 13A is lowered on the side of the recovery passage $60R_L$ of the cut staple storage unit 6R. Therefore, the contact movable unit $95Rb_L$ descends to the non-full load detection position and is detected by the sensor $96R_L$. On the other hand, on the other recovery passage $60R_R$ side of the cut staple storage unit 6R, the loading height of the cut staple 13A increases. Therefore, the contact movable unit $95Rb_R$ cannot descend to the non-full load detection position, stops at the raised position, and is not detected by the sensor 96R. Therefore, even when the stapler 1Rb is inclined, it is possible to accurately detect whether or not the quantity of the cut staple 13A is full.

<Another Modified Example of Stapler According to First Embodiment Performing Cut Staple Full Load Detection>

Figure 100:
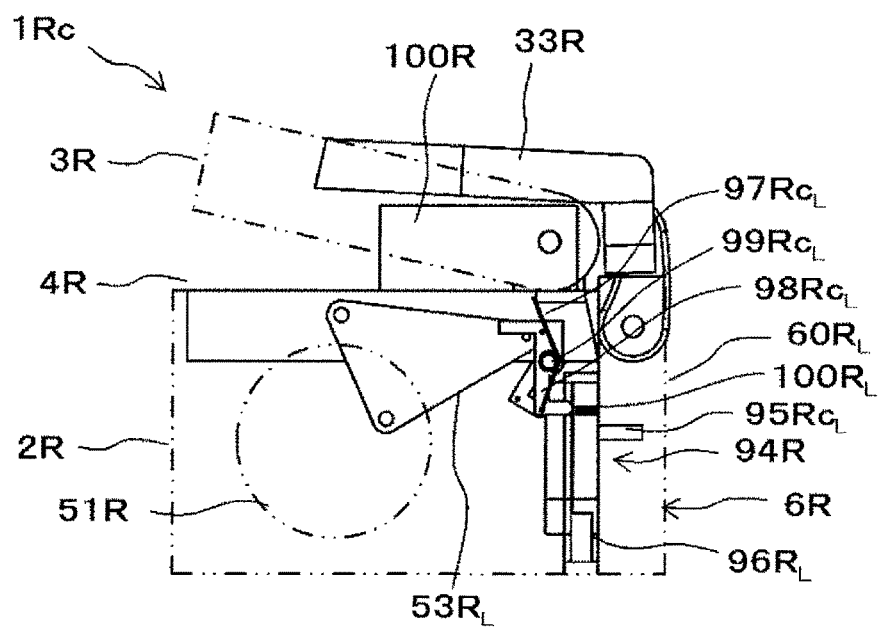
FIG. 100 is a side view illustrating another modified example of the stapler of the first embodiment that performs the cut staple full load detection.
Figure 101:
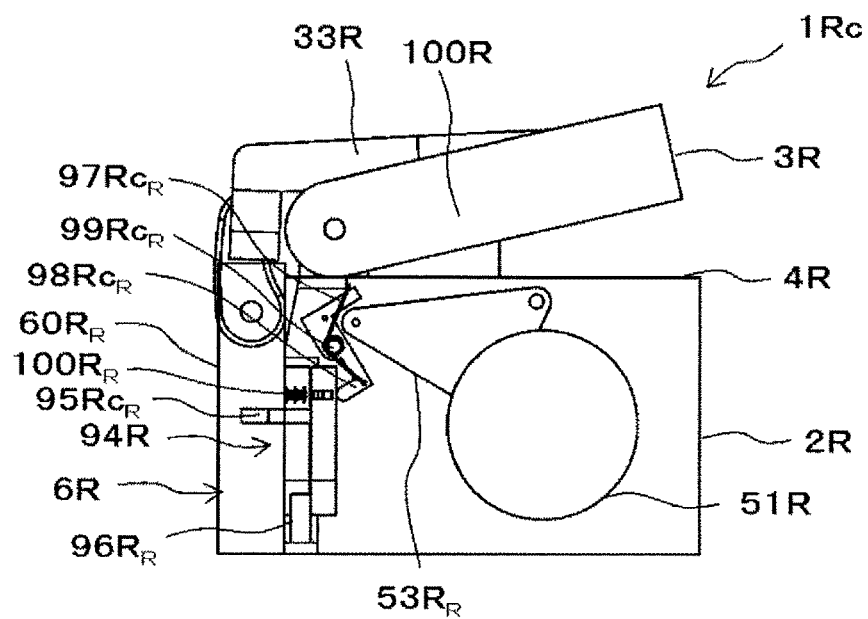
FIG. 101 is a side view illustrating another modified example of the stapler of the first embodiment that performs the cut staple full load detection.
Figure 102:
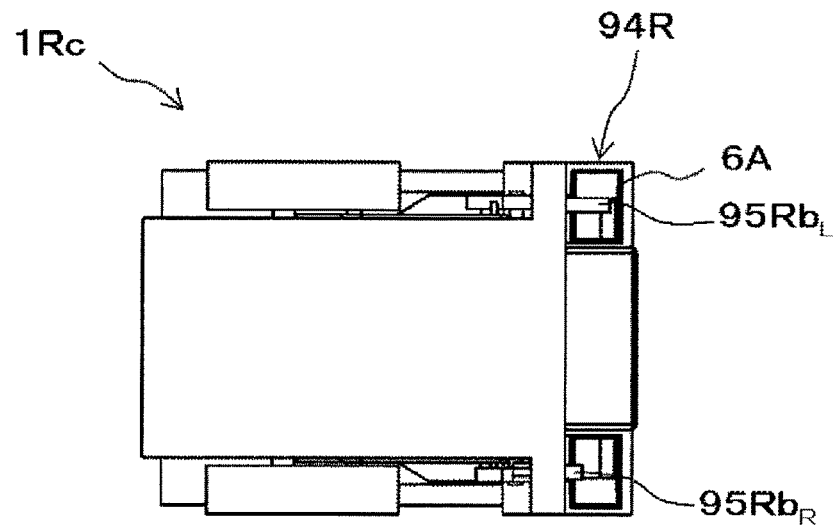
FIG. 102 is a bottom view illustrating another modified example of the stapler of the first embodiment that performs the cut staple full load detection.
Figure 103:
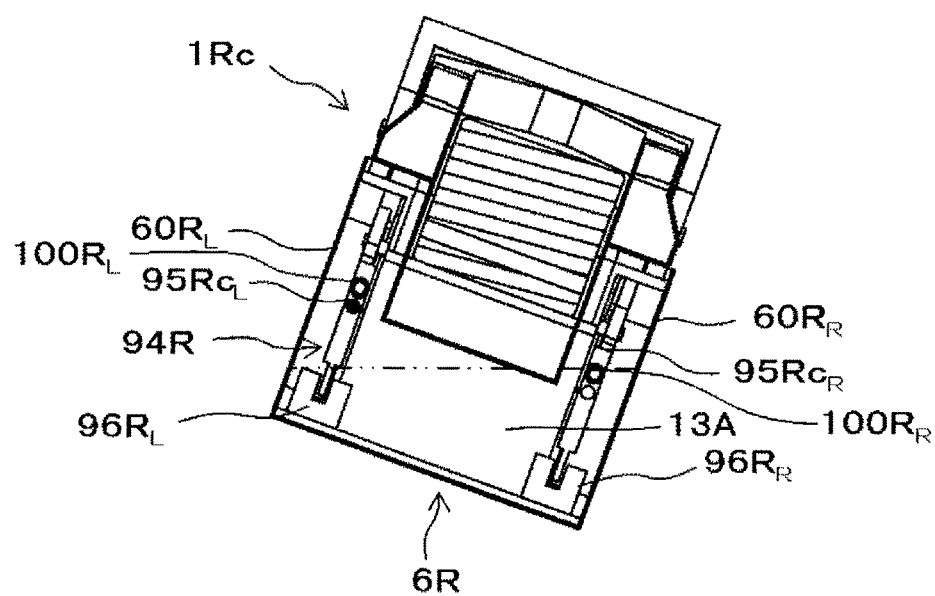
FIG. 103 is a configuration diagram illustrating an operation example of a stapler of another modified example of the first embodiment that performs the cut staple full load detection.

FIGS. 100 and 101 are side views illustrating another modified example of the stapler of the first embodiment that performs the cut staple full load detection, FIG. 102 is a side view of another modified example of the stapler of the first embodiment, and FIG. 103 is a configuration diagram illustrating an operation example of a stapler according to another modified example of the first embodiment that performs the cut staple full load detection.

Similarly to the stapler 1Ra, the stapler 1Rc of another modified example includes a staple ejecting unit 2R and a binding unit 3R, and a sheet pinching unit 4R which pinches the sheet P between the staple ejecting unit 2R and the binding unit 3R.

The stapler 1Rc includes a cut staple quantity detection unit 94R. The cut staple quantity detection unit 94R is an example of a cut staple full load detection unit, and includes contact movable units $95Rc_L$ and $95Rc_R$, sensors $96R_L$ and $96R_R$ for detecting the contact movable units $95Rc_L$ and $95Rc_R$, links $98Rc_L$ and $98Rc_R$ for displacing the contact movable units $95Rc_L$ and $95Rc_R$, and springs $97Rc_L$ and $97Rc_R$ for urging the contact movable units $95Rc_L$ and $95Rc_R$ via the links $98Rc_L$ and $98Rc_R$.

The contact movable unit $95Rc_L$ protrudes from the side to from the one recovery passage $60R_L$ of the cut staple storage unit 6R and is movable in the front-rear direction. The link $98Rc_L$ rotates around the shaft $99Rc_L$ as a fulcrum, and moves the contact movable unit $95Rc_L$ in the front-rear direction. The contact movable unit $95Rc_L$ is pushed rearward by the spring $97Rc_L$ via the link $98Rc_L$. The sensor $96R_L$ detects whether or not the quantity of the cut staple 13A is full, by detecting the presence or absence of the contact movable unit $95Rc_L$. In this example, the sensor $96R_L$ is provided at a position which detects the contact movable unit $95Rc_L$ that has moved to the non-full load position.

The contact movable unit $95Rc_R$ protrudes from the side of the other recovery passage $60R_R$ of the cut staple storage unit 6R and is movable in the front-rear direction. The link $98Rc_R$ rotates about the shaft $99Rc_R$ as a fulcrum, and moves the contact movable unit $95Rc_R$ in the front-rear direction. The contact movable unit $95Rc_R$ is pressed rearward by the spring $97Rc_R$ via the link $98Rc_R$. The sensor 96R detects whether or not the quantity of the cut staple 13A is full, by detecting the presence or absence of the contact movable unit $95Rc_R$. In this example, the sensor 96R detects the contact movable unit $95Rc_R$ that has moved to the non-full load position.

The operation of the cam 51R constituting the driving unit for pinching the sheet, driving the staple, and clinching is transmitted to the contact movable unit $95Rc_L$ via the link unit $53R_L$ and the link $98Rc_L$, and the contact movable unit $95Rc_L$ is moved forward and backward by the operation of the cam 51R. That is, when the link $98Rc_L$ is rotated by the cam 51R and the link unit $53R_L$, the contact movable unit $95Rc_L$ moves by being pressed forward by the spring $100R_L$. The spring force of the spring $97Rc_L$ is provided to be larger than the spring force of the spring $100R_L$. When the cam 51R returns to the standby position, the contact movable unit $95Rc_L$ stands by in the rear part by the spring force of the spring $100R_L$. The operation of the cam 51R constituting the driving unit for pinching the sheet, driving up the staple, and clinching is transmitted to the contact movable unit $95Rc_R$ via the link unit $53R_R$ and the link $98Rc_R$, and the contact movable unit $95Rc_R$ moves backward and forward by the operation of the cam 51R. That is, when the link $98Rc_R$ is rotated by the cam 51R and the link unit $53R_R$, the contact movable unit $95Rc_R$ moves by being is pressed forward by the spring $100R_R$. The spring force of the spring $97Rc_R$ is provided to be larger than the spring force of the spring $100R_R$. When the cam 51R returns to the standby position, the contact movable unit $95Rc_R$ stands by in the rear part by the spring force of the spring $100R_R$.

<Example of Operational Effect of Stapler of Another Modified Example of First Embodiment that Performs Cut Staple Full Load Detection>

In the stapler 1RC, when the cam 51R rotates in the operation of binding the sheet with the staple, the contact movable unit $95Rc_L$ moves in the front-rear direction, and the contact movable unit $95Rc_R$ moves in the front-rear direction by the operation of the link unit $53R_R$.

When the quantity of the cut staple 13A stored in the cut staple storage unit 6R is small, the contact movable unit $95Rc_L$ is pressed rearward by the spring $97Rc_L$, is moved to the non-full load detection position, and is detected by the sensor $96R_L$.

The contact movable portion $95Rc_R$ is pressed rearward by the spring $97Rc_R$, is moved to the non-full load detection position, and is detected by the sensor 96R. Therefore, it is possible to detect that the quantity of the cut staple 13A is not full.

When the quantity of the cut staple 13A stored in the cut staple storage unit 6R is full, the contact movable unit $95Rc_L$ cannot move to the non-full load detection position, stops at the position moved forward, and is not detected by the sensor $96R_L$. Further, the contact movable unit $95Rc_R$ cannot move to the non-full load detection position, stops at the position moved forward, and is not detected by the sensor 96R. Therefore, it is possible to detect that the quantity of the cut staple 13A is full.

In the post-processing apparatus 502A described with reference to FIG. 2 and the like, depending on the position of the stapler 1Rd, the stapler 1Rc is inclined as illustrated in FIG. 103. In such a case, in this example, the loading height of the cut staple 13A is lowered on the side of one recovery passage $60R_L$ of the cut staple storage unit 6R.

Therefore, the contact movable unit $95Rc_L$ moves to the non-full load detection position and is detected by the sensor $96R_L$. On the other hand, on the other recovery passage $60R_R$ side of the cut staple storage unit 6R, the loading height of the cut staple 13A rises. Therefore, the contact movable unit $95Rc_R$ cannot move to the non-full load detection position, stops at the position moved forward, and is not detected by the sensor 96R. Therefore, even when the stapler 1Rc is inclined, it is possible to accurately detect whether or not the quantity of the cut staple 13A is full.

<Configuration Example of Stapler of Second Embodiment for Detecting Cut Staple Full Load>

Figure 104:
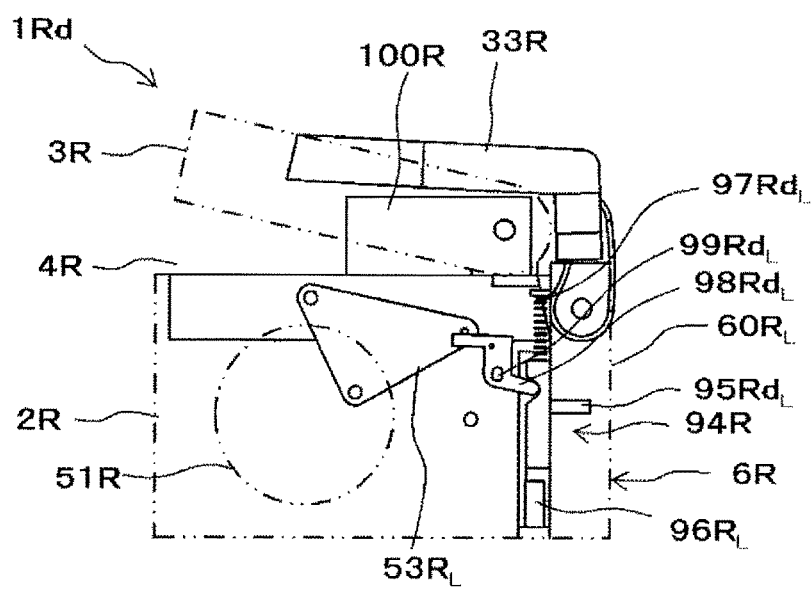
FIG. 104 is a side view illustrating an example of a stapler according to a second embodiment that performs the cut staple full load detection.
Figure 105:
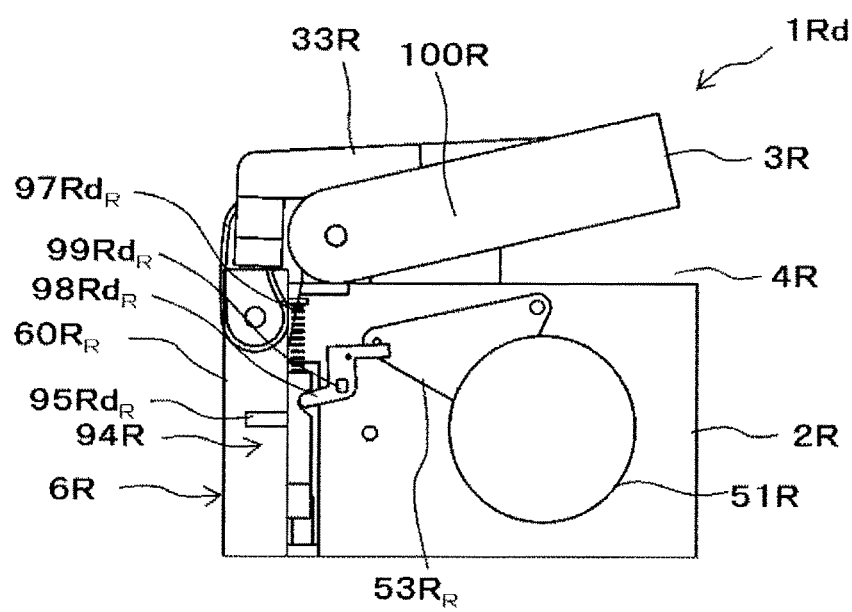
FIG. 105 is a side view illustrating an example of a stapler according to a second embodiment of the present disclosure in which the cut staple full load detection is performed.
Figure 106:
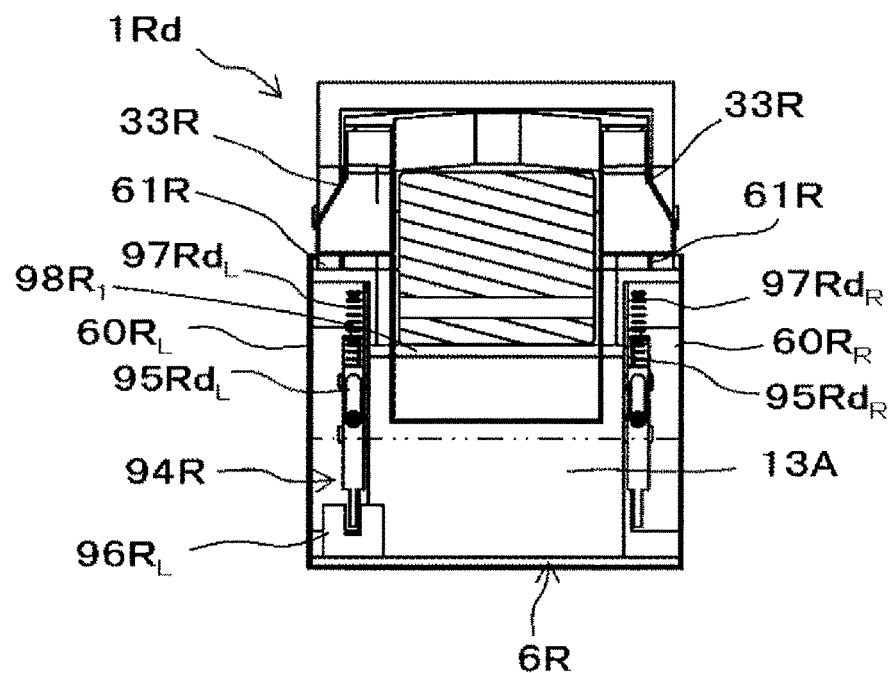
FIG. 106 is a rear view illustrating an example of a stapler according to a second embodiment of the present disclosure in which the cut staple full load detection is performed.

FIGS. 104 and 105 are side views illustrating an example of a stapler according to a second embodiment that performs the cut staple full load detection, FIG. 106 illustrates an example of a stapler according to a second embodiment that performs the cut staple full load detection, and FIGS. 107 to 111 are configuration diagrams illustrating an operation example of the stapler of the second embodiment that performs the cut staple full load detection.

Like the stapler 1Ra, the stapler 1Rd includes a staple ejecting unit 2R, a binding unit 3R, and a sheet pinching unit 4R which pinches the sheet P between the staple ejecting unit 2R and the binding unit 3R.

The stapler 1Rd includes a cut staple quantity detection unit 94R. The cut staple quantity detection unit 94R is an example of the cut staple full load detection unit, and includes contact movable units $95Rd_L$ and $95Rd_R$, a sensor $96R_L$ for detecting the contact movable unit $95Rd_L$, links $98Rd_L$ and $98Rd_R$ for displacing the contact movable units $95Rd_L$ and $95Rd_R$, and springs $97Rd_L$ and $97Rd_R$ for biasing the movable contact portions $95Rd_L$ and $95Rd_R$.

The contact movable unit $95Rd_L$ protrudes from the side to from the one recovery passage $60R_L$ of the cut staple storage unit 6R and is provided so as to be movable in the vertical direction along the stacking direction of the cut staple 13A. The link $98Rd_L$ rotates about the shaft $99Rd_L$ as a fulcrum, and moves the contact movable unit $95Rd_L$ in the vertical direction. The contact movable unit $95Rd_L$ is pressed downward by the spring $97Rd_L$. The sensor $96R_L$ detects whether or not the quantity of the cut staple 13A is full by detecting the presence or absence of the contact movable unit $95Rd_L$. In this example, the sensor $96R_L$ is provided at a position for detecting the contact movable unit $95Rd_L$ moved to the non-full load position.

The contact movable unit $95Rd_R$ protrudes from the side to from the other recovery passage $60R_R$ of the cut staple storage unit 6R and is movable in the vertical direction along the stacking direction of the cut staple 13A. The link $98Rd_R$ rotates about the shaft $99Rd_R$ as a fulcrum, and moves the contact movable unit $95Rd_R$ in the vertical direction. The contact movable unit $95Rd_R$ is pressed downward by the spring $97Rd_R$.

The operation of the cam 51R constituting the driving unit for pinching the sheet, driving the staple, and clinching is transmitted to the contact movable unit $95Rd_L$ via the link unit $53R_L$ and the link $98Rd_L$, and the contact movable unit $95Rd_L$ moves upward and downward by the operation of the cam 51R. The operation of the cam 51R constituting the driving unit for pinching the sheet, ejecting the staple, and clinching is transmitted to the contact movable unit $95Rd_R$ via the link unit $53R_R$ and the link $98Rd_R$, and moves upward and downward by the operation of the cam 51R. The link $98Rd_L$ and the link $98Rd_R$ are connected and linked by a shaft $98R_1$.

<Example of Operational Effect of Stapler of Second Embodiment that Performs the Cut Staple Full Load Detection>

In the stapler 1Rd, when the quantity of the cut staple 13A stored in the cut staple storage unit 6R is small, the contact movable unit $95Rd_L$ is pressed downward by the spring $97Rd_L$, is moved to the non-full load detection position and is detected by the sensor $96R_L$. Further, since the link $98Rd_L$ and the link $98Rd_R$ are linked with each other by the shaft $98R_1$, the contact movable unit $95Rd_R$ is pressed downward by the spring $97Rd_R$, and moves to the non-full load detection position. Therefore, it is possible to detect that the quantity of the cut staple 13A is not full.

Figure 107:
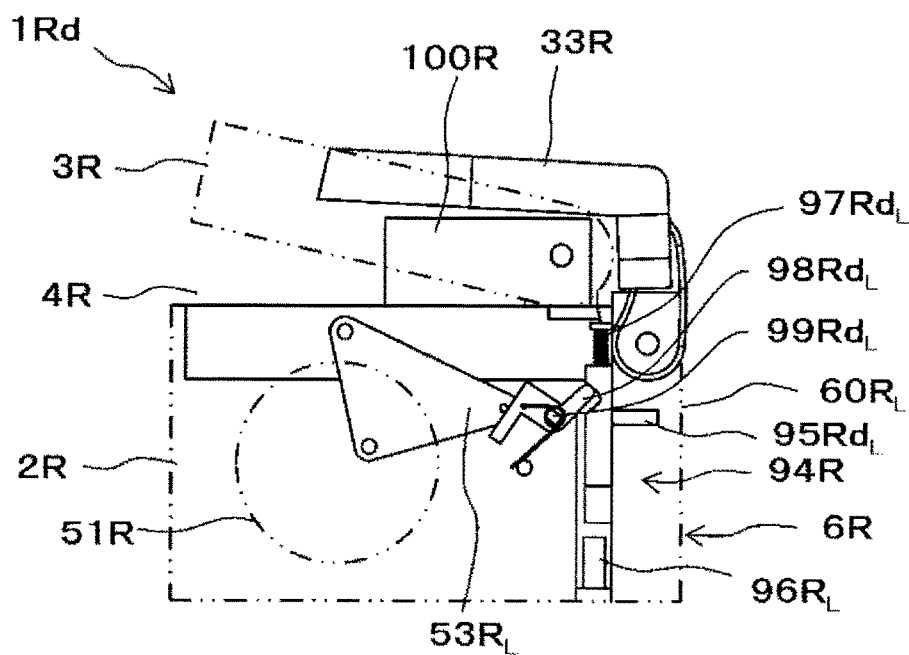
FIG. 107 is a configuration diagram illustrating the operation example of the stapler according to the second embodiment that performs the cut staple full load detection.
Figure 108:
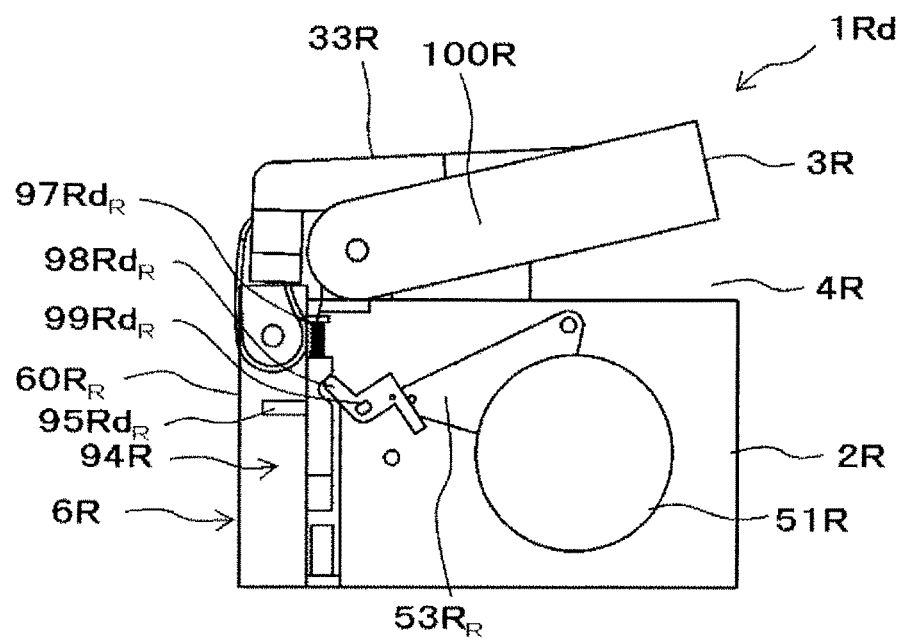
FIG. 108 is a configuration diagram illustrating an operation example of the stapler of the second embodiment that performs the cut staple full load detection.

When the cam 51R is rotated by the operation of binding the sheet with the staple, as illustrated in FIG. 107, the contact movable unit $95Rd_L$ rises by the operation of the link unit $53R_L$ and the link $98Rd_L$. Furthermore, as illustrated in FIG. 108, the contact movable unit $95Rd_R$ rises by the operation of the link unit $53R_R$ and the link $98Rd_R$.

Figure 109:
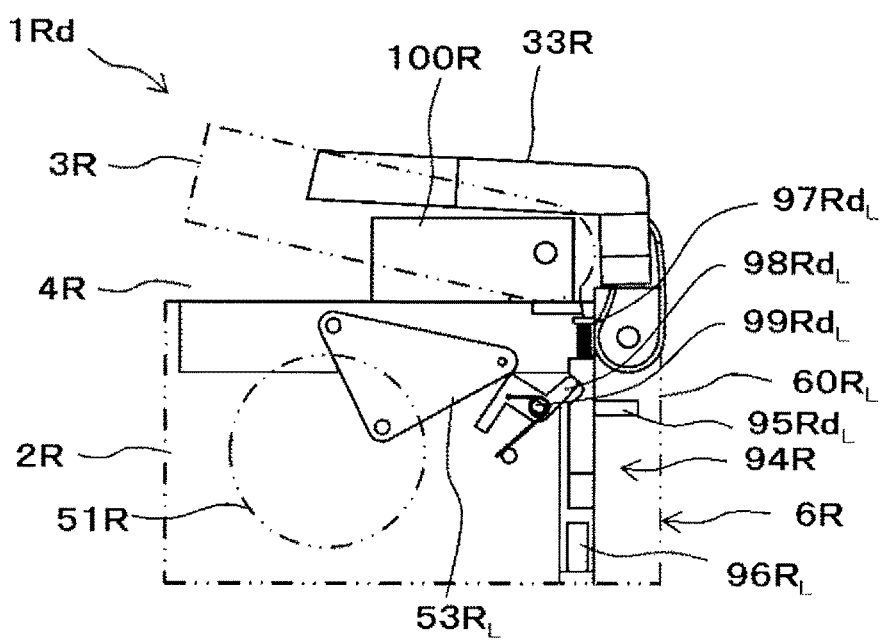
FIG. 109 is a configuration diagram illustrating the operation example of the stapler according to the second embodiment that performs the cut staple full load detection.
Figure 110:
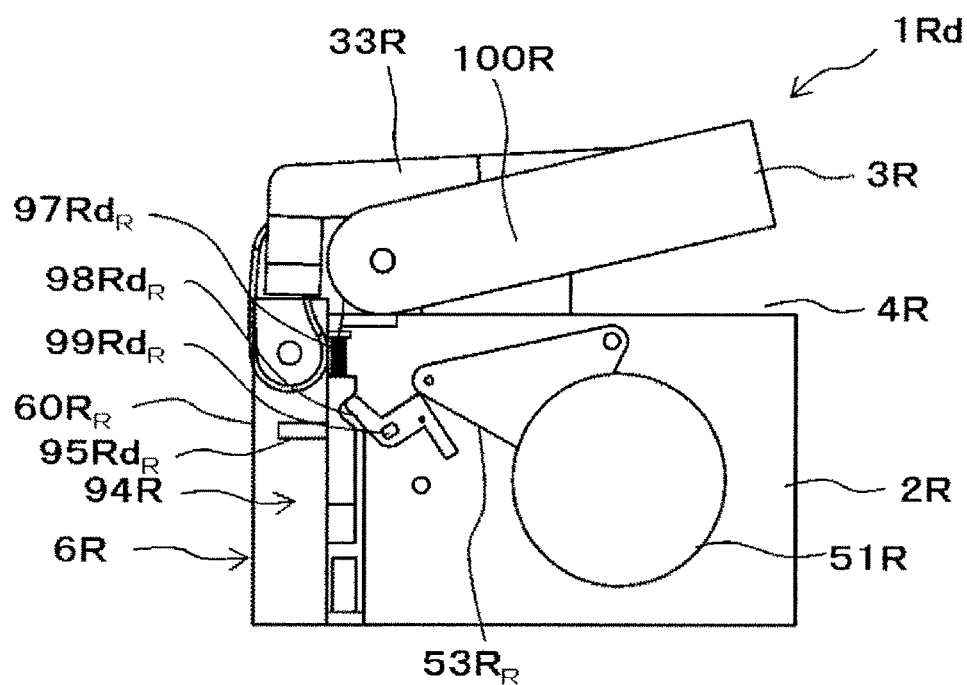
FIG. 110 is a configuration diagram illustrating the operation example of the stapler according to the second embodiment that performs the staple full load detection.

When the cam 51R is further rotated by the operation of binding the sheet with the staple, if the quantity of the cut staple 13A stored in the cut staple storage unit 6R is full, as illustrated in FIG. 109, the contact movable unit $95Rd_L$ stops at the position moved upward without moving downward to the non-full load detection position, and is not detected by the sensor $96R_L$. Also, as illustrated in FIG. 110, the contact movable unit $95Rd_R$ stops at the position moved upward without moving downward to the non-full load detection position. Therefore, it is possible to detect that the quantity of the cut staple 13A is full.

Figure 111:
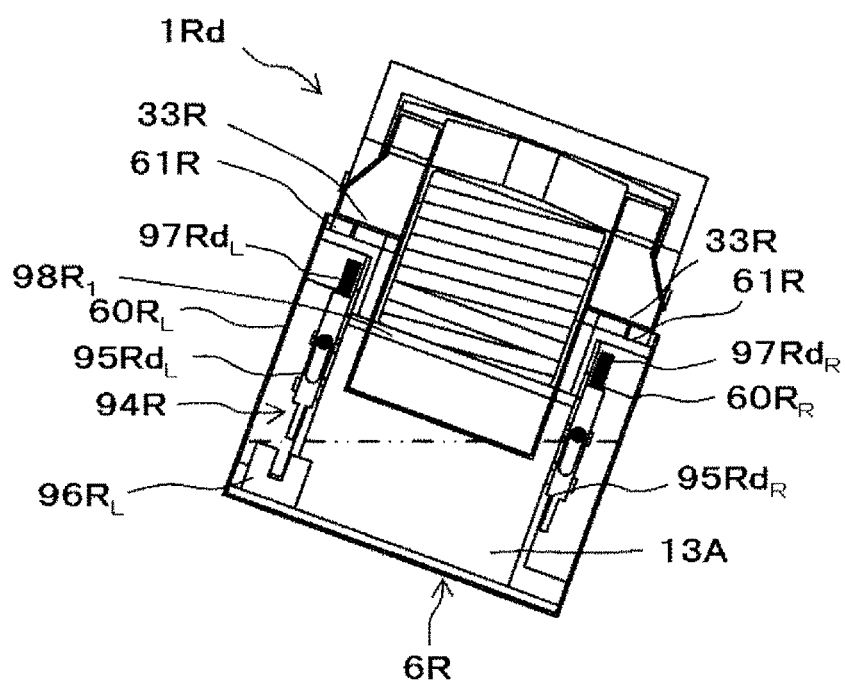
FIG. 111 is a configuration diagram illustrating the operation example of the stapler according to the second embodiment that performs the cut staple full load detection.

In the post-processing apparatus 502A described with reference to FIG. 2 and the like, depending on the position of the stapler 1Rd, the stapler 1Rd is in a tilted state as illustrated in FIG. 111. In such a case, in this example, on the recovery passage $60R_R$ side of the cut staple storage unit 6R, the loading height of the cut staple 13A becomes higher. Therefore, the contact movable unit $95Rd_R$ stops at the position moved upward without moving to the non-full load detection position.

In contrast, the loading height of the cut staple 13A decreases on the recovery passage $60R_L$ side of the cut staple storage unit 6R. However, since the link $98Rd_L$ and the link $98Rd_R$ are connected and linked by the shaft $98R_1$, irrespective of the loading height of the cut staple 13A, the contact movable unit $95Rd_L$ stops at the position moved upward without moving to the non-full load detection position, and is not detected by the sensor $96R_L$. This makes it possible to accurately detect whether or not the quantity of the cut staple 13A is full by a single sensor, regardless of the direction of the inclination of the stapler 1Rd.

<Modified Example of Stapler of Second Embodiment for Detecting Cut Staple Full Load>

Figure 112:
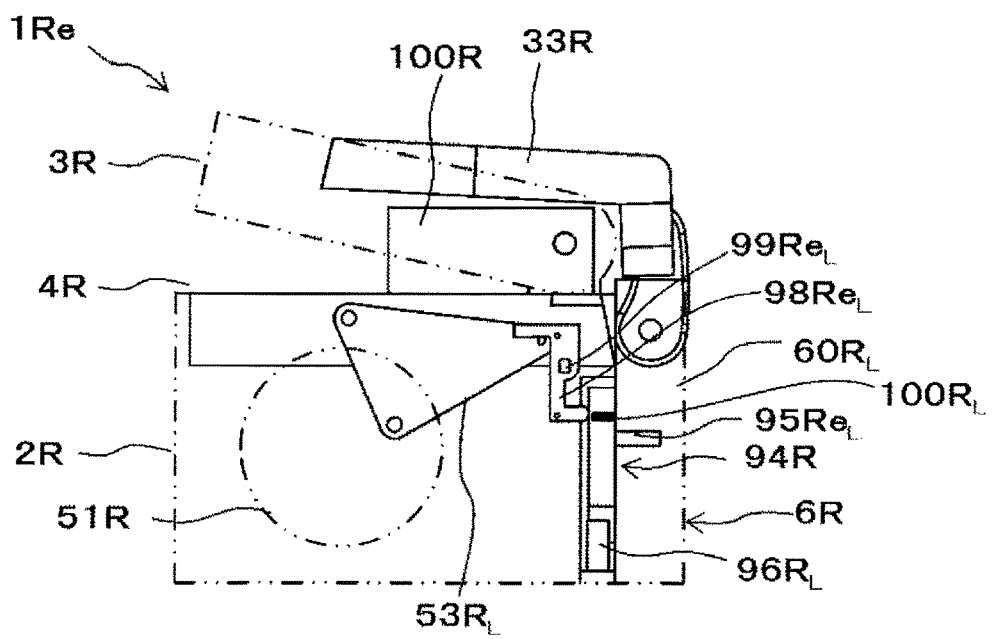
FIG. 112 is a side view illustrating a modified example of the stapler of the second embodiment that performs the cut staple full load detection.
Figure 113:
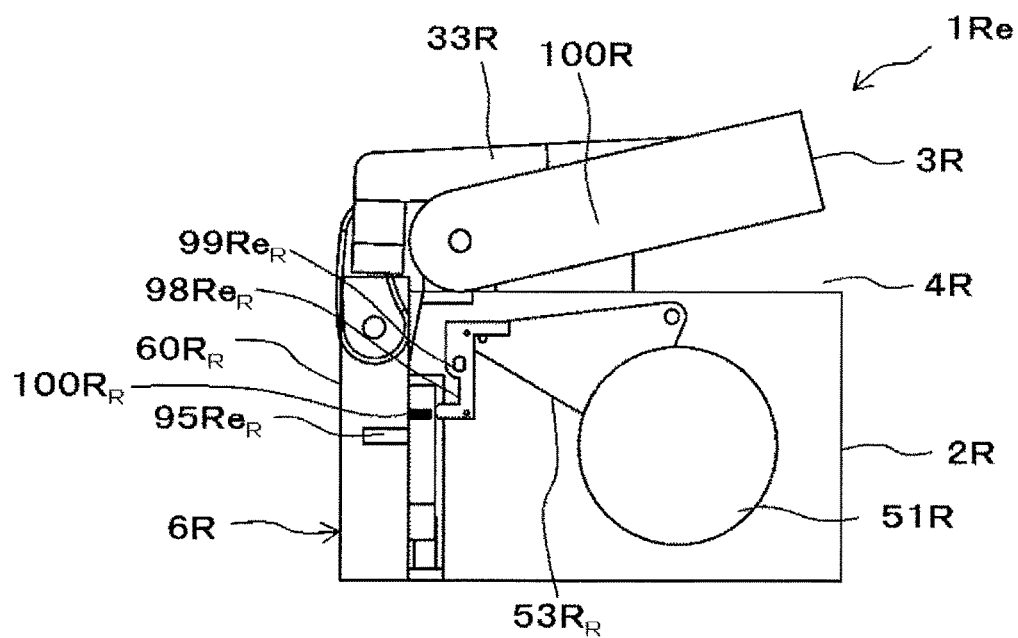
FIG. 113 is a side view illustrating a modified example of the stapler of the second embodiment that performs the staple full load detection.
Figure 114:
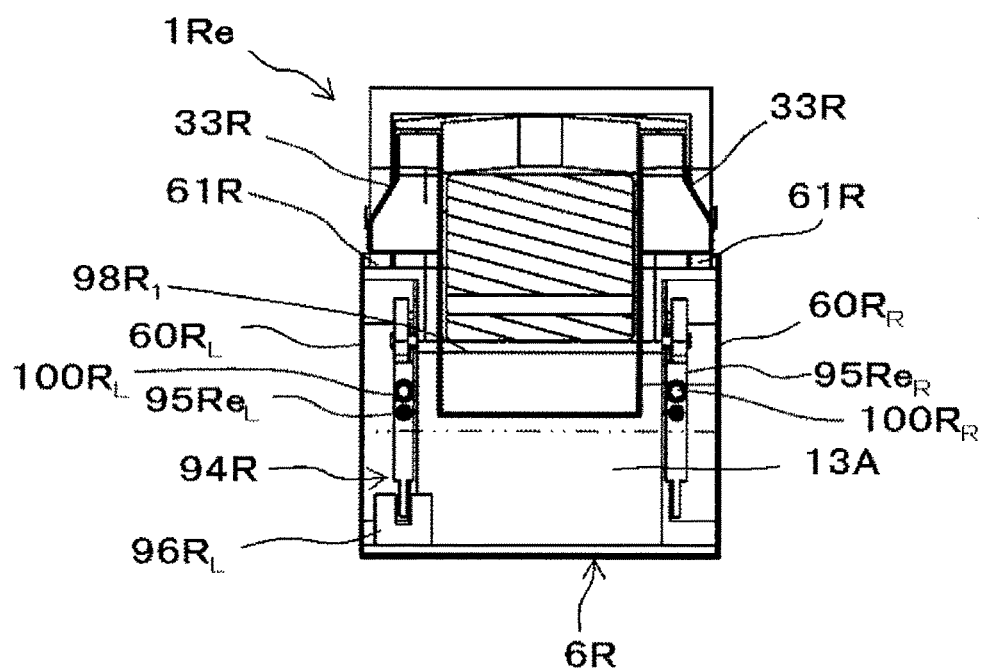
FIG. 114 is a rear view illustrating a modified example of the stapler of the second embodiment that performs the cut staple full load detection.

FIGS. 112 and 113 are side views illustrating modified examples of the stapler of the second embodiment that performs the cut staple full load detection, FIG. 114 illustrates a modified example of the stapler of the second embodiment that performs the full staple load detection, and FIGS. 115 to 119 are configuration diagrams illustrating an operation example of a stapler according to a modified example of the second embodiment that performs the cut staple full load detection.

Like the stapler 1Ra, the stapler 1Re includes a staple ejecting unit 2R and a binding unit 3R, and a sheet pinching unit 4R which pinches the sheet P between the staple ejecting unit 2R and the binding unit 3R.

The stapler 1Rd includes a cut staple quantity detection unit 94R. The cut staple quantity detection unit 94R is an example of the cut staple full load detection unit, and includes contact movable units $95Re_L$ and $95Re_R$, a sensor $96R_L$ for detecting the contact movable unit $95Re_L$, links $98Re_L$ and $98Re_R$ for displacing the contact movable units $95Re_L$ and $95Re_R$, and Springs $97Re_L$ and $97Re_R$ for biasing the contact movable units $95Re_L$ and $95Re_R$ via the links $98Re_L$ and $98Re_R$.

The contact movable unit $95Re_L$ protrudes from the side to from one recovery passage $60R_L$ of the cut staple storage unit 6R and is movable in the front-rear direction. The link $98R_L$ rotates about the shaft $99Re_L$ as a fulcrum, and moves the contact movable unit $95Re_L$ in the front-rear direction. The contact movable unit $95Re_L$ is pressed rearward by the spring $97Re_L$ via the link $98Re_L$. The sensor $96R_L$ detects whether or not the quantity of the cut staple 13A is full, by detecting the presence or absence of the contact movable unit $95Re_L$. In this example, the sensor $96R_L$ is provided at a position that detects the contact movable unit $95Re_L$ moved to the non-full load position.

The contact movable unit $95Re_R$ protrudes from the side to the other recovery passage $60R_R$ of the cut staple storage unit 6R and is movable in the front-rear direction. The link $98Re_R$ rotates about the shaft $99Re_R$ as a fulcrum, and moves the contact movable unit $95Re_R$ in the front-rear direction. The contact movable unit $95Re_R$ is pressed rearward by the spring $97Re_R$ via the link $98Re_R$.

The operation of the cam 51R constituting the driving unit for pinching the sheet, ejecting the staple, and clinching is transmitted to the contact movable unit $95Re_L$ via the link unit $53R_L$ and the link $98Re_L$, and moves forward and backward by the operation of the cam 51R. That is, when the link $98Re_L$ is rotated by the cam 51R and the link unit $53R_L$, the contact movable unit $95Re_L$ moves by being pressed forward by the spring $100R_L$. The spring force of the spring $97Re_L$ is larger than the spring force of the spring $100R_L$. When the cam 51R returns to the standby position, the contact movable unit $95Re_L$ stands at the rear by the spring force of the spring $100R_L$. Further, the operation of the cam 51R constituting the drive unit for pinching the sheet, ejecting the staple and clinching is transmitted to the contact movable unit $95Re_R$ via the link unit $53R_R$ and the link $98Re_R$, and moves back and forth by the operation of the cam 51R. That is, when the link $98Re_R$ is rotated by the cam 51R and the link unit $53R_R$, the contact movable unit $95Re_R$ moves forward by being pressed forward by the spring $100R_R$. The spring force of the spring $97Re_R$ is larger than the spring force of the spring $100R_R$. When the cam 51R returns to the standby position, the contact movable unit $95Re_R$ stands by in the rear by the spring force of the spring $100R_R$. The link $98Re_L$ and the link $98Re_R$ are connected and linked with each other by the shaft $98R_1$.

<Example of Operational Effect of Stapler of Modified Example of Second Embodiment for Detecting Full Cut Staple Load Detection>

In the stapler 1Re, when the quantity of the cut staple 13A stored in the cut staple storage unit 6R is small, the contact movable unit $95Re_L$ is pressed rearward by the spring $97Re_L$ via the link $98Re_L$, moves to the non-full load detection position, and is detected by the sensor $96R_L$. Since the link $98Re_L$ and the link $98Re_R$ are connected and linked by the shaft $98R_1$, the contact movable unit $95Re_R$ is pressed rearward by the spring $97Re_R$ via the link $98Re_R$ and moves to the non-full load detection position. Therefore, it is possible to detect that the quantity of the cut staple 13A is not full.

Figure 115:
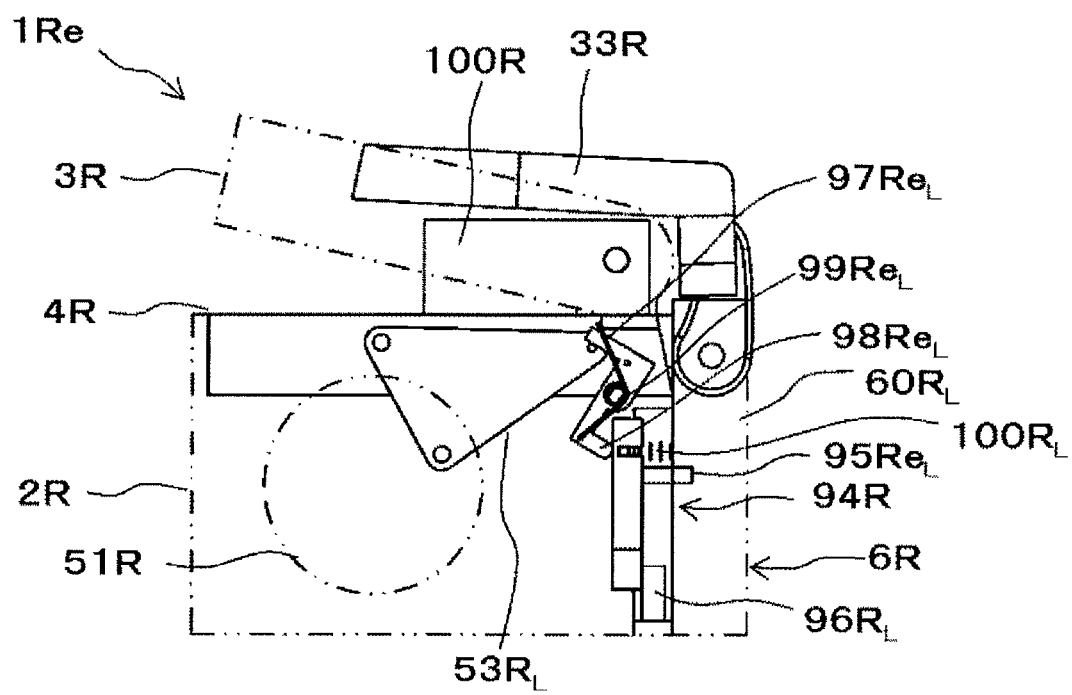
FIG. 115 is a configuration diagram illustrating an operation example of a stapler according to a modified example of the second embodiment that performs the cut staple full load detection.
Figure 116:
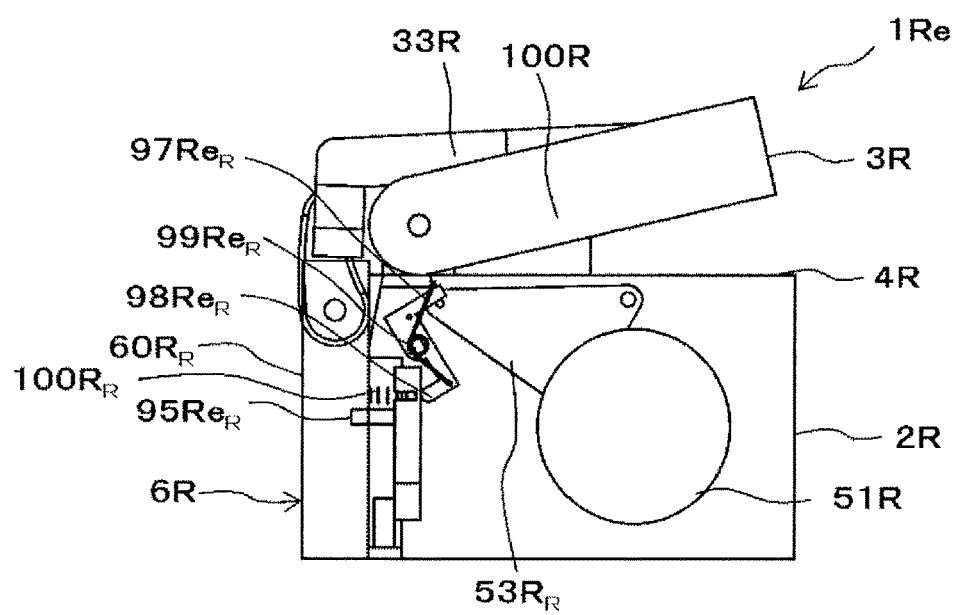
FIG. 116 is a configuration diagram illustrating an operation example of a stapler according to a modified example of the second embodiment that performs the cut staple full load detection.

When the cam 51R is rotated by the operation of binding the sheet with the staple, as illustrated in FIG. 115, the contact movable unit $95Re_L$ moves forward by the operation of the link unit $53R_L$ and the link $98Re_L$. As illustrated in FIG. 116, the contact movable unit $95Re_R$ moves forward by the operation of the link unit $53R_R$ and the link $98Re_R$.

Figure 117:
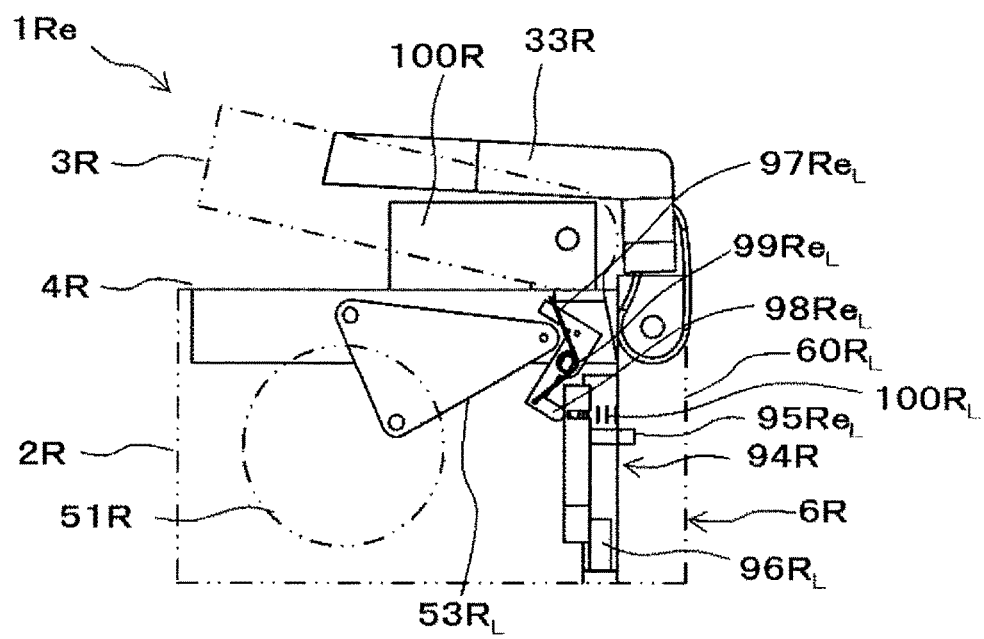
FIG. 117 is a configuration diagram illustrating an operation example of a stapler according to a modified example of the second embodiment that performs the cut staple full load detection.
Figure 118:
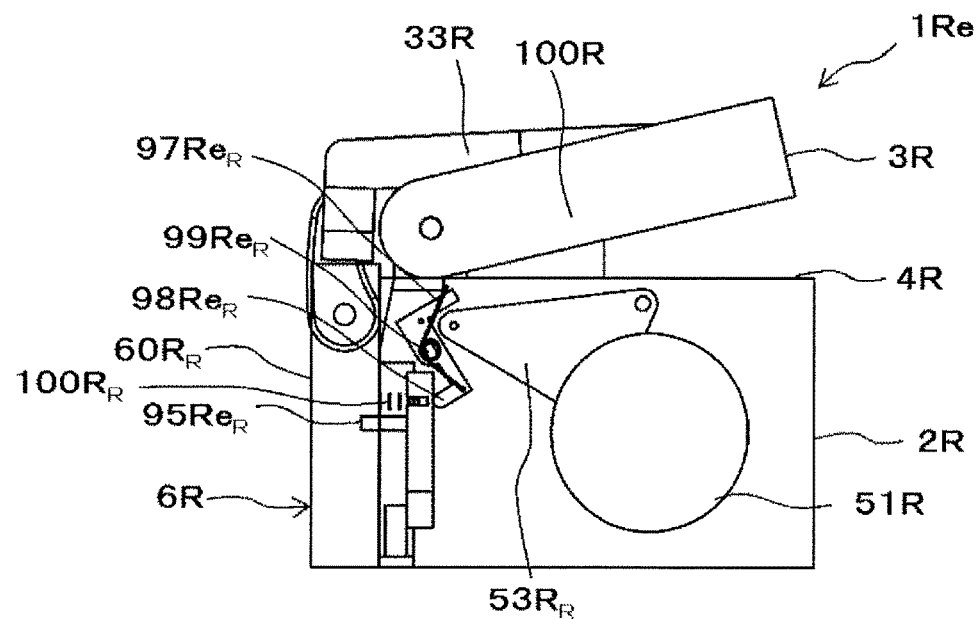
FIG. 118 is a configuration diagram illustrating an operation example of a stapler according to a modified example of the second embodiment that performs the cut staple full load detection.

When the cam 51R is further rotated by the operation of binding the sheet with the staple, if the quantity of the cut staple 13A stored in the cut staple storage unit 6R is full, as illustrated in FIG. 117, the contact movable unit $95Re_L$ stops at a position moved forward without moving to the non-full load detection, and is not detected by the sensor $96R_L$. In addition, as illustrated in FIG. 118, the contact movable unit $95Re_R$ stops at a position moved forward without moving to the non-full load detection position. Therefore, it is possible to detect that the quantity of the cut staple 13A is full.

Figure 119:
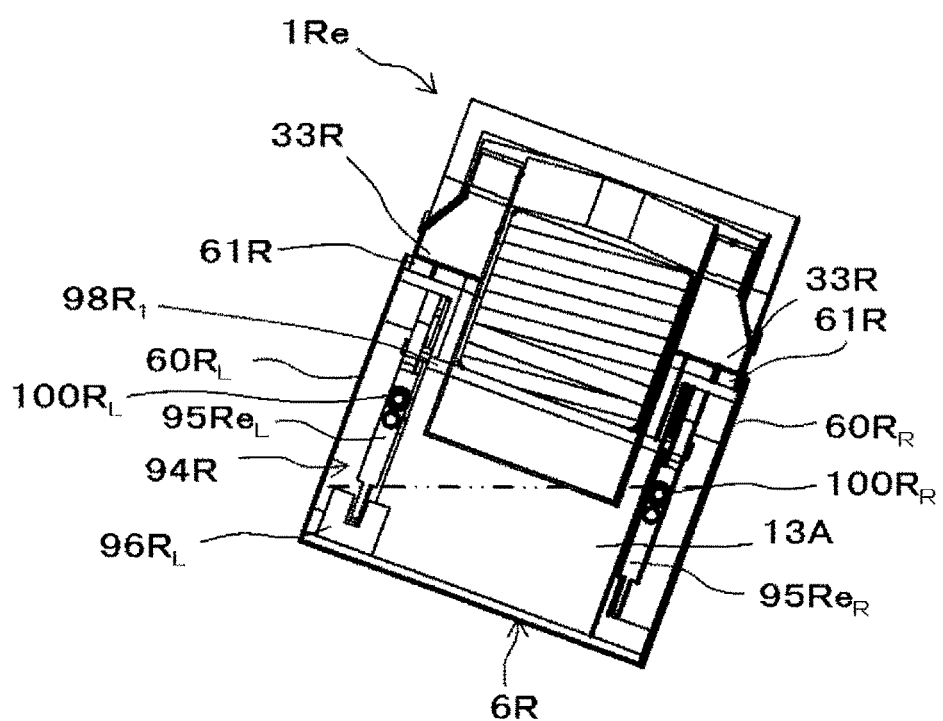
FIG. 119 is a configuration diagram illustrating an operation example of a stapler according to a modified example of the second embodiment that performs the cut staple full load detection.

In the post-processing apparatus 502A described with reference to FIG. 2 and the like, depending on the position of the stapler 1Re, the stapler 1Re is in an inclined state as illustrated in FIG. 119. In such a case, in this example, on the recovery passage $60R_R$ side of the cut staple storage unit 6R, the loading height of the cut staple 13A becomes high. Therefore, the contact movable unit $95Re_R$ stops at a position moved forward, without moving to the non-full load detection position.

In contrast, the loading height of the cut staple 13A decreases on the recovery passage $60R_L$ side of the cut staple storage unit 6R. However, the link $98Re_L$ and the link $98Re_R$ are connected and linked by the shaft $98R_1$. Therefore, irrespective of the loading height of the cut staple 13A, the contact movable unit $95Re_L$ stops at a position moved forward without moving to the non-full load detection position, and is not detected by the sensor $96R_L$. This makes it possible to accurately detect whether or not the quantity of cut staples 13A is full by a single sensor, regardless of the direction of inclination of the stapler 1Re.

<Example of Structure of Stapler of Another Embodiment for Detecting Cut Staple Full Load>

Figure 120:
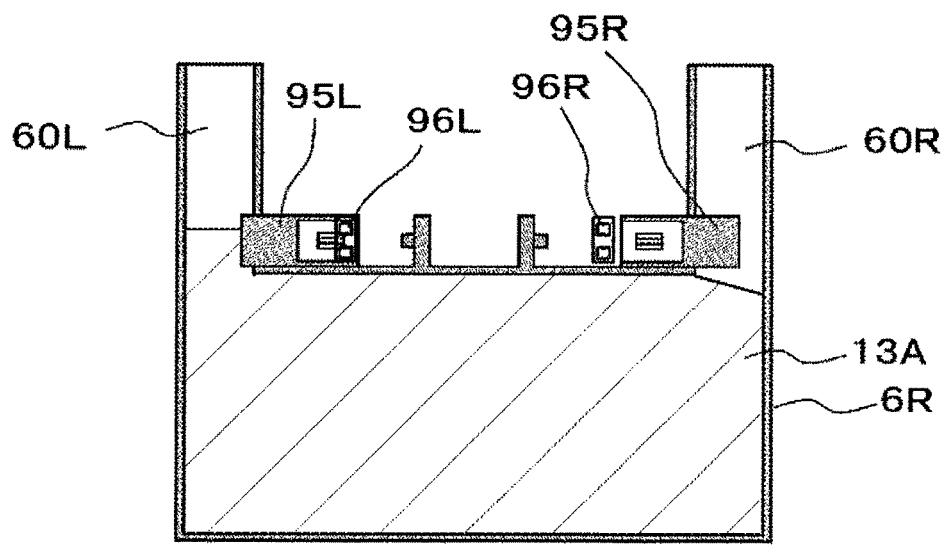
Figure 121:
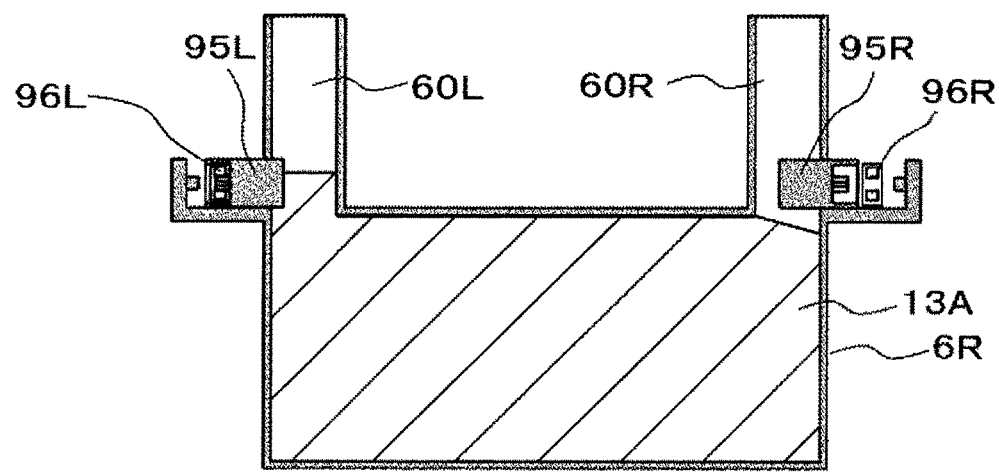

FIGS. 120 and 121 are configuration diagrams illustrating an example of a stapler according to another embodiment that performs the cut staple full load detection.

In an example of FIG. 120, in the cut staple quantity detection unit in which the contact movable units 95L and 95R displaced by the storage of the cut staple 13A are detected by the sensors 96L and 96R, the contact movable units 95L and 95R are configured to protrude and retreat from the inside of each of the recovery passages 60L and 60R of the cut staple storage unit 6R. In the example of FIG. 121, the contact movable units 95L and 95R are configured to protrude and retract from the outside of each of the recovery passages 60L and 60R of the cut staple storage unit 6R.

FIGS. 122 to 127B are configuration diagrams illustrating modified examples of the stapler according to another embodiment that performs the cut staple full load detection.

Figure 122:
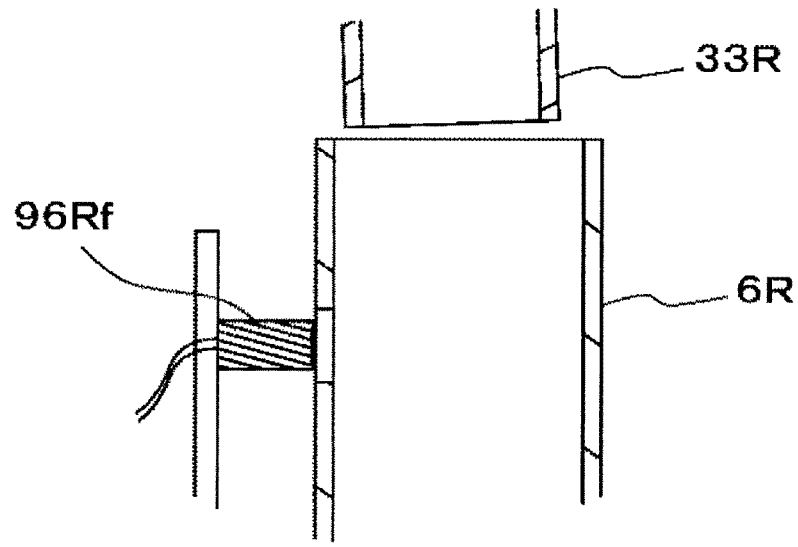

In the example of FIG. 122, the sensor 96Rf for detecting metal is arranged outside a part through which the cut staple passes in the cut staple storage unit 6R. By counting the number of the cut staples from the output of the sensor 96Rf, it is possible to detect that the quantity of the cut staple is full and to detect the approximate value of the remaining number of cut staples that can be stored.

Figure 123A:
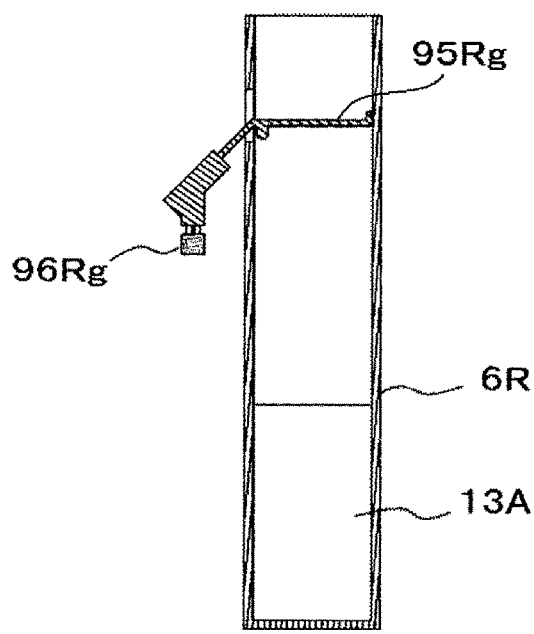
Figure 123B:
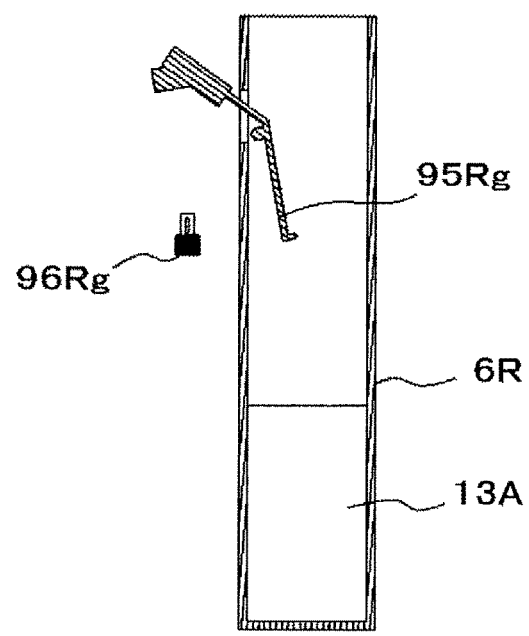

In the example of FIGS. 123A and 123B, a movable unit 95Rg which opens and closes the cut staple storage unit 6R, and an actuator 96Rg for operating the movable unit 95Rg are provided. As illustrated in FIG. 123A, when it is determined that a fixed quantity of the cut staple 13A is accumulated on the movable unit 95Rg such as a predetermined number of binding operations with the movable unit 95Rg closed, as illustrated in FIG. 123B, the movable unit 95Rg is opened by the actuator 96Rg. This makes it possible to detect that the quantity of the cut staple is full and to determine the approximate value of the remaining number of cut staples that can be stored, from the number of operations of the actuator 96Rg.

Figure 124A:
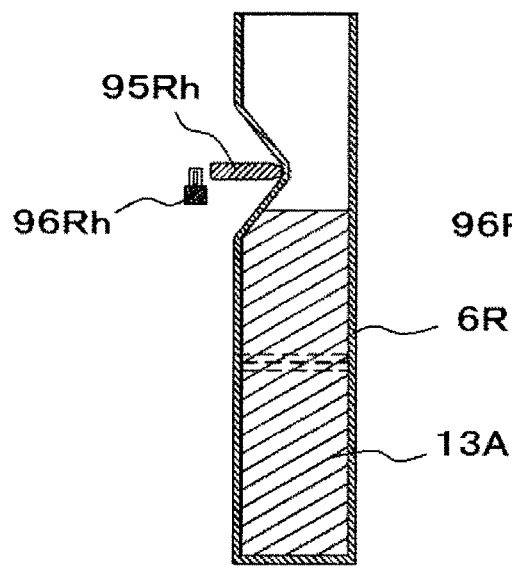
Figure 124B:
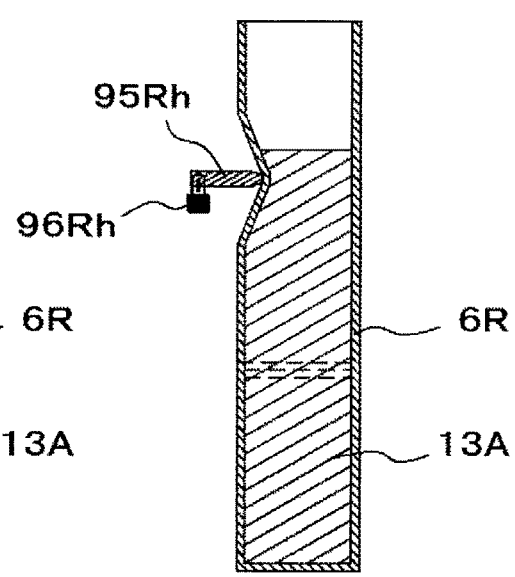

In the example of FIGS. 124A and 124B, the cut staple storage unit 6R is formed by an elastic body, and a movable unit 95Rh that operates by deformation of the cut staple storage unit 6R due to the storage of the cut staple 13A, and a sensor 96Rh that detects the presence or absence of the movable unit 95Rh are included. As illustrated in FIG. 124A, the movable unit 95Rh is not detected by the sensor 96Rh in a state in which the loading height of the cut staple 13A does not reach the full load detection position. As illustrated in FIG. 124B, when the loading height of the cut staple 13A reaches the full load detection position, the movable unit 95Rh is operated by the deformation of the cut staple storage unit 6R, and the movable unit 95Rh is detected by the sensor 96Rh. As a result, it is possible to detect that the quantity of the cut staple is full.

Figure 125A:
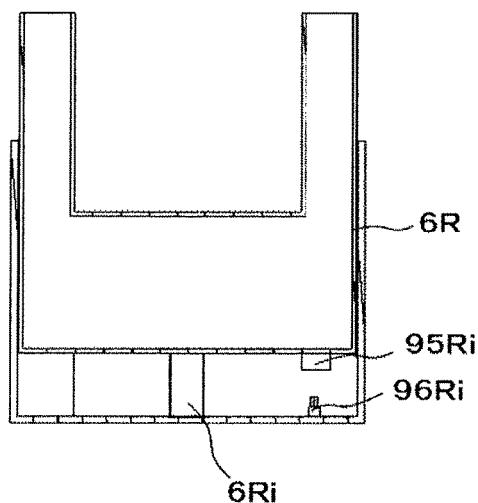
Figure 125A:
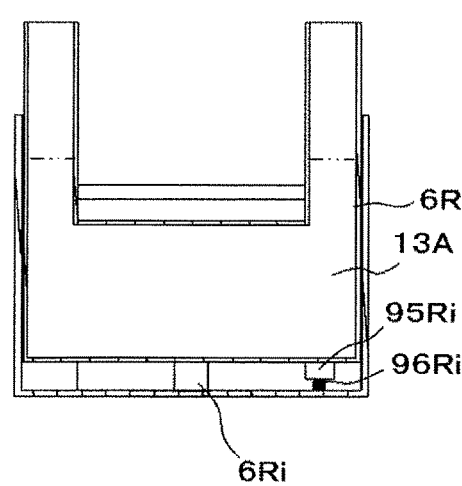

In the example of FIGS. 125A and 125B, the cut staple storage unit 6R is supported to move upward and downward by a spring 6Ri, and a movable unit 95Ri that operates by displacement of the cut staple storage unit 6R due to a change in weight due to the storage of the cut staple 13A, and a sensor 96Ri for detecting presence or absence of the movable unit 95Ri. As illustrated in FIG. 125A, when the cut staple 13A is not stored or the storage quantity is small, the cut staple storage unit 6R is pushed up to the initial position or the vicinity of the initial position by the spring 6Ri, and the movable unit 95Ri is not detected by 96Ri. As illustrated in FIG. 125B, when the loading quantity of the cut staple 13A reaches a predetermined quantity, the cut staple storage unit 6R descends to the detection position by the weight of the cut staple 13A, and the movable unit 95Ri is detected by the sensor 96Ri. As a result, it is possible to detect that the quantity of the cut staple is full.

Figure 126A:
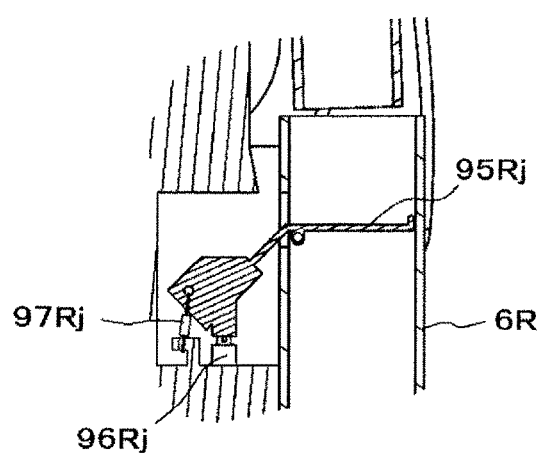
Figure 126B:
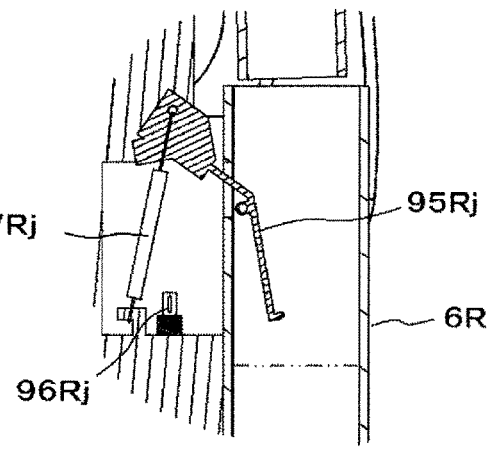

In the example of FIGS. 126A and 126B, there are provided a movable unit 95Rj displaced by the weight of the cut staple 13A, and a sensor 96Rg for detecting the presence or absence of the movable unit 95Rj. As illustrated in FIG. 126A, when no cut staple is stacked on the movable unit 95Rj or when the loading quantity is small, the movable unit 95Rj is held in the closed state by the spring 97Rj, and the movable unit 95Rj is held in the closed state by the spring 97Rj and is detected by a sensor 96Rg. As illustrated in FIG. 126B, when a certain quantity of the cut staple 13A is accumulated on the movable unit 95Rj, the spring 97Rj is expanded by the weight of the cut staple 13A, the movable unit 95Rj is opened, and the movable unit 95Rj is not detected by the sensor 96Rg. Thus, it is possible to detect that the quantity of cut staples is full and to detect the approximate value of the remaining number of cut staples that can be stored, from the number of open/close detection times at the sensor 96Rj.

Figure 127A:
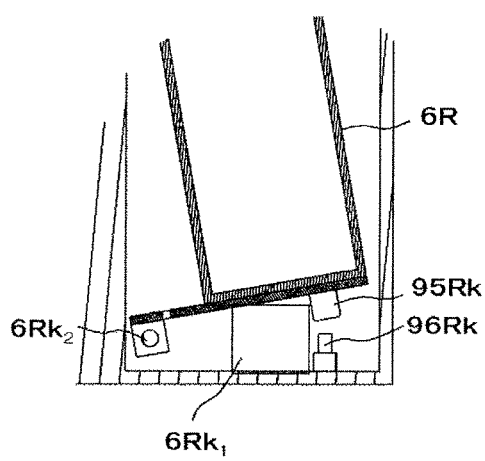
Figure 127B:
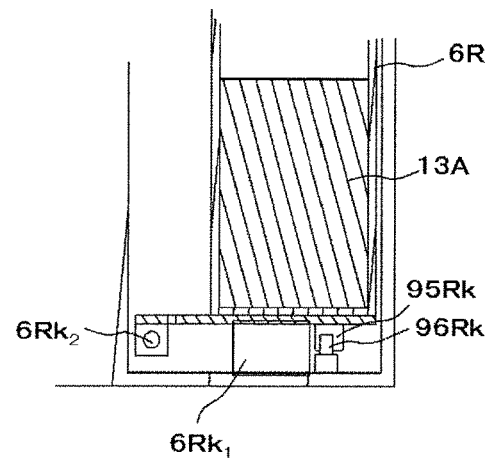

In the example of FIGS. 127A and 127B, the cut staple storage unit 6R is supported by the spring $6Rk_1$ so as to be capable of ascending and descending by rotational operation about the shaft $6Rk_2$ as a fulcrum, and the movable unit 95Rk that operates by the displacement of the cut staple storage unit 6R due to the storage of the cut staple 13A, and a sensor 96Rk for detecting the presence or absence of the movable unit 95Rk are included. As illustrated in FIG. 127A, when the cut staple 13A is not stored or the storage quantity is small, the cut staple storage unit 6R is pushed up to the initial position or the vicinity of the initial position by the spring $6Rk_1$, and the movable unit 95 is not detected by the sensor 96Rk. As illustrated in FIG. 127B, when the loading quantity of the cut staple 13A reaches the predetermined quantity, the cut staple storage unit 6R descends to the detection position by the weight of the cut staple 13A, and the movable unit 95Rk is detected by the sensor 96Rk. As a result, it is possible to detect that the quantity of the cut staple is full.

Figures 128A, 128B:
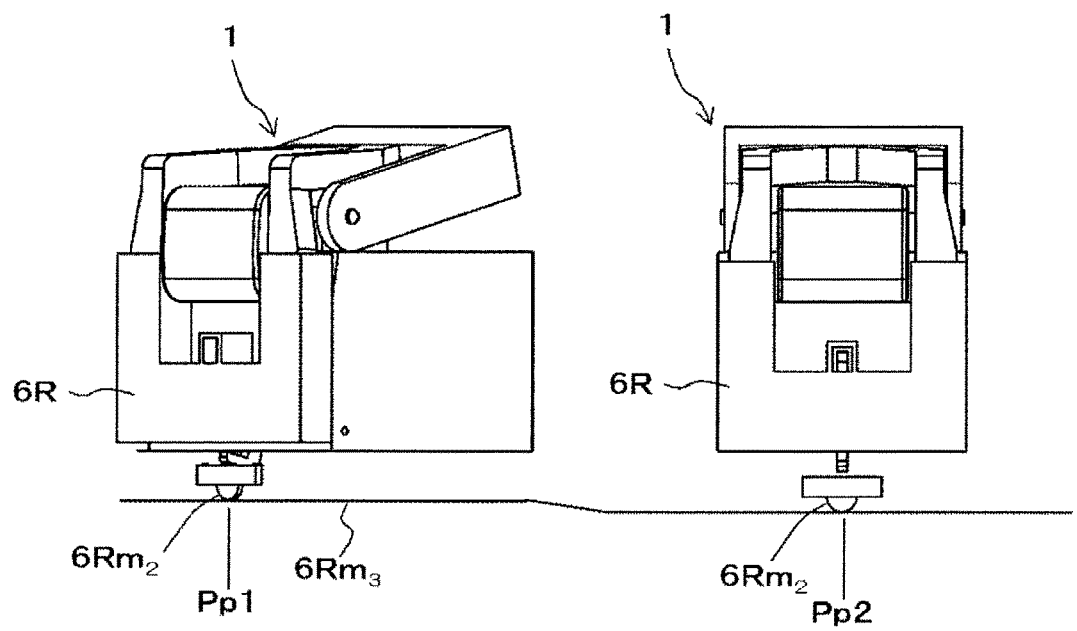
Figure 129A:
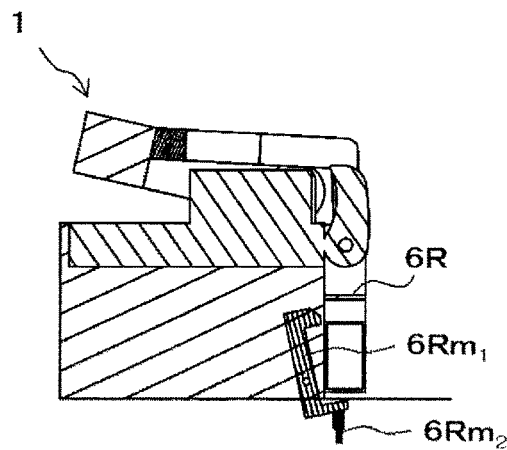
Figure 129B:
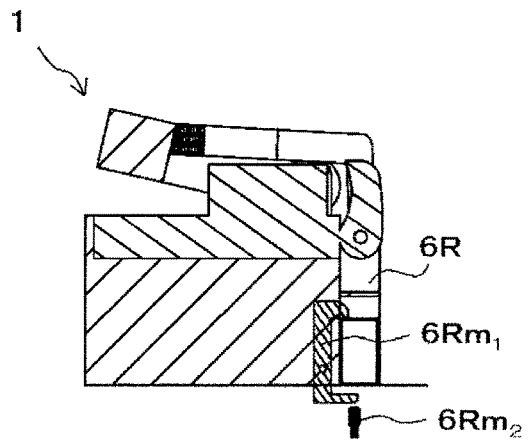

FIGS. 128 to 129B are configuration diagrams illustrating modified examples of the stapler according to another embodiment that performs the cut staple full load detection. As illustrated in the examples of FIGS. 125A and 125B and FIGS. 127A and 127B, in the configuration in which the cut staple storage unit 6R can move upward and downward and the full load is detected by the weight of the cut staple 13A, if the cut staple storage unit 6R vibrates by vibration due to movement of the stapler 1 or the like, it may adversely affect the movement operation when moving the stapler 1. There is a possibility of misdetection of full load and non-full load.

Therefore, when the stapler 1 is at a specific position, the full load detection is performed. In this example, the lock portion $6Rm_1$ For regulating the lifting and lowering of the cut staple storage unit 6R and releasing the regulation, an induction unit $6Rm_2$ for operating the lock unit $6Rm_1$, and a guide unit $6Rm_3$ for operating the induction unit $6Rm_2$.

When the stapler 1 moves to the home position HP, the induction unit $6Rm_2$ is pushed up by the shape of the guide unit $6Rm_3$ to release the regulation of ascending and descending at the locking unit $6Rm_1$ of the cut staple storage unit 6R as illustrated in FIG. 129A. As a result, as described with reference to FIGS. 125A and 125B and FIGS. 127A and 127B, the full load can be detected with the weight of the cut staple 13A at the home position HP which is not accompanied by the binding operation.

When the stapler 1 moves to a predetermined binding position, in this example, the first position Pp1, the induction unit $6Rm_2$ descends due to the shape of the guide unit $6Rm_3$, and as illustrated in FIG. 129B, the ascending and descending of the cut staple storage unit 6R are regulated by the lock unit $6Rm_1$. Therefore, when the stapler 1 moves in accordance with the binding operation, the cut staple storage unit 6R does not move upward and downward. Therefore, it is possible to suppress the full load and non-full load error detection due to unnecessary ascending and descending of the cut staple storage unit 6R. Further, the lock portion $6Rm_1$ may not be necessarily provided.

Figure 130:
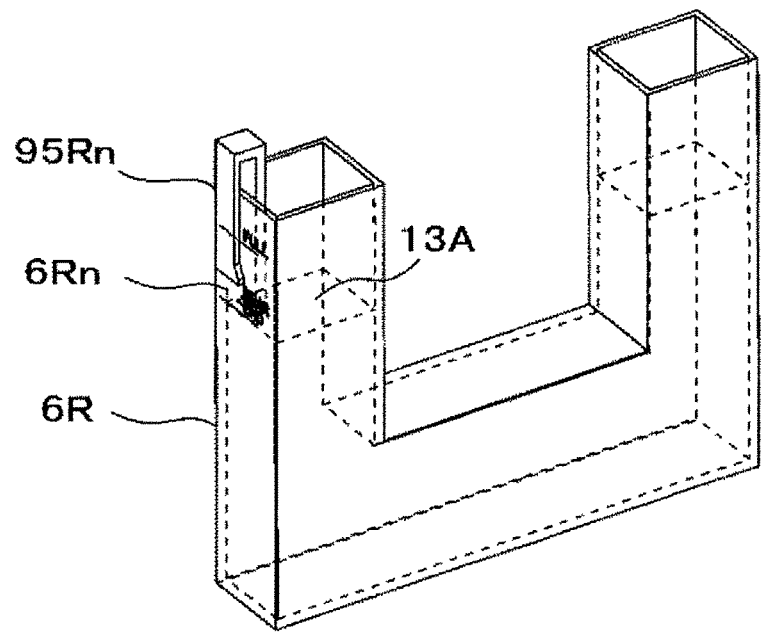
Figure 131:
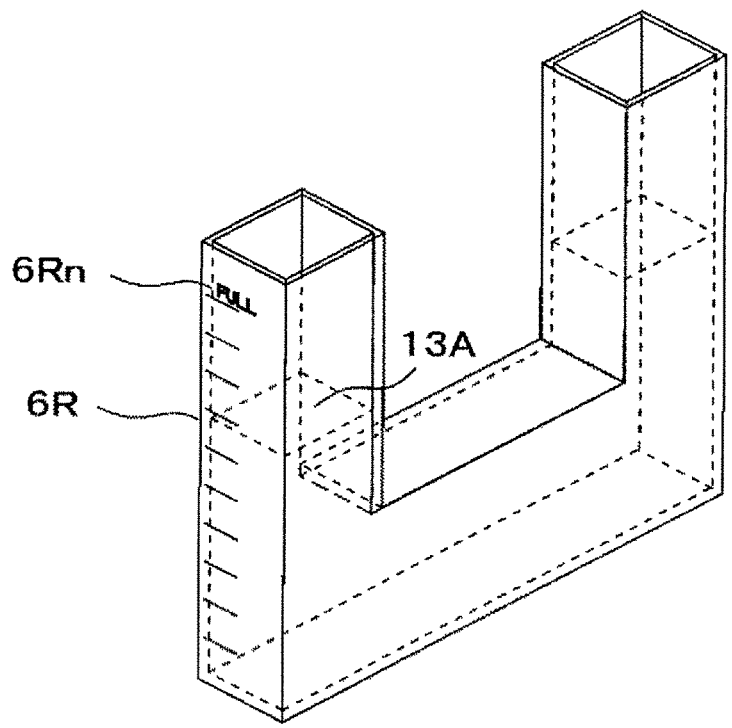

FIGS. 130 and 131 are configuration diagrams illustrating modified examples of the stapler according to another embodiment that performs the cut staple full load detection. To detect full load of the cut staple, checking by visual recognition may be added. In the example of FIG. 130, the cut staple storage unit 6R is provided with the movable unit 95Rn that moves up and down with the storage of the cut staple 13A, and a scale 6Rn that is a measure of the storage quantity of the cut staple 13 by the position of the movable unit 95Rn. Thus, from the position of the movable unit 95Rn, it is possible to check visually whether or not the quantity of the cut staple 13A is full.

In the example of FIG. 131, the cut staple storage unit 6R is made of a transparent material so that the inside thereof can be visually recognized, and a scale 6Rn serving as a measure for the quantity of storage of the cut staple 13 is provided in the cut staple storage unit 6R. As a result, it is possible to visually check the quantity of the cut staple 13A from the outside and check whether the quantity of the cut staple 13A is full.

FIGS. 132A and 132B are configuration diagrams illustrating a modified example of a stapler according to another embodiment that performs the cut staple full load detection. As illustrated in the examples of FIGS. 125A and 125B and FIGS. 127A and 127B, there is a configuration in which the cut staple storage unit 6R can move upward and downward and the full load is detected by the weight of the cut staple 13A. There is a possibility that the cut staple storage unit 6R vibrates due to vibration or the like accompanying the movement of the stapler 1 to erroneously detect the full load or non-full load.

Therefore, in the example of FIGS. 132A and 132B, the movable unit 95Rp that operates by the displacement of the cut staple storage unit 6R accompanying the storage of the cut staple 13A, the sensor 96Rp that detects the presence or absence of the movable unit 95Ri, and the locking unit 6Rp for locking the full staple storage unit 6R at the full load detection position.

As illustrated in FIG. 132A, when the cut staple 13A is not stored or the storage quantity is small, the lock at the lock portion 6Rp of the cut staple storage unit 6R is released and the cut staple storage unit 6R can move upward and downward. As illustrated in FIG. 132B, when the loading quantity of the cut staple 13A reaches the predetermined quantity, the cut staple storage unit 6R descends to the full load detecting position by the weight of the cut staple 13A, and the movable unit 95Rp is detected by the sensor 96Rp. As a result, it is possible to detect that the quantity of the cut staple is full. Further, the locking unit 6Rp locks the ascending and descending of the cut staple storage unit 6R.

FIGS. 133A and 133B are configuration diagrams illustrating a modified example of the stapler of another embodiment that performs the cut staple full load detection. Three or more full load detection locations may be provided in the cut staple storage unit 6R. In FIGS. 133A and 133B, a first sensor $96Rq_1$ is provided in the one recovery passage 60L of the cut staple storage unit 6R, a second sensor $96Rq_2$ is provided in the other recovery passage 60R of the cut staple storage unit 6R, and a third sensor $96Rq_3$ is provided near the center. As a result, in any of the case of the horizontal case illustrated in FIG. 133A and the inclined case illustrated in FIG. 133B, it is possible to accurately detect that the quantity of the cut staple 13A is full.

FIGS. 134A to 134C are configuration diagrams illustrating a modified example of the stapler of another embodiment that performs the cut staple full load detection. If the stapler 1 is provided with a cut staple full load detection unit such as a cut staple quantity detection unit, the weight of the stapler 1 increases. Therefore, a part of the cut staple quantity detection unit is provided on the post-processing apparatus side. In FIGS. 134A and 134B, the post-processing apparatus 502A is provided with a movable unit 95Rx that displaces in accordance with the stored quantity of the cut staple, and a sensor 96Rx that detects the presence or absence of the movable unit 95Rx. When the cut staple is not stored or the storage quantity is small, as illustrated in FIG. 134A, the movable unit 95Rx does not operate and is not detected by the sensor 96Rx. When the cut staple is stored by a predetermined quantity, as illustrated in FIG. 134B, the movable unit 95Rx is operated and detected by the sensor 96Rx. In addition, as illustrated in FIG. 134C, the sensor 96Rx may be provided in the lid 505A.

FIG. 135 is a configuration diagram illustrating a modified example of a stapler according to another embodiment that performs the cut staple full load detection. In the stapler 1, as the quantity of the cut staple stored in the cut staple storage unit 6 increases, the weight of the stapler 1 increases, so that the load applied to the motor M for moving the stapler 1 increases. Therefore, by detecting the load applied to the motor M, it is possible to detect the approximate value of the quantity of the cut staple.

<Example of Configuration of Stapler of Embodiment that Detects Full Load of Cut Staple by Optical Sensor>

Next, an embodiment of a stapler for detecting full load of a cut staple with an optical sensor will be described.

<Optical Waveguide; Configuration Example Using Prism>

FIGS. 136 and 137 are configuration diagrams illustrating an example of a stapler according to the embodiment that performs full load detection of a cut staple with an optical sensor, FIG. 136 illustrates a state in which a cut staple storage unit is attached, and FIG. 137 illustrates a state in which a cut staple storage unit is detached. Further, FIG. 138 is a configuration diagram illustrating an example of a cut staple storage unit according to the embodiment that performs the cut staple full load detection with an optical sensor.

In the stapler of each embodiment described below, the configuration other than the cut staple quantity detection unit is the same as that of the stapler 1Ra illustrated in FIG. 92 and the like. As illustrated in FIGS. 3A and 3B, the stapler $1Rf_1$ includes a staple ejecting unit 2R which supplies and ejects the staple 10A, and a binding unit 3R that binds the sheet P with the staple 10A by cutting the staple leg 12A of the staple 10A and by folding the staple leg 12A illustrated in FIG. 3D in cooperation with the staple ejecting unit 2R.

The stapler $1Rf_1$ is provided with a sheet pinching unit 4R which pinches the sheet P between the staple ejecting unit 2R and the binding unit 3R. When the binding unit 3R moves in a direction in which the binding unit 3R comes into contact with and separates from the staple ejecting unit 2R with the shaft 32R as a fulcrum by the rotational operation, the stapler $1Rf_1$ pinches and releases the sheet P with the sheet pinching unit 4R.

The stapler $1Rf_1$ includes a cut staple storage unit $6Rf_1$ that stores the cut staple 13A illustrated in FIG. 3D. Further, as illustrated in FIG. 3C, the stapler $1Rf_1$ includes a cut unit 30R which cuts the staple leg 12A of the staple 10A penetrating the sheet P with a predetermined length, and a discharge passage 33R which guides the cut staple cut by the cut unit 30R to the cut staple storage unit $6Rf_1$. In the stapler $1Rf_1$, the feeding unit, the ejecting unit, the clincher unit, and the driving unit of the staple 10A are not illustrated, but they may have the same configuration as the stapler 1A of the first embodiment.

In the discharge path 33R, in this example, a single discharge path 33R communicating with the cut section 30R is divided into two discharge paths $33R_L$ and $33R_R$ so as not to block the attachment/detachment path of the staple cartridge 100 attached to the stapler $1Rf_1$, and is disposed on both left and right sides of the storage unit 20R to which the staple cartridge 100A is attached.

The cut staple storage unit $6Rf_1$ is detachably attached to the back surface of the stapler $1Rf_1$. The cut staple storage unit $6Rf_1$ has two recovery passages $60R_L$ and $60R_R$, and when attached to the stapler $1Rf_1$, the two recovery passages $60R_L$ and $60R_R$ are arranged on the left and right sides behind the storage unit 20R. Thus, the staple cartridge 100A is configured to be attachable to and detachable from the stapler $1Rf_1$ in a state in which the cut staple storage unit $6Rf_1$ is attached to the stapler $1Rf_1$.

In the stapler $1Rf_1$, the discharge port $34R_L$ of one discharge passage $33R_L$ and the recovery port $61R_L$ of one recovery passage $60R_L$ of the cut staple storage unit $6Rf_1$ communicate with each other, and the discharge port $34R_R$ of the other discharge passage $33R_R$ and the discharge port $34R_R$ of the cut staple storage unit $6Rf_1$ communicates with the recovery port $61R_R$ of the other recovery passage $60R_R$.

As a result, a cut staple passing through one discharge passages $33R_L$ from the cut unit 30R is stored in the cut staple storage unit $6Rf_1$ through the recovery passage $60R_L$ from the recovery port $61R_L$. In addition, the cut staple passing through the other discharge passage $33R_R$ from the cut unit 30R is stored in the cut staple storage unit $6Rf_1$ through the recovery passage $61R_R$ from the recovery passage $60R_R$.

The stapler $1Rf_1$ and the cut staple storage unit $6Rf_1$ include an optical cut staple quantity detection unit $210R_1$ that detects the presence or absence of a predetermined quantity of a cut staple stored in the cut staple storage unit $6Rf_1$, using the presence or absence of light transmission. The cut staple quantity detection unit $210R_1$ is an example of a cut staple full load detection unit, and includes a light emitting unit $211R_1$ that emits light, and a light receiving unit $212_R$ that detects light emitted from the light emitting unit $211R_1$. Further, the cut staple quantity detection unit $210R_1$ includes an optical waveguide $213R_1$ that guides the light emitted from the light emitting unit $211R_1$ to the light receiving unit $212R_1$ on a predetermined optical path.

In the cut staple quantity detection unit $210R_1$, the light emitting unit $211R_1$ and the light receiving unit $212R_1$ are provided in the stapler $1Rf_1$. Further, in the cut staple quantity detection unit $210R_1$, the optical waveguide $213R_1$ is provided in the cut staple storage unit $6Rf_1$.

The cut staple storage unit $6Rf_1$ includes a window $600_L$ in one recovery passage $60R_L$, and a window $600_R$ in the other recovery passage $60R_R$. The window $600_L$ and the window $600_R$ are made of, for example, a transparent material through which light emitted from the light source is transmitted. The cut staple storage unit $6Rf_1$ is provided with a pair of windows $600_L$ on a wall surface opposed in the front-rear direction of the recovery route $60R_L$, and a pair of windows $600_R$ are provided on wall surfaces opposed to the front-rear direction of the recovery passage $60R_R$.

In the following description of each embodiment, the light emitting unit $211R_{(1\ to\ n)}$ and the light receiving unit $212R_{(1\ to\ n)}$ are an example of an optical sensor made up of a pair of light emitting and receiving units, and the light emitting unit and the light receiving unit may be configured independently, or may be unitized. The light emitting unit $211R_1$ and the light receiving unit $212R_1$ are independent configurations.

The light emitting unit $211R_1$ is made up of a light emitting element such as a laser and a light emitting diode, and is provided on the back surface of the stapler 1Rf1 with the light emitting direction facing the back of the stapler $1Rf_1$. When the cut staple storage unit $6Rf_1$ is attached to the stapler $1Rf_1$, the light emitting unit $211R_1$ is provided at a position opposed to the window 600L provided in the one recovery passage 60RL.

The light receiving unit $212R_1$ is constituted by a light receiving element such as a photodiode and is provided on the back surface of the stapler 1Rf1 with the incidence direction of the light facing the back of the stapler $1Rf_1$. When the cut staple storage unit $6Rf_1$ is attached to the stapler $1Rf_1$, the light receiving unit $212R_1$ is provided at a position facing the window $600_R$ provided in the other recovery passage $60R_R$.

As a result, the light emitted from the light emitting unit $211R_1$ passes through the window $600_L$ and an optical path passing through the inside of the one recovery passage $60R_L$ is formed, by the window $600_L$ provided on the one recovery passage $60R_L$. Further, by the window $600_R$ provided in the other recovery passage $60R_R$, an optical path is formed in which light passing through the inside of the other recovery passage $60R_R$ by passing through the window $600_R$ is incident on the light receiving unit $212R_1$.

The optical waveguide $213R_1$ includes a prism $214R_1$, and a cover $215R_1$ that covers the prism $214R_1$. The prism $214R_1$ includes a first reflection surface $214R_L$ opposed to the window $600_L$ of one recovery passage $60R_L$, a second reflection surface $214R_R$ opposed to the window $600_R$ of the other recovery passage $60R_R$, and a light guide unit $214R_C$ which guides light between the first reflection surface $214R_L$ and the second reflection surface $214R_R$.

As a result, the optical waveguide $213R_1$ forms an optical path which allows the light emitted from the light emitting unit $211_R$ to enter the light receiving unit $212_R$ through one recovery passage $60R_L$ and the other recovery passage $60R_R$.

In the cut staple quantity detection unit $210R_1$, when a quantity of cut staples reaching the window $600_L$ of one recovery passage $60R_L$ and the window $600_R$ of the other recovery passage $60R_R$ is not stored in the cut staple storage unit $6Rf_1$, the light emitted from the light emitting unit $211R_1$ is incident on the light receiving unit $212R_1$ through the one recovery passage $60R_L$, the optical waveguide $213R_1$, and the other recovery passage $60R_R$.

In contrast, in the cut staple quantity detection unit $210R_1$, when the cut staple of a quantity that reaches one of the window $600_L$ of the one recovery passage $60R_L$ or the window $600_R$ of the other recovery passage $60R_R$ is stored in the cut staple storage unit $6Rf_1$, the optical path of the light emitted from the light emitting unit $211R_1$ is blocked by the cut staple and light is not incident on the light receiving unit $212R_1$.

Accordingly, the position where the window $600_L$ and the window $600_R$ are provided becomes the full load detection position of the cut staple in the cut staple quantity detection portion $210R_1$. Further, the cut staple quantity detection unit $210R_1$ detects whether light emitted from the light emitting unit $211R_1$ is incident on the light receiving unit $212R_1$, and detects whether or not the quantity of the cut staple is full.

Next, an example of operational effect of the cut staple quantity detection unit $210R_1$ will be described. In the cut staple quantity detection unit $210R_1$, in the case where the cut staple storage of a quantity enough to reach the full load detection position of one recovery passage $60R_L$ and the full load detection position of the other recovery passage $60R_R$ is not stored in the cut staple storage unit $6Rf_1$, the light emitted from the light emitting unit $211R_1$ is incident on the light receiving unit $212_R$ through the one recovery passage $60R_L$ and the other recovery passage $60R_R$.

That is, the light emitted from the light emitting unit $211R_1$ passes through the window $600_L$ and passes through the one recovery passage $60R_L$, and is incident on the prism $214R_1$. The light incident on the prism $214R_L$ is reflected by the first reflection surface $214R_L$, passes through the light guide unit $214\ R_C$, is reflected by the second reflection surface $214R_R$, and is emitted from the prism $214R_1$. The light emitted from the prism $214R_1$ passes through the window $600_R$, passes through the other recovery passage $60R_R$, and is incident on the light receiving unit $212R_1$.

In contrast, when the cut staple storage unit $6Rf_1$ stores a cut staple in an quantity that reaches one of the full load detection position of the one recovery route $60R_L$ or the full load detection position of the other recovery route $60R_R$, the light emitting unit $211R_1$ is blocked by the cut staple and does not enter the light receiving unit $212R_1$.

As a result, the cut staple quantity detection unit $210R_1$ detects that the quantity of the cut staple stored in the cut staple storage unit $6Rf_1$ is not full by the light emitted from the light emitting unit $211R_1$ being detected by the light receiving unit $212R_1$. Further, when the light emitted from the light emitting unit $211R_1$ is not detected by the light receiving unit $212R_1$, the quantity of the cut staple stored in the cut staple storage unit $6Rf_1$ is detected to be full. Upon detecting that the quantity of the cut staple is full, the stapler $1Rf_1$ notifies this detection to the post-processing apparatus 502A described with reference to FIG. 2 and the like, and notifies the user or the like from the post-processing apparatus 502A by an operation display unit (not illustrated).

In the case where the stapler $1Rf_1$ is applied to the post-processing apparatus 502A illustrated in FIG. 2 and the like, the stapler $1Rf_1$ is in an inclined state depending on the position of the stapler $1Rf_1$. In such a case, one of the one recovery passage $60R_L$ and the other recovery passage $60R_R$ of the cut staple storage unit $6Rf_1$ has a lower loading height of the cut staple, and the other thereof has a higher loading height of the cut staple.

Therefore, in the one recovery passage $60R_L$ and the other recovery passage $60R_R$, on the side where the loading height of the cut staple is high, the optical path passing through the window is shielded by the cut staple, and the light emitted from the light emitting unit $211R_1$ is not detected by the light receiving unit $212R_1$, it is detected that the quantity of cut staples stored in the cut staple storage unit 6Rf1 is full. Therefore, even when the stapler 1Rf1 is inclined, it is possible to accurately detect whether or not the quantity of the cut staple is full.

Further, by providing the light emitting unit $211R_1$ and the light receiving unit $212R_1$ in the stapler $1Rf_1$ and by providing the optical waveguide $213R_1$ in the cut staple storage unit $6Rf_1$, when the cut staple storage unit $6Rf_1$ is not attached to the stapler $1Rf_1$, an optical path is not formed between the light emitting unit $211R_1$ and the light receiving unit $212R_1$, and the light emitted from the light emitting unit $211R_1$ is not detected by the light receiving unit $212R_1$. This makes it possible to perform the full load detection of the cut staple and detection of the presence or absence of the cut staple storage unit $6Rf_1$, that is, detection of attachment/detachment of the cut staple storage unit 6Rf1 by the same detection unit.

<Optical Waveguide; Modified Example Using Prism>

FIG. 139 is a configuration diagram illustrating a modified example of the stapler of the embodiment that performs full load detection of the cut staple with the optical sensor. Since the configuration of the stapler $1Rf_2$ is the same as that of the stapler $1Rf_1$ except for the cut staple quantity detection unit $210R_2$, a description thereof will be omitted.

The stapler $1Rf_2$ and the cut staple storage unit $6Rf_2$ include an optical cut staple quantity detection unit $210R_2$ that detects the presence or absence of a predetermined quantity of a cut staple stored in the cut staple storage unit $6Rf_2$, using the presence or absence of light transmission. The cut staple quantity detection unit $210R_2$ is an example of a cut staple full load detection unit, and includes a light emitting unit $211R_2$ that emits light, and a light receiving unit $212R_2$ that detects light emitted from the light emitting unit $211R_2$. Further, the cut staple quantity detection unit $210R_2$ includes an optical waveguide $213R_2$ that guides the light emitted from the light emitting unit $211R_2$ to the light receiving unit $212R_2$ on a predetermined optical path.

In the cut staple quantity detection unit $210R_2$, the light emitting unit $211R_2$ and the light receiving unit $212R_2$ are provided in the stapler $1Rf_2$. Further, the cut staple quantity detection unit $210R_2$ is provided with the optical waveguide $213R_2$ in the cut staple storage unit $6Rf_2$.

The cut staple storage unit $6Rf_2$ has a window $600_L$ in one recovery passage $60R_L$ and a window $600_R$ in the other recovery passage $60R_R$. When the cut staple storage unit $6Rf_2$ is attached to the stapler $1Rf_2$, the light emitting unit $211R_2$ is provided at a position opposed to the window $600_L$ provided on the one recovery passage $60R_L$. When the cut staple storage unit $6Rf_2$ is attached to the stapler $1Rf_2$, the light receiving unit $212R_2$ is provided at a position opposed to the window $600_R$ provided in the other recovery passage $60R_R$.

The optical waveguide $213R_2$ includes a prism $214R_2$ and a cover $215R_2$ that covers the prism $214R_2$. The prism $214R_2$ includes a first reflection surface $217R_L$ opposed to the window $600_L$ of one recovery passage $60R_L$, and a first light guide unit $218R_L$ which that guides the light reflected by the first reflection surface $217R_L$. The first light guide unit $218R_L$ extends along the one recovery passage $60R_L$.

The prism $214R_2$ includes a second reflection surface $219R_L$ for reflecting the light guided by the second light guide unit $218R_L$, a second light guide unit $218R_C$ that guides the light reflected by the second reflection surface $219R_L$, and a third reflection surface $219R_R$ that reflects the light guided by the second light guide unit $218R_C$. The second light guide unit $218R_C$ extends in a direction of connecting the one recovery passage $60R_L$ and the other recovery passage $60R_R$.

Further, the prism $214R_2$ includes a third light guide unit $218R_R$ which guides the light reflected by the third reflection surface $219R_R$. The third light guide unit $218R_R$ is disposed along the other recovery passage $60R_R$. The prism $214R_2$ includes a fourth reflection surface $217R_R$ which faces the window $600_R$ of the other recovery passage $60R_R$ and reflects the light guided by the third light guide unit $218R_R$.

Therefore, the optical waveguide $213R_2$ forms an optical path that allows the light emitted from the light emitting unit $211R_2$ to enter the light receiving unit $212R_2$ through the one recovery passage $60R_L$ and the other recovery passage $60R_R$.

Next, an example of operational effect of the cut staple quantity detection unit $210R_2$ will be described. When the cut staple storage unit $6Rf_2$ does not store the cut staple of the quantity that reaches the full staple detection position of one recovery passage $60R_L$ and the full load detection position of the other recovery passage $60R_R$, in the cut staple quantity detection unit $210R_2$, the light emitted from the light emitting unit $211R_2$ is incident on the light receiving unit $212R_2$ through one recovery passage $60R_L$ and the other recovery passage $60R_R$.

That is, the light emitted from the light emitting portion $211R_2$ passes through the window portion $600_L$, passes through one recovery passage $60R_L$, and is incident on the prism $214R_2$. The light incident on the prism $214R_2$ is reflected by the first reflection surface $217R_L$, passes through the first light guide unit $218R_L$ and is reflected by the second reflection surface $219R_L$. The light reflected by the second reflection surface $219R_L$ passes through the second light guide unit $218R_C$ and is reflected by the third reflection surface $219R_R$. The light reflected by the third reflection surface $219R_R$ passes through the third light guide unit $218R_R$, is reflected by the fourth reflection surface $217R_R$, and exits from the prism $214R_2$. The light emitted from the prism $214R_2$ passes through the window $600_R$, passes through the other recovery passage $60R_R$, and is incident on the light receiving unit $212R_2$.

In contrast, when the cut staple storage unit $6Rf_2$ stores a cut staple of a quantity that reaches one of the full load detection position of one recovery passage $60R_L$ or the full load detection position of the other recovery passage $60R_R$, the optical path of light emitted from the light emitting unit $211R_2$ is blocked by the cut staple and is not incident on the light receiving unit $212R_2$.

As a result, in the cut staple quantity detection unit $210R_2$, light emitted from the light emitting unit $211R_2$ is detected by the light receiving unit $212R_2$, so that the quantity of the cut staple stored in the cut staple storage unit $6Rf_2$ is detected not to be full. In addition, when the light emitted from the light emitting unit $211R_2$ is not detected by the light receiving unit $212R_2$, the quantity of the cut staple stored in the cut staple storage unit $6Rf_2$ is detected to be full.

In the cut staple quantity detection unit $210R_2$, without raising the position of the second light guide section $218R_C$ extending between the first recovery passage $60_L$ and the second recovery passage $60R$, it is possible to raise the positions of the first reflection surface $217R_L$ opposed to the light emitting unit $211R_2$ and the second reflection surface $217R_R$ opposed to the light receiving unit $212R_2$. Therefore, by raising the cut staple detection position of the window $600_L$ and the window $600_R$, it is possible to increase the quantity of full load detection.

FIG. 140 is a configuration diagram illustrating another modified example of the stapler according to the embodiment that performs full load detection of a cut staple with an optical sensor. Since the configuration of a stapler $1Rf_3$ is the same as that of the stapler $1Rf_1$ except for a cut staple quantity detection unit $210R_3$, the entire description will be omitted.

The stapler $1Rf_3$ and the cut staple storage unit $6Rf_3$ include an optical cut staple quantity detection unit $210R_3$ that detects the presence or absence of a predetermined quantity of a cut staple stored in the cut staple storage unit $6Rf_3$, using the presence or absence of light transmission. The cut staple quantity detection unit $210R_3$ is an example of a cut staple full load detection unit, and includes a light emitting unit $211R_3$ that emits light, and a light receiving unit $212R_3$ that detects light emitted from the light emitting unit $211R_3$. Further, the cut staple quantity detection unit $210R_3$ includes an optical waveguide $213R_3$ that guides the light emitted from the light emitting unit $211R_3$ to the light receiving unit $212R_3$ on a predetermined optical path.

In the cut staple quantity detection unit $210R_3$, the light emitting unit $211R_3$ and the light receiving unit $212R_3$ are provided in the stapler $1Rf_3$. Further, the cut staple quantity detection unit $210R_3$ is provided with the optical waveguide $213R_3$ in the cut staple storage unit $6Rf_3$.

The cut staple storage unit $6Rf_3$ includes a window $600_L$ in one recovery passage $60R_L$ and a window $600_R$ in the other recovery passage $60R_R$. The cut staple storage unit $6Rf_3$ is provided with a pair of windows $600_L$ on the wall surface opposed in the left-right direction of the recovery route $60R_L$, and a pair of windows $600_R$ are provided on the wall surface opposed in the left-right direction of the recovery passage $60R_R$.

The light emitting unit $211R_3$ is provided on the back surface of the stapler $1Rf_3$ with the light emitting direction facing the lateral inside of the stapler $1Rf_3$. Further, when the cut staple storage unit $6Rf_3$ is attached to the stapler $1Rf_3$, the light emitting unit $211R_3$ is provided at a position facing the window $600_L$ provided in the one recovery passage $60R_L$.

The light receiving unit $212R_3$ is provided on the back surface of the stapler $1Rf_3$ with the incidence surface of light (not illustrated) facing the inside of the side of the stapler $1Rf_3$. When the cut staple storage unit $6Rf_3$ is attached to the stapler $1Rf_3$, the light receiving unit $212R_3$ is provided at a position facing the window $600_R$ provided in the other recovery passage $60R_R$.

The optical waveguide $213R_3$ includes a prism $214R_3$. The prism $214R_3$ has an incident surface $220R_L$ opposed to the window $600_L$ of one recovery passage $60R_L$, an emitting surface $220R_R$ opposed to the window $600_R$ of the other recovery passage $60R_R$, and a light guide unit $220R_C$ for guiding the light between the incident surface $220R_L$ and the emitting surface $220R_R$.

As a result, the optical waveguide $213R_3$ forms an optical path that allows the light emitted from the light emitting unit $211R_3$ to enter the light receiving unit $212R_3$ through one recovery passage $60R_L$ and the other recovery passage $60R_R$.

Next, an example of operational effect of the cut staple quantity detection unit $210R_3$ will be described. When the cut staple storage unit $6Rf_3$ does not store the cut staple of the quantity that reaches the full staple detection position of one recovery passage $60R_L$ and the full staple detection quantity of the other recovery passage $60R_R$, in the staple detection unit $210R_3$, the light emitted from the light emitting unit $211R_3$ passes through one recovery passage $60R_L$ and the other recovery passage $60R_R$ and is incident on the light receiving unit $212R_3$.

That is, the light emitted from the light emitting unit $211R_3$ passes through the window $600_L$, passes through the one recovery passage $60R_L$, and is incident on the prism $214R_3$ from the incident surface $220R_L$. The light incident on the prism $214R_3$ exits from the emitting surface $220R_R$, passes through the window $600_R$, passes through the other recovery passage $60R_R$, and is incident on the light receiving unit $212R_3$.

In contrast, when the cut staple storage unit $6Rf3$ stores a quantity of cut staple that reaches one of the full load detection position of one recovery route $60R_L$ or the full load detection position of the other recovery route $60R_R$, the optical path of light emitted from the light emitting unit $211R_3$ is blocked by the cut staple, and does not enter the light receiving unit $212R_3$.

Accordingly, in the cut staple quantity detection unit $210R_3$, when the light emitted from the light emitting unit $211R_3$ is detected by the light receiving unit $212R_3$, the quantity of the cut staple stored in the cut staple storage unit $6Rf_3$ is detected not to be full. Further, when the light emitted from the light emitting unit $211R_3$ is not detected by the light receiving unit $212R_3$, the quantity of the cut staple stored in the cut staple storage unit $6Rf_3$ is detected to be full.

Since the optical waveguide $213R_3$ can be linearly formed in the cut staple quantity detection unit $210R_3$, it is possible to configure not only the prism but also an optical fiber.

<Optical Waveguide; Modified Example Using Reflecting Mirror>

FIG. 141 is a configuration diagram illustrating another modified example of the stapler of the embodiment that performs full load detection of a cut staple with an optical sensor. Since the configuration of a stapler $1Rf_4$ is the same as that of the stapler $1Rf_1$ except for a staple quantity detection unit $210R_4$, a description thereof will be omitted.

The stapler $1Rf_4$ and the cut staple storage unit $6Rf_4$ include an optical cut staple quantity detection unit $210R_4$ that detects the presence or absence of a predetermined quantity of a cut staple stored in the cut staple storage unit $6Rf_4$, using the presence or absence of light transmission. The cut staple quantity detection unit $210R_4$ is an example of a cut staple full load detection unit, and includes a light emitting unit $211R_4$ that emits light, and a light receiving unit $212R_4$ that detects light emitted from the light emitting unit $211R_4$. Further, the cut staple quantity detection unit $210R_4$ includes an optical waveguide $213R_4$ that guides the light from the light emitting unit $211R_4$ to the light receiving unit $212R_4$ on a predetermined optical path.

In the cut staple quantity detection unit $210R_4$, the light emitting unit $211R_4$ and the light receiving unit $212R_4$ are provided in the stapler $1Rf_4$. Further, the cut staple quantity detection unit $210R_4$ is provided with the optical waveguide $213R_4$ in the cut staple storage unit $6Rf_4$.

The cut staple storage unit $6Rf_4$ has a window $600_L$ in one recovery passage $60R_L$ and a window $600_R$ in the other recovery passage $60R_R$. When the cut staple storage unit $6Rf_4$ is attached to the stapler $1Rf_4$, the light emitting unit $211R_4$ is provided at a position facing the window $600_L$ provided in the one recovery passage $60R_L$. When the cut staple storage unit $6Rf_2$ is attached to the stapler $1Rf_2$, the light receiving unit $212R_4$ is provided at a position facing the window $600_R$ provided in the other recovery passage $60R_R$.

The optical waveguide $213R_4$ includes a first reflection surface $221R_L$ opposed to the window $600_L$ of the one recovery passage $60R_L$, and a second reflection surface $222R_L$ that reflects the light reflected by the first reflection surface $221R_L$. The first reflection surface $221R_L$ forms an optical path along the one recovery passages $60R_L$, and the second reflection surface $222R_L$ forms an optical path that connects the one recovery passage $60R_L$ and the other recovery passage $60R_R$.

The optical waveguide $213R_4$ has a third reflection surface $222R_R$ that reflects the light reflected by the second reflection surface $222R_L$, and a fourth reflection surface $221R_R$ that faces the window $600_R$ of the other recovery passage $60R_R$ and reflects the light reflected by the third reflection surface $222R_R$. The third reflection surface $222R_R$ forms an optical path along the other recovery passage $60R_R$. The first reflection surface $221R_L$, the second reflection surface $222R_L$, the third reflection surface $222R_R$, and the fourth reflection surface $221R_R$ are made up of reflecting mirrors. Furthermore, the optical waveguide $213R_4$ includes a cover $215R_4$ that covers the optical path formed by the respective reflection surfaces.

Therefore, the optical waveguide $213R_4$ forms an optical path through which light emitted from the light emitting unit $211R_4$ enters the light receiving unit $212R_4$ through one recovery passage $60R_L$ and the other recovery passage $60R_R$.

Next, an example of operational effect of the cut staple quantity detection unit $210R_4$ will be described. When the cut staple storage unit $6Rf_4$ does not store the cut staple of the quantity that reaches the full staple detection position of one recovery passage $60R_L$ and the full staple detection quantity of the other recovery passage $60R_R$, in the staple detection unit $210R_4$, the light emitted from the light emitting unit $211R_4$ enters the light receiving unit $212R_4$ through one recovery passage $60R_L$ and the other recovery passage $60R_R$.

That is, the light emitted from the light emitting unit $211R_4$ passes through the window $600_L$, passes through the one recovery passage $60R_L$, is reflected by the first reflection surface $221R_L$, and is reflected by the second reflection surface $222R_L$. The light reflected by the second reflection surface $222R_L$ is reflected by the third reflection surface $222R_R$ and is reflected by the fourth reflection surface $221R_R$. The light reflected by the fourth reflection surface $221R_R$ passes through the window $600_R$, passes through the other recovery passage $60R_R$, and is incident on the light receiving unit $212R_4$.

In contrast, when the cut staple storage unit $6Rf_4$ stores a quantity of cut staple that reaches one of the full load detection position of one recovery route $60R_L$ or the full load detection position of the other recovery route $60R_R$, the light emitting unit $211R_4$ is blocked by the cut staple and does not enter the light receiving unit $212R_4$.

Accordingly, the cut staple quantity detection unit $210R_4$ detects that the quantity of the cut staple stored in the cut staple storage unit $6Rf_4$ is not full, when the light emitted from the light emitting unit $211R_4$ is detected by the light receiving unit $212R_4$. In addition, when the light emitted from the light emitting unit $211R_4$ is not detected by the light receiving unit $212R_4$, the quantity of the cut staple stored in the cut staple storage unit $6Rf_4$ is detected to be full.

Since the optical waveguide is constituted by the reflection surface of the reflecting mirror or the like in the cut staple quantity detecting portion $210R_4$, it is unnecessary to provide a light guiding member such as a prism or an optical fiber between the reflection surface and the reflection surface.

<Optical Waveguide; Modified Example in which Optical Path is Aligned with Inclination of Stapler>

FIGS. 142 and 143 are configuration diagrams illustrating another modified example of the stapler of the embodiment that performs full load detection of the cut staple with the optical sensor. Since the configuration of a stapler $1Rf_5$ is the same as that of the stapler $1Rf_1$ except for a cut staple quantity detection unit $210R_5$, the entire description will be omitted.

The stapler $1Rf_5$ and the cut staple storage unit $6Rf_5$ are provided with an optical cut staple quantity detection unit $210R_5$ which detects the presence or absence of a predetermined quantity of the cut staple 13A stored in the cut staple storage unit $6Rf_5$, using the presence or absence of light transmission. The cut staple quantity detection unit $210R_5$ is an example of a cut staple full load detection unit, and includes a light emitting unit $211R_5$ that emits light, and a light receiving unit $212R_5$ that detects light emitted from the light emitting unit $211R_5$. The cut staple quantity detection unit $210R_5$ detects an optical waveguide $213R_5$ that guides the light emitted from the light emitting unit $211R_5$ to the light receiving unit $212R_5$ on a predetermined optical path.

In the cut staple quantity detection unit $210R_5$, the light emitting unit $211R_5$ and the light receiving unit $212R_5$ are provided on the stapler $1Rf_5$ by the support member 223. Further, in the cut staple quantity detection unit $210R_5$, the optical waveguide $213R_5$ is provided in the cut staple storage unit $6Rf_5$ by the support member 224.

The support member 223 is configured such that the emission direction of the light emitting unit $211R_5$ and the incident direction of the light receiving unit $212R_5$ can be adjusted by rotation about the fulcrum 223a. Further, the support member 223 is maintained at an adjusted angle, by a screw and fixing member 223b such as a long hole along the rotation locus of the support member 223.

The optical waveguide $213R_5$ includes a prism $214R_5$. The prism $214_R$ has a first reflection surface $217R_L$ opposed to the light emitting unit $211R_5$ through a window (not illustrated) of the one recovery passages $60R_L$, and a first light guide unit $218R_L$ that guides the light reflected by the first reflection surface $217R_L$. The first light guide unit $218R_L$ extends along one recovery passage $60R_L$.

The prism $214R_5$ has a second reflection surface $219R_L$ that reflects the light guided by the second light guide unit $218R_L$, and a second light guide unit $218\ R_C$ that guides light reflected by the second reflection surface $219R$, and a third reflection surface $219R_R$ that reflects the light guided by the second light guide unit $218R_C$. The second light guide unit $218R_C$ extends in a direction of connecting the one recovery passage $60R_L$ with the other recovery passage $60R_R$.

Further, the prism $214R_5$ includes a third light guide unit $218R_R$ which guides the light reflected by the third reflection surface $219R_R$. The third light guide unit $218R_R$ is disposed along the other recovery passage $60R_R$. The prism $214R_5$ has a fourth reflection surface $217R_R$ that faces the light receiving unit $212R_5$ through a window (not illustrated) of the other recovery passage $60R_R$, and reflects the light guided by the third light guide unit $218R_R$.

Therefore, the optical waveguide $213R_5$ forms an optical path which allows the light emitted from the light emitting unit $211R_5$ to enter the light receiving unit $212R_5$ through one recovery passage $60R_L$ and the other recovery passage $60R_R$.

The support member 224 is configured so that the incident direction and the emission direction of the prism $214R_5$ can be adjusted by rotation about the fulcrum $224a$. Further, the support member 224 is maintained at an adjusted angle by a screw and a first fixing member $224b$ such as an elongated hole along the locus of rotation of the support member 224. Further, the support member 224 is adjusted and held in the height direction of the fulcrum $224a$ by the second fixing member $224c$ having the screw or long holes and the like.

Next, an example of operational effect of the cut staple quantity detection unit $210R_5$ will be described. In the case where the stapler $1Rf_5$ is applied to the post-processing apparatus 502A illustrated in FIG. 2 and the like, as illustrated in FIG. 143, the stapler $1Rf_5$ is inclined in a direction in which the side of the cut staple storage unit $6Rf_5$ is lowered.

Therefore, when the quantity of the cut staples 13A stored in the cut staple storage unit $6Rf_5$ increases and the cut staples 13A are stacked on the recovery passages $60R_L$ and $60R_R$, the upper surface of the cut staple 13A is inclined in accordance with the inclination of the stapler $1Rf_5$.

Therefore, the emission direction of the light emitting unit $211R_5$ and the incident direction of the light receiving unit $212R_5$ are adjusted by the support member 223 in accordance with the inclination of the stapler $1Rf_5$ to match the inclination of the upper surface of the cut staple 13A. Further, the incident direction and the emission direction of the prism $214R_5$ are adjusted by the support member 224 in accordance with the inclination of the stapler $1Rf_5$ to match the inclination of the upper surface of the cut staple 13A.

When the cut staple storage unit $6Rf_5$ does not store the cut staple 13A of an quantity that reaches the full load detection position of one recovery route $60R_L$ and the full load detection position of the other recovery route $60R_R$, in the cut staple quantity detection unit $210R_5$, light emitted from the light emitting unit $211R_5$ is incident on the light receiving unit $212R_5$ through the one recovery passage $60R_L$, the prism $214R_2$ and the other recovery passage $60R_R$.

In contrast, in the case where the cut staple storage unit $6Rf_5$ stores the cut staple 13A of a quantity that reaches one of the full load detection position of the one recovery passage $60R_L$ or the full load detection position of the other recovery passage $60R_R$, optical path of light emitted from the light emitting unit $211R_5$ is blocked by the cut staple and does not enter the light receiving unit $212R_5$.

Thus, in the cut staple quantity detection unit $210R_5$, when the light emitted from the light emitting unit $211R_2$ is detected by the light receiving unit $212R_5$, the quantity of the cut staple 13A stored in the cut staple storage unit $6Rf_5$ is detected not to be full. In addition, when the light emitted from the light emitting unit $211R_5$ is not detected by the light receiving unit $212R_5$, the quantity of the cut staple 13A stored in the cut staple storage unit $6Rf_5$ is detected to be full.

In the cut staple quantity detecting unit $210R_5$, by setting the emission direction of the light emitting unit $211R_5$ and the incident direction of the light receiving unit $212R_5$ and the incident direction and the emission direction of the prism $214R_5$ to match the inclination of the upper surface of the cut staple 13A according to the inclination of the stapler $1Rf_5$, it is possible to suppress erroneous detection of full load detection.

<Optical Waveguide: Modified Example of Detecting Quantity Cut Staple Before Full Load Detection>

FIG. 144 is a configuration diagram illustrating another modified example of the stapler of the embodiment that performs full load detection of the cut staple with the optical sensor. Since the configuration of a stapler $1Rf_6$ is the same as that of the stapler $1Rf_1$ except for as cut staple quantity detection unit $210R_6$, a description thereof will be omitted.

The stapler $1Rf_6$ and the cut staple storage unit $6Rf_6$ include an optical cut staple quantity detection unit $210R_6$ that detects the presence or absence of a predetermined quantity of a cut staple stored in the cut staple storage unit $6Rf_6$, using the presence or absence of light transmission. The cut staple quantity detection unit $210R_6$ is an example of a cut staple full load detection unit, and includes a first light emitting unit $211R_{61}$ that emits light, and a first light receiving unit $212R_{61}$ that detects light emitted from the first light emitting unit $211R_1$. Further, the cut staple quantity detection unit $210R_6$ includes a second light emitting unit $211R_{62}$ which emits light, and a second light receiving unit $212R_{62}$ which detects light emitted from the second light emitting unit $211R_{62}$.

Further, the cut staple quantity detection unit $210R_6$ includes an optical waveguide $213R_6$ which guides the light emitted from the first light emitting unit $211R_{61}$ to the second light receiving unit $212R_{61}$, and guides the light emitted from the second light emitting unit $211R_{62}$ to the second light receiving unit $212R_{62}$ on a predetermined optical path.

In the cut staple quantity detection unit $210R_6$, the first light emitting unit $211R_{61}$ and the second light emitting unit $211R_{62}$, and the first light receiving unit $212R_{61}$ and the second light receiving unit $212R_{62}$ are provided in the stapler $1Rf_6$. Further, the cut staple quantity detection unit $210R_6$ is provided with an optical waveguide $213R_6$ in the cut staple storage unit $6Rf_6$.

The optical waveguide $213R_6$ has a first prism $214R_{61}$ and a second prism $214R_{62}$, and a cover $215R_6$ that covers the first prism $214R_{61}$ and the second prism $214R_{62}$.

The first prism $214R_{61}$ includes a first reflection surface $214R_{L1}$ opposed to the first light emitting unit $211R_{61}$ through a window (not illustrated) of the one recovery passage $60R_L$, a second reflection surface $214R_{R1}$ opposed to the first light receiving unit $212R_6$ through a window (not illustrated) of the other recovery passage $60R_R$, and a light guide unit $214R_{C1}$ which guides light between the first reflection surface $214R_{L1}$ and the second reflection surface $214R_{R1}$.

The second prism $214R_{62}$ includes a first reflection surface $214R_{L2}$ opposed to the second light emitting unit $211R_{62}$ through a window (not illustrated) of the one recovery passage $60R_L$, a second reflection surface $214R_{R2}$ opposed to the second light receiving unit $212R_{62}$ through a window (not illustrated) of the other recovery passage $60R_R$, and a light guide unit $214R_2$ which guides light between the first reflection surface $214R_{L2}$ and the second reflection surface $214R_{R2}$.

Therefore, the optical waveguide $213R_6$ forms an optical path that allows the light emitted from the first light emitting unit $211R_{61}$ to enter the first light receiving unit $212R_{61}$ through the one recovery passage $60R_L$ and the other recovery passage $60R_R$, at the first detection position of detecting that the cut staple stored in the cut staple storage unit $6Rf_6$ is the first quantity.

The optical waveguide $213R_6$ forms an optical path that allows the light emitted from the second light emitting unit $211R_{62}$ to enter the second light receiving unit $212R_{62}$ through the one recovery passage $60R_L$ and the other recovery passage $60R_R$, at the second detection position of detecting that the cut staple stored in the cut staple storage unit $6Rf_6$ is the second quantity.

Here, the first detection position is a full load detection position. In contrast, the second detection position is a detection position with a predetermined quantity smaller than the full load.

Next, an example of operational effect of the cut staple quantity detection unit $210R_6$ will be described. In the cut staple quantity detection unit $210R_6$, when the cut staple storage unit $6Rf_6$ does not store the cut staple having the quantity that reaches the second detection position of one recovery passage $60R_L$ and the second detection position of the other recovery passage $60R_R$, the light emitted from the second light-emitting unit $211R_{62}$ is incident on the second light receiving unit $212R_{62}$ through the one recovery passage $60R_L$ and the other recovery passage $60R_R$. In a state in which the loading height of the cut staple does not reach the second position, the cut staple does not reach the full detection position which is the first detection position.

In contrast, in the case where a cut staple having an quantity that reaches one of the second detection position of one recovery passage $60R_L$ or the second detection position of the other recovery passage $60R_R$ is stored in the cut staple storage unit $6Rf_6$, the optical path of the light emitted from the second light emitting unit $211R_{62}$ is shielded by the cut staple and is not incident on the second light receiving unit $212R_{62}$. In the case where the storage quantity of the cut staple further increases and an quantity of the cut staple which reaches one of the full load detection position of one recovery passage $60R_L$ or the full load detection position of the other recovery passage $60R_R$ is stored, the optical path of the light emitted from the portion $211R_{61}$ is blocked by the cut staple and the light does not enter the first light receiving unit $212R_{61}$.

As a result, when the light emitted from the first light emitting unit $211R_{61}$ is detected by the first light receiving unit $212R_{61}$, and the light emitted from the second light emitting unit $211R_{62}$ is detected by the second light receiving unit $212R_{62}$, the cut staple quantity detection unit $210R_6$ detects that the quantity of the cut staple stored in the cut staple storage unit $6Rf_6$ is not full.

In addition, when the light emitted from the second light emitting unit $211R_{62}$ is not detected by the second light receiving unit $212R_{62}$, the quantity of the cut staple stored in the cut staple storage unit $6Rf_6$ is detected to approach the full load. Furthermore, when the light emitted from the first light emitting unit $211R_{61}$ is not detected by the first light receiving unit $212R_{61}$, the quantity of the cut staple stored in the cut staple storage unit $6Rf_6$ is detected to be full.

The cut staple quantity detection unit $210R_6$ detects that the quantity of the cut staple stored in the cut staple storage unit $6Rf_6$ approaches the full load before the detection of full load of the cut staple, notifies the detection to the post-processing apparatus 502A illustrated in FIG. 2 and the like and can notify the user or the like from the post-processing apparatus 502A. Thus, it is possible to perform the work such as replacement of the cut staple storage unit $6Rf_6$ at a desired timing before the full load detection.

<Optical Waveguide: Modified Example Using Full Load Detection and Opening/Closing Detection of Lid of Cut Staple Storage Unit>

FIGS. 145A and 145B are configuration diagrams illustrating another modified example of the stapler of the embodiment in which the full load detection of the cut staple is performed by the optical sensor. Since a stapler $1Rf_7$ has the same configuration as the stapler $1Rf_1$ except for a cut staple quantity detection unit $210R_7$, overall description thereof will be omitted.

The stapler $1Rf_7$ and a cut staple storage unit $6Rf_7$ are provided with the optical cut staple quantity detection unit $210R_7$ that detects whether or not a given amount of cut staple stored in the cut staple storage unit $6Rf_7$ are present using whether or not the transmission of light is present. The cut staple quantity detection unit $210R_7$ is an example of cut staple full load detection unit, and is provided with a light emitting unit $211R_7$ that reflects light and a light receiving unit $212R_7$ that detects the light reflected from light emitting unit $211R_7$. The cut staple quantity detection unit $210R_7$ is provided with an optical waveguide $213R_7$ that guides the light emitted from the light emitting unit $211R_7$ to the light receiving unit $212R_7$ along a given optical path.

The cut staple quantity detection unit $210R_7$ has the light emitting unit $211R_7$ and the light receiving unit $212R_7$ provided for the stapler $1Rf_7$. The cut staple quantity detection unit $210R_7$ has the optical waveguide $213R_7$ provided for the cut staple storage unit $6Rf_7$.

The optical waveguide $213R_7$ is provided with a prism $214R_7$ and a cover $215R_7$ that covers the prism $214R_7$. The prism $214R_7$ is provided with a first reflection surface $214R_L$ that faces the light emitting unit $211R_7$ through a window (not illustrated) of one recovery passage $60R_L$, a second reflection surface $214R_R$ that faces the light receiving unit $212R_7$ through a window (not illustrated) of the other recovery passage $60R_R$, and a light guiding unit $214R_C$ that guides the light between the first reflection surface $214R_L$ and the second reflection surface $214R_R$.

Thereby, the optical waveguide $213R_7$ forms an optical path that causes the light emitted from the light emitting unit $211R_7$ to be incident upon the light receiving unit $212R_7$ through the one recovery passage $60R_L$ and the other recovery passage $60R_R$.

The cut staple storage unit $6Rf_7$ is provided with a discharge port 216R of the cut staple, and a lid 216Rf that can open/close the discharge port 216R. The discharge port 216R is configured by providing an opening in one lateral surface of the cut staple storage unit $6Rf_7$.

The lid 216Rf is mounted to be movable in a direction in which the one recovery passage $60R_L$ extend in the present example. A blocking part $216Rf_1$ for blocking the discharge port 216R and an opening part $216Rf_2$ for opening the discharge port 216R are provided in a moving direction of the lid 216Rf. The lid 216Rf moves in one direction as illustrated in FIG. 145A, and thereby the blocking part $216Rf_1$ faces the discharge port 216R and blocks the discharge port 216R. The lid 216Rf moves in the other direction as illustrated in FIG. 145B, and thereby the opening part $216Rf_2$ faces the discharge port 216R and blocks the discharge port 216R.

The lid $216Rf_1$ s provided with a window $216Rf_3$ and a shield part $216Rf_4$ that switch whether or not to shield the optical path from the light emitting unit $211R_7$ to the light receiving unit $212R_7$. The window $216Rf_3$ and the shield part $216Rf_4$ are provided in the moving direction of the lid $216Rf$.

The lid $216Rf$ moves in one direction as illustrated in FIG. 145A, and thereby the window $216Rf_3$ faces the window (not illustrated) of the one recovery passage $60R_L$, and opens the optical path passing through the one recovery passage $60R_L$. In FIG. 145A, the blocking part $216Rf_1$ of the lid $216Rf$ faces the discharge port $216R$, and the discharge port $216R$ is closed. However, since the cut staple storage unit $6Rf_7$ is transmitted and illustrated, the internal window $216Rf_3$ is illustrated.

As illustrated in FIG. 145B, the lid $216Rf$ moves in the other direction. Thereby, the shield part $216Rf_4$ faces the window (not illustrated) of the one recovery passage $60R_L$, and shields the optical path passing through the one recovery passage $60R_L$.

Next, an example of operation and effects of the cut staple quantity detection unit $210R_7$ will be described. When the amount of cut staple that reaches a full load detection position of the one recovery passage $60R_L$ and a full load detection position of the other recovery passage $60R_R$ are not stored in the cut staple storage unit $6Rf_7$ at the cut staple quantity detection unit $210R_7$, the light emitted from the light emitting unit $211R_7$ is incident upon the light receiving unit $212R_7$ through the one recovery passage $60R_L$ and the other recovery passage $60R_R$.

In contrast, when the amount of cut staple that reaches any one of the full load detection position of the one recovery passage $60R_L$ and the full load detection position of the other recovery passage $60R_R$ are stored in the cut staple storage unit $6Rf_7$, the light emitted from the light emitting unit $211R_7$ is obstructed on its optical path by the cut staple, and is not incident upon the light receiving unit $212R_7$.

As illustrated in FIG. 145A, at the cut staple storage unit $6Rf_7$, the window $216Rf_3$ faces the window (not illustrated) of the one recovery passage $60R_L$ at a position at which the blocking part $216Rf_1$ of the lid $216Rf$ faces the discharge port $216R$ to close the discharge port $216R$, and opens the optical path passing through the one recovery passage $60R_L$. Therefore, when the cut staple does not reach the full load detection position, the light emitted from the light emitting unit $211R_7$ is incident upon the light receiving unit $212R_2$ through the one recovery passage $60R_L$ and the other recovery passage $60R_R$.

In contrast, as illustrated in FIG. 145B, at the cut staple storage unit $6Rf_7$, the shield part $216Rf_4$ faces the window (not illustrated) of the one recovery passage $60R_L$ at a position at which the opening part $216Rf_2$ of the lid $216Rf$ faces the discharge port $216R$ to open the discharge port $216R$, and shields the optical path passing through the one recovery passage $60R_L$. Therefore, regardless of whether or not the cut staple reaches the full load detection position, in a state in which the lid $216Rf_1$ s open, the light emitted from the light emitting unit $211R_7$ is obstructed on its optical path, and is not incident upon the light receiving unit $212R_7$.

Thus, at the cut staple quantity detection unit $210R_7$, the light emitted from the light emitting unit $211R_7$ is detected by the light receiving unit $212R_7$, and thereby it is detected that the amount of the cut staple stored in the cut staple storage unit $6Rf_7$ is not fully loaded. The light emitted from the light emitting unit $211R_7$ is not detected by the light receiving unit $212R_7$, and thereby it is detected that the amount of the cut staple stored in the cut staple storage unit $6Rf_7$ is fully loaded or that the lid $216Rf$ is open.

At the cut staple quantity detection unit $210R_7$, the full load detection of the cut staple and the detection of the opening/closing of the lid $216Rf$ can be used by the same detection unit, and the operation of the stapler $1Rf_7$ can be prevented in the state in which the lid $216Rf$ is open. Thereby, the cut staple can be prevented from being scattered inside a post-processing apparatus $502A$.

<Optical Waveguide: Modified Example in which Light Receiving and Emitting Parts are in an Integral Type>

FIG. 146 is a configuration diagram illustrating another modified example of the stapler of the embodiment in which the full load detection of the cut staple is performed by the optical sensor. Since a stapler $1Rf_8$ has the same configuration as the stapler $1Rf_1$ except for a cut staple quantity detection unit $210R_8$, overall description thereof will be omitted.

The stapler $1Rf_8$ and a cut staple storage unit $6Rf_8$ are provided with the optical cut staple quantity detection unit $210R$ that detects whether or not a given amount of cut staple stored in the cut staple storage unit $6Rf_8$ are present using whether or not the transmission of light is present.

The cut staple quantity detection unit $210R_8$ is an example of cut staple full load detection unit, and is provided with a first light emitting unit $211R_{81}$ that emits light, and a first light receiving unit $212R_1$ that detects the light emitted from the first light emitting unit $211R_{81}$. The cut staple quantity detection unit $210R$ is provided with a first optical waveguide $213R_{81}$ that guides the light emitted from the first light emitting unit $211R_{81}$ to the first light receiving unit $212R_{81}$ along a given optical path.

Further, the cut staple quantity detection unit $210_8$ is provided with a second light emitting unit $211R_{82}$ that emits light, and a second light receiving unit $212R_{82}$ that detects the light emitted from the second light emitting unit $211R_{82}$, The cut staple quantity detection unit $210R_8$ is provided with a second optical waveguide $213R_{82}$ that guides the light emitted from the second light emitting unit $211R_{82}$ to the second light receiving unit $212R_{82}$ along a given optical path.

The cut staple quantity detection unit $210R_8$ has the first light emitting unit $211R_{81}$ and the first light receiving unit $212R_{81}$ that are configured as one unit and are provided at positions that face one recovery passage $60R_L$ of the cut staple storage unit $6Rf_8$ in the stapler $1Rf_8$. A light emitting direction the first light emitting unit $211R_{81}$ is directed to the rear of the stapler $1Rf_8$, and a receiving surface of light of the first light receiving unit $212R_{81}$ is directed to the rear of the stapler $1Rf_8$.

The cut staple quantity detection unit $210R_8$ has the second light emitting unit $211R_{82}$ and the second light receiving unit $212R_{82}$ that are configured as one unit and are provided at positions that face the other recovery passage $60R_R$ of the cut staple storage unit $6Rf_8$ in the stapler $1Rf_8$. A light emitting direction of the second light emitting unit $211R_{82}$ is directed to the rear of the stapler $1Rf_8$, and a receiving surface of light of the second light receiving unit $212R_{82}$ is directed to the rear of the stapler $1Rf_8$.

Further, the cut staple quantity detection unit $210R_8$ has the first optical waveguide $213R_{81}$ that is provided for the one recovery passage $60R_L$ of the cut staple storage unit $6Rf_8$, and the second optical waveguide $213R_{82}$ that is provided for the other recovery passage $60R_R$ of the cut staple storage unit $6Rf_8$.

The first optical waveguide $213R_{81}$ is provided with a prism $214R_{81}$. The prism $214R_{81}$ is provided with a first reflection surface $214R_{L1}$ that faces the first light emitting unit $211R_{81}$ through a window (not illustrated) of the one recovery passage $60R_L$, a second reflection surface $214R$ that faces the first light receiving unit $212R_{81}$ through the window (not illustrated) of the one recovery passage $60R_L$, and a light guiding unit $214R_{C1}$ that guides light between the first reflection surface $214R_{L1}$ and the second reflection surface $214R_{L2}$.

The second optical waveguide $213R_{82}$ is provided with a prism $214R_{82}$. The prism $214R_{82}$ is provided with a first reflection surface $214R_{R1}$ that faces the second light emitting unit $211R_{82}$ through a window (not illustrated) of the other recovery passage $60R_R$, a second reflection surface $214R_{R2}$ that faces the second light receiving unit $212R_{82}$ through the window (not illustrated) of the other recovery passage $60R_R$, and a light guiding unit $214R_{C2}$ that guides light between the first reflection surface $214R_{R1}$ and the second reflection surface $214R_{R2}$.

Thereby, the first optical waveguide $213R_{81}$ forms an optical path that causes the light emitted from the first light emitting unit $211R_{81}$ to be incident onto the first light receiving unit $212R_{81}$ through the one recovery passage $60R_L$. The second optical waveguide $213R_{82}$ forms an optical path that causes the light emitted from the second light emitting unit $211R_{82}$ to be incident onto the second light receiving unit $212R_{82}$ through the other recovery passage $60R_R$.

Next, an example of operation and effects of the cut staple quantity detection unit $210R_8$ will be described. When the amount of cut staple that reaches a full load detection position of the one recovery passage $60R_L$ and a full load detection position of the other recovery passage $60R_R$ are not stored in the cut staple storage unit $6Rf_8$ at the cut staple quantity detection unit $210R_8$, the light emitted from the first light emitting unit $211R_{81}$ is incident upon the first light receiving unit $212R_{81}$ through the one recovery passage $60R_L$.

That is, the light emitted from the first light emitting unit $211R_{81}$ is reflected by the first reflection surface $214R_{L1}$ and the second reflection surface $214R_{L2}$ of the prism $214R_{81}$ through the one recovery passage $60R_L$, and is incident upon the first light receiving unit $212R_{81}$ through the one recovery passage $60R_L$.

The light emitted from the second light emitting unit $211R_{82}$ is incident upon the second light receiving unit $212R_{82}$ through the other recovery passage $60R_R$. That is, the light emitted from the second light emitting unit $211R_{82}$ is reflected by the first reflection surface $214R_{R1}$ and the second reflection surface $214R_{R2}$ of the prism $214R_{82}$ through the other recovery passage $60R_R$, and is incident upon the second light receiving unit $212R_{82}$ through the other recovery passage $60R_R$.

In contrast, when the amount of cut staple that reaches the full load detection position of the one recovery passage $60R_L$ are stored in the cut staple storage unit $6Rf_8$, the light emitted from the first light emitting unit $211R_{81}$ is obstructed on its optical path by the cut staple, and is not incident upon the first light receiving unit $212R_{81}$. Moreover, when the amount of cut staple that reaches the full load detection position of the other recovery passage $60R_R$ are stored in the cut staple storage unit $6Rf_8$, the light emitted from the second light emitting unit $211R_{82}$ is obstructed on its optical path by the cut staple, and is not incident upon the second light receiving unit $212R_{82}$.

Thus, at the cut staple quantity detection unit $210R_8$, the light emitted from the first light emitting unit $211R_{81}$ is detected by the first light receiving unit $212R_{81}$, and the light emitted from the second light emitting unit $211R_{82}$ is detected by the second light receiving unit $212R_{82}$. Thereby, it is detected that the amount of the cut staple stored in the cut staple storage unit $6Rf_8$ is not fully loaded.

The light emitted from the first light emitting unit $211R_{81}$ is not detected by the first light receiving unit $212R_{81}$, or the light emitted from the second light emitting unit $211R_{82}$ is not detected by the second light receiving unit $212R_{82}$, and thereby it is detected that the amount of the cut staple stored in the cut staple storage unit $6Rf_8$ is fully loaded.

At the cut staple quantity detection unit $210R_8$, the full load detection is independently allowed by the one recovery passage 60L and the other recovery passage 60R of the cut staple storage unit $6Rf_8$.

FIG. 147 is a configuration diagram illustrating another modified example of the stapler of the embodiment in which the full load detection of the cut staple is performed by the optical sensor. Since a stapler $1Rf_9$ has the same configuration as the stapler $1Rf_1$ except for a cut staple quantity detection unit $210R_9$, overall description thereof will be omitted.

The stapler $1Rf_9$ and a cut staple storage unit $6Rf_9$ are provided with the optical cut staple quantity detection unit $210R_9$ that detects whether or not a given amount of cut staple stored in the cut staple storage unit $6Rf_9$ are present using whether or not the transmission of light is present.

The cut staple quantity detection unit $210R_9$ is an example of cut staple full load detection unit, and is provided with a first light emitting unit $211R_{91}$ that emits light, and a first light receiving unit $212R_{91}$ that detects the light emitted from the first light emitting unit $211R_{91}$. The cut staple quantity detection unit $210R_9$ is provided with a first optical waveguide $213R_9$ that guides the light emitted from the first light emitting unit $211R_{91}$ to the first light receiving unit $212R_{91}$ along a given optical path.

Further, the cut staple quantity detection unit $210R_9$ is provided with a second light emitting unit $211R_{92}$ that emits light, and a second light receiving unit $212R_{92}$ that detects the light emitted from the second light emitting unit $211R_{92}$. The cut staple quantity detection unit $210R_9$ is provided with a second optical waveguide $213R_{92}$ that guides the light emitted from the second light emitting unit $211R_{92}$ to the second light receiving unit $212R_{92}$ along a given optical path.

The cut staple quantity detection unit $210R_9$ has the first light emitting unit $211R_{91}$ and the first light receiving unit $212R_{91}$ that are configured as one unit and are provided for the stapler $1Rf_9$. The first light emitting unit $211R_{91}$ and the first light receiving unit $212R_{91}$ are provided inside the one recovery passage $60R_L$ of the cut staple storage unit $6Rf_9$ mounted on the stapler $1Rf_9$. A light emitting direction of the first light emitting unit $211R_{91}$ is directed to a lateral outer side of the stapler $1Rf_9$, and a receiving surface of light of the first light receiving unit $212R_{91}$ directed to the lateral outer side of the stapler $1Rf_9$.

The cut staple quantity detection unit $210R_9$ has the second light emitting unit $211R_{92}$ and the second light receiving unit $212R_{92}$ that are configured as one unit and are provided for the stapler $1Rf_9$. The second light emitting unit $211R_{92}$ and the second light receiving unit $212R_{92}$ are provided inside the other recovery passage $60R_R$ of the cut staple storage unit $6Rf_9$ mounted on the stapler $1Rf_9$. A light emitting direction of the second light emitting unit $211R_{92}$ is directed to a lateral outer side of the stapler $1Rf_9$, and a receiving surface of light of the second light receiving unit $212R_{92}$ directed to the lateral outer side of the stapler $1Rf_9$.

Further, the cut staple quantity detection unit $210R_9$ is configured such that the first optical waveguide $213R_{91}$ is provided at an outer lateral surface of the one recovery passage $60R_L$ of the cut staple storage unit $6Rf_9$ and that the second optical waveguide $213R_{92}$ is provided on an outer lateral surface of the other recovery passage $60R_R$ of the cut staple storage unit $6Rf_9$.

The first optical waveguide $213R_{91}$ is provided with a prism $214R_{91}$. The prism $214R_{91}$ is provided with a first reflection surface $214R_{L1}$ that faces the first light emitting unit $211R_{91}$ through a window (not illustrated) of the one recovery passage $60R_L$, a second reflection surface $214R_{L2}$ that faces the first light receiving unit $212R_{91}$ through the window (not illustrated) of the one recovery passage $60R_L$, and a light guiding unit $214R_{C1}$ that guides light between the first reflection surface $214R_{L1}$ and the second reflection surface $214R_{L2}$.

The second optical waveguide $213R_{92}$ is provided with a prism $214R_{92}$. The prism $214R_{92}$ is provided with a first reflection surface $214R_{R1}$ that faces the second light emitting unit $211R_{92}$ through a window (not illustrated) of the other recovery passage $60R_R$, a second reflection surface $214R_{R2}$ that faces the second light receiving unit $212R_{92}$ through the window (not illustrated) of the other recovery passage $60R_R$, and a light guiding unit $214R_{C2}$ that guides light between the first reflection surface $214R_{R1}$ and the second reflection surface $214R_{R2}$.

Thereby, the first optical waveguide $213R_{91}$ forms an optical path that causes the light emitted from the first light emitting unit $211R_{91}$ to be incident upon the first light receiving unit $212R_{91}$ through the one recovery passage $60R_L$. The second optical waveguide $213R_{92}$ forms an optical path that causes the light emitted from the second light emitting unit $211R_{92}$ to be incident upon the second light receiving unit $212R_{92}$ through the other recovery passage $60R_R$.

Next, an example of operation and effects of the cut staple quantity detection unit $210R_9$ will be described. When the amount of cut staple that reaches a full load detection position of the one recovery passage $60R_L$ and a full load detection position of the other recovery passage $60R_R$ are not stored in the cut staple storage unit $6Rf_9$ at the cut staple quantity detection unit $210R_9$, the light emitted from the first light emitting unit $211R_{91}$ is incident upon the first light receiving unit $212R_{91}$ through the one recovery passage $60R_L$. In addition, light emitted from the second light emitting unit $211R_{92}$ is incident upon the second light receiving unit $212R_{92}$ through the other recovery passage $60R_R$.

In contrast, when the cut staple of the amount that reaches the full load detection position of the one recovery passage $60R_L$ are stored in the cut staple storage unit $6Rf_9$, the light emitted from the first light emitting unit $211R_{91}$ is obstructed on its optical path by the cut staple, and is not incident upon the first light receiving unit $212R_{91}$. In addition, when the cut staple of the amount that reaches the full load detection position of the other recovery passage $60R_R$ are stored in the cut staple storage unit $6Rf_9$, the light emitted from the second light emitting unit $211R_{92}$ is obstructed on its optical path by the cut staple, and is not incident upon the second light receiving unit $212R_{92}$.

Thereby, at the cut staple quantity detection unit $210R_9$, the light emitted from the first light emitting unit $211R_{91}$ is detected by the first light receiving unit $212R_{91}$, and the light emitted from the second light emitting unit $211R_{92}$ is detected by the second light receiving unit $212R_{92}$, thereby it is detected that the amount of the cut staple stored in the cut staple storage unit $6Rf_9$ is not fully loaded.

In addition, the light emitted from the first light emitting unit $211R_{91}$ is not detected by the first light receiving unit $212R_{91}$, or the light emitted from the second light emitting unit $211R_{92}$ is not detected by the second light receiving unit $212R_{92}$, and thereby it is detected that the amount of the cut staple stored in the cut staple storage unit $6Rf_9$ is fully loaded.

At the cut staple quantity detection unit $210R_9$, the full load detection is independently allowed by the one recovery passage $60R_L$ and the other recovery passage $60R_R$ of the cut staple storage unit $6Rf_9$.

FIG. 148 is a configuration diagram illustrating another modified example of the stapler of the embodiment in which the full load detection of the cut staple is performed by the optical sensor. Since a stapler $1Rf_{10}$ has the same configuration as the stapler $1Rf_1$ except for a cut staple quantity detection unit $210R_{10}$, overall description thereof will be omitted.

The stapler $1Rf_{10}$ and a cut staple storage unit $6Rf_{10}$ are provided with the optical cut staple quantity detection unit $210R_{10}$ that detects whether or not a given amount of cut staple stored in the cut staple storage unit $6Rf_{10}$ are present using whether or not the transmission of light is present.

The cut staple quantity detection unit $210R_{10}$ is an example of cut staple full load detection unit, and is provided with a first light emitting unit $211R_{101}$ that emits light, and a first light receiving unit $212R_{101}$ that detects the light emitted from the first light emitting unit $211R_{101}$. The cut staple quantity detection unit $210R_{10}$ is provided with a first optical waveguide $213R_{101}$ that guides the light emitted from the first light emitting unit $211R_{101}$ to the first light receiving unit $212R_{101}$ along a given optical path.

Further, the cut staple quantity detection unit $210R_{10}$ is provided with a second light emitting unit $211R_{102}$ that emits light, and a second light receiving unit $212R_{102}$ that detects the light emitted from the second light emitting unit $211R_{102}$. The cut staple quantity detection unit $210R_{10}$ is provided with a second optical waveguide $213R_{102}$ that guides the light emitted from the second light emitting unit $211R_{102}$ to the second light receiving unit $212R_{102}$ along a given optical path.

The cut staple quantity detection unit $210R_{10}$ has the first light emitting unit $211R_{101}$ and the first light receiving unit $212R_{101}$ that are configured as one unit and are provided for the stapler $1Rf_{10}$. The first light emitting unit $211R_{101}$ and the first light receiving unit $212R_{101}$ are provided outside the one recovery passage $60R_L$ of the cut staple storage unit $6Rf_{10}$ mounted on the stapler $1Rf_{10}$. A light emitting direction of the first light emitting unit $211R_{101}$ is directed to a lateral inside of the stapler $1Rf_{10}$, and a receiving surface of light of the first light receiving unit $212R_{101}$ directed to the lateral inside of the stapler $1Rf_{10}$.

The cut staple quantity detection unit $210R_{10}$ has the second light emitting unit $211R_{101}$ and the second light receiving unit $212R_{101}$ that are configured as one unit and are provided for the stapler $1Rf_{10}$. The second light emitting unit $211R_{102}$ and the second light receiving unit $212R_{102}$ are provided outside the other recovery passage $60R_R$ of the cut staple storage unit $6Rf_{10}$ mounted on the stapler $1Rf_{10}$. A light emitting direction of the second light emitting unit $211R_{102}$ is directed to a lateral inside of the stapler $1Rf_{10}$, and a receiving surface of light of the second light receiving unit $212R_{102}$ directed to the lateral inside of the stapler $1Rf_{10}$.

Further, the cut staple quantity detection unit $210R_{10}$ has the first optical waveguide $213R_{101}$ that is provided on an inner lateral surface of the one recovery passage $60R_L$ of the cut staple storage unit $6Rf_{10}$, and the second optical waveguide $213R_{102}$ that is provided on an inner lateral surface of the other recovery passage $60R_R$ of the cut staple storage unit $6Rf_{10}$.

The first optical waveguide $213R_{101}$ is provided with a prism $214R_{101}$. The prism $214R_{101}$ is provided with a first reflection surface $214R_{L1}$ that faces the first light emitting unit $211R_{101}$ through a window (not illustrated) of the one recovery passage $60R_L$, a second reflection surface $214R_{L2}$ that faces the first light receiving unit $212R_{101}$ through the window (not illustrated) of the one recovery passage $60R_L$, and a light guiding unit $214R_{C1}$ that guides light between the first reflection surface $214R_{L1}$ and the second reflection surface $214R_{L2}$.

The second optical waveguide $213R_{102}$ is provided with a prism $214R_{102}$. The prism $214R_{102}$ is provided with a first reflection surface $214R_{R1}$ that faces the second light emitting unit $211R_{102}$ through a window (not illustrated) of the other recovery passage $60R_R$, a second reflection surface $214R_{R2}$ that faces the second light receiving unit $212R_{102}$ through the window (not illustrated) of the other recovery passage $60R_R$, and a light guiding unit $214R_{C2}$ that guides light between the first reflection surface $214R_{R1}$ and the second reflection surface $214R_{R2}$.

Thereby, the first optical waveguide $213R_{101}$ forms an optical path that causes the light emitted from the first light emitting unit $211R_{101}$ to be incident upon the first light receiving unit $212R_{101}$ through the one recovery passage $60R_L$. The second optical waveguide $213R_{102}$ forms an optical path that causes the light emitted from the second light emitting unit $211R_{102}$ to be incident upon the second light receiving unit $212R_{102}$ through the other recovery passage $60R_R$.

Next, an example of operation and effects of the cut staple quantity detection unit $210R_{10}$ will be described. When the amount of cut staple that reaches a full load detection position of the one recovery passage $60R_L$ and a full load detection position of the other recovery passage $60R_R$ are not stored in the cut staple storage unit $6Rf_{10}$ at the cut staple quantity detection unit $210R_{10}$, the light emitted from the first light emitting unit $211R_{101}$ is incident upon the first light receiving unit $212R_{101}$ through the one recovery passage $60R_L$, and the light emitted from the second light emitting unit $211R_{102}$ is incident upon the second light receiving unit $212R_{102}$ through the other recovery passage $60R_R$.

In contrast, when the cut staple of the amount that reaches the full load detection position of the one recovery passage $60R_L$ are stored in the cut staple storage unit $6Rf_{10}$, the light emitted from the first light emitting unit $211R_{101}$ is obstructed on its optical path by the cut staple, and is not incident upon the first light receiving unit $212R_{101}$. When the cut staple of the amount that reaches the full load detection position of the other recovery passage $60R_R$ are stored in the cut staple storage unit $6Rf_{10}$, the light emitted from the second light emitting unit $211R_{102}$ is obstructed on its optical path by the cut staple, and is not incident upon the second light receiving unit $212R_{102}$.

Thus, at the cut staple quantity detection unit $210R_{10}$, the light emitted from the first light emitting unit $211R_{101}$ is detected by the first light receiving unit $212R_{101}$, and the light emitted from the second light emitting unit $211R_{102}$ is detected by the second light receiving unit $212R_{102}$, and thereby it is detected that the amount of the cut staple stored in the cut staple storage unit $6Rf_{10}$ is not fully loaded.

The light emitted from the first light emitting unit $211R_{101}$ is not detected by the first light receiving unit $212R_{101}$ or the light emitted from the second light emitting unit $211R_{102}$ is not detected by the second light receiving unit $212R_{102}$, and thereby it is detected that the amount of the cut staple stored in the cut staple storage unit $6Rf_{10}$ is fully loaded.

At the cut staple quantity detection unit $210R_{10}$, the full load detection is independently allowed by the one recovery passage $60R_L$ and the other recovery passage $60R_R$ of the cut staple storage unit $6Rf_{10}$.

FIG. 149 is a configuration diagram illustrating another modified example of the stapler of the embodiment in which the full load detection of the cut staple is performed by the optical sensor. Since a stapler $1Rf_{11}$ has the same configuration as the stapler $1Rf_1$ except for a cut staple quantity detection unit $210R_{11}$, overall description thereof will be omitted.

The stapler $1Rf_{11}$ has one discharge passage 33R that communicates with a cut part (not illustrated) and extends rearwards. When a cut staple storage unit $6Rf_{11}$ is mounted on the stapler $1Rf_{11}$, one recovery passage $60R_C$ communicating with the discharge passage 33R is provided at the center in a width direction. In the stapler $1Rf_{11}$, a recovery port $61R_C$ of the recovery passage $60R_C$ of the cut staple storage unit $6Rf_{11}$ communicates with a discharge port $34R_C$ of the discharge passage 33R.

The stapler $1Rf_{11}$ and the cut staple storage unit $6Rf_{11}$ are provided with the optical cut staple quantity detection unit $210R_{11}$ that detects whether or not a given amount of cut staple stored in the cut staple storage unit $6Rf_1$ are present using whether or not the transmission of light is present.

The cut staple quantity detection unit $210R_{11}$ is an example of cut staple full load detection unit, and is provided with a light emitting unit $211R_1$ that emits light, and a light receiving unit $212R_{11}$ that detects the light emitted from the light emitting unit $211R_{11}$. The cut staple quantity detection unit $210R_{11}$ is provided with an optical waveguide $213R_{11}$ that guides the light emitted from the light emitting unit $211R_{11}$ to the light receiving unit $212R_{11}$ along a given optical path.

The cut staple quantity detection unit $210R_{11}$ has the light emitting unit $211R_{11}$ and the light receiving unit $212R_1$ that are configured as one unit and are provided for the stapler $1Rf_{11}$. The light emitting unit $211R_{11}$ and the light receiving unit $212R_{11}$ are provided to face the recovery passage $60R_C$ of the cut staple storage unit $6Rf_{11}$ mounted on the stapler $1Rf_{11}$. A light emitting direction of the light emitting unit $211R_{11}$ is directed to the rear of the stapler $1Rf_{11}$, and a receiving surface of light of the light receiving unit $212R_{11}$ is directed to the rear of the stapler $1Rf_{11}$.

The cut staple quantity detection unit $210R_{11}$ has the optical waveguide $213R_{11}$ provided for the recovery passage $60R_C$ of the cut staple storage unit $6Rf_{11}$. The optical waveguide $213R_{11}$ is provided with a prism $214R_{11}$. The prism $214R_{11}$ is provided with a first reflection surface $214R_L$ that faces the light emitting unit $211R_{11}$ through a window (not illustrated) of the recovery passage $60R_C$, a second reflection surface $214R_R$ that faces light receiving unit $212R_{11}$ through window (not illustrated) of the recovery passage $60R_C$, and a light guiding unit $214R_C$ between the first reflection surface $214R_L$ and the second reflection surface $214R_R$.

Thereby, the optical waveguide $213R_{11}$ forms an optical path that causes the light emitted from the light emitting unit $211R_{11}$ to be incident upon the light receiving unit $212R_{11}$ through the recovery passage $60R_C$.

Next, an example of operation and effects of the cut staple quantity detection unit $210R_{11}$ will be described. When the amount of cut staple that reaches a full load detection position of the recovery passage $60R_C$ are not stored in the cut staple storage unit $6Rf_{11}$ at the cut staple quantity detection unit $210R_{11}$, the light emitted from the light emitting unit $211R_{11}$ is incident upon the light receiving unit $212R_{11}$ through the recovery passage $60R_C$.

In contrast, when the cut staple of the amount that reaches the full load detection position of the recovery passage $60R_C$ are stored in the cut staple storage unit $6Rf_{11}$, the light emitted from the light emitting unit $211R_{11}$ is obstructed on its optical path by the cut staple, and is not incident upon the light receiving unit $212R_{11}$.

Thus, at the cut staple quantity detection unit $210R_{11}$, the light emitted from the light emitting unit $211R_{11}$ is detected by the light receiving unit $212R_{11}$, and thereby it is detected that the amount of the cut staple stored in the cut staple storage unit $6Rf_{11}$ is not fully loaded.

The light emitted from the light emitting unit $211R_{11}$ is not detected by the light receiving unit $212R_{11}$, and thereby it is detected that the amount of the cut staple stored in the cut staple storage unit $6Rf_{11}$ is fully loaded.

At the cut staple quantity detection unit $210R_{11}$, when the cut staple storage unit $6Rf_{11}$ is demounted from the stapler $1Rf_{11}$, a staple cartridge 100A cannot be mounted and demounted on/from the stapler $1Rf_{11}$. Thereby, the cut staple can be recovered according to a timing when the staple cartridge 100A is mounted and demounted.

FIGS. 150A and 150B are configuration diagrams illustrating another modified example of the stapler of the embodiment in which the full load detection of the cut staple is performed by the optical sensor. Since a stapler $1Rf_{12}$ has the same configuration as the stapler $1Rf_1$ except for a cut staple quantity detection unit $210R_{12}$, overall description thereof will be omitted.

A cut staple storage unit $6Rf_{12}$ has a size equivalent to the entire back surface of a staple ejecting unit 2R. The cut staple storage unit $6Rf_{12}$ is configured such that one recovery port $61R_L$ communicates with a discharge port $34R_L$ of one discharge passage $33R_L$ of the stapler $1Rf_{12}$, and the other recovery port $61R_R$ communicates with a discharge port $34R_R$ of the other discharge passage $33R_R$ of the stapler $1Rf_{12}$.

The stapler $1Rf_{12}$ and the cut staple storage unit $6Rf_{12}$ are provided with an optical cut staple quantity detection unit $210R_{12}$ that detects whether or not a given amount of cut staple stored in the cut staple storage unit $6Rf_{12}$ are present using whether or not the transmission of light is present.

The cut staple quantity detection unit $210R_{12}$ is an example of cut staple full load detection unit, and is provided with a light emitting unit $211R_{12}$ that emits light, and a light receiving unit $212R_{12}$ that detects the light emitted from the light emitting unit $211R_{12}$. The cut staple quantity detection unit $210R_{12}$ is provided with an optical waveguide $213R_{12}$ that guides the light emitted from the light emitting unit $211R_{12}$ to the light receiving unit $212R_{12}$ along a given optical path.

As illustrated in FIG. 150B, the cut staple quantity detection unit $210R_{12}$ has the optical waveguide $213R_{12}$ provided around the center of a back surface of the cut staple storage unit $6Rf_{12}$ in order to set the vicinity of the center of the cut staple storage unit $6Rf_{12}$, in which a variation in a loading height of the cut staple due to a slope of the stapler $1Rf_{12}$ is small, to a full load detection position in the cut staple storage unit $6Rf_{12}$.

The light emitting unit $211R_{12}$ and the light receiving unit $212R_{12}$ are provided on a back surface of the stapler $1Rf_{12}$ to face the optical waveguide $213R_{12}$. The light emitting unit $211R_{12}$ and the light receiving unit $212R_{12}$ are configured as one unit. A light emitting direction of the light emitting unit $211R_{12}$ is directed to the rear of the stapler $1Rf_{12}$, and a receiving surface of light of the light receiving unit $212R_{12}$ is directed to the rear of the stapler $1Rf_{12}$.

The optical waveguide $213R_{12}$ is provided with a prism $214R_{12}$. The prism $214R_{12}$ is provided with a first reflection surface $214R_L$ that faces the light emitting unit $211R_{12}$ through a window (not illustrated) of the cut staple storage unit $6Rf_{12}$, a second reflection surface $214R_R$ that faces the light receiving unit $212R_{12}$ through the window (not illustrated) of the cut staple storage unit $6Rf_{12}$, and a light guiding unit $214R_C$ that guides light between the first reflection surface $214R_L$ and the second reflection surface $214R_R$.

Thereby, the optical waveguide $213R_{12}$ forms an optical path that causes the light emitted from the light emitting unit $211R_{12}$ to be incident upon the light receiving unit $212R_{12}$ through the cut staple storage unit $6Rf_{12}$.

Next, an example of operation and effects of the cut staple quantity detection unit $210R_{12}$ will be described. When the amount of cut staple 13A that reaches a full load detection position are not stored in the cut staple storage unit $6Rf_{12}$ at the cut staple quantity detection unit $210R_{12}$, the light emitted from the light emitting unit $211R_{12}$ is incident upon the light receiving unit $212R_{12}$ through the cut staple storage unit $6Rf_{12}$.

In contrast, when the cut staple 13A of the amount that reaches the full load detection position are stored in the cut staple storage unit $6Rf_{12}$, the light emitted from the light emitting unit $211R_{12}$ is obstructed on its optical path by the cut staple, and is not incident upon the light receiving unit $212R_{12}$.

Thus, at the cut staple quantity detection unit $210R_{12}$, the light emitted from the light emitting unit $211R_{12}$ is detected by the light receiving unit $212R_{12}$, and thereby it is detected that the amount of the cut staple 13A stored in the cut staple storage unit $6Rf_{12}$ is not fully loaded.

Moreover, the light emitted from the light emitting unit $211R_{12}$ is not detected by the light receiving unit $212R_{12}$, and thereby it is detected that the amount of the cut staple 13A stored in the cut staple storage unit $6Rf_{12}$ is fully loaded.

At the cut staple quantity detection unit $210R_{12}$, when the cut staple storage unit $6Rf_{12}$ is demounted from the stapler $1Rf_{12}$, the staple cartridge 100A cannot be mounted and demounted on/from the stapler $1Rf_{12}$. Thus, the cut staple can be recovered according to a timing when the staple cartridge 100A is mounted and demounted. Since the cut staple storage unit $6Rf_{12}$ has the size equivalent to the entire back surface of the staple ejecting unit 2R, an amount of storage of the cut staple can be increased.

<Optical Waveguide: Modified Example Using Optical Fiber>

FIG. 151 is a configuration diagram illustrating another modified example of the stapler of the embodiment in which the full load detection of the cut staple is performed by the optical sensor. Since a stapler $1Rf_{13}$ has the same configuration as the stapler $1Rf_1$ except for a cut staple quantity detection unit $210R_{13}$, overall description thereof will be omitted.

The stapler $1Rf_{13}$ and a cut staple storage unit $6Rf_{13}$ are provided with an optical cut staple quantity detection unit $210R_{13}$ that detects whether or not a given amount of cut staple stored in the cut staple storage unit $6Rf_{13}$ are present using whether or not the transmission of light is present.

The cut staple quantity detection unit $210R_{13}$ is an example of cut staple full load detection unit, and is provided with a light emitting unit $211R_{13}$ that emits light, and a light receiving unit $212R_{13}$ that detects the light emitted from the light emitting unit $211R_{13}$. The cut staple quantity detection unit $210R_{13}$ is provided with an optical waveguide $213R_{13}$ that guides the light emitted from the light emitting unit $211R_{13}$ to the light receiving unit $212R_{13}$ along a given optical path.

The cut staple quantity detection unit $210R_{13}$ has the light emitting unit $211R_{13}$ and the light receiving unit $212R_{13}$ provided for the stapler $1Rf_3$. A light emitting direction of the light emitting unit $211R_{13}$ is directed to the rear of the stapler $1Rf_3$, and a receiving surface of light of the light receiving unit $212R_{13}$ is directed to the rear of the stapler $1Rf_{13}$. The cut staple quantity detection unit $210R_{13}$ has the optical waveguide $213R_{13}$ provided for the cut staple storage unit $6Rf_{13}$.

The optical waveguide $213R_{13}$ is provided with an optical fiber $214R_{13}$. The optical fiber $214R_{13}$ is provided with an incident surface $214R_{L13}$ that faces the light emitting unit $211R_{13}$ through a window (not illustrated) of one recovery passage $60R_L$, and an emitting surface $214R_{R13}$ that faces the light receiving unit $212R_{13}$ through a window (not illustrated) of the other recovery passage $60R_R$.

Thus, the optical waveguide $213R_{13}$ forms an optical path that causes the light emitted from the light emitting unit $211R_{13}$ to be incident upon the light receiving unit $212R_{13}$ through the one recovery passage $60R_L$ and the other recovery passage $60R_R$.

Next, an example of operation and effects of the cut staple quantity detection unit $210R_{13}$ will be described. When the amount of cut staple that reaches a full load detection position of the one recovery passage $60R_L$ and a full load detection position of the other recovery passage $60R_R$ are not stored in the cut staple storage unit $6Rf_{13}$ at the cut staple quantity detection unit $210R_{13}$, the light emitted from the light emitting unit $211R_{13}$ is incident upon the light receiving unit $212R_{13}$ through the one recovery passage $60R_L$, the optical fiber $214R_{13}$ constituting the optical waveguide $213R_{13}$, and the other recovery passage $60R_R$.

In contrast, when the cut staple of the amount that reaches the full load detection position of the one recovery passage $60R_L$ or the full load detection position of the other recovery passage $60R_R$ are stored in the cut staple storage unit $6Rf_3$, the light emitted from the light emitting unit $211R_{13}$ is obstructed on its optical path, and is not incident upon the light receiving unit $212R_{13}$.

Thus, at the cut staple quantity detection unit $210R_{13}$, the light emitted from the light emitting unit $211R_{13}$ is detected by the light receiving unit $212R_{13}$, and thereby it is detected that the amount of the cut staple stored in the cut staple storage unit $6Rf_{13}$ is not fully loaded.

In addition, the light emitted from the light emitting unit $211R_{13}$ is not detected by the light receiving unit $212R_{13}$, and thereby it is detected that the amount of the cut staple stored in the cut staple storage unit $6Rf_{13}$ is fully loaded.

The optical waveguide $213R_{13}$ is constituted of the optical fiber $214R_{13}$ having flexibility, and thereby a degree of freedom of arrangement of the optical path is improved at the cut staple quantity detection unit $210R_{13}$.

FIG. 152 is a configuration diagram illustrating another modified example of the stapler of the embodiment in which the full load detection of the cut staple is performed by the optical sensor. Since a stapler $1Rf_{14}$ has the same configuration as the stapler $1Rf_1$ except for a cut staple quantity detection unit $210R_{14}$, overall description thereof will be omitted.

The stapler $1Rf_{14}$ and a cut staple storage unit $6Rf_{14}$ are provided with an optical cut staple quantity detection unit $210R_{14}$ that detects whether or not a given amount of cut staple stored in the cut staple storage unit $6Rf_4$ are present using whether or not the transmission of light is present.

The cut staple quantity detection unit $210R_{14}$ is an example of cut staple full load detection unit, and is provided with a light emitting unit $211R_{14}$ that emits light, and a light receiving unit $212R_{14}$ that detects the light emitted from the light emitting unit $211R_{14}$. The cut staple quantity detection unit $210R_{14}$ is provided with an optical waveguide $213R_{14}$ that guides the light emitted from the light emitting unit $211R_{14}$ to the light receiving unit $212R_{14}$ along a given optical path.

The cut staple quantity detection unit $210R_{14}$ has the light emitting unit $211R_{14}$ and the light receiving unit $212R_{14}$ provided for the stapler $1Rf_{14}$. The cut staple quantity detection unit $210R_{114}$ has the optical waveguide $213R_{14}$ provided for the cut staple storage unit $6Rf_{14}$.

The light emitting unit $211R_{14}$ is provided on a back surface of the stapler $1Rf_{14}$ such that a light emitting direction is directed to a lateral inside of the stapler $1Rf_{14}$. The light receiving unit $212R_{14}$ is provided on the back surface of the stapler $1Rf_{14}$ such that a receiving surface of light is directed to the lateral inside of the stapler $1Rf_{14}$.

The optical waveguide $213R_{14}$ is provided with an optical fiber $214R_{14}$. The optical fiber $214R_{14}$ is provided with an incident surface $214R_{L14}$ that faces the light emitting unit $211R_{14}$ through a window (not illustrated) of one recovery passage $60R_L$, and a light emitting surface $214R_{R14}$ that faces the light receiving unit $212R_{14}$ through a window (not illustrated) of the other recovery passage $60R_R$.

Thus, the optical waveguide $213R_{14}$ forms an optical path that causes the light emitted from the light emitting unit $211R_{14}$ to be incident upon the light receiving unit $212R_{14}$ through the one recovery passage $60R_L$ and the other recovery passage $60R_R$.

Next, an example of operation and effects of the cut staple quantity detection unit $210R_{14}$ will be described. When the amount of cut staple that reaches a full load detection position of the one recovery passage $60R_L$ and a full load detection position of the other recovery passage $60R_R$ are not stored in the cut staple storage unit $6Rf_{14}$ at the cut staple quantity detection unit $210R_{14}$, the light emitted from the light emitting unit $211R_{14}$ is incident upon the light receiving unit $212R_{14}$ through the one recovery passage $60R_L$, the optical fiber $214R_{14}$ constituting the optical waveguide $213R_{14}$, and the other recovery passage $60R_R$.

In contrast, when the cut staple of the amount that reaches either the full load detection position of the one recovery passage $60R_L$ or the full load detection position of the other recovery passage $60R_R$ are stored in the cut staple storage unit $6Rf_{14}$, the light emitted from the light emitting unit $211R_{14}$ is obstructed on its optical path by the cut staple, and is not incident upon the light receiving unit $212R_{14}$.

Thus, at the cut staple quantity detection unit $210R_{14}$, the light emitted from the light emitting unit $211R_{14}$ is detected by the light receiving unit $212R_{14}$, and thereby it is detected that the amount of the cut staple stored in the cut staple storage unit $6Rf_{14}$ is not fully loaded.

In addition, the light emitted from the light emitting unit $211R_{14}$ is not detected by the light receiving unit $212R_{14}$, and thereby it is detected that the amount of the cut staple stored in the cut staple storage unit $6Rf_{14}$ is fully loaded.

The optical waveguide $213R_{14}$ is constituted of the optical fiber $214R_{14}$ having flexibility, and thereby a degree of freedom of arrangement of the optical path is improved at the cut staple quantity detection unit $210R_{14}$.

<Modified Example in which Light Receiving and Emitting Parts are Separated>

FIGS. 153 and 154 are configuration diagrams illustrating another modified example of the stapler according to the embodiment in which the full load detection of the cut staple is performed by the optical sensor. Since a stapler $1Rf_{15}$ has the same configuration as the stapler $1Rf_1$ except for a cut staple quantity detection unit $210R_{15}$, overall description thereof will be omitted.

The stapler $1Rf_{15}$ and a cut staple storage unit $6Rf_{15}$ are provided with the optical cut staple quantity detection unit $210R_{15}$ that detects whether or not a given amount of cut staple stored in the cut staple storage unit $6Rf_{15}$ are present using whether or not the transmission of light is present.

The cut staple quantity detection unit $210R_{15}$ is an example of cut staple full load detection unit, and is provided with a light emitting unit $211R_{15}$ that emits light, and a light receiving unit $212R_{15}$ that detects the light emitted from the light emitting unit $211R_{15}$.

The light emitting unit $211R_{15}$ and the light receiving unit $212R_{15}$ are mounted on a support member 225R provided for the stapler $1Rf_{15}$. The light emitting unit $211R_{15}$ is provided on a back surface of the stapler $1Rf_5$ such that a light emitting direction is directed to a lateral inside of the stapler $1Rf_{15}$. In addition, the light receiving unit $212R_{15}$ is provided on the back surface of the stapler $1Rf_{15}$ such that a receiving surface of light is directed to the lateral inside of the stapler $1Rf_{15}$. The support member 225R is provided with a light receiving window $225R_1$ which light transmits toward the light receiving unit $212R_{15}$.

When the cut staple storage unit $6Rf_{15}$ is mounted on the stapler $1Rf_{15}$, the light emitting unit $211R_{15}$ faces a window (not illustrated) of one recovery passage $60R_L$, and the light receiving unit $212R_{15}$ faces a window (not illustrated) of the other recovery passage $60R_R$. The light receiving unit $212R_{15}$ is provided in an optical path of the light emitted from the light emitting unit $211R_{15}$. Thereby, the optical path along which the light emitted from the light emitting unit $211R_{15}$ is incident upon the light receiving unit $212R_{15}$ through the one recovery passage $60R_L$ and the other recovery passage $60R_R$ is formed.

The cut staple quantity detection unit $210R_{15}$ is provided with a mounting/demounting detection member 226R that detects mounting/demounting of the cut staple storage unit $6Rf_{15}$ by means of the light emitting unit $211R_{15}$ and the light receiving unit $212R_{15}$.

The mounting/demounting detection member 226R is mounted on the support member 225R to make the light receiving window $225R_1$ openable/closable with rotational motion that uses a shaft $226R_1$ as a fulcrum. The mounting/demounting detection member 226R is biased by a spring $226R_2$ such as a torsion coil spring in a direction in which the light receiving window $225R_1$ is shielded.

The support member 225R is provided with a stopper $225R_2$ with which the mounting/demounting detection member 226R rotated by the spring $226R_2$ up to a position at which the light receiving window $225R_1$ is shielded collides. The mounting/demounting detection member 226R is provided with a pressing claw part $225R_3$ that is pressed to the cut staple storage unit $6Rf_{15}$ mounted on the stapler $1Rf_{15}$.

As illustrated in FIG. 154A, when the cut staple storage unit $6Rf_{15}$ is mounted on the stapler $1Rf_{15}$, the pressing claw part $225R_3$ of the mounting/demounting detection member 226R is pressed to the cut staple storage unit $6Rf_{15}$. Thereby, the mounting/demounting detection member 226R is rotated in a direction in which it opens the light receiving window $225R_1$ with the rotational motion that uses the shaft $226R_1$ as the fulcrum. The pressing claw part $225R_3$ is held in a pressed state by the cut staple storage unit $6Rf_{15}$ mounted on the stapler $1Rf_{15}$, and thereby the light receiving window $225R_1$ is held in an open state.

As illustrated in FIG. 154B, when the cut staple storage unit $6Rf_{15}$ is demounted from the stapler $1Rf_{15}$, the pressing claw part $225R_3$ of the mounting/demounting detection member 226R is not pressed. Thereby, the mounting/demounting detection member 226R is rotated by the spring $226R_2$ up to the position at which the light receiving window $225R_1$ is shielded, collides with the stopper $225R_2$, and is held with the light receiving window $225R_1$ shielded.

Next, an example of operation and effects of the cut staple quantity detection unit $210R_{15}$ will be described. When the amount of cut staple that reaches a full load detection position of the one recovery passage $60R_L$ and a full load detection position of the other recovery passage $60R_R$ are not stored in the cut staple storage unit $6Rf_{15}$ at the cut staple quantity detection unit $210R_{15}$, the light emitted from the light emitting unit $211R_{15}$ is incident upon the light receiving unit $212R_{15}$ through the one recovery passage $60R_L$ and the other recovery passage $60R_R$.

In contrast, when the cut staple of the amount that reaches either the full load detection position of the one recovery passage $60R_L$ or the full load detection position of the other recovery passage $60R_R$ are stored in the cut staple storage unit $6Rf_{15}$, the light emitted from the light emitting unit $211R_{15}$ is obstructed on its optical path by the cut staple, and is not incident upon the light receiving unit $212R_{15}$.

As illustrated in FIG. 154A, when the cut staple storage unit $6Rf_{15}$ is mounted on the stapler $1Rf_{15}$, the light receiving window $225R_1$ is opened by the mounting/demounting detection member 226R. Thereby, the light emitted from the light emitting unit $211R_{15}$ is incident upon the light receiving unit $212R_{15}$ through the one recovery passage $60R_L$ and the other recovery passage $60R_R$.

In contrast, as illustrated in FIG. 154B, when the cut staple storage unit $6Rf_{15}$ is demounted from the stapler $1Rf_1$, the light receiving window $225R_1$ is shielded by the mounting/demounting detection member 226R. Thereby, the light emitted from the light emitting unit $211R_{15}$ is obstructed on its optical path, and is not incident upon the light receiving unit $212R_{15}$.

Thus, at the cut staple quantity detection unit $210R_{15}$, the light emitted from the light emitting unit $211R_{15}$ is detected by the light receiving unit $212R_{15}$. Thereby, it is detected that the cut staple storage unit $6Rf_{15}$ is mounted on the stapler $1Rf_{15}$, and that the amount of the cut staple stored in the cut staple storage unit $6Rf_{15}$ is not fully loaded.

The light emitted from the light emitting unit $211R_{15}$ is not detected by the light receiving unit $212R_{15}$. Thereby, it is detected that the amount of the cut staple stored in the cut staple storage unit $6Rf_{15}$ is fully loaded, or that the cut staple storage unit $6Rf_{15}$ is not mounted on the stapler $1Rf_5$.

At the cut staple quantity detection unit $210R_{15}$, full load detection of the cut staple and detection of the presence or absence of the cut staple storage unit $6Rf_{15}$, namely detection of the mounting/demounting of the cut staple storage unit $6Rf_{15}$, can be combined by the same detection part.

FIG. 155 is a configuration diagram illustrating another modified example of the stapler of the embodiment in which the full load detection of the cut staple is performed by the optical sensor. Since a stapler $1Rf_{16}$ has the same configuration as the stapler $1Rf_1$ except for a cut staple quantity detection unit $210R_{16}$, overall description thereof will be omitted.

The stapler $1Rf_{16}$ and a cut staple storage unit $6Rf_{16}$ are provided with the optical cut staple quantity detection unit $210R_{16}$ that detects whether or not a given amount of cut staple stored in the cut staple storage unit $6Rf_{16}$ are present using whether or not the transmission of light is present.

The cut staple quantity detection unit $210R_{16}$ is an example of cut staple full load detection unit, and is provided with a first light emitting unit $211R_{161}$ that emits light, and a first light receiving unit $212R_{161}$ that detects the light emitted from the first light emitting unit $211R_{161}$. In addition, the cut staple quantity detection unit $210R_{16}$ is provided with a second light emitting unit $211R_{162}$ that emits light, and a second light receiving unit $212R_{162}$ that detects the light emitted from the second light emitting unit $211R_{162}$.

The first light emitting unit $211R_{161}$ and the second light emitting unit $211R_{162}$ are provided on a back surface of the stapler $1Rf_{16}$ such that a light emitting direction is directed to the rear of the stapler $1Rf_{16}$. The first light emitting unit $211R_{161}$ is provided to face one recovery passage $60R_L$ of the cut staple storage unit $6Rf_{16}$ mounted on the stapler $1Rf_{16}$. In addition, the second light emitting unit $211R_{162}$ is provided to face the other recovery passage $60R_R$ of the cut staple storage unit $6Rf_{16}$ mounted on the stapler $1Rf_{16}$.

The first light receiving unit $212R_{161}$ and the second light receiving unit $212R_{162}$ are provided on the back surface of the stapler $1Rf_{16}$ such that a receiving direction of light is directed to the front of the stapler $1Rf_{16}$. The first light receiving unit $212R_{161}$ is provided for the one recovery passage $60R_L$ of the cut staple storage unit $6Rf_{16}$, and the second light receiving unit $212R_{162}$ is provided for the other recovery passage $60R_R$ of the cut staple storage unit $6Rf_{16}$.

When the cut staple storage unit $6Rf_{16}$ is mounted on the stapler $1Rf_{16}$, the first light emitting unit $211R_{161}$ is transmitted through a window (not illustrated) of the one recovery passage $60R_L$, and faces the first light receiving unit $212R_{161}$. Thus, an optical path along which the light emitted from the first light emitting unit $211R_{161}$ is incident upon the first light receiving unit $212R_{161}$ through the one recovery passage $60R_L$ is formed.

When the cut staple storage unit $6Rf_{16}$ is mounted on the stapler $1Rf_{16}$, the second light emitting unit $211R_{162}$ is transmitted through a window (not illustrated) of the other recovery passage $60R_R$, and faces the second light receiving unit $212R_{162}$. Thus, an optical path along which the light emitted from the second light emitting unit $211R_{162}$ is incident upon the second light receiving unit $212R_{162}$ through the other recovery passage $60R_R$ is formed.

Next, an example of operation and effects of the cut staple quantity detection unit $210R_{16}$ will be described. When the cut staple storage unit $6Rf_{16}$ is mounted on the stapler $1Rf_{16}$, and when the amount of cut staple that reaches a full load detection position of the one recovery passage $60R_L$ and a full load detection position of the other recovery passage $60R_R$ are not stored in the cut staple storage unit $6Rf_{16}$, the light emitted from the first light emitting unit $211R_{161}$ is incident upon the first light receiving unit $212R_{161}$ through the one recovery passage $60R_L$. The light emitted from the second light emitting unit $211R_{162}$ is incident upon the second light receiving unit $212R_{162}$ through the other recovery passage $60R_R$.

In contrast, when the cut staple of the amount that reaches the full load detection position of the one recovery passage $60R_L$ are stored in the cut staple storage unit $6Rf_{16}$, the light emitted from the first light emitting unit $211R_{161}$ is obstructed on its optical path by the cut staple, and is not incident upon the first light receiving unit $212R_{161}$. When the cut staple of the amount that reaches the full load detection position of the other recovery passage $60R_R$ are stored in the cut staple storage unit $6Rf_{16}$, the light emitted from the second light emitting unit $211R_{162}$ is obstructed on its optical path by the cut staple, and is not incident upon the second light receiving unit $212R_{162}$.

Thus, at the cut staple quantity detection unit $210R_{16}$, the light emitted from the first light emitting unit $211R_{161}$ is detected by the first light receiving unit $212R_{161}$, and the light emitted from the second light emitting unit $211R_{162}$ is detected by the second light receiving unit $212R_{162}$. Thereby, it is detected that the cut staple storage unit $6Rf_{16}$ is mounted on the stapler $1Rf_{16}$, and that the amount of the cut staple stored in the cut staple storage unit $6Rf_{16}$ is not fully loaded.

The light emitted from the first light emitting unit $211R_{61}$ is not detected by the first light receiving unit $212R_{161}$, or the light emitted from the second light emitting unit $211R_{162}$ is not detected by the second light receiving unit $212R_{162}$. Thereby, it is detected that the amount of the cut staple stored in the cut staple storage unit $6Rf_{16}$ is fully loaded.

Further, the light emitted from the first light emitting unit $211R_{161}$ is not detected by the first light receiving unit $212R_{161}$, and the light emitted from the second light emitting unit $211R_{162}$ is not detected by the second light receiving unit $212R_{162}$. Thereby, it is detected that the cut staple storage unit $6Rf_{16}$ is not mounted on the stapler $1Rf_{16}$.

At the cut staple quantity detection unit $210R_{16}$, the full load detection is independently allowed by the one recovery passage $60R_L$ and the other recovery passage $60R_L$ of the cut staple storage unit $6Rf_{17}$. Moreover, full load detection of the cut staple and detection of the presence or absence of the cut staple storage unit $6Rf_{16}$, namely detection of the mounting/demounting of the cut staple storage unit $6Rf_{16}$, can be combined by the same detection part.

FIG. 156 is a configuration diagram illustrating another modified example of the stapler of the embodiment in which the full load detection of the cut staple is performed by the optical sensor. Since a stapler $1Rf_{17}$ has the same configuration as the stapler $1Rf_1$ except for a cut staple quantity detection unit $210R_{17}$, overall description thereof will be omitted.

The stapler $1Rf_{17}$ and a cut staple storage unit $6Rf_{17}$ are provided with the optical cut staple quantity detection unit $210R_{17}$ that detects whether or not a given amount of cut staple stored in the cut staple storage unit $6Rf_{17}$ are present using whether or not the transmission of light is present.

The cut staple quantity detection unit $210R_{17}$ is an example of cut staple full load detection unit, and is provided with a first light emitting unit $211R_{171}$ that emits light, and a first light receiving unit $212R_{171}$ that detects the light emitted from the first light emitting unit $211R_{171}$. In addition, the cut staple quantity detection unit $210R_{17}$ is provided with a second light emitting unit $211R_{172}$ that emits light, and a second light receiving unit $212R_{172}$ that detects the light emitted from the second light emitting unit $211R_{172}$.

The first light emitting unit $211R_{171}$ and the second light emitting unit $211R_{172}$ are provided on a back surface of the stapler $1Rf_{17}$ such that a light emitting direction is directed to a lateral inside of the stapler $1Rf_{17}$. The first light emitting unit $211R_{171}$ is provided to face an outer lateral surface of one recovery passage $60R_L$ of the cut staple storage unit $6Rf_{17}$ mounted on the stapler $1Rf_{17}$. The second light emitting unit $211R_{172}$ is provided to face an outer lateral surface of the other recovery passage $60R_R$ of the cut staple storage unit $6Rf_{17}$ mounted on the stapler $1Rf_{17}$.

The first light receiving unit $212R_{171}$ and the second light receiving unit $212R_{172}$ are provided on the back surface of the stapler $1Rf_{17}$ such that a receiving direction of light is directed to a lateral outer side of the stapler $1Rf_{17}$. The first light receiving unit $212R_{171}$ is provided to face an inner lateral surface of one recovery passage $60R_L$ of the cut staple storage unit $6Rf_{17}$ mounted on the stapler $1Rf_{17}$. The second light receiving unit $212R_{172}$ is provided to face an inner lateral surface of the other recovery passage $60R_R$ of the cut staple storage unit $6Rf_{17}$ mounted on the stapler $1Rf_{17}$.

When the cut staple storage unit $6Rf_{17}$ is mounted on the stapler $1Rf_{17}$, the first light emitting unit $211R_{171}$ is transmitted through a window (not illustrated) of the one recovery passage $60R_L$, and faces the first light receiving unit $212R_{171}$. Thus, an optical path along which the light emitted from the first light emitting unit $211R_{171}$ is incident upon the first light receiving unit $212R_{171}$ through the one recovery passage $60R_L$ is formed.

When the cut staple storage unit $6Rf_{17}$ is mounted on the stapler $1Rf_{17}$, the second light emitting unit $211R_{172}$ is transmitted through a window (not illustrated) of the other recovery passage $60R_R$, and faces the second light receiving unit $212R_{172}$. Thus, an optical path along which the light emitted from the second light emitting unit $211R_{172}$ is incident upon the second light receiving unit $212R_{172}$ through the other recovery passage $60R_R$ is formed.

Next, an example of operation and effects of the cut staple quantity detection unit $210R_{17}$ will be described. When the amount of cut staple that reaches a full load detection position of the one recovery passage $60R_L$ and a full load detection position of the other recovery passage $60R_R$ are not stored in the cut staple storage unit $6Rf_{17}$ at the cut staple quantity detection unit $210R_{17}$, the light emitted from the first light emitting unit $211R_{171}$ is incident upon the first light receiving unit $212R_{171}$ through the one recovery passage $60R_L$. The light emitted from the second light emitting unit $211R_{172}$ is incident upon the second light receiving unit $212R_{172}$ through the other recovery passage $60R_R$.

In contrast, when the cut staple of the amount that reaches the full load detection position of the one recovery passage $60R_L$ are stored in the cut staple storage unit $6Rf_{17}$, the light emitted from the first light emitting unit $211R_{171}$ is obstructed on its optical path by the cut staple, and is not incident upon the first light receiving unit $212R_{171}$. When the cut staple of the amount that reaches the full load detection position of the other recovery passage $60R_R$ are stored in the cut staple storage unit $6Rf_{17}$, the light emitted from the second light emitting unit $211R_{172}$ is obstructed on its optical path by the cut staple, and is not incident upon the second light receiving unit $212R_{172}$.

Thus, at the cut staple quantity detection unit $210R_{17}$, the light emitted from the first light emitting unit $211R_{171}$ is detected by the first light receiving unit $212R_{171}$, and the light emitted from the second light emitting unit $211R_{172}$ is detected by the second light receiving unit $212R_{172}$. Thereby, it is detected that the amount of the cut staple stored in the cut staple storage unit $6Rf_{17}$ is not fully loaded.

The light emitted from the first light emitting unit $211R_{171}$ is not detected by the first light receiving unit $212R_{171}$, or the light emitted from the second light emitting unit $211R_{172}$ is not detected by the second light receiving unit $212R_{172}$. Thereby, it is detected that the amount of the cut staple stored in the cut staple storage unit $6Rf_{17}$ is fully loaded.

At the cut staple quantity detection unit $210R_{17}$, the full load detection is independently allowed by the one recovery passage $60R_L$ and the other recovery passage $60R_L$ of the cut staple storage unit $6Rf_{17}$.

FIG. 157 is a configuration diagram illustrating another modified example of the stapler of the embodiment in which the full load detection of the cut staple is performed by the optical sensor. Since a stapler $1Rf_{18}$ has the same configuration as the stapler $1Rf_1$ except for a cut staple quantity detection unit $210R_{18}$, overall description thereof will be omitted.

The stapler $1Rf_{18}$ has one discharge passage 33R that communicates with a cut part (not illustrated) and extends rearwards. When a cut staple storage unit $6Rf_{18}$ is mounted on the stapler $1Rf_{18}$, one recovery passage $60R_C$ communicating with the discharge passage 33R is provided at the center in a width direction. In the stapler $1Rf_{18}$, a discharge port $34R_C$ of the discharge passage 33R and a recovery port $61R_C$ of the recovery passage $60R_C$ of the cut staple storage unit $6Rf_{18}$ communicate with each other.

The stapler $1Rf_{18}$ and the cut staple storage unit $6Rf_{18}$ are provided with the optical cut staple quantity detection unit $210R_{18}$ that detects whether or not a given amount of cut staple stored in the cut staple storage unit $6Rf_{18}$ are present using whether or not the transmission of light is present.

The cut staple quantity detection unit $210R_{18}$ is an example of cut staple full load detection unit, and is provided with a light emitting unit $211R_{18}$ that emits light, and a light receiving unit $212R_{18}$ that detects the light emitted from the light emitting unit $211R_{18}$.

The light emitting unit $211R_{18}$ is provided on a back surface of the stapler $1Rf_{18}$ such that a light emitting direction is directed to the rear of the stapler $1Rf_{18}$. The light emitting unit $211R_{18}$ is provided to face the recovery passage $60R_C$ of the cut staple storage unit $6Rf_{18}$ mounted on the stapler $1Rf_{18}$.

The light receiving unit $212R_{18}$ is provided on the back surface of the stapler $1Rf_{18}$ such that a receiving direction of light is directed to the front of the stapler $1Rf_{18}$. The light receiving unit $212R_{18}$ is provided for the recovery passage $60R_C$ of the cut staple storage unit $6Rf_{18}$.

When the cut staple storage unit $6Rf_{18}$ is mounted on the stapler $1Rf_{18}$, the light emitting unit $211R_{18}$ is transmitted through a window (not illustrated) of the recovery passage $60R_C$, and faces the light receiving unit $212R_{18}$. Thereby, an optical path along which the light emitted from the light emitting unit $211R_{18}$ is incident upon the light receiving unit $212R_{18}$ through the recovery passage $60R_C$ is formed.

Next, an example of operation and effects of the cut staple quantity detection unit $210R_{18}$ will be described. When the cut staple storage unit $6Rf_{18}$ is mounted on the stapler $1Rf_{18}$, and when the amount of cut staple that reaches a full load detection position of the recovery passage $60R_C$ are not stored in the cut staple storage unit $6Rf_{18}$, the light emitted from the light emitting unit $211R_{18}$ is incident upon the light receiving unit $212R_{18}$ through the recovery passage $60R_C$.

In contrast, when the cut staple of the amount that reaches the full load detection position of the recovery passage $60R_C$ are stored in the cut staple storage unit $6Rf_{18}$, the light emitted from the light emitting unit $211R_{18}$ is obstructed on its optical path by the cut staple, and is not incident upon the light receiving unit $212R_{18}$.

Thus, at the cut staple quantity detection unit $210R_{18}$, the light emitted from the light emitting unit $211R_{18}$ is detected by the light receiving unit $212R_{18}$. Thereby, it is detected that the cut staple storage unit $6Rf_{18}$ is mounted on the stapler $1Rf_{18}$, and that the amount of the cut staple stored in the cut staple storage unit $6Rf_{18}$ is not fully loaded.

In addition, the light emitted from the light emitting unit $211R_{18}$ is not detected by the light receiving unit $212R_{18}$, and thereby it is detected that the amount of the cut staple stored in the cut staple storage unit $6Rf_{18}$ is fully loaded. Further, the light emitted from the light emitting unit $211R_{18}$ is not detected by the light receiving unit $212R_{18}$, and thereby it is detected that the cut staple storage unit $6Rf_{18}$ is not mounted on the stapler $1Rf_{18}$.

At the cut staple quantity detection unit $210R_{18}$, full load detection of the cut staple and detection of the presence or absence of the cut staple storage unit $6Rf_{18}$, namely detection of the mounting/demounting of the cut staple storage unit $6Rf_8$, can be combined by the same detection part. When the cut staple storage unit $6Rf_8$ is demounted from the stapler $1Rf_8$, a staple cartridge 100A cannot be mounted/demounted on/from the stapler $1Rf_{18}$. Thereby, the cut staple can be recovered according to a timing when the staple cartridge 100A is mounted and demounted.

FIG. 158 is a configuration diagram illustrating another modified example of the stapler of the embodiment in which the full load detection of the cut staple is performed by the optical sensor. Since a stapler $1Rf_{19}$ has the same configuration as the stapler 1H illustrated in FIG. 20 except for a cut staple quantity detection unit $210R_{19}$, overall description thereof will be omitted.

A staple cartridge 100H is configured such that a refill 104Ha in which a staple sheet (not illustrated) is contained can be mounted or demounted, and the refill 104Ha is provided with a cut staple storage unit $6Rf_{19}$. The cut staple storage unit $6Rf_{19}$ is provided with a lid 63Ha, which opens/closes a recovery port communicating with a discharge port 33H on an upper surface of the refill 104Ha.

In a state in which the staple cartridge 100H is not mounted on the stapler $1Rf_{19}$, the recovery port is closed by the lid 63Ha. Therefore, in a state in which the staple cartridge 100H is demounted from the stapler $1Rf_{19}$, stored cut staple are inhibited from being casually discharged to the outside.

In contrast, when the staple cartridge 100H is mounted on the stapler $1Rf_{19}$, the lid 63Ha pushed by the discharge passage 33H is open, and the discharge passage 33H and the cut staple storage unit $6Rf_{19}$ communicate with each other.

The stapler $1Rf_{19}$ and the cut staple storage unit $6Rf_{19}$ are provided with the optical cut staple quantity detection unit $210R_{19}$ that detects whether or not a given amount of cut staple stored in the cut staple storage unit $6Rf_{19}$ are present using whether or not the transmission of light is present.

The cut staple quantity detection unit $210R_{19}$ is an example of cut staple full load detection unit, and is provided with a light emitting unit $211R_{19}$ that emits light, and a light receiving unit $212R_{19}$ that detects the light emitted from the light emitting unit $211R_{19}$.

The light emitting unit $211R_{19}$ is provided for the stapler $1Rf_{19}$ such that a light emitting direction is directed to an inner side of the stapler $1Rf_{19}$. The light emitting unit $211R_{19}$ is provided to face one lateral surface of the cut staple storage unit $6Rf_{19}$ of the staple cartridge 100H mounted on the stapler $1Rf_{19}$.

The light receiving unit $212R_{19}$ is provided for the stapler $1Rf_{19}$ such that a receiving direction of light is directed to the inner side of the stapler $1Rf_{19}$. The light receiving unit $212R_{19}$ is provided to face the other lateral surface of the cut staple storage unit $6Rf_{19}$ of the staple cartridge 100H mounted on the stapler $1Rf_{19}$.

When the cut staple storage unit $6Rf_{19}$ is mounted on the stapler $1R_{19}$, the light emitting unit $211R_{19}$ is transmitted through a window (not illustrated) of the cut staple storage unit $6Rf_{19}$ of the staple cartridge 100H. Thereby, an optical path along with the light emitted from the light emitting unit $211R_{19}$ is incident upon the light receiving unit $212R_{19}$ through the cut staple storage unit $6Rf_{19}$ is formed.

Next, an example of operation and effects of the cut staple quantity detection unit $210R_{19}$ will be described. When the cut staple storage unit $6Rf_{19}$ is mounted on the stapler $1Rf_9$, and when the amount of cut staple that reaches a full load detection position are not stored in the cut staple storage unit $6Rf_{19}$, the light emitted from the light emitting unit $211R_{19}$ is incident upon the light receiving unit $212R_{19}$ through the cut staple storage unit $6Rf_{19}$.

In contrast, when the cut staple of the amount that reaches the full load detection position are stored in the cut staple storage unit $6Rf_{19}$, the light emitted from the light emitting unit $211R_{19}$ is obstructed on its optical path by the cut staple, and is not incident upon the light receiving unit $212R_{19}$.

Thus, at the cut staple quantity detection unit $210R_{19}$, the light emitted from the light emitting unit $211R_{19}$ is detected by the light receiving unit $212R_{19}$, and thereby it is detected that the amount of the cut staple stored in the cut staple storage unit $6Rf_{19}$ is not fully loaded.

The light emitted from the light emitting unit $211R_{19}$ is not detected by the light receiving unit $212R_{19}$, and thereby it is detected that the amount of the cut staple stored in the cut staple storage unit $6Rf_{19}$ is fully loaded.

At the cut staple quantity detection unit $210R_{19}$, since the cut staple storage unit $6Rf_{19}$ and the staple cartridge 100H are integrally mounted/demounted on/from the stapler $1Rf_{19}$, the cut staple can be recovered according to a timing when the staple cartridge 100H is mounted/demounted.

FIG. 159 is a configuration diagram illustrating another modified example of the stapler of the embodiment in which the full load detection of the cut staple is performed by the optical sensor. Since a stapler $1Rf_{20}$ has the same configuration as the stapler $1Rf_1$ except for a cut staple quantity detection unit $210R_{20}$, overall description thereof will be omitted.

The stapler $1Rf_{20}$ and a cut staple storage unit $6Rf_{20}$ are provided with the optical cut staple quantity detection unit $210R_{20}$ that detects whether or not a given amount of cut staple stored in the cut staple storage unit $6Rf_{20}$ are present using whether or not the transmission of light is present.

The cut staple quantity detection unit $210R_{20}$ is an example of cut staple full load detection unit, and is provided with a first light emitting unit $211R_{201}$ that emits light, and a first light receiving unit $212R_{201}$ that detects the light emitted from the first light emitting unit $211R_{201}$. In addition, the cut staple quantity detection unit $210R_{20}$ is provided with a second light emitting unit $211R_{202}$ that emits light, and a second light receiving unit $212R_{202}$ that detects the light emitted from the second light emitting unit $211R_{202}$.

The first light emitting unit $211R_{201}$ and the first light receiving unit $212R_{201}$ are configured as one unit. The first light emitting unit $211R_{201}$ is provided on a back surface of the stapler $1Rf_{20}$ such that a light emitting direction is directed to an inner side of the stapler $1Rf_{20}$, and the first light receiving unit $212R_{201}$ is provided on the back surface of the stapler $1Rf_{20}$ such that a receiving direction of light is directed to an outer side of the stapler $1Rf_{20}$.

The first light emitting unit $211R_{201}$ is provided to face an outer lateral surface of one recovery passage $60R_L$ of the cut staple storage unit $6Rf_{20}$ mounted on the stapler $1Rf_{20}$. In addition, the first light receiving unit $212R_{201}$ is provided to face an inner lateral surface of the one recovery passage $60R_L$ of the cut staple storage unit $6Rf_{20}$.

The second light emitting unit $211R_{202}$ and the second light receiving unit $212R_{202}$ are configured as one unit. The second light emitting unit $211R_{202}$ is provided on the back surface of the stapler $1Rf_{20}$ such that the light emitting direction is directed to the inner side of the stapler $1Rf_{20}$, and the second light receiving unit $212R_{202}$ is provided on the back surface of the stapler $1Rf_{20}$ such that the receiving direction of light is directed to the outer side of the stapler $1Rf_{20}$.

The second light emitting unit $211R_{202}$ is provided to face an outer lateral surface of the other recovery passage $60R_R$ of the cut staple storage unit $6Rf_{20}$ mounted on the stapler $1Rf_{20}$. In addition, the second light receiving unit $212R_{202}$ is provided to face an inner lateral surface of the other recovery passage $60R_R$ of the cut staple storage unit $6Rf_{20}$.

When the cut staple storage unit $6Rf_{20}$ is mounted on the stapler $1Rf_{20}$, the first light emitting unit $211R_{201}$ is transmitted through a window (not illustrated) of the one recovery passage $60R_L$, and faces the first light receiving unit $212R_{201}$. Thereby, an optical path along which the light emitted from the first light emitting unit $211R_{201}$ is incident upon the first light receiving unit $212R_{201}$ through the one recovery passage $60R_L$ is formed.

When the cut staple storage unit $6Rf_{20}$ is mounted on the stapler $1Rf_{20}$, the second light emitting unit $211R_{202}$ is transmitted through a window (not illustrated) of the other recovery passage $60R_R$, and faces the second light receiving unit $212R_{202}$. Thereby, an optical path along which the light emitted from the second light emitting unit $211R_{202}$ is incident upon the second light receiving unit $212R_{202}$ through the other recovery passage $60R_R$ is formed.

Next, an example of operation and effects of the cut staple quantity detection unit $210R_{20}$ will be described. When the cut staple storage unit $6Rf_{20}$ is mounted on the stapler $1Rf_{20}$, and when the amount of cut staple that reaches a full load detection position of the one recovery passage $60R_L$ and a full load detection position of the other recovery passage $60R_R$ are not stored in the cut staple storage unit $6Rf_{20}$, the light emitted from the first light emitting unit $211R_{201}$ is incident upon the first light receiving unit $212R_{201}$ through the one recovery passage $60R_L$. In addition, the light emitted from the second light emitting unit $211R_{202}$ is incident upon the second light receiving unit $212R_{202}$ through the other recovery passage $60R_R$.

In contrast, when the cut staple of the amount that reaches the full load detection position of the one recovery passage $60R_L$ are stored in the cut staple storage unit $6Rf_{20}$, the light emitted from the first light emitting unit $211R_{201}$ is obstructed on its optical path by the cut staple, and is not incident upon the first light receiving unit $212R_{201}$. When the cut staple of the amount that reaches the full load detection position of the other recovery passage $60R_R$ are stored in the cut staple storage unit $6Rf_{20}$, the light emitted from the second light emitting unit $211R_{202}$ is obstructed on its optical path by the cut staple, and is not incident upon the second light receiving unit $212R_{202}$.

Thus, at the cut staple quantity detection unit $210R_{20}$, the light emitted from the first light emitting unit $211R_{201}$ is detected by the first light receiving unit $212R_{201}$, and the light emitted from the second light emitting unit $211R_{202}$ is detected by the second light receiving unit $212R_{202}$. Thereby, it is detected that the amount of the cut staple stored in the cut staple storage unit $6Rf_{20}$ is not fully loaded.

The light emitted from the first light emitting unit $211R_{201}$ is not detected by the first light receiving unit $212R_{201}$, or the light emitted from the second light emitting unit $211R_{202}$ is not detected by the second light receiving unit $212R_{202}$. Thereby, it is detected that the amount of the cut staple stored in the cut staple storage unit $6Rf_{20}$ is fully loaded.

At the cut staple quantity detection unit $210R_{20}$, the full load detection is independently allowed by the one recovery passage $60R_L$ and the other recovery passage $60R_L$ of the cut staple storage unit $6Rf_{20}$.

FIG. 160 is a configuration diagram illustrating another modified example of the stapler of the embodiment in which the full load detection of the cut staple is performed by the optical sensor. Since a stapler $1Rf_{21}$ has the same configuration as the stapler $1Rf_1$ except for a cut staple quantity detection unit $210R_{21}$, overall description thereof will be omitted.

The stapler $1Rf_{21}$ has one discharge passage 33R that communicates with a cut part (not illustrated) and extends rearwards. When a cut staple storage unit $6Rf_{21}$ is mounted on the stapler $1Rf_{21}$, one recovery passage $60R_C$ communicating with the discharge passage 33R is provided at the center in a width direction. In the stapler $1Rf_{21}$, a discharge port $34R_C$ of the discharge passage 33R and a recovery port $61R_C$ of the recovery passage $60R_C$ of the cut staple storage unit $6Rf_{21}$ communicate with each other.

The stapler $1Rf_{21}$ and the cut staple storage unit $6Rf_{21}$ are provided with the optical cut staple quantity detection unit $210R_{21}$ that detects whether or not a given amount of cut staple stored in the cut staple storage unit $6Rf_{21}$ are present using whether or not the transmission of light is present.

The cut staple quantity detection unit $210R_{21}$ is an example of cut staple full load detection unit, and is provided with a light emitting unit $211R_{21}$ that emits light, and a light receiving unit $212R_{21}$ that detects the light emitted from the light emitting unit $211R_{21}$.

The light emitting unit $211R_{21}$ and the light receiving unit $212R_{21}$ are configured as one unit. The light emitting unit $211R_{21}$ is provided on a back surface of the stapler $1Rf_{21}$ such that a light emitting direction is directed to an inner side of the stapler $1Rf_{21}$, and the light receiving unit $212R_{21}$ is provided on the back surface of the stapler $1Rf_{21}$ such that a receiving direction of light is directed to an outer side of the stapler $1Rf_2$.

The light emitting unit $211R_{21}$ is provided to face one lateral surface of the recovery passage $60R_C$ of the cut staple storage unit $6Rf_{21}$ mounted on the stapler $1Rf_{21}$. In addition, the light receiving unit $212R_{21}$ is provided to face the other lateral surface of the recovery passage $60R_C$ of the cut staple storage unit $6Rf_{21}$.

When the cut staple storage unit $6Rf_{21}$ is mounted on the stapler $1Rf_{21}$, the light emitting unit $211R_{21}$ is transmitted through a window (not illustrated) of the recovery passage $60R_C$, and faces the light receiving unit $212R_{21}$. Thereby, an optical path along which the light emitted from the light emitting unit $211R_{21}$ is incident upon the light receiving unit $212R_{21}$ through the recovery passage $60R_C$ is formed.

Next, an example of operation and effects of the cut staple quantity detection unit $210R_{21}$ will be described. When the cut staple storage unit $6Rf_{21}$ is mounted on the stapler $1Rf_{21}$, and when the amount of cut staple that reaches a full load detection position of the recovery passage $60R_C$ are not stored in the cut staple storage unit $6Rf_{21}$, the light emitted from the light emitting unit $211R_{21}$ is incident upon the light receiving unit $212R_{21}$ through the recovery passage $60R_C$.

In contrast, when the amount of cut staple that reaches the full load detection position of the recovery passage $60R_C$ are stored in the cut staple storage unit $6Rf_{21}$, the light emitted from the light emitting unit $211R_{21}$ is obstructed on its optical path by the cut staple, and is not incident upon the light receiving unit $212R_{21}$.

Thus, at the cut staple quantity detection unit $210R_{21}$, the light emitted from the light emitting unit $211R_{21}$ is detected by the light receiving unit $212R_{21}$, and thereby it is detected that the amount of the cut staple stored in the cut staple storage unit $6Rf_{21}$ is not fully loaded.

In addition, the light emitted from the light emitting unit $211R_{21}$ is not detected by the light receiving unit $212R_{21}$, and thereby it is detected that the amount of the cut staple stored in the cut staple storage unit $6Rf_{21}$ is fully loaded.

At the cut staple quantity detection unit $210R_{21}$, when the cut staple storage unit $6Rf_{21}$ is demounted from the stapler $1Rf_{21}$, a staple cartridge 100A cannot be mounted and demounted on/from the stapler $1Rf_{21}$. Thereby, the cut staple can be recovered according to a timing when the staple cartridge 100A is mounted and demounted.

<Modified Example Using a Reflective Optical Sensor>

FIG. 161 is a configuration diagram illustrating another modified example of the stapler of the embodiment in which the full load detection of the cut staple is performed by the optical sensor. Since a stapler $1Rf_{22}$ has the same configuration as the stapler $1Rf_1$ except for a cut staple quantity detection unit $210R_{22}$, overall description thereof will be omitted.

The stapler $1Rf_{22}$ and a cut staple storage unit $6Rf_{22}$ are provided with the optical cut staple quantity detection unit $210R_{22}$ that detects whether or not a given amount of cut staple stored in the cut staple storage unit $6Rf_{22}$ are present using whether or not the transmission of light is present.

The cut staple quantity detection unit $210R_{22}$ is an example of cut staple full load detection unit, and is provided with a first light receiving/emitting unit $211R_{221}$ that receives/emits light, and a second light receiving/emitting unit $211R_{222}$ that receives/emits light. The first light receiving/emitting unit $211R_{221}$ and the second light receiving/emitting unit $211R_{222}$ are reflective optical sensors, and are provided with a light-emitting element (not illustrated) and a light-receiving element (not illustrated) that receives reflected light reflected from the light-emitting element.

The first light receiving/emitting unit $211R_{221}$ and the second light receiving/emitting unit $211R_{222}$ are provided on a back surface of the stapler $1Rf_{22}$ such that emitting and receiving directions of light are directed to the rear of the stapler $1Rf_{22}$. The first light receiving/emitting unit $211R_{221}$ is provided to face one recovery passage $60R_L$ of the cut staple storage unit $6Rf_{22}$ mounted on the stapler $1Rf_{22}$. In addition, the second light receiving/emitting unit $211R_{222}$ is provided to face the other recovery passage $60R_R$ of the cut staple storage unit $6Rf_{22}$ mounted on the stapler $1Rf_{22}$.

When the cut staple storage unit $6Rf_{22}$ is mounted on the stapler $1Rf_{22}$, the first light receiving/emitting unit $211R_{221}$ faces a window (not illustrated) of the one recovery passage 60RL. Thereby, an optical path along which the light emitted from the first light receiving/emitting unit $211R_{221}$ is reflected on the cut staple that are irradiation targets loaded on the one recovery passage $60R_L$ and is incident upon the first light receiving/emitting unit $211R_{221}$ is formed.

When the cut staple storage unit $6Rf_{22}$ is mounted on the stapler $1Rf_{22}$, the second light receiving/emitting unit $211R_{222}$ faces a window (not illustrated) of the other recovery passage $60R_R$. Thereby, an optical path along which the light emitted from the second light receiving/emitting unit $211R_{222}$ is reflected on the cut staple that are irradiation targets loaded on the other recovery passage $60R_R$ and is incident upon the second light receiving/emitting unit $211R_{222}$ is formed.

Next, an example of operation and effects of the cut staple quantity detection unit $210R_{22}$ will be described. When the cut staple storage unit $6Rf_{22}$ is mounted on the stapler $1Rf_{22}$, and when the amount of cut staple that reaches a full load detection position of the one recovery passage $60R_L$ and a full load detection position of the other recovery passage $60R_R$ are not stored in the cut staple storage unit $6Rf_{22}$, the light emitted from the first light receiving/emitting unit $211R_{221}$ is not reflected by the cut staple, and is not incident upon the first light receiving/emitting unit $211R_{221}$. The light emitted from the second light receiving/emitting unit $211R_{222}$ is not reflected by the cut staple, and is not incident upon the second light receiving/emitting unit $211R_{222}$.

In contrast, when the cut staple of the amount that reaches the full load detection position of the one recovery passage $60R_L$ are stored in the cut staple storage unit $6Rf_{22}$, the light emitted from the first light receiving/emitting unit $211R_{221}$ is reflected by the cut staple, and is incident upon the first light receiving/emitting unit $211R_{221}$. When the cut staple of the amount that reaches the full load detection position of the other recovery passage $60R_R$ are stored in the cut staple storage unit $6Rf_{22}$, the light emitted from the second light receiving/emitting unit $211R_{222}$ is reflected by the cut staple, and is incident upon the second light receiving/emitting unit $211R_{222}$.

Thus, at the cut staple quantity detection unit $210R_{22}$, the light emitted from the first light receiving/emitting unit $211R_{221}$ is not detected by the first light receiving/emitting unit $211R_{221}$, and the light emitted from the second light receiving/emitting unit $211R_{222}$ is not detected by the second light receiving/emitting unit $211R_{222}$. Thereby, it is detected that the amount of the cut staple stored in the cut staple storage unit $6Rf_{22}$ is not fully loaded.

The light emitted from the first light receiving/emitting unit $211R_{221}$ is detected by the first light receiving/emitting unit $211R_{221}$, or the light emitted from the second light receiving/emitting unit $211R_{222}$ is detected by the second light receiving/emitting unit $211R_{222}$. Thereby, it is detected that the amount of the cut staple stored in the cut staple storage unit $6Rf_{22}$ is fully loaded.

At the cut staple quantity detection unit $210R_{22}$, the full load detection is independently allowed by the one recovery passage $60R_L$ and the other recovery passage $60R_L$ of the cut staple storage unit $6Rf_{22}$.

FIG. 162 is a configuration diagram illustrating another modified example of the stapler of the embodiment in which the full load detection of the cut staple is performed by the optical sensor. Since a stapler $1Rf_{23}$ has the same configuration as the stapler $1Rf_1$ except for a cut staple quantity detection unit $210R_{23}$, overall description thereof will be omitted.

The stapler $1Rf_{23}$ has one discharge passage 33R that communicates with a cut part (not illustrated) and extends rearwards. When a cut staple storage unit $6Rf_{23}$ is mounted on the stapler $1Rf_{23}$, one recovery passage $60R_C$ communicating with the discharge passage 33R is provided at the center in a width direction. In the stapler $1Rf_{23}$, a discharge port $34R_C$ of the discharge passage 33R and a recovery port $61R_C$ of the recovery passage $60R_C$ of the cut staple storage unit $6Rf_{23}$ communicate with each other.

The stapler $1Rf_{23}$ and the cut staple storage unit $6Rf_{23}$ are provided with the optical cut staple quantity detection unit $210R_{23}$ that detects whether or not a given amount of cut staple stored in the cut staple storage unit $6Rf_3$ are present using whether or not the transmission of light is present.

The cut staple quantity detection unit $210R_{23}$ is an example of cut staple full load detection unit, and is provided with a light receiving/emitting unit $211R_{23}$ that receives/emits light. The light receiving/emitting unit $211R_{23}$ is a reflective optical sensor, and is provided with a light-emitting element (not illustrated), and a light-receiving element (not illustrated) that receives reflected light reflected from the light-emitting element.

The light receiving/emitting unit $211R_{23}$ is provided on a back surface of the stapler $1Rf_{23}$ such that emitting and receiving directions of light are directed to the rear of the stapler $1Rf_{23}$. The light receiving/emitting unit $211R_{23}$ is provided to face the recovery passage $60R_C$ of the cut staple storage unit $6Rf_2$ mounted on the stapler $1Rf_{23}$.

When the cut staple storage unit $6Rf_{23}$ is mounted on the stapler $1Rf_{23}$, the light receiving/emitting unit $211R_{23}$ faces a window (not illustrated) of the recovery passage $60R_C$. Thereby, an optical path along which the light emitted from the light receiving/emitting unit $211R_{23}$ is reflected on the cut staple loaded on the recovery passage $60R_C$ and is incident upon the light receiving/emitting unit $211R_{23}$ is formed.

Next, an example of operation and effects of the cut staple quantity detection unit $210R_{23}$ will be described. When the cut staple storage unit $6Rf_{23}$ is mounted on the stapler $1Rf_{23}$, and when the amount of cut staple that reaches a full load detection position of the recovery passage $60R_C$ are not stored in the cut staple storage unit $6Rf_{23}$, the light emitted from the light receiving/emitting unit $211R_{23}$ is not reflected by the cut staple, and is not incident upon the light receiving/emitting unit $211R_{23}$.

In contrast, when the cut staple of the amount that reaches the full load detection position of the recovery passage $60R_C$ are stored in the cut staple storage unit $6Rf_{23}$, the light emitted from the light receiving/emitting unit $211R_{23}$ is reflected by the cut staple, and is incident upon the light receiving/emitting unit $211R_{23}$.

Thus, at the cut staple quantity detection unit $210R_{23}$, the light emitted from the light receiving/emitting unit $211R_{23}$ is not detected by the light receiving/emitting unit $211R_{23}$, and thereby it is detected that the amount of the cut staple stored in the cut staple storage unit $6Rf_{23}$ is not fully loaded.

The light emitted from the light receiving/emitting unit $211R_{23}$ is detected by the light receiving/emitting unit $211R_{23}$, and thereby it is detected that the amount of the cut staple stored in the cut staple storage unit $6Rf_{23}$ is fully loaded.

At the cut staple quantity detection unit $210R_{23}$, when the cut staple storage unit $6Rf_3$ is demounted from the stapler $1Rf_{23}$, a staple cartridge 100A cannot be mounted and demounted on/from the stapler $1Rf_{23}$. Thereby, the cut staple can be recovered according to a timing when the staple cartridge 100A is mounted and demounted.

FIG. 163 is a configuration diagram illustrating another modified example of the stapler of the embodiment in which the full load detection of the cut staple is performed by the optical sensor. Since a stapler $1Rf_{24}$ has the same configuration as the stapler $1Rf_1$ except for a cut staple quantity detection unit $210R_{24}$, overall description thereof will be omitted.

The stapler $1Rf_{24}$ and a cut staple storage unit $6Rf_{24}$ are provided with the optical cut staple quantity detection unit $210R_{24}$ that detects whether or not a given amount of cut staple stored in the cut staple storage unit $6Rf_{24}$ are present using whether or not the transmission of light is present.

The cut staple quantity detection unit $210R_{24}$ is an example of cut staple full load detection unit, and is provided with a first light receiving/emitting unit $211R_{241}$ that receives/emits light, and a second light receiving/emitting unit $212R_{242}$ that receives/emits light. The first light receiving/emitting unit $211R_{241}$ and the second light receiving/emitting unit $211R_{242}$ are reflective optical sensors, and are provided with a light-emitting element (not illustrated) and a light-receiving element (not illustrated) that receives reflected light reflected from the light-emitting element.

The first light receiving/emitting unit $211R_{241}$ and the second light receiving/emitting unit $211R_{242}$ are provided on a back surface of the stapler $1Rf_{24}$ such that emitting and receiving directions of light are directed to an outer side of the stapler $1Rf_{24}$. The first light receiving/emitting unit $211R_{241}$ is provided to face an inner lateral surface of one recovery passage $60R_L$ of the cut staple storage unit $6Rf_{24}$ mounted on the stapler $1Rf_{24}$. In addition, the second light receiving/emitting unit $211R_{242}$ is provided to face an inner lateral surface of the other recovery passage $60R_R$ of the cut staple storage unit $6Rf_{24}$ mounted on the stapler $1Rf_{24}$.

When the cut staple storage unit $6Rf_{24}$ is mounted on the stapler $1Rf_{24}$, the first light receiving/emitting unit $211R_{241}$ faces a window (not illustrated) of the one recovery passage $60R_L$. Thereby, an optical path along which the light emitted from the first light receiving/emitting unit $211R_{241}$ is reflected on the cut staple that are irradiation targets loaded on the one recovery passage $60R_L$ and is incident upon the first light receiving/emitting unit $211R_{241}$ is formed.

When the cut staple storage unit $6Rf_{24}$ is mounted on the stapler $1Rf_{24}$, the second light receiving/emitting unit $211R_{242}$ faces a window (not illustrated) of the other recovery passage $60R_R$. Thereby, an optical path along which the light emitted from the second light receiving/emitting unit $211R_{242}$ is reflected on the cut staple that are irradiation targets loaded on the other recovery passage $60R_R$ and is incident upon the second light receiving/emitting unit $211R_{242}$ is formed.

Next, an example of operation and effects of the cut staple quantity detection unit $210R_{24}$ will be described. When the cut staple storage unit $6Rf_{24}$ is mounted on the stapler $1Rf_{24}$, and when the amount of cut staple that reaches a full load detection position of the one recovery passage $60R_L$ and a full load detection position of the other recovery passage $60R_R$ are not stored in the cut staple storage unit $6Rf_{24}$, the light emitted from the first light receiving/emitting unit $211R_{241}$ is not reflected by the cut staple, and is not incident upon the first light receiving/emitting unit $211R_{241}$. The light emitted from the second light receiving/emitting unit $211R_{242}$ is not reflected by the cut staple, and is not incident upon the second light receiving/emitting unit $211R_{242}$.

In contrast, when the cut staple of the amount that reaches the full load detection position of the one recovery passage $60R_L$ are stored in the cut staple storage unit $6Rf_{24}$, the light emitted from the first light receiving/emitting unit $211R_{241}$ is reflected by the cut staple, and is incident upon the first light receiving/emitting unit $211R_{241}$. When the cut staple of the amount that reaches the full load detection position of the other recovery passage $60R_R$ are stored in the cut staple storage unit $6Rf_{24}$, the light emitted from the second light receiving/emitting unit $211R_{242}$ is reflected by the cut staple, and is incident upon the second light receiving/emitting unit $211R_{242}$.

Thus, at the cut staple quantity detection unit $210R_{24}$, the light emitted from the first light receiving/emitting unit $211R_{241}$ is not detected by the first light receiving/emitting unit $211R_{241}$, and the light emitted from the second light receiving/emitting unit $211R_{242}$ is not detected by the second light receiving/emitting unit $211R_{242}$. Thereby, it is detected that the amount of the cut staple stored in the cut staple storage unit $6Rf_{24}$ is not fully loaded.

The light emitted from the first light receiving/emitting unit $211R_{241}$ is detected by the first light receiving/emitting unit $211R_{241}$, or the light emitted from the second light receiving/emitting unit $211R_{242}$ is detected by the second light receiving/emitting unit $211R_{242}$. Thereby, it is detected that the amount of the cut staple stored in the cut staple storage unit $6Rf_{24}$ is fully loaded.

At the cut staple quantity detection unit $210R_{24}$, the full load detection is independently allowed by the one recovery passage $60R_L$ and the other recovery passage $60R_L$ of the cut staple storage unit $6Rf_{24}$.

<Modified Example of the Post-Processing Apparatus of the Embodiment in which the Full Load Detection of the Cut Staple is Performed by the Optical Sensor>

FIG. 164 is a configuration diagram illustrating another modified example of the post-processing apparatus of the embodiment having the stapler in which the full load detection of the cut staple is performed by the optical sensor. Like the stapler $1Rf_1$ or the like illustrated in FIGS. 136 to 138, in the configuration in which the full load detection of the cut staple is performed, a post-processing apparatus $502R_1$ may be configured to be provided with an optical waveguide $213R_1$.

For example, in the configuration in which the stapler $1Rf_1$ or the like performing the full load detection of the cut staple is displaced as illustrated in FIG. 2, the optical waveguide $213R_1$ of the stapler $1Rf_1$ or the like is provided at a given detection position Pp10. When the stapler $1Rf_1$ moves to the detection position Pp10, the stapler $1Rf_1$ faces the optical waveguide $213R_1$.

Thus, an optical path along which the light emitted from the light emitting unit $211R_1$ is incident upon the light receiving unit $212R_1$ through the one recovery passage $60R_L$, the optical waveguide $213R_1$, and the other recovery passage $60R_R$ of the cut staple storage unit $6Rf_1$ is formed. Therefore, when the stapler $1Rf_1$ moves to the detection position Pp10, the full load detection of the cut staple is possible.

In contrast, when the stapler $1Rf_1$ moves to a non-detection position Pp11, the stapler $1Rf_1$ is separated from the optical waveguide $213R_1$. Thus, the optical path for the full load detection is not formed, and the full load detection of the cut staple is not performed excepting the given detection position.

FIG. 165 is a configuration diagram illustrating another modified example of the post-processing apparatus of the embodiment having the stapler in which the full load detection of the cut staple is performed by the optical sensor.

For example, in the stapler $1Rf_9$ illustrated in FIG. 147, the prism $214R_{91}$ constituting the first optical waveguide $213R_{91}$ and the prism $214R_{92}$ constituting the second optical waveguide $213R_{92}$ are provided for a mounting member 507R on which the stapler $1Rf_9$ is mounted.

The mounting member 507R is provided for a post-processing apparatus $502R_2$, and displaces the stapler $1Rf_9$ by driving a motor M as illustrated in FIG. 2.

The first optical waveguide $213R_{91}$ and the second optical waveguide $213R_{92}$ are provided for the post-processing apparatus $502R_2$. Thereby, it is not necessary to provide the optical waveguide for the cut staple storage unit $6Rf_9$.

FIG. 166 is a configuration diagram illustrating another modified example of the post-processing apparatus of the embodiment having the stapler in which the full load detection of the cut staple is performed by the optical sensor.

For example, in the stapler $1Rf_{17}$ illustrated in FIG. 156, the first light emitting unit $211R_{171}$ and the second light emitting unit $211R_{172}$ are provided for a mounting member 507R on which the stapler $1Rf_{17}$ is mounted.

The mounting member 507R is provided for a post-processing apparatus $502R_2$, and displaces the stapler $1Rf_{17}$ by driving a motor M as illustrated in FIG. 2. The first light receiving unit $212R_{171}$ and the second light receiving unit $212R_{172}$ may be provided for the mounting member 507R.

FIG. 167 is a configuration diagram illustrating another modified example of the post-processing apparatus of the embodiment having the stapler in which the full load detection of the cut staple is performed by the optical sensor.

For example, in the stapler $1Rf_{10}$ illustrated in FIG. 148, the first light emitting unit $211R_{101}$ and the first light receiving unit $212R_{101}$ configured as one unit and the second light emitting unit $211R_{102}$ and the second light receiving unit $212R_{102}$ configured as one unit are provided for a mounting member 507R on which the stapler $1Rf_{10}$ is mounted.

The mounting member 507R is provided for a post-processing apparatus $502R_2$, and displaces the stapler $1Rf_{10}$ by driving a motor M as illustrated in FIG. 2.

The first light emitting unit $211R_{101}$ and the first light receiving unit $212R_{101}$, and the second light emitting unit $211R_{102}$ and the second light receiving unit $212R_{102}$ are provided for the post-processing apparatus $502R_2$, and thereby it is not necessary to provide the light receiving and emitting parts for the stapler $1Rf_{10}$.

FIG. 168 is a configuration diagram illustrating another modified example of the post-processing apparatus of the embodiment having the stapler in which the full load detection of the cut staple is performed by the optical sensor. A post-processing apparatus $502R_3$ provides a first light receiving/emitting unit $211R_{251}$ that receives/emits light and a second light receiving/emitting unit $211R_{252}$ that receives/emits light, which serve as a cut staple quantity detection unit $210R_{25}$, at a given detection position Pp10. The first light receiving/emitting unit $211R_{251}$ and the second light receiving/emitting unit $211R_{252}$ are reflective optical sensors, and are provided with a light-emitting element (not illustrated), and a light-receiving element (not illustrated) that receives reflected light reflected from the light-emitting element.

When the stapler $1Rf_{25}$ moves to the detection position Pp10, the first light receiving/emitting unit $211R_{251}$ faces one recovery passage $60R_L$ of a cut staple storage unit $6Rf_{25}$ mounted on the stapler $1Rf_{25}$. The second light receiving/emitting unit $211R_{252}$ faces the other recovery passage $60R_R$ of the cut staple storage unit $6Rf_{25}$ mounted on the stapler $1Rf_{25}$.

The first light receiving/emitting unit $211R_{251}$ faces a window (not illustrated) of the one recovery passage $60R_L$. Thereby, an optical path along which the light emitted from the first light receiving/emitting unit $211R_{251}$ is reflected on cut staple that are irradiation targets loaded on the one recovery passage $60R_L$ and is incident upon the first light receiving/emitting unit $211R_{251}$ is formed. In addition, the second light receiving/emitting unit $211R_{252}$ faces a window (not illustrated) of the other recovery passage $60R_R$. Thereby, an optical path along which the light emitted from the second light receiving/emitting unit $211R_{252}$ is reflected on cut staple that are irradiation targets loaded on the other recovery passage $60R_R$ and is incident upon the second light receiving/emitting unit $211R_{252}$ is formed. Therefore, when the stapler $1Rf_{25}$ moves to the detection position Pp10, full load detection of the cut staple is possible.

In contrast, when the stapler $1Rf_{25}$ moves to a non-detection position Pp11, the stapler $1Rf_{25}$ is separated from the first light receiving/emitting unit $211R_{251}$ and the second light receiving/emitting unit $211R_{252}$. Thereby, the optical path for the full load detection is not formed, and the full load detection of the cut staple is not performed excepting the given detection position.

At the post-processing apparatus $502R_3$, it is not necessary to provide the cut staple quantity detection unit for the stapler $1Rf_{25}$. The detection position Pp10 may be provided at a plurality of places. In this case, the first light receiving/emitting unit $211R_{251}$ and the second light receiving/emitting unit $211R_{252}$ are provided at each detection position Pp10.

FIG. 169 is a configuration diagram illustrating another modified example of the post-processing apparatus of the embodiment having the stapler in which the full load detection of the cut staple is performed by the optical sensor.

A post-processing apparatus $503R_4$ provides a light emitting unit $211R_{26}$ and a light receiving unit $212R_{26}$, which serve as a cut staple quantity detection unit $210R_{26}$, for a mounting member 507R on which a stapler $1Rf_{26}$ is mounted.

When the stapler $1Rf_{26}$ is mounted on the mounting member 507R, the light emitting unit $211R_{26}$ faces a window (not illustrated) of one recovery passage $60R_L$ of a cut staple storage unit $6Rf_{26}$ mounted on the stapler $1Rf_{26}$, and the light receiving unit $212R_{26}$ faces a window (not illustrated) of the other recovery passage $60R_R$. The light receiving unit $212R_{26}$ is provided in an optical path of light emitted from the light emitting unit $211R_{26}$. Thereby, an optical path along which the light emitted from the light emitting unit $211R_{26}$ is incident upon the light receiving unit $212R_{26}$ through the one recovery passage $60R_L$ and the other recovery passage $60R_R$ is formed.

The mounting member 507R displaces the stapler $1Rf_{26}$ by driving a motor M as illustrated in FIG. 2.

The light emitting unit $211R_{26}$ and the light receiving unit $212R_{26}$ are provided for the post-processing apparatus $502R_4$, and thereby it is not necessary to provide the light receiving/emitting unit for the stapler $1Rf_{26}$.

What is claimed is:

1. A stapler comprising:
    a staple cartridge in which a staple is stored;
    a storage unit to which the staple cartridge is detachably attached;
    a staple ejecting unit which ejects the staple to penetrate a paper sheet;
    a cutting unit which cuts a staple leg of the staple penetrating the paper sheet;
    a binding unit which bends the staple leg of the staple penetrating the paper sheet to bind the paper sheet;
    a cut staple storage unit which stores a cut staple that is cut by the cutting unit;
    a cut staple quantity detection unit which detects a quantity of the cut staple stored in the cut staple storage unit; and
    a discharge unit through which the cutting unit and the cut staple storage unit communicate with each other to guide the cut staple to the cut staple storage unit,
    wherein the cut staple storage unit is attachable to and detachable from the stapler, and
    wherein the cut staple quantity detection unit detects the presence or absence of a predetermined quantity of the cut staple stored in the cut staple storage unit, based on the presence or absence of light transmission, and the cut staple quantity detection device comprises:
    a light emitting unit which emits light,
    a light receiving unit which detects the presence or absence of light which is emitted from the light emitting unit and passes through the cut staple storage unit, and
    an optical waveguide which forms an optical path that guides light emitted from the light emitting unit to the light receiving unit.

2. The stapler according to claim 1, wherein the cut staple quantity detection unit detects the quantity of the cut staple in accordance with a loading height of the cut staple displaced in a direction of the cut staple storage unit.

3. The stapler according to claim 1, wherein the cut staple quantity detection unit detects that the quantity of the cut staple stored in the cut staple storage unit is full, and performs detachment detection of the cut staple storage unit.

4. The stapler according to claim 1, wherein the cut staple quantity detection unit detects the presence or absence of the cut staple at a plurality of places along a stacking direction of the cut staples stored in the cut staple storage unit.

5. The stapler according to claim 1, wherein the quantity of the cut staple detected by the cut staple quantity detection unit is reported to a post-processing apparatus.

6. The stapler according to claim 1, wherein the cut staple storage unit includes a first recovery passage and a second recovery passage, the light emitting unit emits light which passes through the first recovery passage to the optical waveguide, and light from the optical waveguide passes through the second recovery passage to the light receiving unit.

7. The stapler according to claim 6, wherein the first recovery passage includes a first window and light from the light emitting device passes through the first window to the optical waveguide, and wherein the second recovery passage includes a second window and light passes from the optical waveguide through the second window to the light receiving unit.

8. The stapler according to claim 1, wherein light passes through the cut staple storage unit between at least one of: the light emitting unit and the optical waveguide, or the optical waveguide and the light receiving unit.

9. The stapler according to claim 8, wherein the cut staple storage unit includes a first window on an upstream side of the optical waveguide and a second window on a downstream side of the optical waveguide, such that light passes through the cut staple storage unit both between the light emitting unit and the optical waveguide by way of the first window, and the optical waveguide and the light receiving unit by way of the second window.

10. A post-processing apparatus comprising a stapler, the post-processing apparatus performing post-processing on a paper sheet on which an image is formed, the stapler including:
    a staple cartridge in which a staple is stored;
    a storage unit to which the staple cartridge is detachably attached;
    a staple ejecting unit which ejects a staple to penetrate a paper sheet;
    a cutting unit which cuts a staple leg of the staple penetrating the paper sheet;
    a binding unit which bends the staple leg of the staple penetrating the paper sheet to bind the paper sheet;
    a cut staple storage unit which stores a cut staple that is cut by the cutting unit; and a discharge unit through which the cutting unit and the cut staple storage unit communicate with each other to guide a cut staple to a cut staple storage unit, wherein the cut staple storage unit is attachable to and detachable from the stapler, and wherein the post-processing apparatus further comprises a cut staple quantity detection unit which detects a quantity of the cut staple stored in the cut staple storage unit, and wherein the cut staple quantity detection unit comprises:

a light emitting unit which emits light, a light receiving unit which detects the presence or absence of light which is emitted from the light emitting unit and passes through the cut staple storage unit, and an optical waveguide which forms an optical path that guides light emitted from the light emitting unit to the light receiving unit.

11. The post-processing apparatus according to claim 10, wherein the cut staple quantity detection unit is provided in the stapler.

12. An image forming system comprising:

an image forming apparatus which forms an image on a paper sheet and outputs the image; and the post-processing apparatus according to claim 10 which is connected to the image forming apparatus and performs post-processing on the paper sheet.

13. The post-processing apparatus according to claim 10, wherein the cut staple storage unit includes a first recovery passage and a second recovery passage, the light emitting unit emits light which passes through the first recovery passage to the optical waveguide, and light from the optical waveguide passes through the second recovery passage to the light receiving unit.

14. The post-processing apparatus according to claim 13, wherein the first recovery passage includes a first window and light from the light emitting device passes through the first window to the optical waveguide, and wherein the second recovery passage includes a second window and light passes from the optical waveguide through the second window to the light receiving unit.

15. The post-processing apparatus according to claim 10, wherein light passes through the cut staple storage unit between at least one of: the light emitting unit and the optical waveguide, or the optical waveguide and the light receiving unit.

16. The post-processing apparatus according to claim 15, wherein the cut staple storage unit includes a first window on an upstream side of the optical waveguide and a second window on a downstream side of the optical waveguide, such that light passes through the cut staple storage unit both between the light emitting unit and the optical waveguide by way of the first window, and the optical waveguide and the light receiving unit by way of the second window.

* * * * *